United States Patent
Gordon et al.

(10) Patent No.: US 10,853,053 B1
(45) Date of Patent: Dec. 1, 2020

(54) SYSTEM, METHOD, AND COMPUTER PROGRAM PRODUCT FOR COORDINATION AMONG MULTIPLE DEVICES

(71) Applicant: MAJEN TECH, LLC, Longview, TX (US)

(72) Inventors: George Andrew Gordon, Fisco, TX (US); Joseph A Cerrato, Longview, TX (US); Ronald A Johnston, Longview, TX (US); Kevin J Zilka, Los Gatos, CA (US)

(73) Assignee: MAJEN TECH, LLC, Longview, TX (US)

( * ) Notice: Subject to any disclaimer, the term of this patent is extended or adjusted under 35 U.S.C. 154(b) by 0 days.

(21) Appl. No.: 16/920,645

(22) Filed: Jul. 3, 2020

Related U.S. Application Data

(63) Continuation of application No. 16/537,488, filed on Aug. 9, 2019, now Pat. No. 10,776,103, which is a
(Continued)

(51) Int. Cl.
*G06F 3/0482* (2013.01)
*G06F 9/54* (2006.01)
(Continued)

(52) U.S. Cl.
CPC .............. *G06F 8/65* (2013.01); *G06F 3/0482* (2013.01); *G06F 9/543* (2013.01); *H04W 4/80* (2018.02)

(58) Field of Classification Search
CPC .......... G06F 8/65; G06F 9/543; G06F 3/0482; H04W 4/80
See application file for complete search history.

(56) References Cited

U.S. PATENT DOCUMENTS

| 2007/0079244 A1* | 4/2007 | Brugiolo | G06F 9/452 715/740 |
| 2009/0178006 A1* | 7/2009 | Lemay | G06F 3/04817 715/835 |

(Continued)

*Primary Examiner* — Daxin Wu
(74) *Attorney, Agent, or Firm* — Patrick E. Caldwell, Esq.; The Caldwell Firm, LLC

(57) ABSTRACT

In various embodiments, a system, method, and computer program are provided involving: a first device including a desktop computer or a lap-top computer; and a second device including a tablet; where at least one first processor of the first device is configured to execute first instructions for causing the first device to: display content via a first display of the first device utilizing an application; and display an option via the first display of the first device for, in response to a detection of a selection thereof via the first input device of the first device, causing display of the content on a touchscreen of the tablet in a mode of operation during which the touchscreen of the tablet operates as a secondary display for the first device, where a state is capable of being communicated with the tablet via a wireless connection; and where the at least one second processor of the tablet is configured to execute the second instructions for, in response to the detection of the selection of the option via the first input device of the first device, causing the tablet to: display, via the touchscreen of the tablet, an interface including: based on the state received from the first device, the content for, in response to a detection of a finger gesture thereon via the touchscreen of the tablet, being manipulated; a first indicia for, in response to a detection of a selection thereof via the touchscreen of the tablet, changing at least one aspect of the mode of operation, and a second indicia for, in response to a detection of a selection thereof via the touchscreen of the tablet, displaying a virtual keyboard for providing keyboard input in connection with the content.

30 Claims, 59 Drawing Sheets

Related U.S. Application Data continuation-in-part of application No. 15/925,737, filed on Mar. 19, 2018, which is a continuation-in-part of application No. 13/652,458, filed on Oct. 15, 2012, now abandoned.

(60) Provisional application No. 61/577,657, filed on Dec. 19, 2011.

(51) Int. Cl.
*G06F 8/65* (2018.01)
*H04W 4/80* (2018.01)

(56) References Cited

U.S. PATENT DOCUMENTS

| | | | |
|---|---|---|---|
| 2010/0100825 A1* | 4/2010 | Sharoni | H04L 67/2823 715/740 |
| 2010/0153866 A1* | 6/2010 | Sharoni | H04M 1/72544 715/762 |
| 2011/0143769 A1* | 6/2011 | Jones | H04M 1/0256 455/456.1 |
| 2011/0230178 A1* | 9/2011 | Jones | H04M 1/0235 455/422.1 |
| 2011/0282785 A1* | 11/2011 | Chin | G06F 21/32 705/42 |
| 2012/0066602 A1* | 3/2012 | Chai | H04L 65/403 715/733 |
| 2012/0127083 A1* | 5/2012 | Kushler | G06F 3/04886 345/169 |
| 2012/0144347 A1* | 6/2012 | Jo | G06F 3/04817 715/863 |
| 2012/0159380 A1* | 6/2012 | Kocienda | G06F 3/04883 715/783 |

* cited by examiner

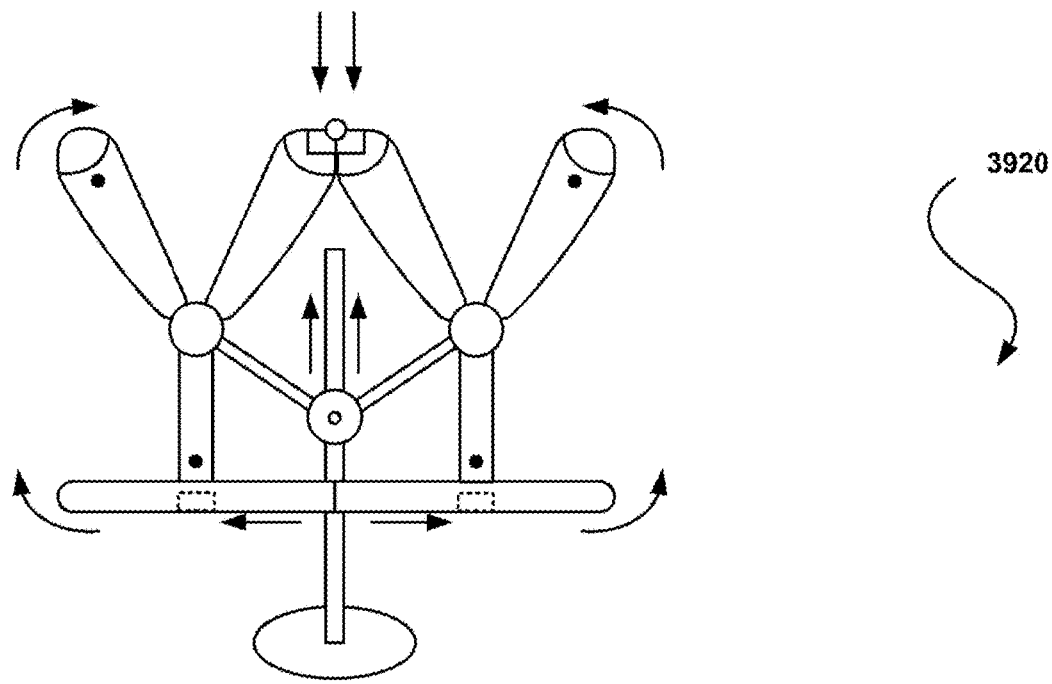
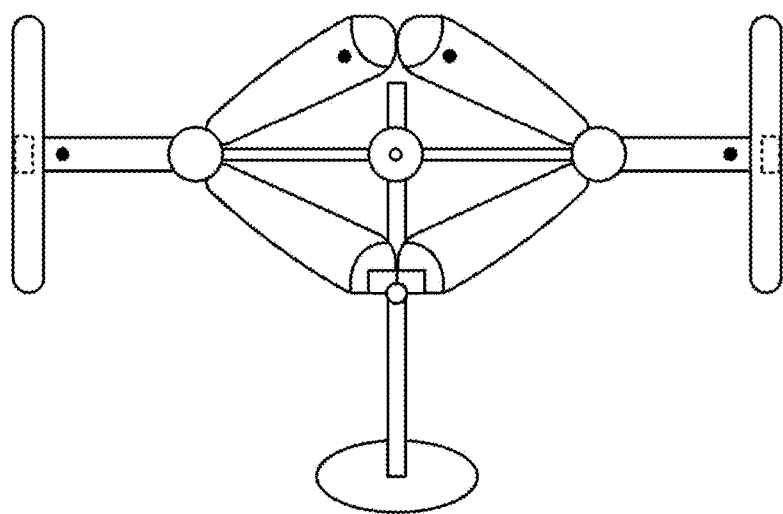
FIGURE 39B

SYSTEM, METHOD, AND COMPUTER PROGRAM PRODUCT FOR COORDINATION AMONG MULTIPLE DEVICES

The present application is a continuation of and claims priority to U.S. application Ser. No. 16/537,488, filed Aug. 9, 2019, which, in turn, is a continuation-in-part of and claims priority to U.S. application Ser. No. 15/925,737, filed Mar. 19, 2018, which, in turn, is a continuation-in-part of and claims priority to U.S. application Ser. No. 13/652,458, filed Oct. 15, 2012, which, in turn, claims priority to U.S. Provisional Application No. 61/577,657 dated Dec. 19, 2011. U.S. application Ser. No. 16/537,488, filed Aug. 9, 2019 (published as U.S. Patent Publication No. 2019-0361694), and U.S. Provisional Application No. 61/577,657 dated Dec. 19, 2011 are each incorporated herein by reference for all purposes.

FIELD OF THE INVENTION AND BACKGROUND

The present invention relates to mobile devices, and more particularly to device coordination.

SUMMARY

In various embodiments, a system, method, and computer program are provided involving: a first device including a first Bluetooth interface, a first Wi-Fi interface, a first input device, a first display, at least one first processor, and a first memory storing first instructions and an application, the first device including a desktop computer or a lap-top computer; and a second device including a second Bluetooth interface, a second Wi-Fi interface, a touchscreen including a second input device and a second display, at least one second processor, and a second memory storing second instructions, the second device including a tablet; where the at least one first processor of the first device is configured to execute the first instructions for causing the first device to: display content via the first display of the first device utilizing the application; and display an option via the first display of the first device for, in response to a detection of a selection thereof via the first input device of the first device, causing display of the content on the touchscreen of the tablet in a mode of operation during which the touchscreen of the tablet operates as a secondary display for the first device, where a state is capable of being communicated with the tablet via a wireless connection; and where the at least one second processor of the tablet is configured to execute the second instructions for, in response to the detection of the selection of the option via the first input device of the first device, causing the tablet to: display, via the touchscreen of the tablet, an interface including: based on the state received from the first device, the content for, in response to a detection of a finger gesture thereon via the touchscreen of the tablet, being manipulated; a first indicia for, in response to a detection of a selection thereof via the touchscreen of the tablet, changing at least one aspect of the mode of operation, and a second indicia for, in response to a detection of a selection thereof via the touchscreen of the tablet, displaying a virtual keyboard for providing keyboard input in connection with the content.

BRIEF DESCRIPTION OF THE DRAWINGS

FIG. 39B shows a dual display mount apparatus in a landscape orientation, in accordance with one embodiment.

DETAILED DESCRIPTION

Figure 1:
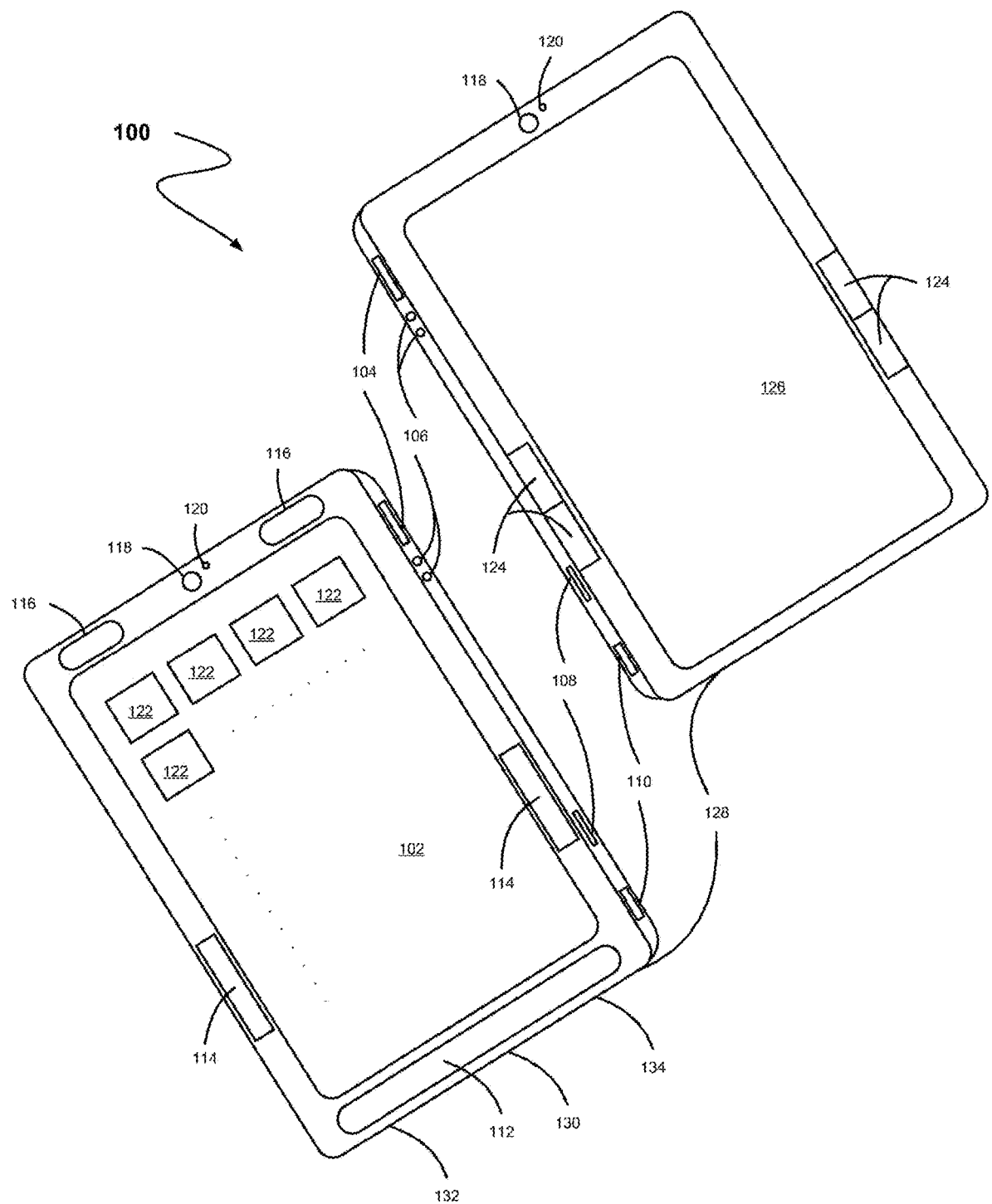
FIG. 1 illustrates a tablet apparatus, in accordance with another possible embodiment.

FIG. 1 illustrates a tablet apparatus 100, in accordance with one embodiment. As an option, the apparatus 100 may be implemented in the context of the architecture and environment of any subsequent Figure(s). Of course, however, the apparatus 100 may be implemented in any desired environment.

As shown, a tablet housing 128 is included. A first backlit touchscreen display 102 positioned on a first face of the tablet housing is included. Additionally, a second electronic ink (e-ink) display 126 is positioned on a second face of the tablet housing.

In the context of the present description, a tablet housing refers to any structure that is capable of supporting and/or enclosing a tablet. For example, in various embodiments, the tablet housing may include, but is not limited to, textured or otherwise tactile features to enhance gripping by a human user. Additionally, the tablet housing may be of one-piece construction, or may be assembled from a plurality of sub-components or sub-portions. Further, in the context of the present description, a tablet refers to a portable computer equipped with a touchscreen. For example, in one embodiment, the tablet may include a personal digital assistant (PDA), a laptop personal computer with a rotatable touchscreen, a tablet computer (e.g. Apple i-pad, Microsoft Slate, etc.), and/or any other portable computer equipped with a touchscreen. In another embodiment, at least one of the first backlit touchscreen display or the second e-ink display may be inset in the tablet housing to prevent damage thereto.

In the context of the present description, a touchscreen display refers to a display which may receive a touch input.

For example, the touchscreen display may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touchscreen. Additionally, the touchscreen display may use LCD (liquid crystal display) technology, or LPD (light emitting polymer display) technology, although other display technologies may be used in other embodiments.

Further, in the context of the present description, an e-ink display refers to any display which is bi-stable. In the context of the present description, bi-stable refers to being capable of holding text or other rendered images even when very little or no power is supplied to the display. In one embodiment, the e-ink display may include a display that has a resolution 150 dpi or better. In another embodiment, the e-ink display may include any technology which may exhibit high contrast, or contrast substantially equal to that of print on paper. For example, the e-ink display may include displays such as bi-stable LCDs, MEMS, cholesteric, pigmented electrophoretic, E Ink-brand display, etc. Further, in one embodiment, the e-ink display may display visual content in black-and-white or grayscale. In some embodiments, the e-ink display may display visual content in color.

In one embodiment, the apparatus 100 may include a touchscreen display 102, an e-ink display 126, a first button 104 for executing a command, volume adjustment button(s) 106, an external media card slot 108, a second button 110 for executing a command, a headset jack 134, a docking/charging external port 130, a microphone 132, a panel of touch sensitive buttons 112, one or more touch sensitive sensor(s) 114, one or more speaker(s) 116, one or more optical sensor(s) 118, one or more proximity sensor(s) 120, one or more applications 122, and one or more operational tools 124. In one embodiment, the foregoing components may be positioned as depicted in FIG. 1, and, in other embodiments, they may be positioned differently (e.g. in different locations of the face shown, on a different face, removed altogether, etc.).

In the context of the present description, a panel of touch-sensitive buttons refers to a touch sensitive button for activating or deactivating particular functions. For example, in some embodiments, the touch-sensitive button may include a home button, a back button, a menu option button, or any other programmable function. In other embodiments, the panel of touch sensitive buttons may be a touch-sensitive area of the device that, unlike the touchscreen, does not display visual output.

In the context of the present description, a touch sensitive sensor refers to a touch sensor which is programmable to more than one particular function. For example, in one embodiment, the sensor may function as a fingerprint reader, a programmable button (e.g. a button to launch a program, take a photo, etc.), a touchscreen displaying visual output (e.g. game console is displayed when playing a game, music controls are displayed when playing music, etc.), etc. Additionally, the sensor may be programmed to function in response to application commands (e.g. game function commands), tablet system controls (e.g. brightness settings, etc.), login verification process (e.g. authentication user), or in response to any input by the user.

In the context of the present description, an optical sensor refers to a sensor which converts an optical image into an electronic signal. For example, the optical sensor may function as a camera, video camera, motion detector, etc.

Additionally, in the context of the present description, a proximity sensor refers to a sensor which detects the presence of an object or motion detection. For example, the proximity sensor may include sensing when a device is placed near a user's ear (e.g., when the user is making a phone call, etc.), is enclosed within a case, when a user is using a device, and/or when the device comes in close proximity to another object.

In the context of the present description, a control operational tool refers to a mechanical tool for activating or deactivating particular functions. For example, in one embodiment, the control buttons may include a power on/off, menu selection capabilities, volume control, brightness/contrast functionality, or page forward/backward functionality, and/or any other functionality that can be programmed to the tool.

More illustrative information will now be set forth regarding various optional architectures and features with which the foregoing techniques discussed in the context of any of the present or subsequent figure(s) may or may not be implemented, per the desires of the user. For instance, various optional examples and/or options associated with the tablet housing 128, the first backlit touchscreen display positioned on a first face of the tablet housing 102, the second e-ink display positioned on a second face of the tablet housing 126, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion other features described.

Figure 2:
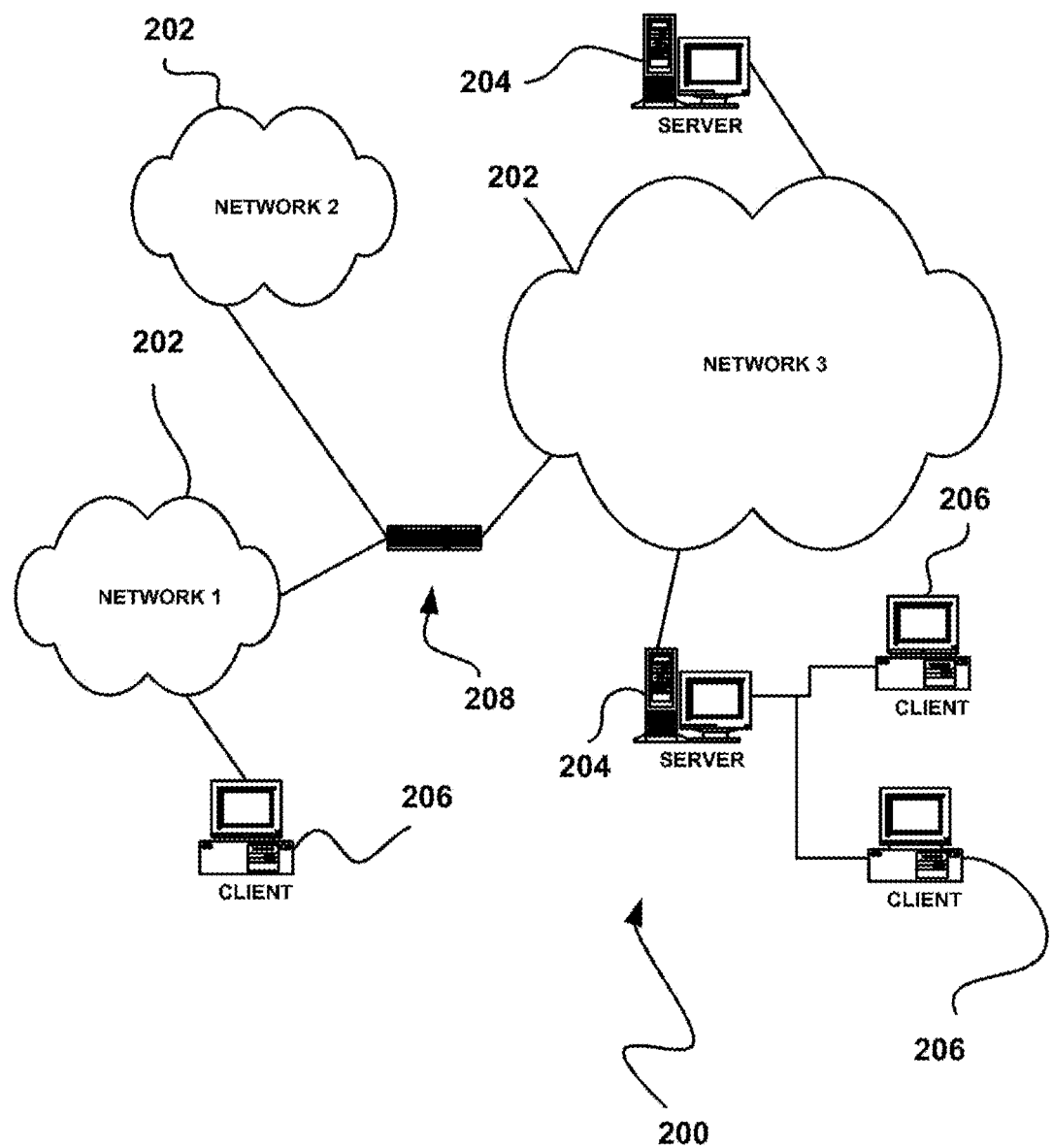
FIG. 2 illustrates a network architecture, in accordance with another possible embodiment.

FIG. 2 illustrates a network architecture 200, in accordance with one embodiment. As shown, a plurality of networks 202 is provided. In the context of the present network architecture 200, the networks 202 may each take any form including, but not limited to a local area network (LAN), a wireless network, a wide area network (WAN) such as the Internet, peer-to-peer network, etc.

Coupled to the networks 202 are servers 204 which are capable of communicating over the networks 202. Also coupled to the networks 202 and the servers 204 is a plurality of clients 206. Such servers 204 and/or clients 206 may each include a desktop computer, tablet computer, e-ink reader, lap-top computer, hand-held computer, mobile phone, personal digital assistant (PDA), peripheral (e.g. printer, etc.), any component of a computer, and/or any other type of logic. In order to facilitate communication among the networks 202, at least one gateway 208 is optionally coupled therebetween.

Figure 3:
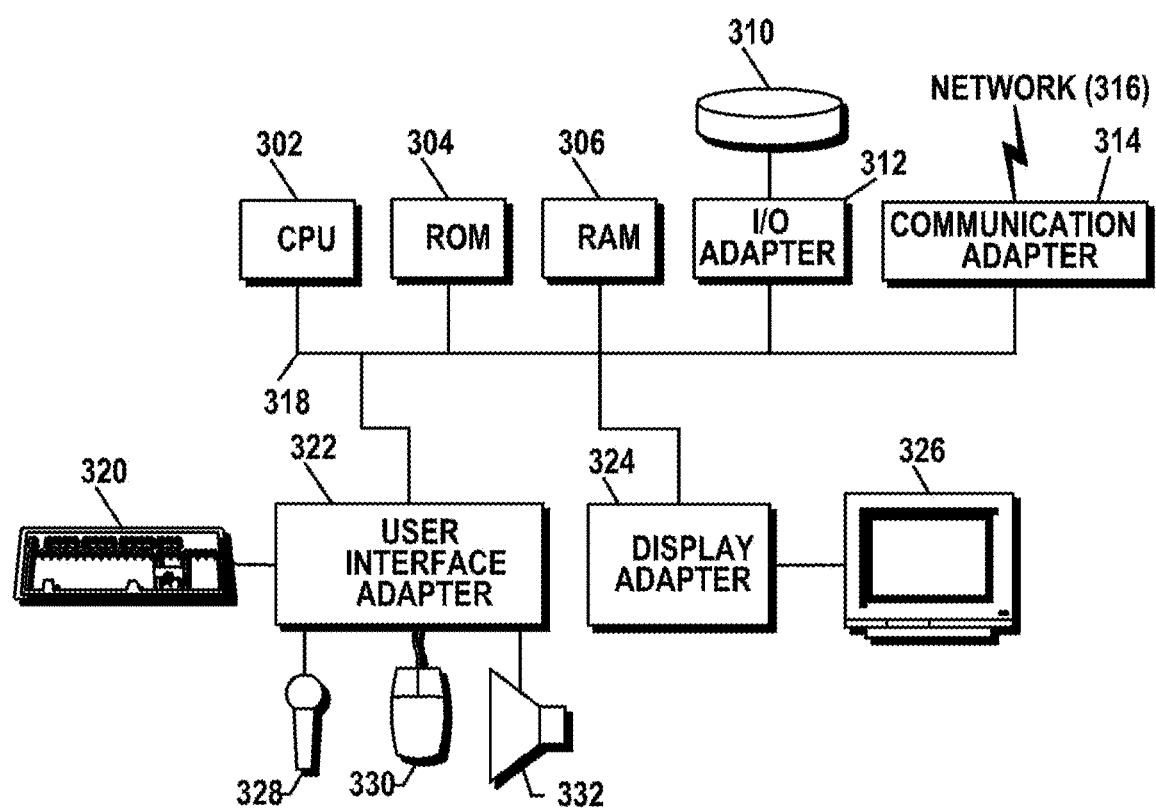
FIG. 3 shows a representative hardware environment that may be associated with the servers and/or clients of FIG. 2, in accordance with one embodiment.

FIG. 3 shows a representative hardware environment that may be associated with the servers 204 and/or clients 206 of FIG. 2, in accordance with one embodiment. Such figure illustrates a typical hardware configuration a workstation in accordance with one embodiment having a central processing unit 302, such as a microprocessor, and a number of other units interconnected via a system bus 318.

The workstation shown in FIG. 3 includes a Random Access Memory (RAM) 306, Read Only Memory (ROM) 304, an I/O adapter 312 for connecting peripheral devices such as disk storage units 310 to the bus 318, a user interface adapter 322 for connecting a keyboard 320, a mouse 330, a speaker 332, a microphone 328, and/or other user interface devices such as a touch screen (not shown) to the bus 318, communication adapter 314 for connecting the workstation to a communication network 316 (e.g., a data processing network) and a display adapter 324 for connecting the bus 318 to a display device 326. Computer programs, or computer control logic algorithms, may be stored in the disk storage units 310.

The workstation may have resident thereon any desired operating system. It will be appreciated that an embodiment may also be implemented on platforms and operating systems other than those mentioned. One embodiment may be written using JAVA, C, Objective C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 4:
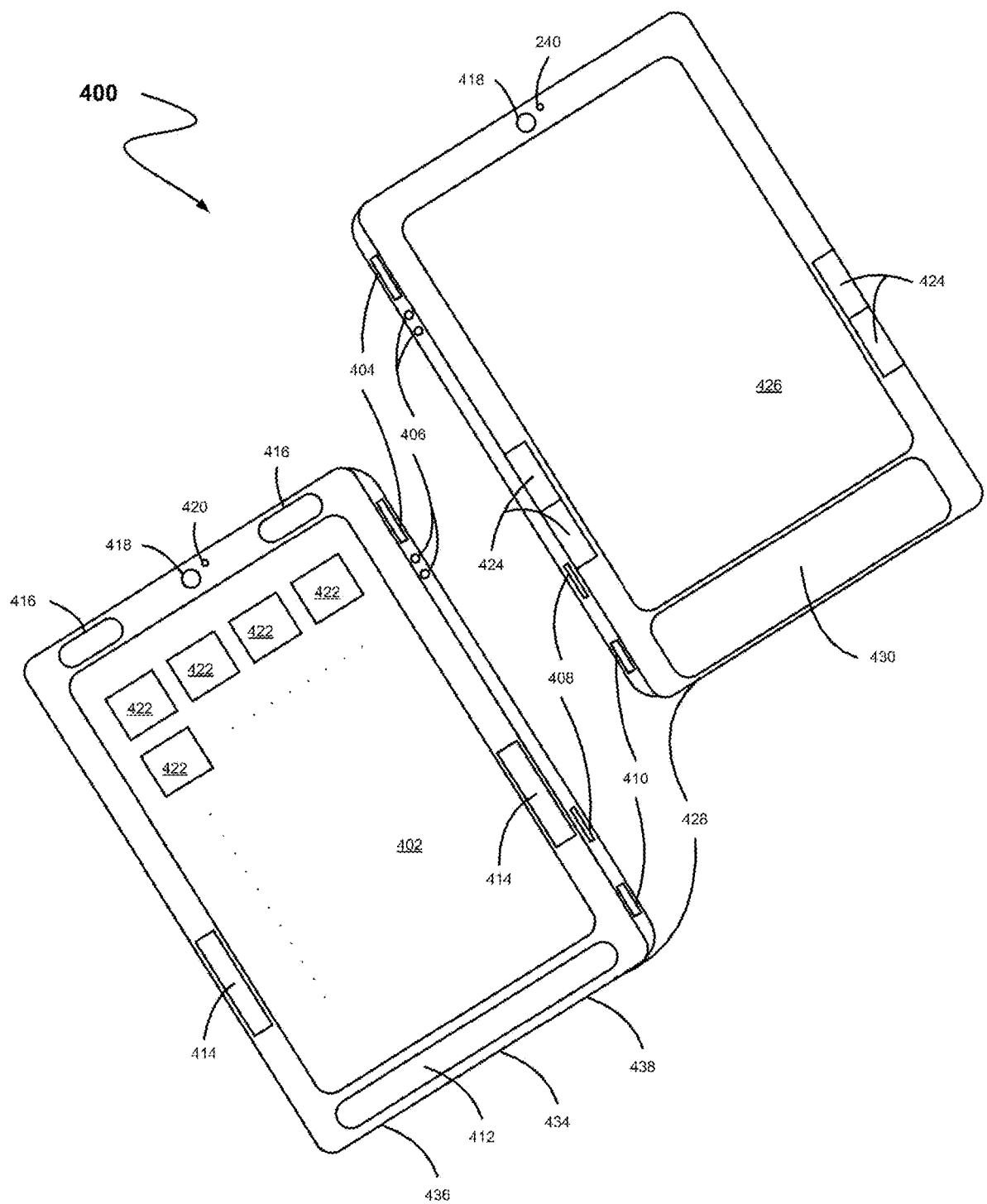
FIG. 4 illustrates a tablet apparatus having a first backlit touchscreen display and a second electronic ink (e-ink) display, in accordance with another possible embodiment.

FIG. 4 illustrates a tablet apparatus 400, in accordance with one embodiment. As an option, the apparatus 400 may be implemented in the context of the architecture and environment of the previous Figures or any subsequent Figure(s). Of course, however, the apparatus 400 may be implemented in any desired environment. It should also be noted that the aforementioned definitions may apply during the present description.

As shown, a tablet housing 428 is included. A first backlit touchscreen display 402 positioned on a first face of the tablet housing is included. Additionally, a second e-ink display 426 positioned on a second face of the tablet housing is included.

In one embodiment, the apparatus 400 may include, but is not limited to, the touchscreen display 402, the e-ink display 426, a first button 404 for executing a command, volume adjustment button(s) 406, an external media card slot 408, a second button 410 for executing a command, a headset jack 438, a docking/charging external port 434, a microphone 436, a panel of touch sensitive buttons 412, one or more touch sensitive sensor(s) 414, one or more speaker(s) 416, one or more optical sensor(s) 418, one or more proximity sensor(s) 420, one or more applications 422, one or more operational tools 424, and a touchscreen panel 430. In one embodiment, the foregoing components may be positioned as depicted in FIG. 4, and, in other embodiments, they may be positioned differently (e.g. in different locations of the face shown, on a different face, removed altogether, etc.).

In one embodiment, the touchscreen display may have a resolution in excess of 100 dpi. The user may make contact with the touchscreen display using any suitable object or appendage, such as a stylus, a finger, a pen, etc. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In use, the first button 404 may be adapted for executing a command. In one embodiment, the first button 404 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. Furthermore, in one embodiment, depressing the first button 404 while pressing another button may function to execute a command. In various embodiments, such command may include a screen capture command, a command to record a video, a command to take a picture, a command to record audio, a short-cut command, and/or various other commands.

As shown, the apparatus may include a second button for executing a command. In a further embodiment, the second button may be used to take a picture, activate an application, implement a predefined state of settings, and/or execute any preconfigured command.

In another embodiment, the optical sensor 418 may include charge-coupled device (CCD) or complementary metal-oxide semiconductor (CMOS) phototransistors. The optical sensor receives light from the environment, projected through one or more lens, and converts the light to data representing an image. As such, the optical sensor may capture still images or video.

In some embodiments, a second optical sensor may optionally be located on the second face of the tablet housing so that the touchscreen display may be used as a viewfinder for either still and/or video image acquisition. In some embodiments, an optical sensor is located on the first face (e.g. front of the apparatus) so that the user's image may be obtained for videoconferencing while the user views the other video conference participants on the touch screen display. In some embodiments, the position the optical sensor may be changed by the user (e.g., by rotating the lens and the sensor in the device housing) so that a single optical sensor may be used along with the touch screen display for both video conferencing and still and/or video image acquisition.

Additionally, in another embodiment, the proximity sensors 420 may turn off and disable the touchscreen display or the second e-ink display. For example, the proximity sensor may include sensing when a device is placed near a user's ear (e.g., when the user is making a phone call, etc.), is enclosed within a case, when a user is using a device, and/or when the device comes in close proximity to another object. In another embodiment, the proximity sensor may be used to activate and turn on the touchscreen display or the second e-ink display.

In another embodiment, the apparatus may also include one or more accelerometers (not shown). In the context of the present description, an accelerometer refers to an instrument that measures acceleration. In one embodiment, once the accelerometer detects a movement of the apparatus, a moving direction may be determined based on the movement data provided by the accelerometer. In the context of the present description, a moving direction may refer to a moving vector or an acceleration vector. In the context of the present description, a moving vector may refer to any change in position of an object, and an acceleration vector may refer the rate of change of both the magnitude and the direction velocity with time.

The moving direction and/or the movement data may be provided to a software component (e.g., application software) executed within the apparatus. In response to the detection of the movement of the apparatus, the corresponding software component may perform one or more predetermined user configurable actions. For example, predetermined user configurable actions may include advancing a page of a document, rotating the orientation the apparatus, activating or deactivating the second e-ink display, and/or activating or deactivating the first touchscreen display, etc. Such predetermined user configurable actions may be based on the moving direction and/or movement data provided by the accelerometer.

Additionally, in another embodiment, an accelerometer of a portable device may constantly or periodically monitor the movement of the apparatus. For example, in response to the detection, a moving direction may be determined based on the movement data provided by the accelerometer. Additionally, appropriate components of the apparatus, such as, firmware, motion software, and/or applications may be notified. For example, the components may be notified via an interrupt or by pulling one or more registers of the accelerometer. In addition, an orientation the portable device after the movement may also be determined. As a result, information may be displayed on the touchscreen display in a portrait view or a landscape view based on an analysis of data received from the one or more accelerometers.

In various embodiments, applications 422 may include the following modules (or sets of instructions), or a subset or superset thereof: a contacts module (sometimes called an address book or contact list); a telephone module; a video conferencing module; an e-mail client module; an instant messaging (IM) module; a blogging module; a camera module for still and/or video images; an image management module video player module; a music player module; a browser module; a calendar module; widget modules, which may include weather widget, stocks widget, calculator widget, alarm clock widget, dictionary widget, and other widgets obtained by the user, as well as user-created widgets; widget creator module for making user-created widgets; search module; video and music player module, which merges video player module and music player module; notes module; and/or map module; and/or online video module. In another embodiment, examples of other applications include other word processing applications, JAVA-enabled applications, encryption, digital rights management, voice recognition, and voice replication. Of course, any program and/or set of instructions may be an application which is tailored to a user.

In further embodiments, the operational tools 424 may be configured to support many diverse operations. For example, the control operational tool(s) may enable the user to flip through pages, skip chapters, operate the second e-ink display, or scroll through content on the second e-ink display. In another embodiment, the control operational tool(s) may enable the user to activate content on the first backlit touchscreen, display content on the first backlit touchscreen, or otherwise control some aspect on the first backlit touchscreen. The control operational tool(s) may be implemented in many forms. For example, the control operational tool(s) may be in the form of a scroll wheel, a thumb wheel, a thumb stick, a sensor that detects and registers movement of a user's thumb or finger, a button, a touchscreen, or any other user input mechanism.

In one embodiment, the control operational tool(s) may function as a page turner to facilitate the turning of pages of an electronic book. The page turner may be configured to simulate a tactile riffle feel as the user flips pages in a book. In another embodiment, the control operational tool(s) may be configured as a page turning mechanism having a tactile member (e.g., a ridge or indentation) juxtaposed with one or more sensors, and sized to accommodate a user's thumb or finger. The tactile member may provide the tactile feedback to the user to simulate the riffle sensation. Additionally, the sensors may detect speed and direction the user's thumb or finger, thereby enabling the device to detect gestures of flipping forward or backward through one or more pages of the book. In various embodiments, the control operational tool(s) may be located in any location on the apparatus.

In the context of the present description, a touchscreen panel may refer to a panel which receives a touch input. For example, the touchscreen panel may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touchscreen. Additionally, the touchscreen panel may use LCD (liquid crystal display) technology, or LPD (light emitting polymer display) technology, although other display technologies may be used in other embodiments. Further, the touchscreen panel may function as an input device (such as a keyboard), an interactive display showing content from the first backlit touchscreen display, a display for browsing the internet, or any other type of display device which may engage a user and which may receive an input from a user.

In some implementations, the control operational tool(s) may be operative as a selection tool. In another embodiment, the touchscreen panel may also be used to select content without interacting with the control operational tool(s). In an alternative embodiment, the apparatus also may accept verbal input for activation or deactivation some functions through the microphone 436. For example, the microphone may be used as a selection tool.

In another embodiment, the audio circuitry (not shown), the one or more speaker(s), and the microphone may provide an audio interface between a user and the apparatus. The audio circuitry may receive audio data from a user interface adapter may convert the audio data to an electrical signal, and may transmit the electrical signal to the one or more speaker(s). The one or more speaker(s) may convert the electrical signal to human-audible sound waves. The audio circuitry also may receive electrical signals converted by the microphone from sound waves. The audio circuitry may convert the electrical signal to audio data and may transmit the audio data to the user interface adapter for processing. Audio data may be retrieved from and/or transmitted to memory by the user interface adapter. In some embodiments, the audio circuitry also may include a headset jack. The headset jack may provide an interface between the audio circuitry and removable audio input/output peripherals, such as output-only headphones or a headset with both output (e.g., a headphone for one or both ears) and input (e.g., a microphone).

In one embodiment, the touchscreen display may present content in a human-readable format to the user. For example, the content presented in the touchscreen display may take the form of electronic books, newspapers, or other readable or viewable materials. In a further embodiment, the touchscreen display may provide the text of the electronic books and also may depict any illustrations, tables, or graphic elements that may be contained in the electronic books. In one implementation, the touchscreen display may employ display technology with a relatively slow refresh rate in exchange for a relatively low rate of power consumption. This tradeoff may serve to maximize battery life. Further, since the touchscreen display may be used to depict electronic books, the content is relatively static and hence a slow-refresh rate technology may be suitable for implementing the touchscreen display. In some implementations, the touchscreen display is not responsive to user input.

In another embodiment, the e-ink display may present content in a human-readable format to the user. For example, the content presented in the e-ink display may take the form of electronic books, newspapers, or other readable or viewable materials. In a further embodiment, the e-ink display may provide the text of the electronic books and also may depict any illustrations, tables, or graphic elements that may be contained in the electronic books. In one implementation, the e-ink display may employ display technology with a relatively slow refresh rate in exchange for a relatively low rate of power consumption. This tradeoff may serve to maximize battery life. Further, since the e-ink display may be used to depict electronic books, the content is relatively static and hence a slow-refresh rate technology may be suitable for implementing the e-ink display. In some implementations, the e-ink display is not responsive to user input. For example, the one or more operational tools or the touchscreen panel may be temporarily disabled.

In the context of the present description, the term "page" may refer to a collection content that is presented at one time. For example, a page may be a virtual frame of the content, or a visual display window presenting the content to the user. Additionally, a page may not be fixed permanently, in contrast to the pages of published "hard" books. In another embodiment, pages may be redefined or repaginated when, for example, the user chooses a different font or font size for displaying the content.

Figure 5:
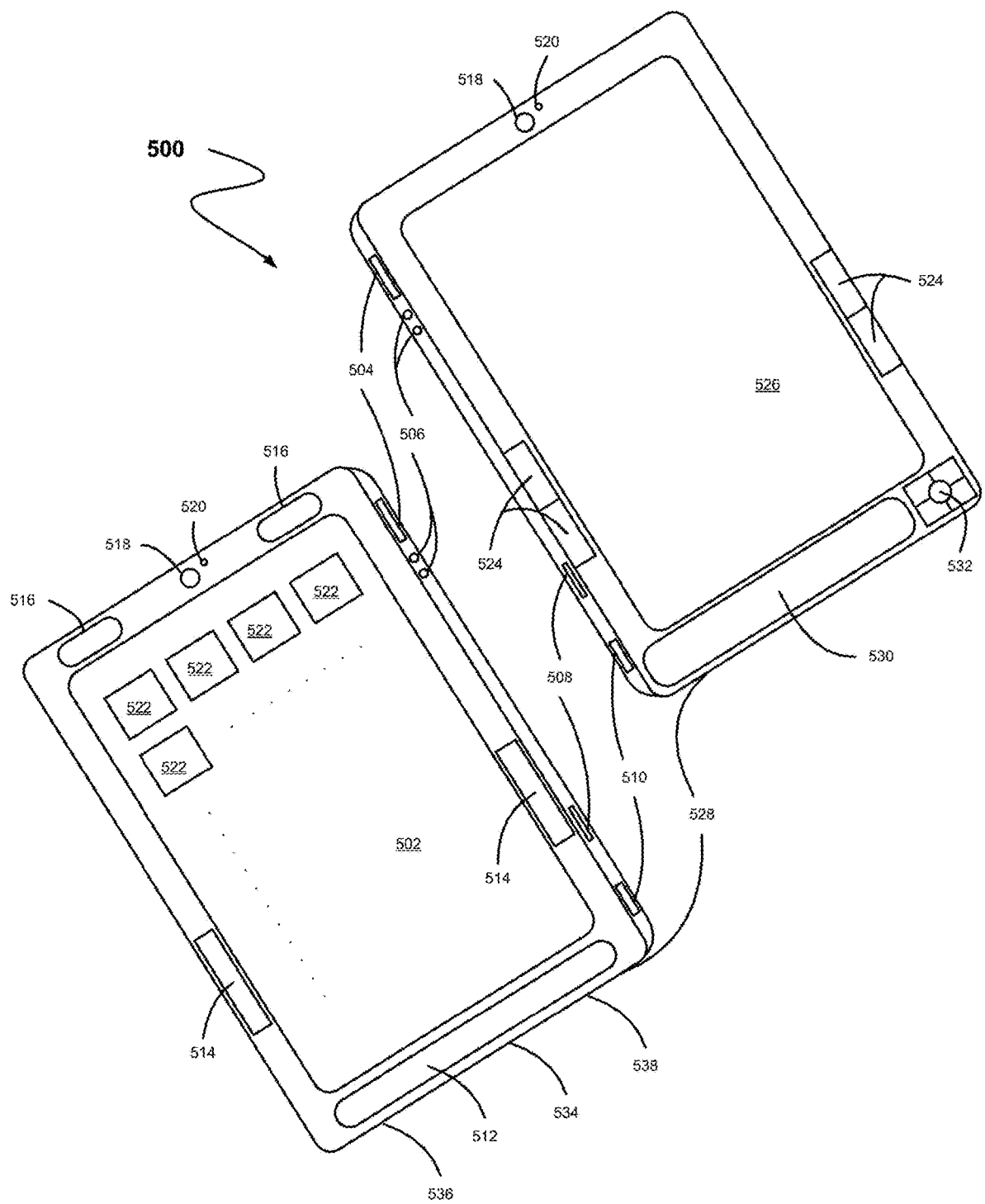
FIG. 5 illustrates a tablet apparatus that is equipped with a navigation tool, in accordance with another possible embodiment.

FIG. 5 illustrates a tablet apparatus 500 that is equipped with a navigation tool, in accordance with another embodiment. As an option, the apparatus 500 may be implemented in the context of the architecture and environment of the previous Figures or any subsequent Figure(s). Of course, however, the apparatus 500 may be implemented in any desired environment. It should also be noted that the aforementioned definitions may apply during the present description.

As shown, a tablet housing 528 is included. A first backlit touchscreen display 502 positioned on a first face of the tablet housing is included. Additionally, a second e-ink display 526 positioned on a second face of the tablet housing is included.

In one embodiment, the apparatus 500 may include, but is not limited to, a touchscreen display 502, an e-ink display 526, a first button 504 for executing a command, volume adjustment button(s) 506, an external media card slot 508, a second button 510 for executing a command, a headset jack 538, a docking/charging external port 534, a microphone 536, a panel of touch sensitive buttons 512, one or more touch sensitive sensor(s) 514, one or more speaker(s) 516, one or more optical sensor(s) 518, one or more proximity sensor(s) 520, one or more applications 522, one or more control operational tool(s) 524, a touchscreen panel 530, and a navigation tool 532. In one embodiment, the foregoing components may be positioned as depicted in FIG. 5, and, in other embodiments, they may be positioned differently (e.g. in different locations of the face shown, on a different face, removed altogether, etc.).

In the context of the present description, a navigation tool (e.g. navigation tool 532, etc.) may refer to any tool used to navigate a display. For example, the navigation tool may control a cursor on the e-ink display, be used to select an object, and/or cause menus to appear on the display. In one embodiment, the navigation tool may enable the user to flip through pages, skip chapters, operate the second e-ink display, or scroll through content on the second e-ink display. In another embodiment, the navigation tool may enable the user to activate content on the first backlit touchscreen, display content on the first backlit touchscreen, or otherwise control some aspect on the first backlit touchscreen.

As shown, the navigation tool 532 may be in the form of a squared four button formation with a center selection button. In another embodiment, the navigation tool may be implemented in many forms, including as a scroll wheel, a thumb wheel, a thumb stick, a sensor that detects and registers movement of a user's thumb or finger, a button, a touchscreen, or any other user input mechanism.

Figure 6:
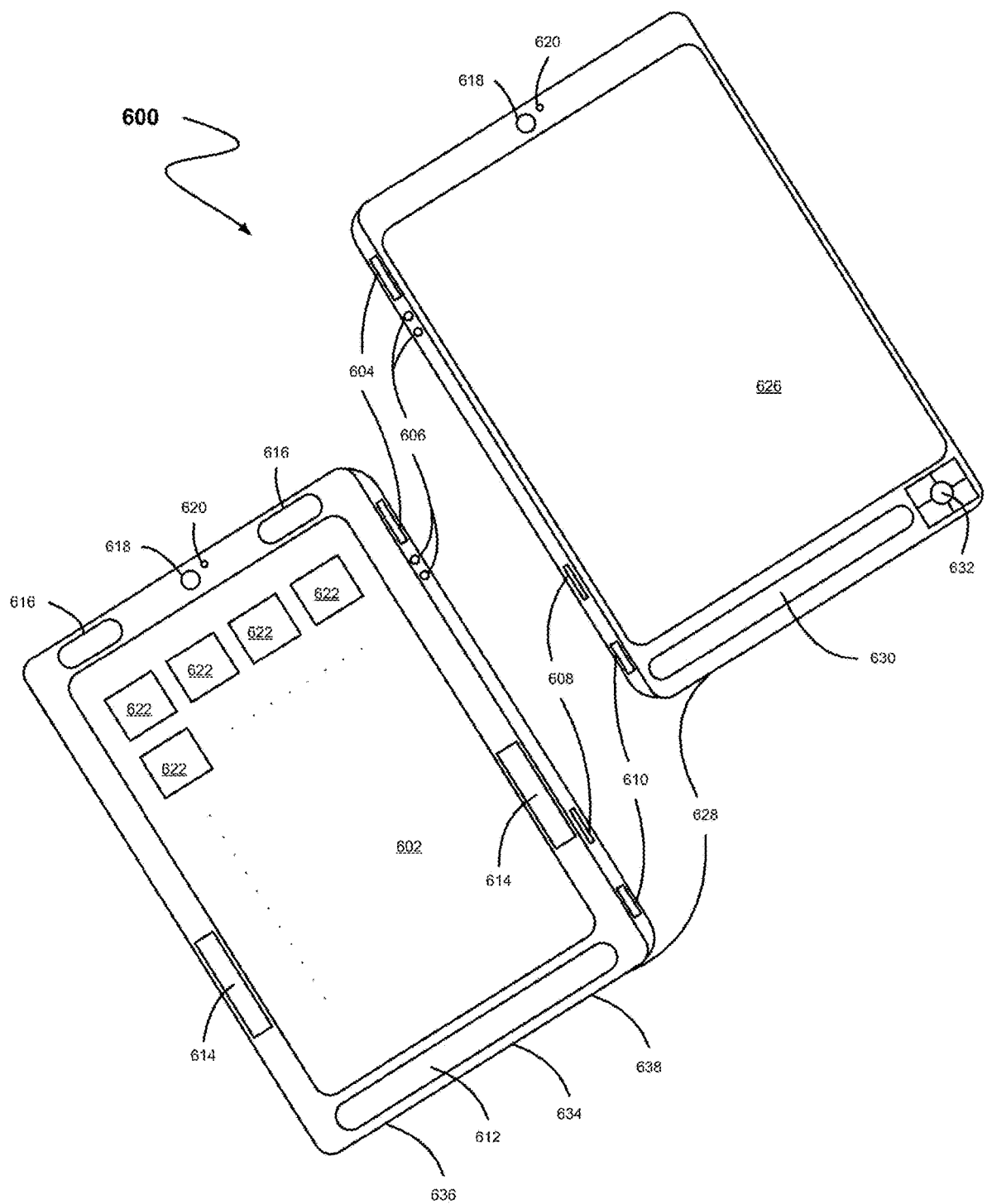
FIG. 6 illustrates a tablet apparatus having a first backlit touchscreen display and a second e-ink display, in accordance with another possible embodiment.

FIG. 6 illustrates a tablet apparatus 600 equipped with a tactile input surface, in accordance with one embodiment. As an option, the apparatus 600 may be implemented in the context of the architecture and environment of the previous Figures or any subsequent Figure(s). Of course, however, the apparatus 600 may be implemented in any desired environment. It should also be noted that the aforementioned definitions may apply during the present description.

As shown, a tablet housing 628 is included. A first backlit touchscreen display 602 positioned on a first face of the tablet housing is included. Additionally, a second e-ink display 626 positioned on a second face of the tablet housing is included.

In one embodiment, the apparatus 600 may include, but is not limited to, a touchscreen display 602, an e-ink display 626, a first button 604 for executing a command, volume adjustment button(s) 606, an external media card slot 608, a second button 610 for executing a command, a headset jack 638, a docking/charging external port 634, a microphone 636, a panel of touch sensitive buttons 612, one or more touch sensitive sensor(s) 614, one or more speaker(s) 616, one or more optical sensor(s) 618, one or more proximity sensor(s) 620, one or more applications 622, a tactile input surface 630, and a navigation tool 632. In one embodiment, the foregoing components may be positioned as depicted in FIG. 6, and, in other embodiments, they may be positioned differently (e.g. in different locations of the face shown, on a different face, removed altogether, etc.).

In the context of the present description, a tactile input surface (e.g. tactile input surface 630, etc.) refers to a surface which may receive a touch input. For example, the tactile input surface may be composed of ridges or indentations, a smooth surface, a pressure sensitive surface, or any type of surface which can receive a touch input. The tactile input surface may receive a touch input in the form of a finger swiping, pressing, or holding the surface. In one embodiment, the tactile input surface may be used to flip through pages, skip chapters, and/or navigate among menus and options.

In another embodiment, the one or more optical sensor 618 may be used as a motion sensor device to control functionality associated with the touchscreen display or the e-ink display. For example, a user may control flipping through pages by hand motions and strokes sensed by the one or more optical sensor. In one embodiment, the optical sensor may track the user's motions to control a digital object or to perform functions. In another embodiment, the optical sensor may be activated by the one or more proximity sensor(s). As such, the one or more proximity sensor(s) may help to conserve battery power by restricting when the optical sensor is used. Additionally, the sensitivity of the one or more proximity sensor(s) may be controlled based on the application that is being used.

Figure 7:
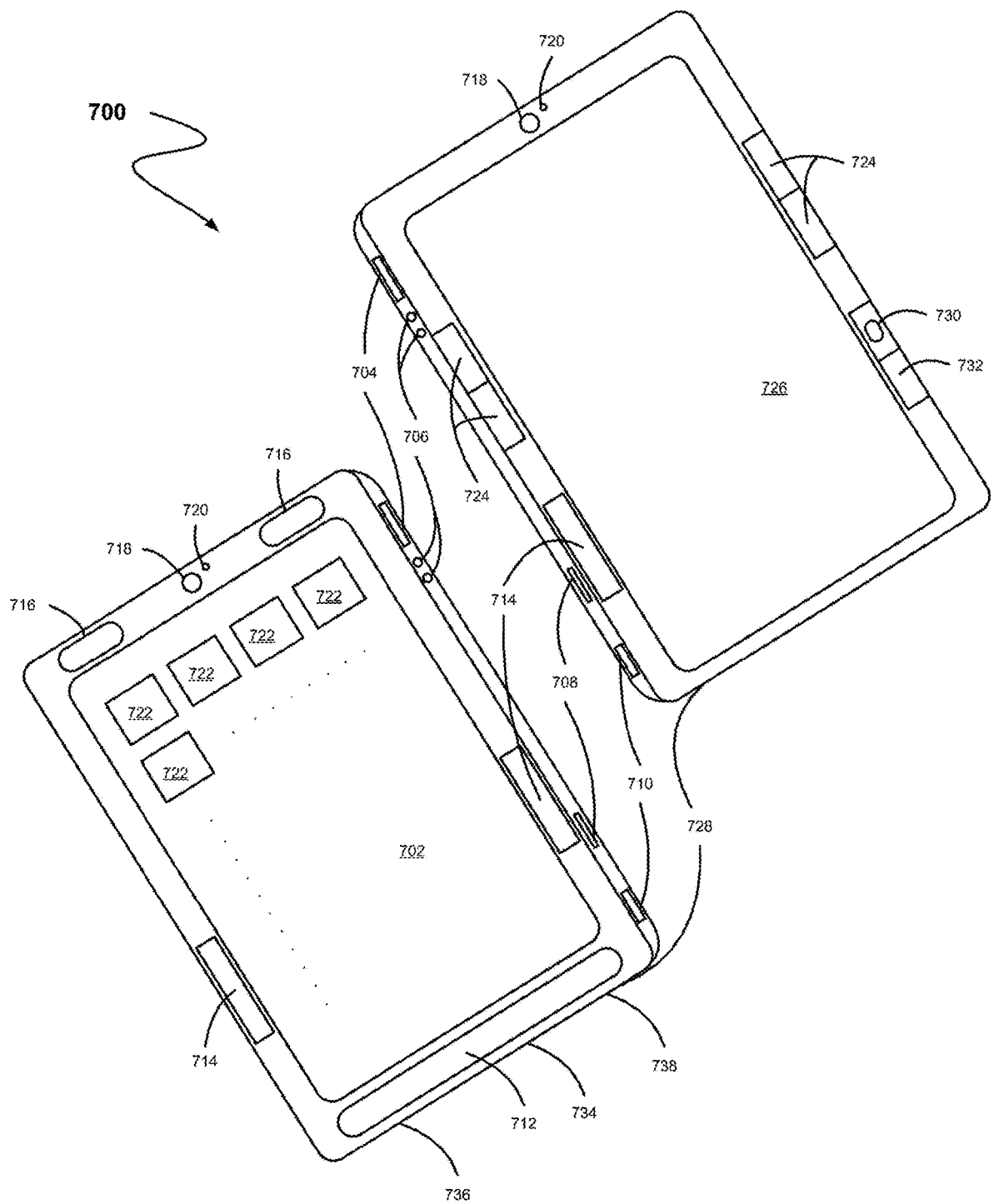
FIG. 7 illustrates a tablet apparatus having a first backlit touchscreen display and a second e-ink display, in accordance with another possible embodiment.

FIG. 7 illustrates a tablet apparatus 700 having a tablet housing, a first backlit touchscreen display positioned on a first face of the tablet housing, and a second e-ink display positioned on a second face of the tablet housing, in accordance with one embodiment. As an option, the apparatus 700 may be implemented in the context of the architecture and environment of the previous Figures or any subsequent Figure(s). Of course, however, the apparatus 700 may be implemented in any desired environment. It should also be noted that the aforementioned definitions may apply during the present description.

As shown, a tablet housing 728 is included. A first backlit touchscreen display 702 positioned on a first face of the tablet housing is included. Additionally, a second e-ink display 726 positioned on a second face of the tablet housing is included.

In one embodiment, the apparatus 700 may include, but is not limited to, a touchscreen display 702, an e-ink display 726, a first button 704 for executing a command, volume adjustment button(s) 706, an external media card slot 708, a second button 710 for executing a command, a headset jack 738, a docking/charging external port 734, a microphone 736, a panel of touch sensitive buttons 712, one or more touch sensitive sensor(s) 714, one or more speaker(s) 716, one or more optical sensor(s) 718, one or more proximity sensor(s) 720, one or more applications 722, a navigation tool 730, and a command tool 732. In one embodiment, the foregoing components may be positioned as depicted in FIG. 7, and, in other embodiments, they may be positioned differently (e.g. in different locations of the face shown, on a different face, removed altogether, etc.).

In the context of the present description, a command tool (e.g. command tool 732, etc.) refers to a tool which may be used to execute a command. For example, the command tool may be used to select and highlight text, magnify the text on the e-ink display, change the text on the e-ink display, etc. In one embodiment, the command tool may work in conjunction with the navigation tool, or any other tool or sensor, to facilitate making selections or any other function.

As shown, at least one touch sensitive sensor 714 may be found on the second face of the apparatus. The touch sensitive sensor may facilitate navigating the e-ink display, including setting the size of the text, turning a page of the text, or scrolling through a page or browser. In one embodiment, the touch sensitive sensor may include functioning as a fingerprint reader, a programmable button, and/or a touchscreen displaying visual output. Additionally, the sensor may function in response to application commands (e.g. game function commands), tablet system controls (e.g. brightness settings, etc.), login verification process (e.g. authentication user), or in response to any input by the user.

In some embodiments, an accelerometer (not shown) may be used to control functionality of the touchscreen display and/or the e-ink display. For example, the accelerometer may track the movement data (e.g., X, Y, and Z axis) of the apparatus. The accelerometer may send such information to a controller (not shown) which may calculate the moving vector of the movement based on the movement data. The moving vector can then be used by the touchscreen display to control a user's actions in a game, to cause a page to turn, to put objects on the screen in perspective, etc. The moving vector can also be used by the e-ink display to cause a page to turn, to skip a chapter, or any further functionality that can be programmed to a specific user movement. In the context of the present description, a moving direction may refer to a moving vector or an acceleration vector. In the context of the present description, a moving vector may refer to any change in position an object, and an acceleration vector may refer the rate of change of both the magnitude and the direction velocity with time.

Figure 8:
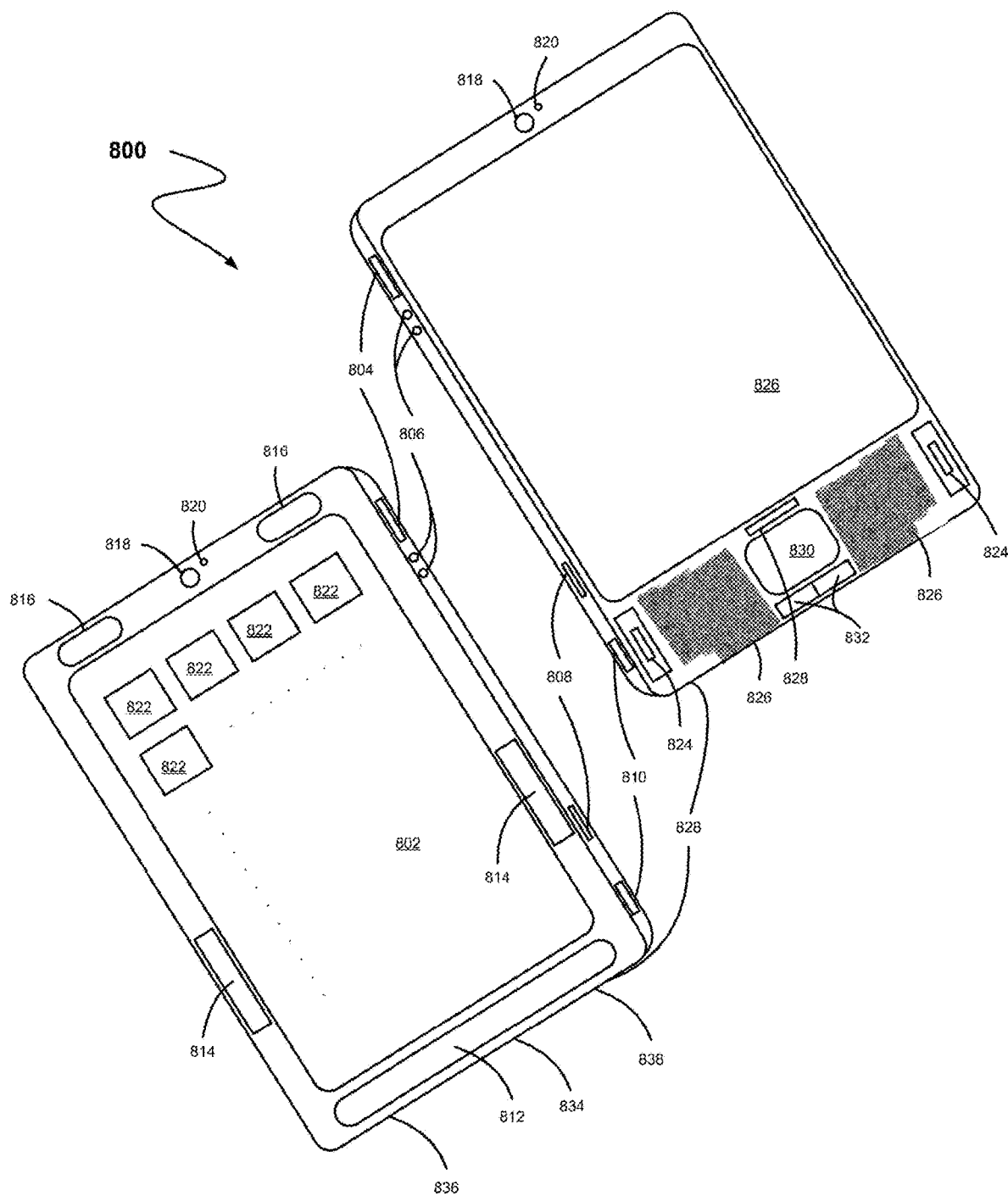
FIG. 8 illustrates a tablet apparatus having a first backlit touchscreen display and a second e-ink display, in accordance with another possible embodiment.

FIG. 8 illustrates a tablet apparatus 800 having a tablet housing, a first backlit touchscreen display positioned on a first face of the tablet housing, and a second e-ink display positioned on a second face of the tablet housing, in accordance with one embodiment. As an option, the apparatus 800 may be implemented in the context of the architecture and environment of the previous Figures or any subsequent Figure(s). Of course, however, the apparatus 800 may be implemented in any desired environment. It should also be noted that the aforementioned definitions may apply during the present description.

As shown, a tablet housing 828 is included. A first backlit touchscreen display 802 positioned on a first face of the tablet housing is included. Additionally, a second e-ink display 826 positioned on a second face of the tablet housing is included.

In one embodiment, the apparatus 800 may include, but is not limited to, a touchscreen display 802, an e-ink display 826, a first button 804 for executing a command, volume adjustment button(s) 806, an external media card slot 808, a second button 810 for executing a command, a headset jack 838, a docking/charging external port 834, a microphone 836, a panel of touch sensitive buttons 812, one or more touch sensitive sensor(s) 814, one or more speaker(s) 816, one or more optical sensor(s) 818, one or more proximity sensor(s) 820, one or more applications 822, one or more control operational tool(s) 824, a touchpad 830, a keyboard 826, a third button for executing a command 828, and at least one selection button 832. In one embodiment, the foregoing components may be positioned as depicted in FIG. 8, and, in other embodiments, they may be positioned differently (e.g. in different locations of the face shown, on a different face, removed altogether, etc.).

In the context of the present description, a touchpad refers to a screen used to control navigating on a display. For example, a touch initiated control function may be used to move an object or perform an action on a display or to make selections or issue commands associated with the application. In one embodiment, the touchpad may be arranged to receive input from a finger moving over the touchpad surface in order to implement the touch initiated control function. In another embodiment, tapping a finger on the touch surface may initiate a control function, similar to a select function. Further, the touchpad may be used to receive multiple inputs simultaneously. In another embodiment, a user may use more than one finger to add greater functionality to the touchpad. For example, a two finger swipe may indicate skipping to the next chapter, whereas two fingers separating may cause magnification the text.

In one embodiment, the third button 828 may be used to power on/off the touchpad, implement a predefined state of settings, and/or execute any preconfigured command. As such, the third button may be used to help conserve the power of the apparatus by disabling power when it may not be needed.

In another embodiment, the at least one selection button(s) 832 may be used to select an object being displayed on the e-ink display. For example, using the touchpad, the user may navigate to objects and use the at least one selection button(s) to select the object. In another embodiment, the at least one selection button(s) may be configured to execute a command. For example, one of the selection buttons may be used to bring up a list of options associated with an object, and another selection button may be configured to execute the selection. In a further embodiment, the length of depressed time of the selection button(s) may be associated with additional functionality. For example, depressing a selection button for a predetermined amount of time may cause the display to undo the last object selection, to bring up a menu of commands, to highlight the selected object, to email the object to a contact, and/or any further preconfigured command associated with the selection button.

In some embodiments, the keyboard 826 may include a plurality of keys. As shown, the keyboard may include at least 26 alphabet keys arranged in a QWERTY format as well as other function keys (such as space bar, control keys, function keys, and so forth). In another embodiment, the keyboard may include other arrangements of the 26 alphabet keys that do not conform to the QWERTY layout. The keys may be separated into two groups including a first or left-side group of keys and a second or right-side group of keys. In one embodiment, the key groups are separated by the touchpad. Additionally, individual keys may be sized to accommodate a user's thumb or finger. In further embodiments, the orientation the keys of the keyboard facilitates ergonomic operation by a user's thumbs when the user may grasp the two lower corners of the apparatus with two hands.

As shown, the control operational tool 824 may be in more than one form. For example, the control operational tool(s) may be in the form of a scroll wheel, a thumb wheel, a thumb stick, a sensor that detects and registers movement of a user's thumb or finger, a button, a touchscreen, or any other user input mechanism. In another embodiment, the control operational tool(s) may enable the user to activate content on the first backlit touchscreen, display content on the first backlit touchscreen, or otherwise control some aspect on the first backlit touchscreen.

Figure 9:
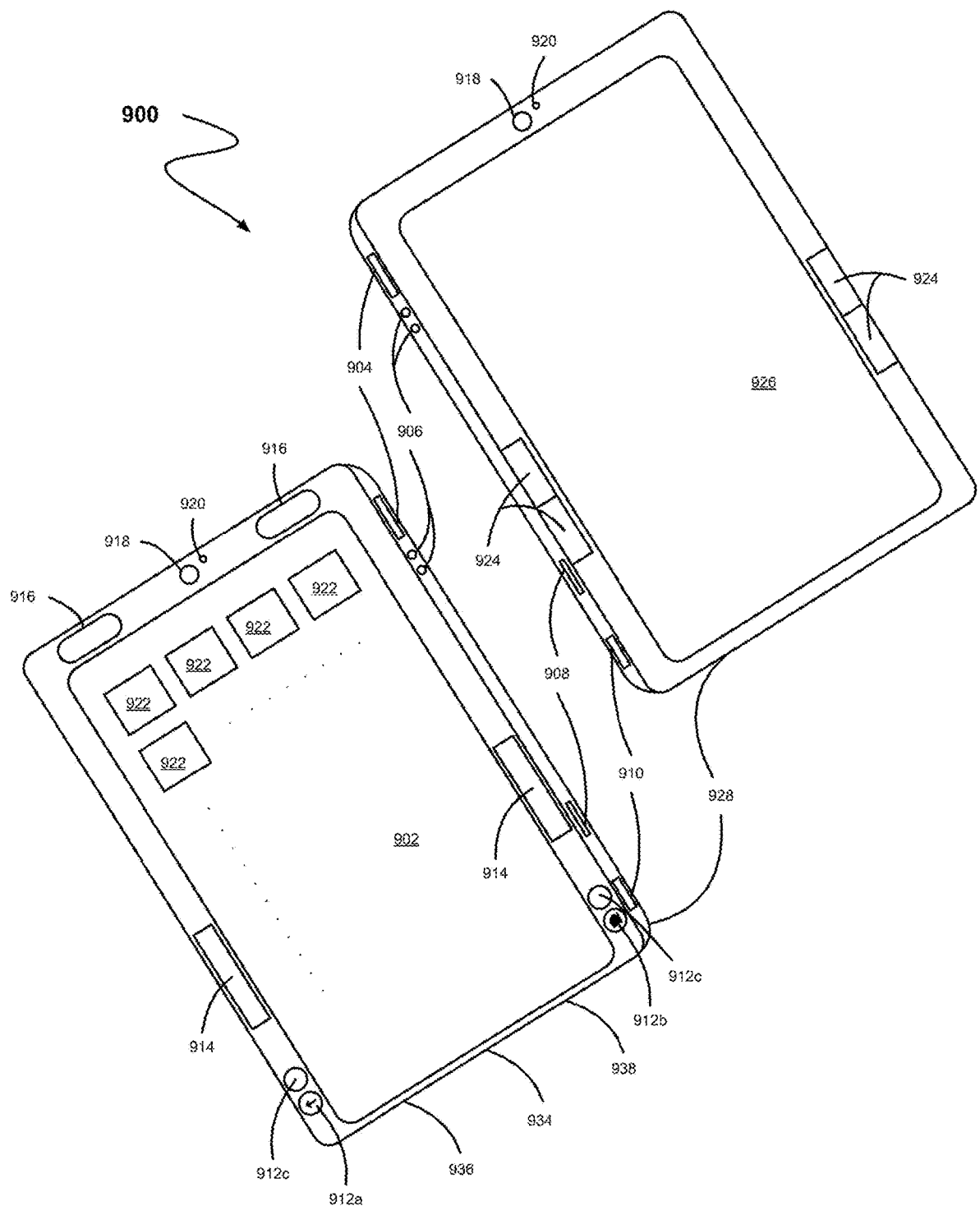
FIG. 9 illustrates a tablet apparatus having a first backlit touchscreen display and a second e-ink display, in accordance with another possible embodiment.

FIG. 9 illustrates a tablet apparatus 900 having a tablet housing, a first backlit touchscreen display positioned on a first face of the tablet housing, and a second e-ink display positioned on a second face of the tablet housing, in accordance with one embodiment. As an option, the apparatus 900 may be implemented in the context of the architecture and environment of the previous Figures or any subsequent Figure(s). Of course, however, the apparatus 900 may be implemented in any desired environment. It should also be noted that the aforementioned definitions may apply during the present description.

As shown, a tablet housing 928 is included. A first backlit touchscreen display 902 positioned on a first face of the tablet housing is included. Additionally, a second e-ink display 926 positioned on a second face of the tablet housing is included.

In one embodiment, the apparatus 900 may include, but is not limited to, a touchscreen display 902, an e-ink display 926, a first button 904 for executing a command, volume adjustment button(s) 906, an external media card slot 908, a second button 910 for executing a command, a headset jack 938, a docking/charging external port 934, a microphone 936, at least one touch sensitive button(s) 912a-c, one or more touch sensitive sensor(s) 914, one or more speaker(s) 916, one or more optical sensor(s) 918, one or more proximity sensor(s) 920, one or more applications 922, and one or more operational tools 924. In one embodiment, the foregoing components may be positioned as depicted in FIG. 9, and, in other embodiments, they may be positioned differently (e.g. in different locations of the face shown, on a different face, removed altogether, etc.).

In the context of the present description, at least one touch-sensitive button(s) 912a-c refers to a touch sensitive button for activating or deactivating at least one function. For example, the touch-sensitive button may include a home button 912b, a back button 912a, a menu option button, or any other programmable function 912c.

Figure 10:
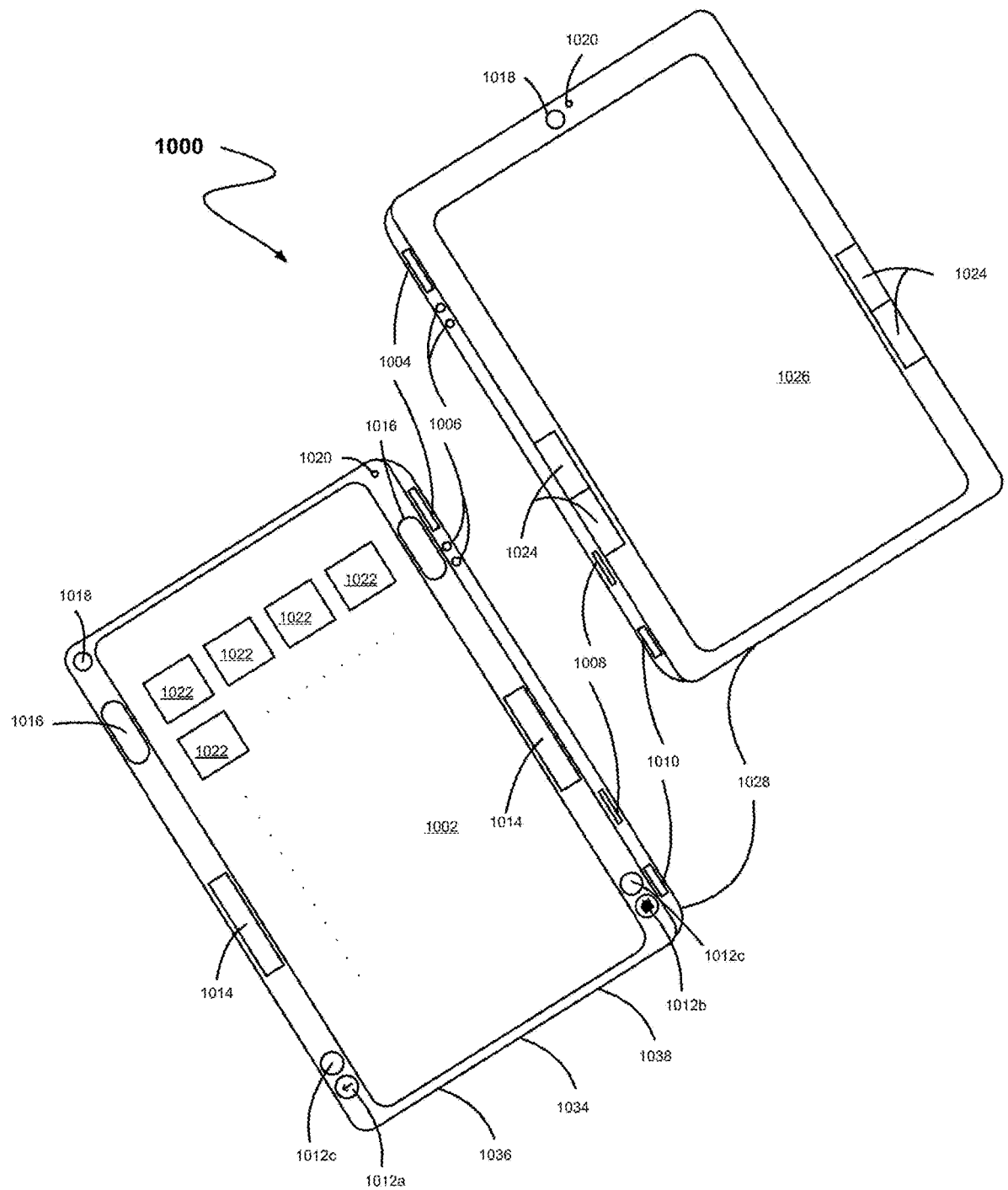
FIG. 10 illustrates a tablet apparatus having a first backlit touchscreen display and a second e-ink display, in accordance with another possible embodiment.

FIG. 10 illustrates a tablet apparatus 1000 having a tablet housing, a first backlit touchscreen display positioned on a first face of the tablet housing, and a second e-ink display positioned on a second face of the tablet housing, in accordance with one embodiment. As an option, the apparatus 1000 may be implemented in the context of the architecture and environment of the previous Figures or any subsequent Figure(s). Of course, however, the apparatus 1000 may be implemented in any desired environment. It should also be noted that the aforementioned definitions may apply during the present description.

As shown, a tablet housing 1028 is included. A first backlit touchscreen display positioned 1002 on a first face of the tablet housing is included. Additionally, a second e-ink display 1026 positioned on a second face of the tablet housing is included.

In one embodiment, the apparatus 1000 may include, but is not limited to, a touchscreen display 1002, an e-ink display 1026, a first button 1004 for executing a command, volume adjustment button(s) 1006, an external media card slot 1008, a second button 1010 for executing a command, a headset jack 1038, a docking/charging external port 1034, a microphone 1036, at least one touch sensitive button(s) 1012a-c, one or more touch sensitive sensor(s) 1014, one or more speaker(s) 1016, one or more optical sensor(s) 1018, one or more proximity sensor(s) 1020, one or more applications 1022, and one or more operational tools 1024. In one embodiment, the foregoing components may be positioned as depicted in FIG. 10, and, in other embodiments, they may be positioned differently (e.g. in different locations of the face shown, on a different face, removed altogether, etc.).

As shown, positioning of the one or more optical sensor 1018, the one or more proximity sensor(s) 1020, and/or the one or more speaker(s) 1016 may be changed. In one embodiment, the one or more optical sensor 1018, the one or more proximity sensor(s) 1020, and/or the one or more speaker(s) 1016 may be located on the top of the apparatus display, on the sides of the apparatus display, or in any other location on the apparatus.

Figure 11:
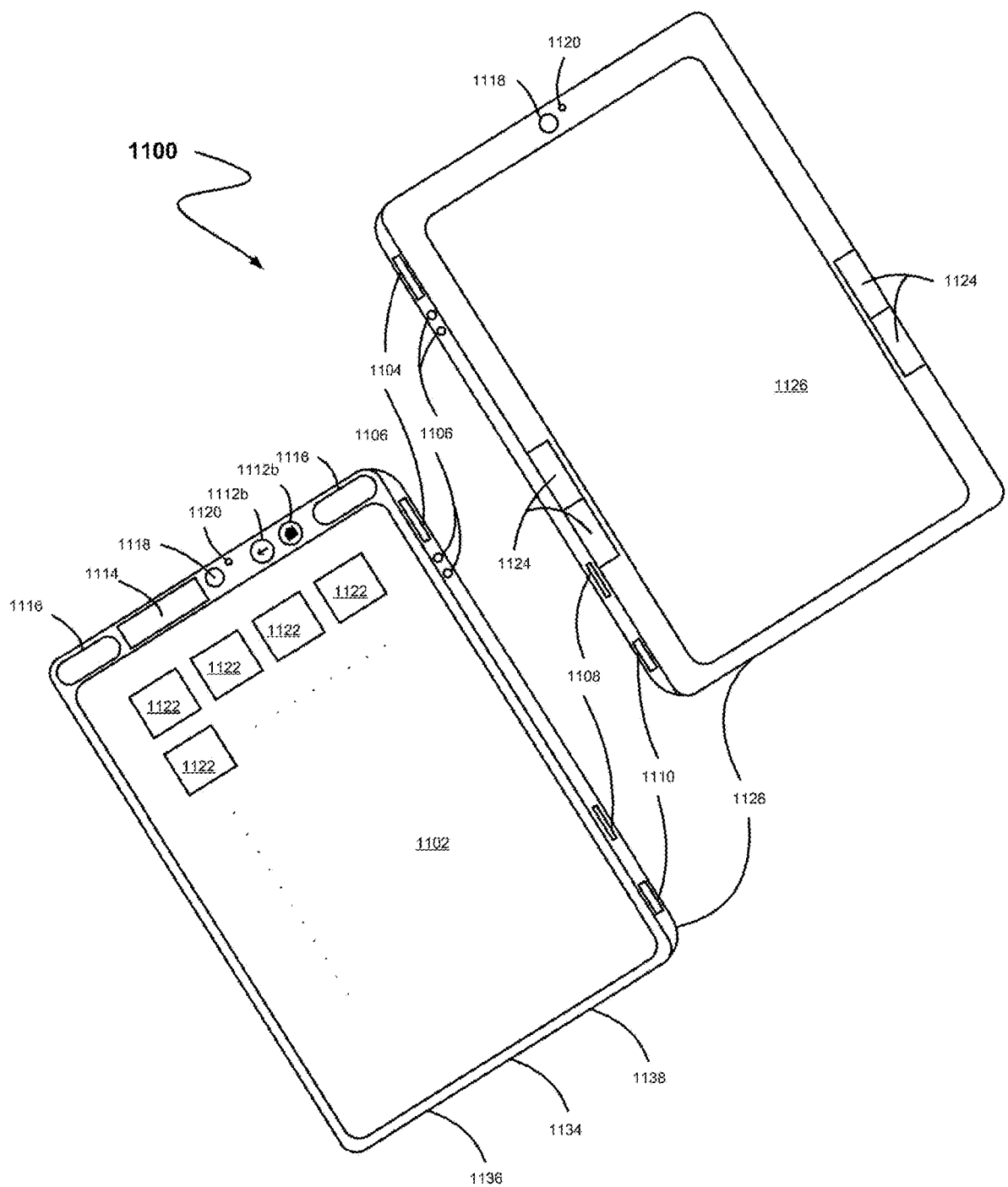
FIG. 11 illustrates a tablet apparatus having a first backlit touchscreen display and a second e-ink display, in accordance with another possible embodiment.

FIG. 11 illustrates a tablet apparatus 1100 having a tablet housing, a first backlit touchscreen display positioned on a first face of the tablet housing, and a second e-ink display positioned on a second face of the tablet housing, in accordance with one embodiment. As an option, the apparatus 1100 may be implemented in the context of the architecture and environment of the previous Figures or any subsequent Figure(s). Of course, however, the apparatus 1100 may be implemented in any desired environment. It should also be noted that the aforementioned definitions may apply during the present description.

As shown, a tablet housing 1128 is included. A first backlit touchscreen display 1102 positioned on a first face of the tablet housing is included. Additionally, a second e-ink display 1126 positioned on a second face of the tablet housing is included.

In one embodiment, the apparatus 1100 may include, but is not limited to, a touchscreen display 1102, an e-ink display 1126, a first button 1104 for executing a command, volume adjustment button(s) 1106, an external media card slot 1108, a second button 1110 for executing a command, a headset jack 1138, a docking/charging external port 1134, a microphone 1136, at least one touch sensitive button(s) 1112a-b, one or more touch sensitive sensor(s) 1114, one or more speaker(s) 1116, one or more optical sensor(s) 1118, one or more proximity sensor(s) 1120, one or more applications 1122, and one or more operational tools 1124. In one embodiment, the foregoing components may be positioned as depicted in FIG. 11, and, in other embodiments, they may be positioned differently (e.g. in different locations of the face shown, on a different face, removed altogether, etc.).

As shown, in one embodiment, positioning of the at least one touch sensitive button(s) 1112a-b and one or more touch sensitive sensor(s) 1114 may be changed. In one embodiment, the at least one touch sensitive button(s) 1112a-b and the one or more touch sensitive sensor(s) 1114 may be located on the top of the apparatus display, on the sides of the apparatus display, or in any other location on the apparatus.

Figure 12:
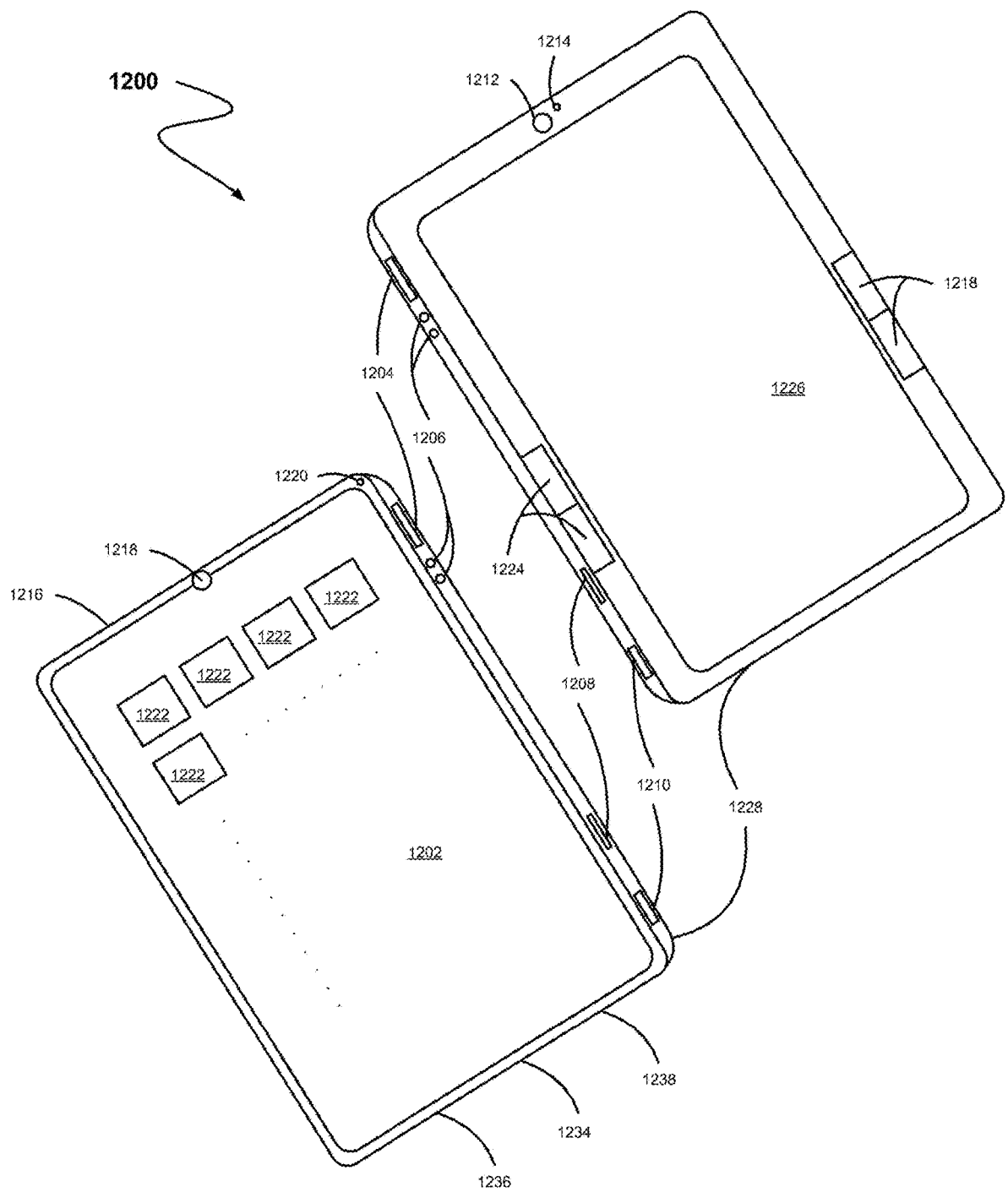
FIG. 12 illustrates a tablet apparatus having a first backlit touchscreen display and a second e-ink display, in accordance with another possible embodiment.

FIG. 12 illustrates a tablet apparatus 1200 having a tablet housing, a first backlit touchscreen display positioned on a first face of the tablet housing, and a second e-ink display positioned on a second face of the tablet housing, in accordance with one embodiment. As an option, the apparatus 1200 may be implemented in the context of the architecture and environment of the previous Figures or any subsequent Figure(s). Of course, however, the apparatus 1200 may be implemented in any desired environment. It should also be noted that the aforementioned definitions may apply during the present description.

As shown, a tablet housing 1228 is included. A first backlit touchscreen display 1202 positioned on a first face of the tablet housing is included. Additionally, a second e-ink display 1226 positioned on a second face of the tablet housing is included.

In one embodiment, the apparatus 1200 may include, but is not limited to, a touchscreen display 1202, an e-ink display 1226, a first button 1204 for executing a command, volume adjustment button(s) 1206, an external media card slot 1208, a second button 1210 for executing a command, a headset jack 1238, a docking/charging external port 1234, a microphone 1236, one or more speaker(s) 1216, one or more optical sensor(s) 1218, one or more proximity sensor(s) 1220, one or more applications 1222, and one or more operational tools 1124. In one embodiment, the foregoing components may be positioned as depicted in FIG. 12, and, in other embodiments, they may be positioned differently (e.g. in different locations of the face shown, on a different face, removed altogether, etc.).

As shown, in one embodiment, the touchscreen display 1202 may occupy the majority of the first face of the apparatus. In such an arrangement, the touchscreen display may also incorporate additional functionality. For example, the touchscreen display may scan fingerprints for authentication, may have optional parts of the screen to operate as touch buttons to navigate the apparatus, and/or may include any type of touch scanner or sensor that may exist separate from the main touchscreen display. In another embodiment, the touchscreen display may occupy the entire first face with all sensors (e.g. optical, proximity) integrated below the touchscreen.

Figure 13:
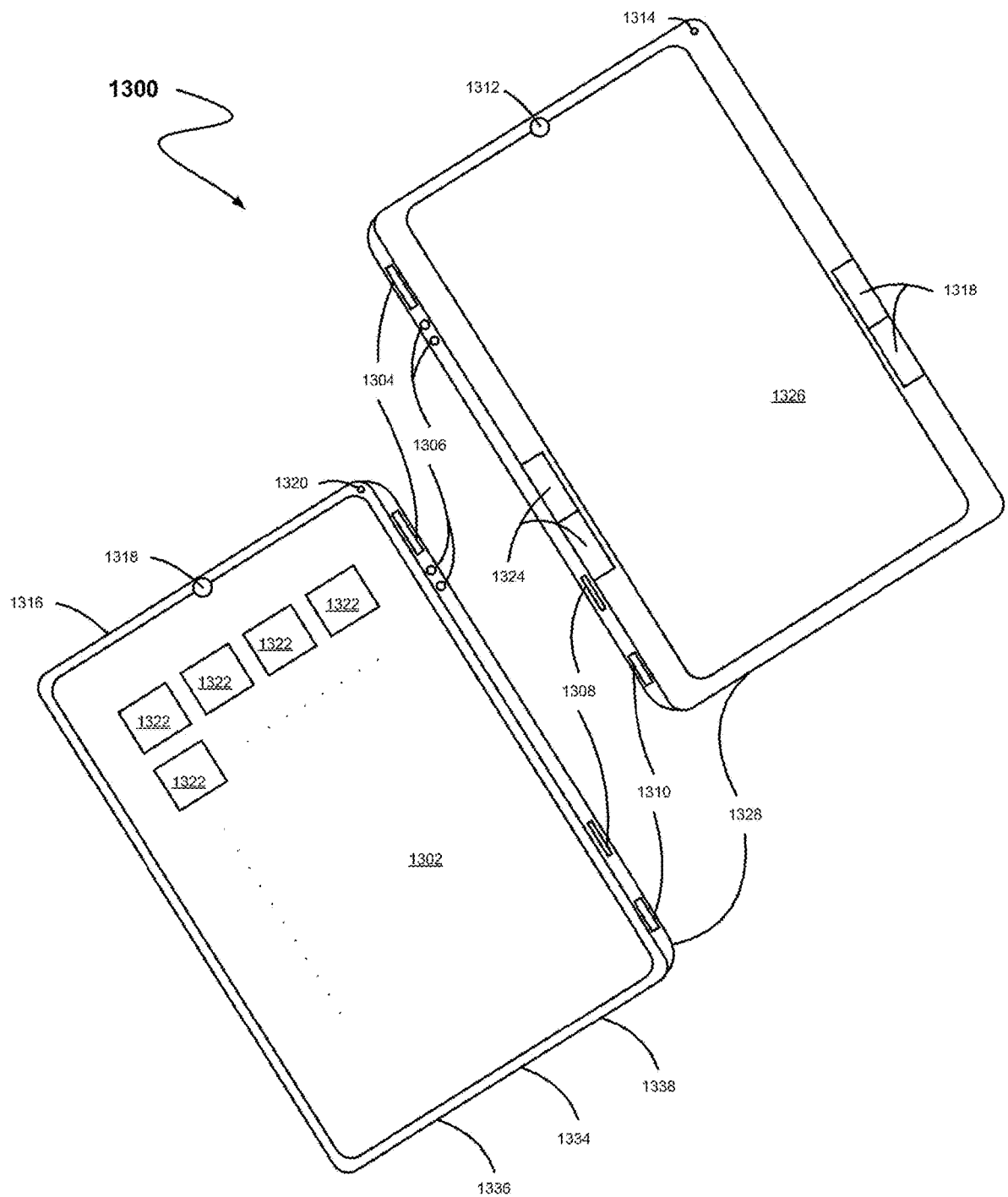
FIG. 13 illustrates a tablet apparatus having a first backlit touchscreen display and a second e-ink display, in accordance with another possible embodiment.

FIG. 13 illustrates a tablet apparatus 1300 having a tablet housing, a first backlit touchscreen display positioned on a first face of the tablet housing, and a second e-ink display positioned on a second face of the tablet housing, in accordance with one embodiment. As an option, the apparatus 1300 may be implemented in the context of the architecture and environment of the previous Figures or any subsequent Figure(s). Of course, however, the apparatus 1300 may be implemented in any desired environment. It should also be noted that the aforementioned definitions may apply during the present description.

As shown, a tablet housing 1328 is included. A first backlit touchscreen display 1302 positioned on a first face of the tablet housing is included. Additionally, a second e-ink display 1326 positioned on a second face of the tablet housing is included.

In one embodiment, the apparatus 1300 may include, but is not limited to, a touchscreen display 1302, an e-ink display 1326, a first button 1304 for executing a command, volume adjustment button(s) 1306, an external media card slot 1308, a second button 1310 for executing a command, a headset jack 1338, a docking/charging external port 1334, a microphone 1336, one or more speaker(s) 1316, one or more optical sensor(s) 1318, one or more proximity sensor(s) 1320, one or more applications 1322, and one or more operational tools 1324. In one embodiment, the foregoing components may be positioned as depicted in FIG. 13, and, in other embodiments, they may be positioned differently (e.g. in different locations of the face shown, on a different face, removed altogether, etc.).

As shown, in one embodiment, the e-ink display 1326 may occupy the majority of the second face of the apparatus. In another embodiment, the one or more optical sensor(s) may be incorporated directly into the touchscreen display and/or the e-ink display. In a further embodiment, the second face may not include one or more operational tools but the second face may simply be covered completely by the e-ink display. In such an arrangement, control of the e-ink display may be by the touchscreen display, or by side mounted operational tools.

Figure 14:
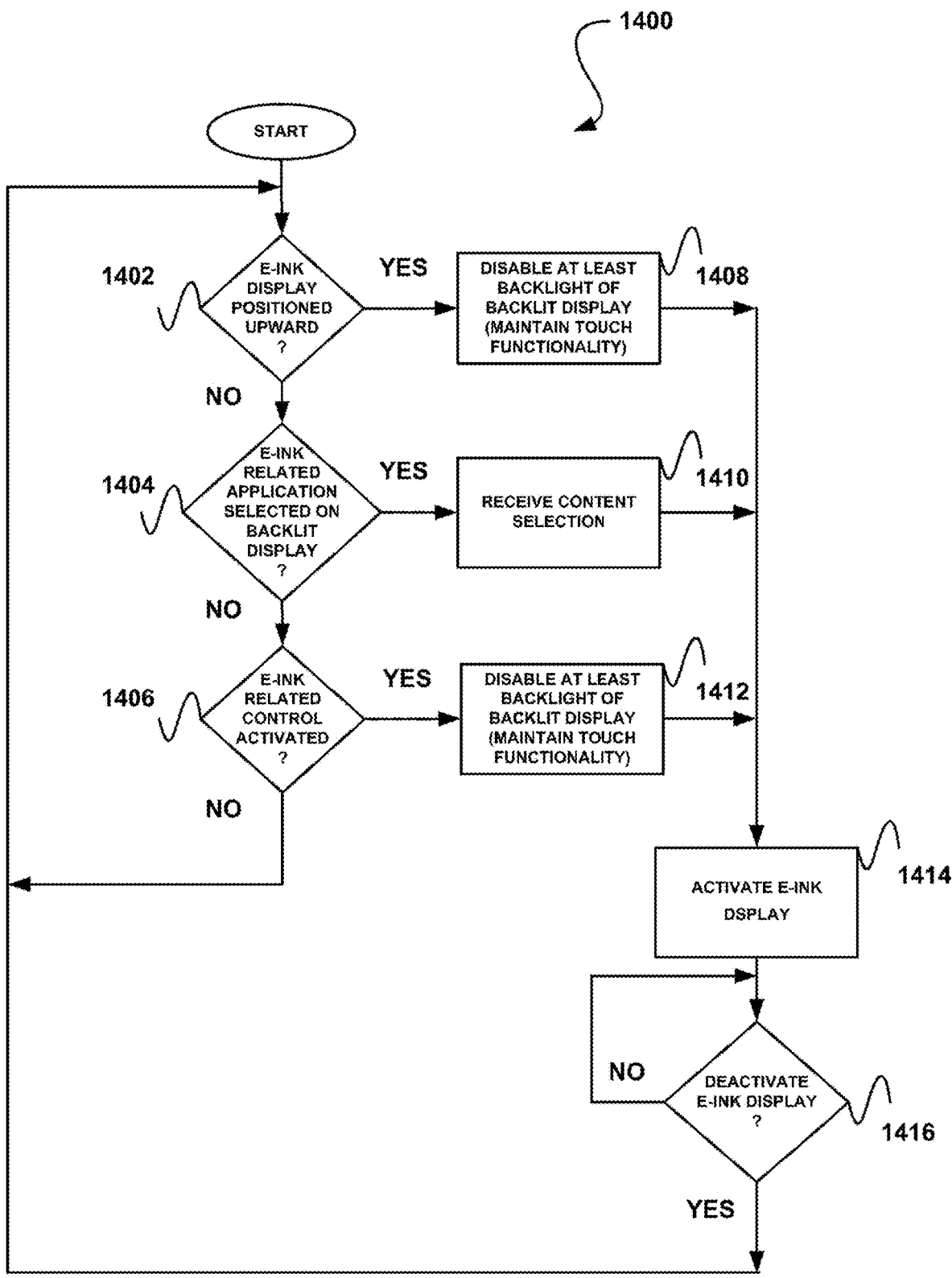
FIG. 14 illustrates a method for activating an e-ink display, in accordance with another possible embodiment.

FIG. 14 shows a method 1400 for activating an e-ink display. As an option, the method 1400 may be implemented in the context of the architecture and environment of the previous Figures or any subsequent Figure(s). Of course, however, the method 1400 may be carried out in any desired environment. It should also be noted that the aforementioned definitions may apply during the present description.

As shown, it is determined whether an e-ink display is positioned upwards. See decision 1402. In various embodiments, the determination the e-ink display being positioned upwards may be determined by the accelerometer (based on a detection the movement of the apparatus). For example, the accelerometer may determine that the orientation the apparatus has changed such that the second face is now positioned upwards. In one embodiment, the accelerometer may deactivate the touchscreen display once the second face e-ink display has been activated. In another embodiment, the accelerometer may disable the backlight of the touchscreen display while maintaining touch functionality on the touchscreen display. In a further embodiment, the accelerometer may be configured to not only activate the e-ink display but to also deactivate it once the second face is no longer in a set orientation.

In another embodiment, the accelerometer may work in conjunction with a proximity sensor to activate the e-ink display. For example, the accelerometer may determine that the apparatus has changed orientation (e.g. the apparatus has been turned over, etc.), prompting a potential activation a display. The proximity sensor may then be used to determine, for example, whether the touchscreen display or the e-ink reader display should be activated or deactivated based on input from the proximity reader. In one embodiment, the proximity sensor may be configured to activate a display based on a distance from the user to the apparatus. In another embodiment, the proximity sensor may be configured to deactivate a display. For example, a display may be deactivated based on a close distance of a cover or another object over the sensor. In another embodiment, the proximity sensor may deactivate a sensor based on a close distance of an object for a set preconfigured time threshold.

In a further embodiment, the accelerometer may work in conjunction with an optical sensor to activate the e-ink display. For example, the accelerometer may determine that the apparatus has changed orientation, prompting a potential activation a display. The optical sensor may then be used to scan the surroundings to determine which display on the apparatus should be activated. For example, the optical sensor may take a video scan of the surroundings to determine which display is being used by a user. This may be accomplished by determining whether a human face is facing the display, etc. In another embodiment, the optical sensor may scan a user's face to authenticate a user before activating a display.

As shown, it is determined whether an e-ink related application is selected on the touchscreen display. See decision 1404. In one embodiment, an application displayed on the touchscreen display may be used to activate the e-ink display. For example, an application on the touchscreen display may be entitled "E-ink Reader" and may be used to activate the e-ink display. After selecting the "E-ink Reader," navigating the e-ink display may be done by control tools on the second face of the apparatus, or on the touchscreen display. In another embodiment, the "E-ink Reader" may be used to navigate through e-books and other saved content. Upon selection of the desired content (that is adapted for e-ink display viewing or is otherwise associated with/configured for e-ink display viewing), the touchscreen may prompt the user if it is desired to activate the e-ink display. For example, after selecting material on the e-ink reader application, the touchscreen display may prompt, "Would you like to view the selected material on the e-ink display?" and display a "yes" and "no" button by which the user can make a selection. As such, activation the e-ink display may be done by a specialized e-ink reader application. Of course, any application may also be configured to make use of the e-ink display, and similarly allow the user to select content and activate the display. For example, a newspaper application, or any other application, may be configured to use the e-ink display and similarly prompt the user if it desired to activate the e-ink display.

In one embodiment, the e-ink display may be activated based on the content being viewed on the touchscreen display. For example, if a user accessed an application relating to a newspaper, a journal, or any other text-based application that could exist in print form, the touchscreen display may prompt the user to select the appropriate display on which the material is to be viewed (e.g. touchscreen display or e-ink display). In a further embodiment, if any viewed content being displayed on the touchscreen display may relate to viewing an image, text, or otherwise related printed material, the touchscreen display may prompt the user to select the appropriate display on which the material is to be viewed (e.g. touchscreen display or e-ink display). For example, if a user selects to view a portable document format (pdf) file, the touchscreen display may prompt the user if it is desired to activate the e-ink display. Similarly, the same prompt may be given whenever a user selects a document, a picture album, a game, reads an email, etc. In another embodiment, the user may specify in the settings of the apparatus which content receives a prompt to activate the e-ink display. In a further embodiment, the user may specify in the settings of the apparatus which content automatically activates the e-ink display. In another embodiment, once the e-ink display has been activated based on the content identified, at least the backlight of the touchscreen display may be disabled. As such, the apparatus may receive content selection. See operation 1410.

As shown, it is determined whether e-ink related control has been activated. See decision 1406. For example, a hardware switch, a configurable button, or any other hardware tool on the apparatus may be used to activate the e-ink display. In another embodiment, software applications may include functionality to decide which display is to be used. For example, after selecting an application, the application software may first determine how many displays are present, and then determine which display would be best for the application. Based on such a determination, the application may find that the e-ink display is present and would be optimal for the application. In some embodiments, the touchscreen display functionality may still retain touch sensitivity even though the backlight has been disabled. See operation 1412.

In further embodiments, after the e-ink display has been activated, it may remain activated until it is determined that the e-ink display is no longer being used. For example, the e-ink display may be positioned downwards, the optical sensor may sense that the user is not present near the face of the e-ink display, the proximity sensor may sense that a case cover has closed over e-ink display or that a user is no longer within a certain distance of the screen, a timer may have expired without any user interaction, an application on the touchscreen display may have been activated causing the e-ink display to turn off, and/or any other input or command may be used to signal to the apparatus that the e-ink display is no longer in use.

In various embodiments, the e-ink display may be deactivated in a variety of ways. See decision 1416. For example, the e-ink display may be manually deactivated (via a button or selection in association with the e-ink display, e.g. using controls on e-ink display face; or via a button or selection in association with the backlit display, i.e. via the an application that was used to retrieve the content being displayed on the e-ink display, etc.). Further, the e-ink display may be deactivated automatically (e.g. after a timeout, etc.). In such embodiment, any action (e.g. a movement vector, press of an e-ink button, etc.) may prompt the awakening of the e-ink display. For that matter, upon awaking from any "sleep" mode, the tablet may be adapted for only activating the display (e.g. e-ink display or backlit display, etc.) that was already activated before the "sleep" mode was initiated. Thus, the "state" of the tablet before and after the "sleep" mode may be maintained consistent.

Of course, the method 1400 may be modified in any desired manner, in various embodiments. For example, any one or more of decisions 1402, 1404, and/or 1406 may be optionally omitted as desired.

Figure 15:
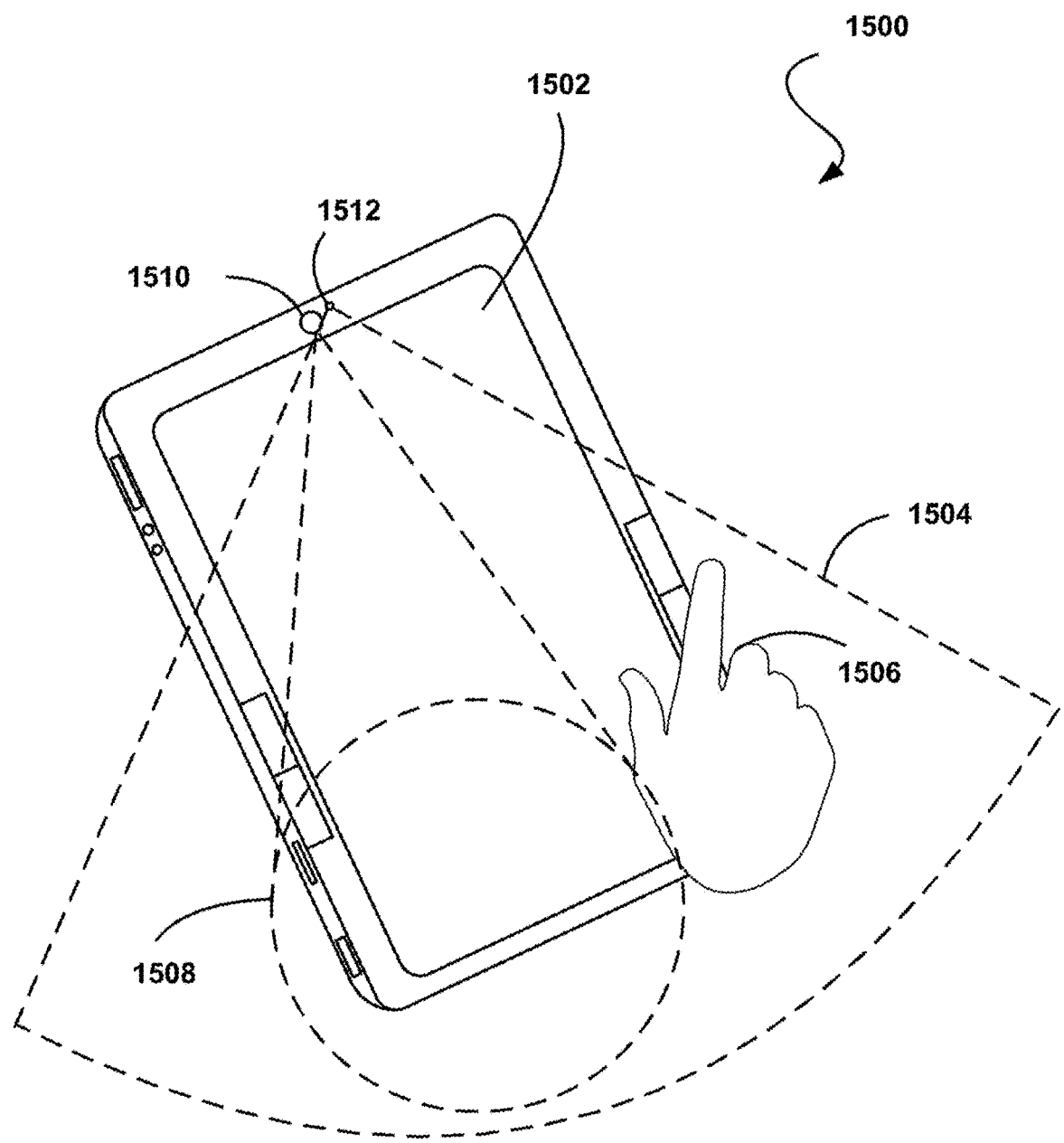
FIG. 15 illustrates a system for activating an e-ink display, in accordance with another possible embodiment.

FIG. 15 illustrates a system 1500 for activating an e-ink display. As an option, the system 1500 may be implemented in the context of the architecture and environment of the previous Figures or any subsequent Figure(s). Of course, however, the system 1500 may be implemented in any desired environment. The aforementioned definitions may apply during the present description.

As shown, an e-ink display 1502 may be positioned upwards. A proximity sensor 1512 is included. Additionally, an optical sensor 1510 is included. In one embodiment, the proximity sensor and the optical sensor may be positioned next to each other. In another embodiment, the proximity sensor and the optical sensor may be positioned anywhere on the system.

In one embodiment, an accelerometer (not shown) may be used to activate the optical sensor and the proximity sensor in response to the apparatus being turned over. As such, battery power is conserved and used for the optical sensor and proximity sensor only once it has been determined that the apparatus has been turned over.

As shown, the determination the e-ink display being positioned upwards may be determined by the proximity sensor. In one embodiment, the proximity sensor may be configured to activate a display based on a detected object found within a preconfigured set distance 1504 from e-ink display. In another embodiment, the proximity sensor may be configured to not activate, or even deactivate a display based on an object at a close distance (e.g. less than 1 inch, etc.). For example, a tablet cover or some other covering may be placed around the apparatus to protect it when not in use.

As shown, the determination the e-ink display being positioned upwards may be determined by the optical sensor. In one embodiment, the optical sensor may be used to scan the surroundings 1508 to determine which display on the apparatus should be activated. For example, the optical sensor may take a video scan of the surroundings to determine which display is being used by a user. In another embodiment, the optical sensor may scan a user's face to authenticate a user before activating a display.

As shown, the determination the e-ink display being positioned upwards may be determined by scanning the number of contact points 1506 on the touchscreen display or any touch sensitive sensor. For example, in one embodiment, the apparatus may determine that if more than four points of contact (or any preconfigured number) are made with the touchscreen display (i.e. finger tips holding up the apparatus), that the apparatus is positioned with the e-ink display up. In another embodiment, the apparatus may determine by contact points on touch sensitive sensors located on the face of the touchscreen display or on the face of the e-ink display whether the touchscreen display or the e-ink display is positioned upward. For example, if only one or two contact points were detected, then the user may be holding the apparatus with one or two hands with the majority of the fingers on the back of the apparatus and the thumbs positioned on the face of the e-ink reader.

Figure 16:
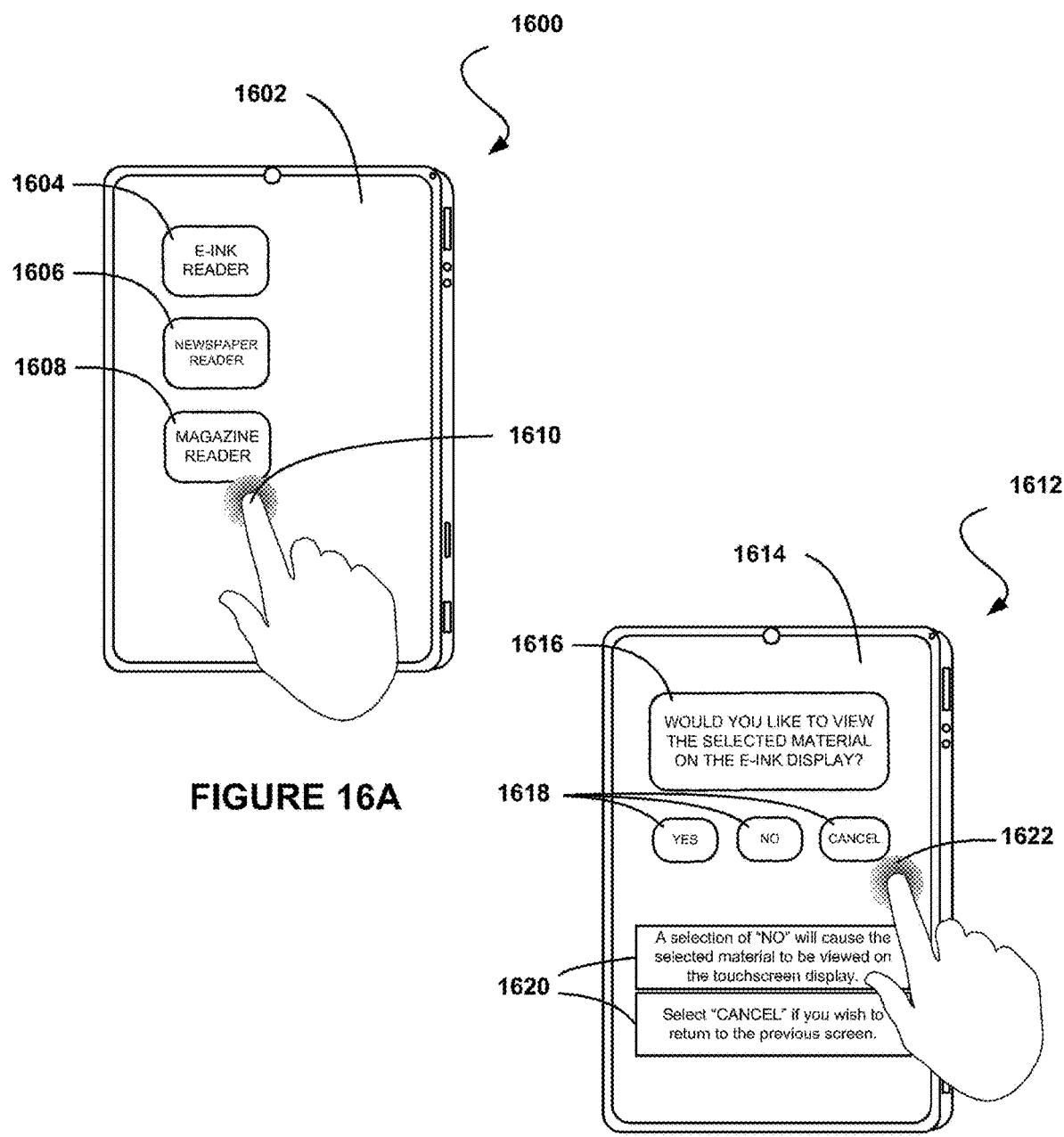
FIG. 16A shows a user interface for determining whether an e-ink related application is selected on a touchscreen display, in accordance with another possible embodiment.
FIG. 16B shows a user interface for determining whether an e-ink display should be activated, in accordance with another possible embodiment.

FIG. 16A shows a user interface 1600 for determining whether an e-ink related application is selected on a touchscreen display. As an option, the user interface 1600 may be implemented in the context of the architecture and environment of the previous Figures or any subsequent Figure(s). Of course, however, the user interface 1600 may be implemented in any desired environment. It should also be noted that the aforementioned definitions may apply during the present description.

As shown, a user may navigate a touchscreen display 1602. In one embodiment, the user may use a finger 1610 to navigate and select content on the screen. In another embodiment, a stylus, pen, or other potentially conductive material may be used.

As shown, an application 1604 may relate directly to an e-ink display. In one embodiment, an application displayed on the touchscreen display may be used to activate the e-ink display. For example, an application on the touchscreen display may be entitled "E-ink Reader" and may be used to activate the e-ink display. After selecting the "E-ink Reader," navigating the e-ink display may be done by control tools on the second face of the apparatus, or on the touchscreen display. In another embodiment, the "E-ink Reader" may be used to navigate through e-books and other saved content. Of course, any content or function may be programmed to the "E-ink Reader" application. Such programming may, in one embodiment, include any association between certain content and the desired/default display (e.g. e-ink display, etc.). Further, such association may be governed by the content provider and/or a configuration of the tablet by the user and/or tablet maker.

As shown, an application 1606 may relate directly to an e-ink display. In one embodiment, an application displayed on the touchscreen display may be used to activate the e-ink display. For example, an application on the touchscreen display may be entitled "Newspaper Reader" and may be used to select, navigate, and read newspapers. In one embodiment, the "Newspaper Reader" may automatically activate the e-ink display in response to a selection by a user. The automatic activation may be based on preconfigured configuration settings by the user. In another embodiment, the "Newspaper Reader" may function as a browser to peruse and tag daily news. In the context of the present description, tagging refers to associating a filtering tag to selected content. After selecting the desired content, the user may then read the selected content on the e-ink display.

As shown, an application 1608 may relate directly to an e-ink display. In one embodiment, an application displayed on the touchscreen display may be used to activate the e-ink display. For example, an application on the touchscreen display may be entitled "Magazine Reader" and may be used to select, navigate, and read magazines. In one embodiment, the "Magazine Reader" may automatically activate the e-ink display in response to a selection by a user. The automatic activation may be based on preconfigured configuration settings by the user. In another embodiment, the "Magazine Reader" may function as a browser to peruse and tag magazines. After selecting the desired content, the user may then read the selected content on the e-ink display.

In another embodiment, any application may be programmed to activate the e-ink reader. For example, games, document readers, photo viewing, and/or any application accessible on the apparatus may be configured to use the e-ink display.

FIG. 16B shows a user interface 1612 for determining whether an e-ink display should be activated. As an option, the user interface 1612 may be implemented in the context of the architecture and environment of the previous Figures or any subsequent Figure(s). Of course, however, the user interface 1612 may be implemented in any desired environment. It should also be noted that the aforementioned definitions may apply during the present description.

As shown, a user may navigate the touchscreen display 1614. In one embodiment, the user may use a finger 1622 to navigate and select content on the screen. In another embodiment, a stylus, pen, or other potentially conductive material may be used.

As shown, an application may prompt 1616 the user if it is desired to activate the e-ink display. For example, after selecting material on an application, the touchscreen display may show the prompt, "Would you like to view the selected material on the e-ink display?" Of course, any prompt may be displayed to the user requesting if it is desired to activate the e-ink display. In another embodiment, the application may be preconfigured so that a prompt is not given and the e-ink display is automatically activated.

As shown, an application may receive user feedback 1618. For example, a user may indicate whether it is desired to activate the e-ink display by selecting an appropriate button in the form of "yes," "no," or "cancel." Of course, the application may be programmed to receive the feedback in any manner. For example, the user may swipe a fingerprint on the touch sensitive sensor to automatically activate the e-ink display, the optical camera may determine by motions whether the e-ink display is to be activated, the accelerometer may determine by motions whether the e-ink display is to be activated, and/or any sensor may be used to receive user feedback as to whether the e-ink display is to be activated.

As shown, part of the screen may describe 1620 what the user feedback buttons may do. For example, the touchscreen display may show the following explanations: "A selection "NO" will cause the selected material to be viewed on the touchscreen display," and "Select "CANCEL" if you wish to return to the previous screen." Of course, any explanation to facilitate user navigation may be presented on the touchscreen display. In another embodiment, no explanations are presented to the user.

Figure 17:
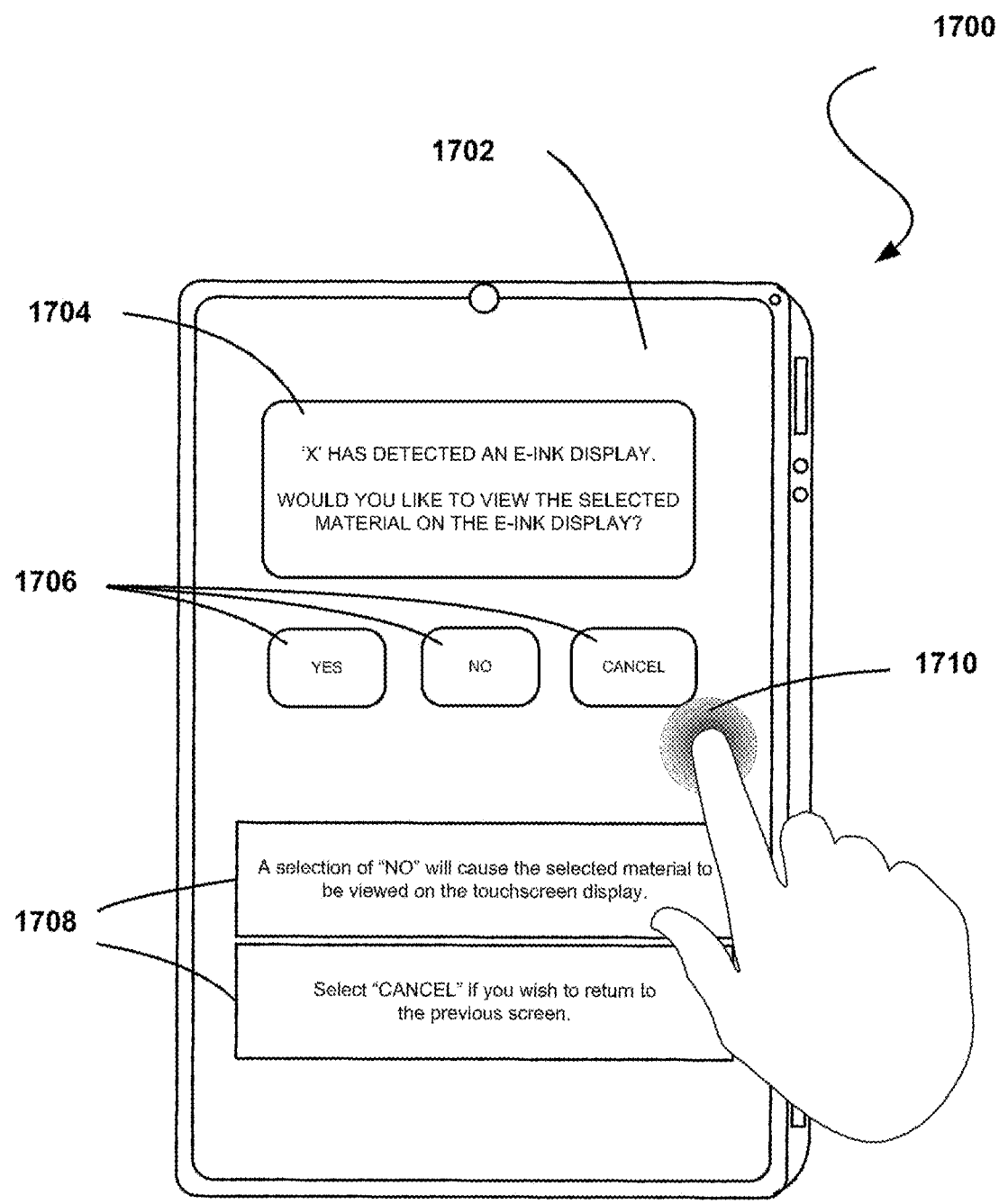
FIG. 17 shows a user interface for determining whether an e-ink display should be activated, in accordance with another possible embodiment.

FIG. 17 shows a user interface 1700 for determining whether an e-ink display should be activated. As an option, the user interface 1700 may be implemented in the context of the architecture and environment of the previous Figures or any subsequent Figure(s). Of course, however, the user interface 1700 may be implemented in any desired environment. It should also be noted that the aforementioned definitions may apply during the present description.

As shown, a user may navigate the touchscreen display 1702. In one embodiment, the user may use a finger 1710 to navigate and select content on the screen. In another embodiment, a stylus, pen, or other potentially conductive material may be used.

As shown, an application may detect an e-ink display and indication the same with appropriate indicia 1704. For example, after making a selection content, the application may detect an e-ink display and prompt the reader "'X' HAS DETECTED AN E-INK DISPLAY. WOULD YOU LIKE TO VIEW THE SELECTED MATERIAL ON THE E-INK DISPLAY?" In the context of the present description, 'X' refers to any application that may be on the apparatus. In one embodiment, the application may be programmed to automatically search for an e-ink display upon startup and then prompt the user once a selection has been made. In another embodiment, the application may be programmed to search for an e-ink display once content has been selected by the user. For example, an application may have both a game interface and a reading interface. The game interface may be optimized on the touchscreen display whereas the reading interface may be optimized on the e-ink display. In such an embodiment, the application may search for an e-ink display only when appropriate content (e.g. reading material, etc.) has been selected by the user.

As shown, an application may receive user feedback 1706. For example, a user may indicate whether it is desired to activate the e-ink display by selecting an appropriate button in the form of "yes," "no," or "cancel." Of course, the application may be programmed to receive the feedback in any manner. For example, the user may swipe a fingerprint on the touch sensitive sensor to automatically activate the e-ink display, the optical camera may determine by motions whether the e-ink display is to be activated, the accelerometer may determine by motions whether the e-ink display is to be activated, and/or any sensor may be used to receive user feedback as to whether the e-ink display is to be activated. In another embodiment, the application may be programmed to automatically activate the requested content on the e-ink display. For example, if a user regularly selects the e-ink display to read newspaper articles, the application may be preconfigured to automatically activate the e-ink reader every time newspaper content is selected. Of course, any feature may be preconfigured on the apparatus and may be used to activate the e-ink display.

As shown, part of the screen may describe 1708 what the user feedback buttons may do. For example, part of the touchscreen display may describe what the user feedback buttons may do. For example, the touchscreen display may show the following explanations: "A selection "NO" will cause the selected material to be viewed on the touchscreen display," and "Select "CANCEL" if you wish to return to the previous screen." Of course, any explanation to facilitate user navigation may be presented on the touchscreen display. In another embodiment, no explanations are presented to the user.

Figure 18:
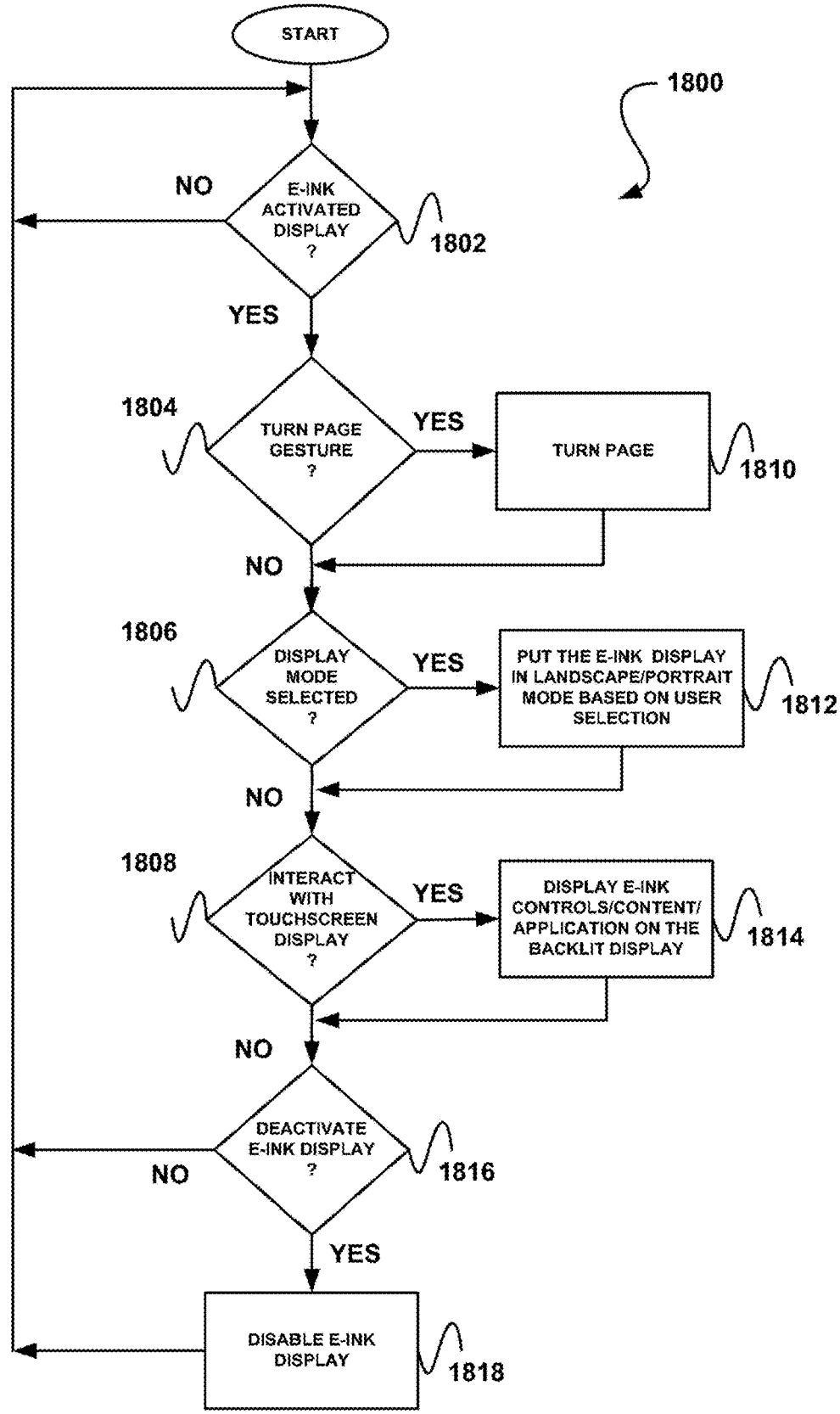
FIG. 18 shows a method for using an e-ink display, in accordance with another possible embodiment.

FIG. 18 shows a method 1800 for using an e-ink display. As an option, the method 1800 may be implemented in the context of the architecture and environment of the previous Figures or any subsequent Figure(s). Of course, however, the method 1800 may be carried out in any desired environment. It should also be noted that the aforementioned definitions may apply during the present description.

As shown, it is determined whether the e-ink display has been activated. See decision 1802. For example, the e-ink display may be positioned upwards, the optical sensor may sense that the user is present near the face of the e-ink display, the proximity sensor may sense that a case cover is not closed over e-ink display or that a user is within a certain amount of distance, an application on the touchscreen display may have been activated causing the e-ink display to turn on, content on the touchscreen display may have been selected prompting the user to activate the e-ink display, and/or any other input or command may be used to signal to the apparatus that the e-ink display is to be activated.

As shown, if it is determined that the e-ink display has been activated, then it is determined whether there has been a turn page gesture, or a gesture to turn the page. See decision 1804. For example, an accelerometer may be used to turn the page based on motion from the user. The user may move the device to the right to turn the page or move the device to the left to turn the page back. The user may turn the device (e.g. alter the viewing angle) to cause the page to turn and advance or, in another embodiment, cause the page to go back.

In another embodiment, the optical sensor may be used to turn the page. For example, a hand motion to the right may cause the page to turn and advance, or a hand motion to the left may cause the page to turn and go back. In a further embodiment, the proximity sensor may work in conjunction with the optical sensor to increase effectiveness of the sensors (e.g. only certain motions at specific distances may cause the page to turn).

In one embodiment, the microphone may be used to turn the page. For example, after the e-ink display has been activated, the microphone may also be activated to receive voice commands from the user. The user may state "next page" to go to the next page, or "last page" to go to the past page. Additionally, the user may state "next chapter" and cause the e-ink display to display the next chapter. In some embodiments, the user may record any string of words to be associated with any preconfigured command.

Further, in one embodiment, command buttons may be used to turn the page. For example, a physical button located on the side of the device may cause the e-ink display to turn to the next page, or to the past page. Of course, any programmable button may also be configured to advance the reading material to the next page or to any predefined function. If it is determined that a gesture has been performed to turn the page, then the page may be turned. See operation 1810.

As shown, it is determined if a display mode has been selected. See decision 1806. For example, the display mode may be put in a landscape or portrait. In one embodiment, the user may specify the e-ink display mode, for example, by a control button, a touchscreen below the e-ink display, and/or the touchscreen display on the first face. In another embodiment, the application may specify the e-ink display mode, and/or the content may indicate what type of display may be preferred (e.g. a photo or a .pdf document may display automatically in landscape format). In a further embodiment, a physical button may switch the display mode. As such, based on the selection by the user, the e-ink display may be put in landscape or portrait mode. See operation 1812.

As shown, it is determined if there is any interaction with the touchscreen display. See decision 1808. For example, content may be selected on the touchscreen display without a backlight, the orientation the apparatus may indicate that it has been flipped over from the second face to the first face, and/or a physical button may be pressed activating (i.e. turning on the backlight) the touchscreen display. Of course, any sensor or input may be used to indicate if there is interaction with the touchscreen display.

As shown, if it is determined that there is some interaction with a touchscreen display, then the touchscreen display displays e-ink controls, content, and/or application(s) on the backlit display. See operation 1814. For example, among other things, a social networking prompt may be displayed asking the user what was thought of the book, a rating system may be displayed asking the user to rate the material, a control guide may be displayed prompting the user to select the next chapter or any specific location in the material, a trashcan may be displayed prompting the user to throw away the material, a return rented materials prompt may be displayed prompting the user to return the rented digital materials to the proper location, and/or anything that may be related in some fashion either to the material displayed on the e-ink display, or to the e-ink reader in general may be displayed to the user. In one embodiment, based on the content of what may be displayed on the e-ink display, advertisements may be tailored and be displayed on the touchscreen display when the orientation is reversed.

In another embodiment, the first backlit touchscreen display may be capable of being utilized as a control for the second e-ink display. For example, an e-ink display application located on the touchscreen display may permit the user to view a thumbnail or even a larger image of what currently is displayed on the e-ink display, select content to highlight, add comments to the text using a stylus or any input tool (e.g. digital keyboard, microphone, etc.), and/or even control basic functions including go to next chapter, turn the page, go to the title page or appendix, enlarge the text, configure automatic page turns (e.g. after 1 minute, automatically turn the page), enable text-reading software, and/or download digital material. In some embodiments, the touchscreen display may include digital applications which may be used to control the e-ink display. For example, a digital rental application may permit the user to select books to rent for a limited time period, a photography management application may permit the user to select a photo album to be viewed on the e-ink display, and/or any application which may have printed-material related content may be used to control the e-ink display. In another embodiment, the apparatus may include a camera positioned on the second face of the tablet housing, and the apparatus may be operable such that content displayed utilizing the second e-ink display is controlled utilizing the camera.

As shown, it is determined whether to deactivate the e-ink display. See decision 1816. For example, the e-ink display may be positioned downwards for a preconfigured set amount of time, the optical sensor may sense that the user is not present near the face of the e-ink display, the proximity sensor may sense that a case cover has closed over e-ink display or that a user is no longer within a certain amount of distance, a timer may have expired without any user interaction, an application on the touchscreen display may have been used to notify the apparatus that the e-ink display is no longer needed, any application on the touchscreen display which would not use the e-ink display may have been activated and/or any other input or command which may be used to signal to the apparatus that the e-ink display is no longer in use. In another embodiment, a physical button may be switched to deactivate the e-ink display.

As shown, if it determined to deactivate the e-ink display, the e-ink display may then be disabled. See decision 1818. In another embodiment, at least one of the first backlit touchscreen display or the second e-ink display may be either powered-down or may display a screensaver screen in response to the determining as to whether the first face of the tablet housing or the second face of the tablet housing is in the predetermined orientation. In the context of the present description, a screensaver screen may refer to a set screen that replaces the image on a screen whenever a screen is not in use.

In some embodiments, at least one of the first backlit touchscreen display or the second e-ink display may be either powered-down or may display a screensaver screen in response to a detection a first one or more controls associated with the first backlit touchscreen display or second one or more controls associated with the second e-ink display are being used. Additionally, in another embodiment, the second e-ink display may display a screensaver screen that includes a trademark of the tablet housing. Further, the second e-ink display may display a screensaver screen that includes a color or design that matches the second face of the tablet housing.

In one embodiment, an orientation detection mechanism may be provided for determining whether the first face of the tablet housing or the second face of the tablet housing is in a predetermined orientation. In another embodiment, at least one of the first backlit touchscreen display or the second e-ink display may be either powered-down or may display a screensaver screen in response to the determining as to whether the first face of the tablet housing or the second face of the tablet housing is in the predetermined orientation.

Figure 19:
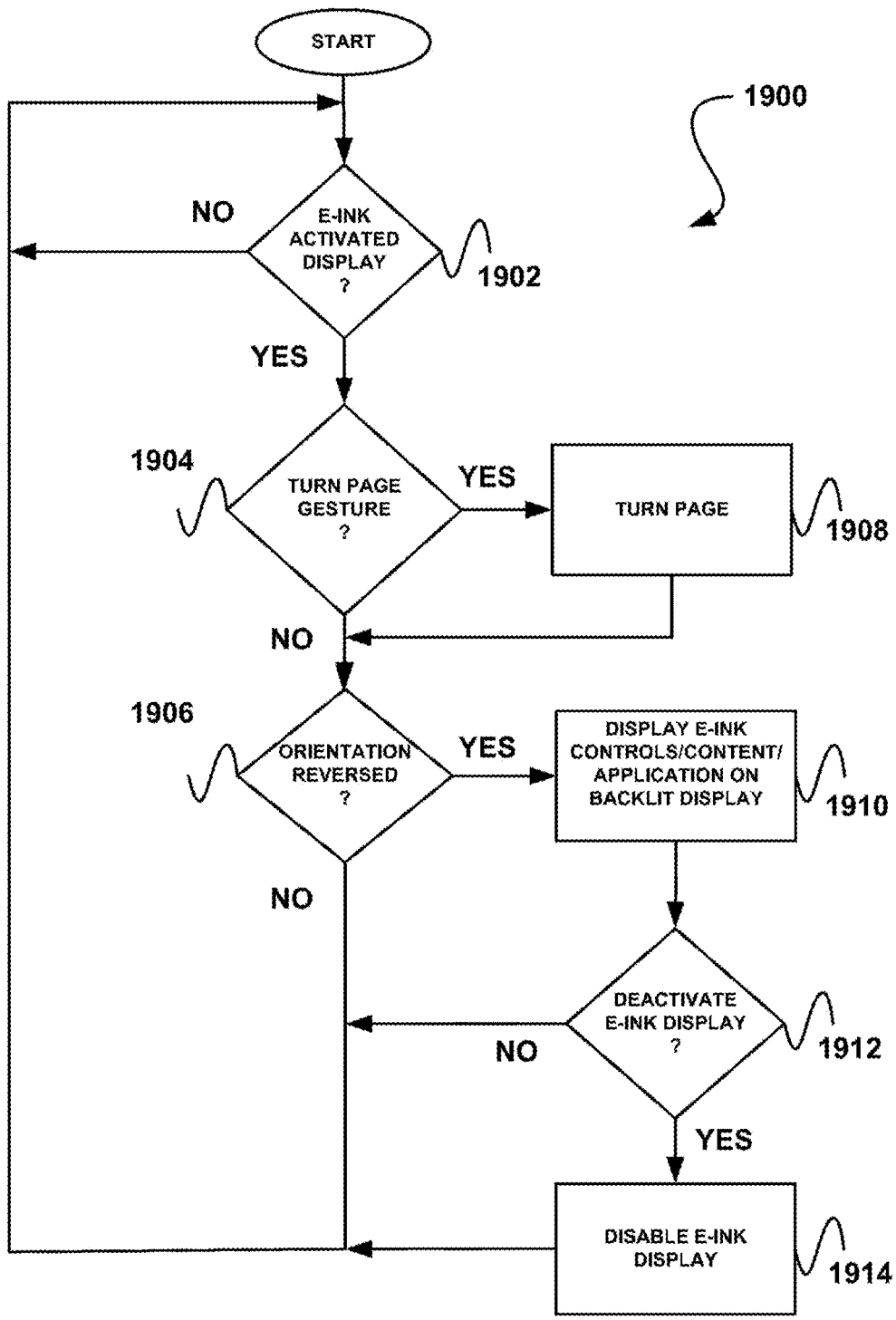
FIG. 19 shows a method for using an e-ink display, in accordance with another possible embodiment.

FIG. 19 shows a method 1900 for using an e-ink display. As an option, the method 1900 may be implemented in the context of the architecture and environment of the previous Figures or any subsequent Figure(s). Of course, however, the method 1900 may be carried out in any desired environment. It should also be noted that the aforementioned definitions may apply during the present description.

As shown, it is determined if the e-ink display has been activated. See decision 1902. For example, the e-ink display may be positioned upwards, the optical sensor may sense that the user is present near the face of the e-ink display, the proximity sensor may sense that a case cover is not closed over e-ink display or that a user is within a certain amount of distance, an application on the touchscreen display may have been activated causing the e-ink display to turn on, content on the touchscreen display may have been selected prompting the user to activate the e-ink display, and/or any other input or command may be used to signal to the apparatus that the e-ink display is to be activated.

As shown, if it is determined that the e-ink display has been activated, then it is determined whether there has been a turn page gesture, or a gesture to turn the page. See decision 1904. For example, an accelerometer may be used to turn the page based on motion from the user. The user may move the device to the right to turn the page or move the device to the left to turn the page back. The user may turn the device (e.g. alter the viewing angle) to cause the page to turn and advance or, in another embodiment, cause the page to go back.

In another embodiment, the optical sensor may be used to turn the page. For example, a hand motion to the right may cause the page to turn and advance, or a hand motion to the left may cause the page to turn and go back. In a further embodiment, the proximity sensor may work in conjunction with the optical sensor to increase effectiveness of the sensors (e.g. only certain motions at specific distances may cause the page to turn).

In one embodiment, the microphone may be used to turn the page. For example, after the e-ink display has been activated, the microphone may also be activated to receive voice commands from the user. The user may state "next page" to go to the next page, or "last page" to go to the past page. Additionally, the user may state "next chapter" and cause the e-ink display to display the next chapter. In some embodiments, the user may record any string of words to be associated with any preconfigured command.

Further, in one embodiment, command buttons may be used to turn the page. For example, a physical button located on the side of the device may cause the e-ink display to turn to the next page, or to the past page. Of course, any programmable button may also be configured to advance the reading material to the next page.

If it is determined that a gesture has been performed to turn the page, then the page may be turned. See operation 1908.

As shown, it is determined whether the orientation has been reversed. See decision 1906. For example, while reading a book, the user may flip the apparatus over to access another application, watch a movie, or perform some other command. The accelerometer, optical sensor, proximity sensor, and any other sensor mounted on the device may be used to assess whether the apparatus has been flipped and the e-ink display is no longer being used.

As shown, if the orientation has been reversed, then e-ink controls, content, and/or applications may be displayed on the touchscreen display. See operation 1910. For example, after flipping the apparatus over (i.e. so that the first face is facing towards the user), the touchscreen display may be activated (backlight may remain off or turn on, depending on user settings) and further controls, content, and/or applications are presented to the user. Of course, after the orientation has been reversed, anything may be presented to the user. For example, among other things, a social networking prompt may be displayed asking the user what was thought of the book, a rating system may be displayed asking the user to rate the material, a control guide may be displayed prompting the user to select the next chapter or any specific location in the material, a trashcan may be displayed prompting the user to throw away the material, a return rented materials prompt may be displayed prompting the user to return the rented digital materials to the proper location, and/or anything that may be related in some fashion either to the material displayed on the e-ink display, or to the e-ink reader in general may be displayed to the user. In one embodiment, based on the content of what may be displayed on the e-ink display, advertisements may be tailored and be displayed on the touchscreen display when the orientation is reversed.

In another embodiment, the first backlit touchscreen display may be capable of being utilized as a control for the second e-ink display. For example, an e-ink display application located on the touchscreen display may permit the user to view a thumbnail or even larger of what currently is displayed on the e-ink display, select content to highlight, add comments to the text using a stylus or any input tool (e.g. digital keyboard, microphone, etc.), and/or even control basic functions including go to next chapter, turn the page, go to the title page or appendix, enlarge the text, configure automatic page turns (e.g. after 1 minute, automatically turn the page), enable text-reading software, and/or download digital material. In some embodiments, the touchscreen display may include digital applications which may be used to control the e-ink display. For example, a digital rental application may permit the user to select books to rent for a limited time period, a photography management application may permit the user to select a photo album to be viewed on the e-ink display, and/or any application which may have printed-material related content may be used to control the e-ink display. In another embodiment, the apparatus may include a camera positioned on the second face of the tablet housing, and the apparatus may be operable such that content displayed utilizing the second e-ink display is controlled utilizing the camera.

In another embodiment, the apparatus may include an application that may be accessible via the first backlit touchscreen display and may be further capable of being utilized to select content that is displayed utilizing the second e-ink display.

As shown, after the orientation is found to be reversed, it is determined whether to deactivate the e-ink display. See decision 1912. For example, the e-ink display may be positioned downwards for a preconfigured set amount of time, the optical sensor may sense that the user is not present near the face of the e-ink display, the proximity sensor may sense that a case cover has closed over e-ink display or that a user is no longer within a certain amount of distance, a timer may have expired without any user interaction, an application on the touchscreen display may have been used to notify the apparatus that the e-ink display is no longer needed, any application on the touchscreen display which would not use the e-ink display may have been activated and/or any other input or command which may be used to signal to the apparatus that the e-ink display is no longer in use. In another embodiment, a physical button may be switched to deactivate the e-ink display.

As shown, if it determined to deactivate the e-ink display, the e-ink display may then be disabled. See decision 1914. In another embodiment, at least one of the first backlit touchscreen display or the second e-ink display may be either powered-down or may display a screensaver screen in response to the determining as to whether the first face of the tablet housing or the second face of the tablet housing is in the predetermined orientation. In some embodiments, at least one of the first backlit touchscreen display or the second e-ink display may be either powered-down or may display a screensaver screen in response to a detection a first one or more controls associated with the first backlit touchscreen display or second one or more controls associated with the second e-ink display are being used. Additionally, in another embodiment, the second e-ink display may display a screensaver screen that includes a trademark of the tablet housing. Further, the second e-ink display may display a screensaver screen that includes a color or design that matches the second face of the tablet housing.

Figure 20A:
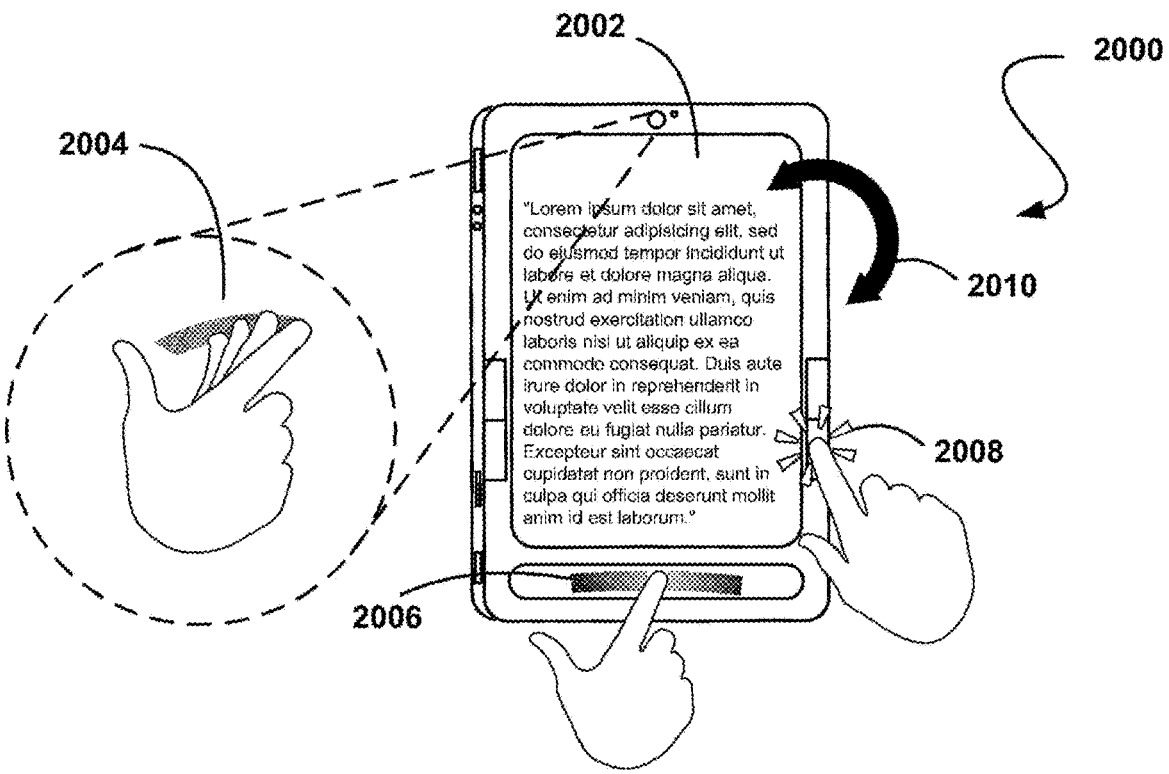
FIG. 20A illustrates a system for using an e-ink display, in accordance with another possible embodiment.

FIG. 20A illustrates a system 2000 for using an e-ink display. As an option, the method 2000 may be implemented in the context of the architecture and environment of the previous Figures or any subsequent Figure(s). Of course, however, the method 2000 may be carried out in any desired environment. It should also be noted that the aforementioned definitions may apply during the present description.

As shown, an activated e-ink display 2002 is included. For example, in one embodiment, text may be displayed on the display. Of course, any image, text, or content may also be displayed.

As shown, the optical sensor 2004 may be used to turn the page. For example, a finger motion to the right may cause the page to turn and advance. In another embodiment, a finger motion to the left may cause the page to turn and go back. In a further embodiment, the proximity sensor may work in conjunction with the optical sensor to increase effectiveness of the sensors (e.g. only motion at a set distance will cause the page to turn). Of course, any object may be used to cause the page to turn through use of the optical sensor.

As shown, a touchscreen panel 2006 may be used to turn a page. For example, in one embodiment, a user may swipe a finger on the touchscreen panel to the right to cause the page to turn and advance. In another embodiment, the user may swipe a finger on the touchscreen panel to the left to cause the page to turn and go back. Of course, any object which can be sensed by the touchscreen panel may be used. Additionally, any stroke, touch, or motion may be set to a preconfigured function.

As shown, command buttons 2008 may be used to turn a page. For example, a physical button located on the side of the device may cause the e-ink display to turn to the next page, or to the past page. Of course, any programmable button may also be configured to advance the reading material to the next page.

As shown, the apparatus may be turned 2010 to facilitate turning a page. In one embodiment, an accelerometer may be used to turn the page based on motion from the user. The user may move the device to the right to turn the page or move the device to the left to turn the page back. Additionally, the user may turn the device to cause the page to turn and advance or, in another embodiment, cause the page to go back. Of course, any sensor which can determine that the apparatus is being turned may be used to facilitate turning a page.

In a further embodiment, voice commands may be used to operate turning a page. For example, after the e-ink display has been activated, the microphone may also be activated to receive voice commands from the user. The user may state "next page" to go to the next page, or "last page" to go to the past page. Additionally, the user may state "next chapter" and cause the e-ink display to display the next chapter. In some embodiments, the user may record any string of words to be associated with any preconfigured command.

In another embodiment, the apparatus may be configured to detect a simulated page turning, utilizing a sensor (e.g. a camera, etc.). For example, a user may have the ability to move a hand as if turning a page and a sensor of the apparatus may detect this motion and, as a result, turn the page. The detection of the hand motion may be accomplished in a variety of ways, such as generating a motion vector based on the hand movement, utilizing image recognition to recognize the hand, utilizing image recognition to detect a rotation of the hand, and various other techniques.

Figure 20B:
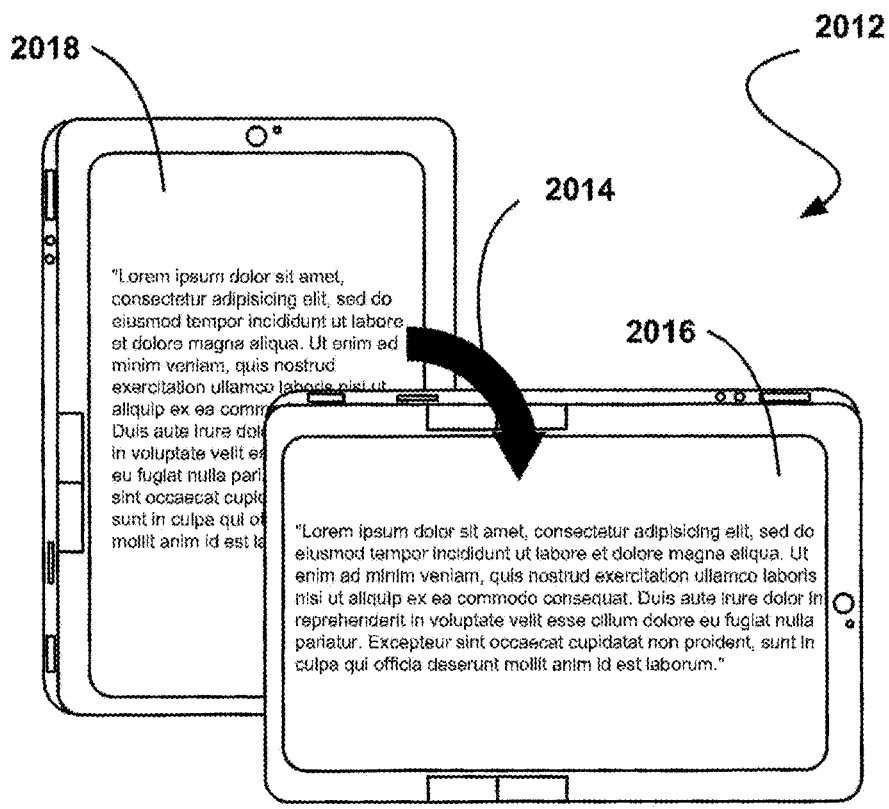
FIG. 20B illustrates a system for using an e-ink display, in accordance with another possible embodiment.

FIG. 20B illustrates a system 2012 for using an e-ink display. As an option, the method 2012 may be implemented in the context of the architecture and environment of the previous Figures or any subsequent Figure(s). Of course, however, the method 2012 may be carried out in any desired environment. It should also be noted that the aforementioned definitions may apply during the present description.

As shown, the apparatus may be positioned in an upright or portrait position 2018. The apparatus may be turned 2014. After turning, the e-ink display may adjust and switch 2016 to a landscape position or a portrait position (e.g. the opposite position that it was set at originally).

In the context of the present description, a portrait position refers to having the apparatus in a position where the height is greater than the width. Further, in the context of the present description, a landscape position refers to having the apparatus in a position where the width is greater than the height.

In one embodiment, the apparatus may switch from portrait to landscape (or from landscape to portrait) automatically. For example, an accelerometer may determine that the apparatus is being turned and automatically switch the orientation the display. In another embodiment, the orientation may change based on the displayed content. For example, if a photo was too wide to be properly shown in portrait mode, the apparatus may automatically switch the display into landscape mode to accommodate the dimensions of the photo. Of course, any content may be preconfigured to automatically switch the orientation the e-ink display. Additionally, the apparatus may switch orientation automatically regardless of the content that is being presented.

In another embodiment, the apparatus may switch from portrait to landscape (or from landscape to portrait) manually. For example, the apparatus may have a physical button, a control button, a switch, or any other type of mechanical tool to assist with manually turning the orientation the e-ink display.

Figure 21A:
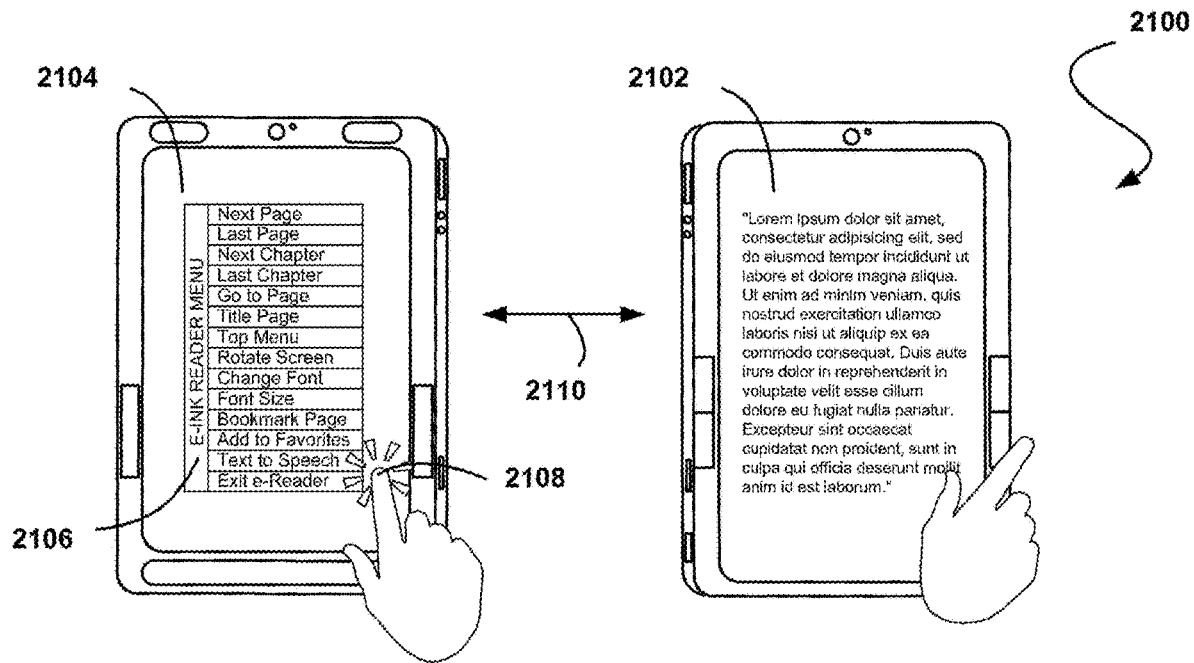
FIG. 21A illustrates a system for using an e-ink display, in accordance with another possible embodiment.

FIG. 21A illustrates a system 2100 for using an e-ink display. As an option, the method 2100 may be implemented in the context of the architecture and environment of the previous Figures or any subsequent Figure(s). Of course, however, the method 2100 may be carried out in any desired environment. It should also be noted that the aforementioned definitions may apply during the present description.

As shown, an activated e-ink display 2102 is included. The apparatus may be flipped 2110 from the second face (i.e. the e-ink display) to the first face (i.e. the touchscreen display).

As shown, the touchscreen display may be used 2104. In one embodiment, the touchscreen display may have its backlight off or the backlight may be activated by turning the apparatus over from the second face (e.g. e-ink display) to the first face (e.g. touchscreen display). In another embodiment, the apparatus may not be fully turned over from the second face to the first face in order to access the touchscreen display. For example, the user may raise the apparatus above the head to view the underside of the apparatus and thereby make a selection on the touchscreen display. As such, the apparatus may be orientated in any manner to permit the user to interact with the touchscreen display.

As shown, a user may interact with the touchscreen display through a menu system 2106. For example, in one embodiment, a menu may be presented to the user displaying any of the following options: "Next Page," "Last Page," "Next Chapter," "Last Chapter," "Go to Page," "Title Page," "Top Menu," "Rotate Screen," "Change Font," "Font Size," "Bookmark Page," "Add to Favorites," "Text to Speech," and "Exit e-Reader." Of course any option may be presented to the user for selection. In another embodiment, a social networking prompt may be displayed asking the user what was thought of the book, a rating system may be displayed asking the user to rate the material, a trashcan icon may be displayed prompting the user to throw away the material, a return rented materials prompt may be displayed prompting the user to return the rented digital materials to the proper location, and/or anything that may be related in some fashion either to the material displayed on the e-ink display, or to the e-ink reader in general. In one embodiment, based on the content of what may be displayed on the e-ink display, advertisements may be tailored and be displayed on the touchscreen display.

In a further embodiment, the touchscreen display may be utilized as a control for the e-ink display. For example, an e-ink display application located on the touchscreen display may permit the user to view a thumbnail or even larger of what currently is displayed on the e-ink display, select content to highlight, add comments to the text using a stylus or any input tool (e.g. digital keyboard, microphone, etc.), and/or even control basic functions including go to next chapter, turn the page, go to the title page or appendix, enlarge the text, configure automatic page turns (e.g. after 1 minute, automatically turn the page), enable text-reading software, and/or download digital material. In some embodiments, the touchscreen display may include digital applications which may be used to control the e-ink display. For example, a digital rental application may permit the user to select books to rent for a limited time period, a photography management application may permit the user to select a photo album to be viewed on the e-ink display, and/or any application which may have printed-material related content may be used to control the e-ink display. In another embodiment, the apparatus may include a camera positioned on the second face of the tablet housing, and the apparatus may be operable such that content displayed utilizing the second e-ink display is controlled utilizing the camera.

As shown, the user may interact 2108 with the touchscreen display. For example, the user may use a finger to select the desired option on the menu. Of course, any object which can be used as an input on a touchscreen display may be used to receive user feedback and/or selection.

Figure 21B:
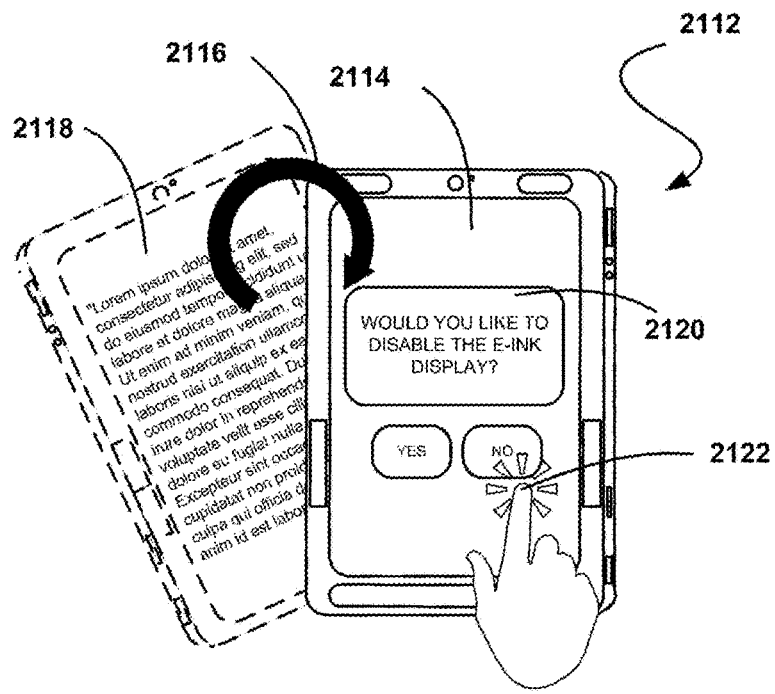
FIG. 21B illustrates a system for disabling an e-ink display, in accordance with another possible embodiment.

FIG. 21B illustrates a system 2112 for disabling an e-ink display. As an option, the method 2112 may be implemented in the context of the architecture and environment of the previous Figures or any subsequent Figure(s). Of course, however, the method 2112 may be carried out in any desired environment. It should also be noted that the aforementioned definitions may apply during the present description.

Additionally, in the context of the present description, disabling an e-ink display may refer to causing the e-ink display to be unresponsive to further commands. For example, disabling an e-ink display may cause the e-ink to not respond to specific command buttons, page turn buttons, inputs from proximity sensors or optical sensors, etc. Of course, the e-ink display may be disabled only temporarily. For example, after the e-ink display has been disabled it may also be re-activated.

As shown, an activated e-ink display 2118 is included. The apparatus may be turned over 2116 so that the first face with the touchscreen display is positioned upward. Additionally, an activated touchscreen display 2114 is included.

In various embodiments, there are many ways in which the e-ink display may be disabled. For example, the e-ink display may be positioned downwards for a preconfigured set amount of time, the optical sensor may sense that the user is not present near the face of the e-ink display, the proximity sensor may sense that a case cover has closed over the e-ink display or that a user is no longer within a certain amount of distance of the sensor, a timer may have expired without any user interaction, an application on the touchscreen display may have been used to notify the apparatus that the e-ink display is no longer needed, any application on the touchscreen display which would not use the e-ink display may have been activated and/or any other input or command which may be used to signal to the apparatus that the e-ink display is no longer in use. In another embodiment, a physical button may be switched to deactivate the e-ink display.

As shown, a prompt 2120 may be displayed asking the user if it is desired to disable the e-ink display. In one embodiment, the prompt may state "Would you like to disable the e-ink display?" Of course, any prompt may be given to the user relating to disabling the e-ink display. In response to the prompt, the user may make a selection. For example, below the prompt may be displayed options "yes" and "no." In another embodiment, any option requesting feedback may be displayed to the user.

As shown, a user may make a selection 2122 of one of the options. In one embodiment, the user may use a finger to navigate and select content on the screen. In another embodiment, a stylus, pen, or other potentially conductive material may be used. Further, in various embodiments, other sensors may be used to select an option. For example, a microphone may be used, the optical sensor may receive input through observed motions, and/or an accelerometer may be used to move a cursor with an automatic selection based on a preconfigured set interval (e.g. 2 seconds of hovering above a selection object).

Figures 22A, 22B, 22C:
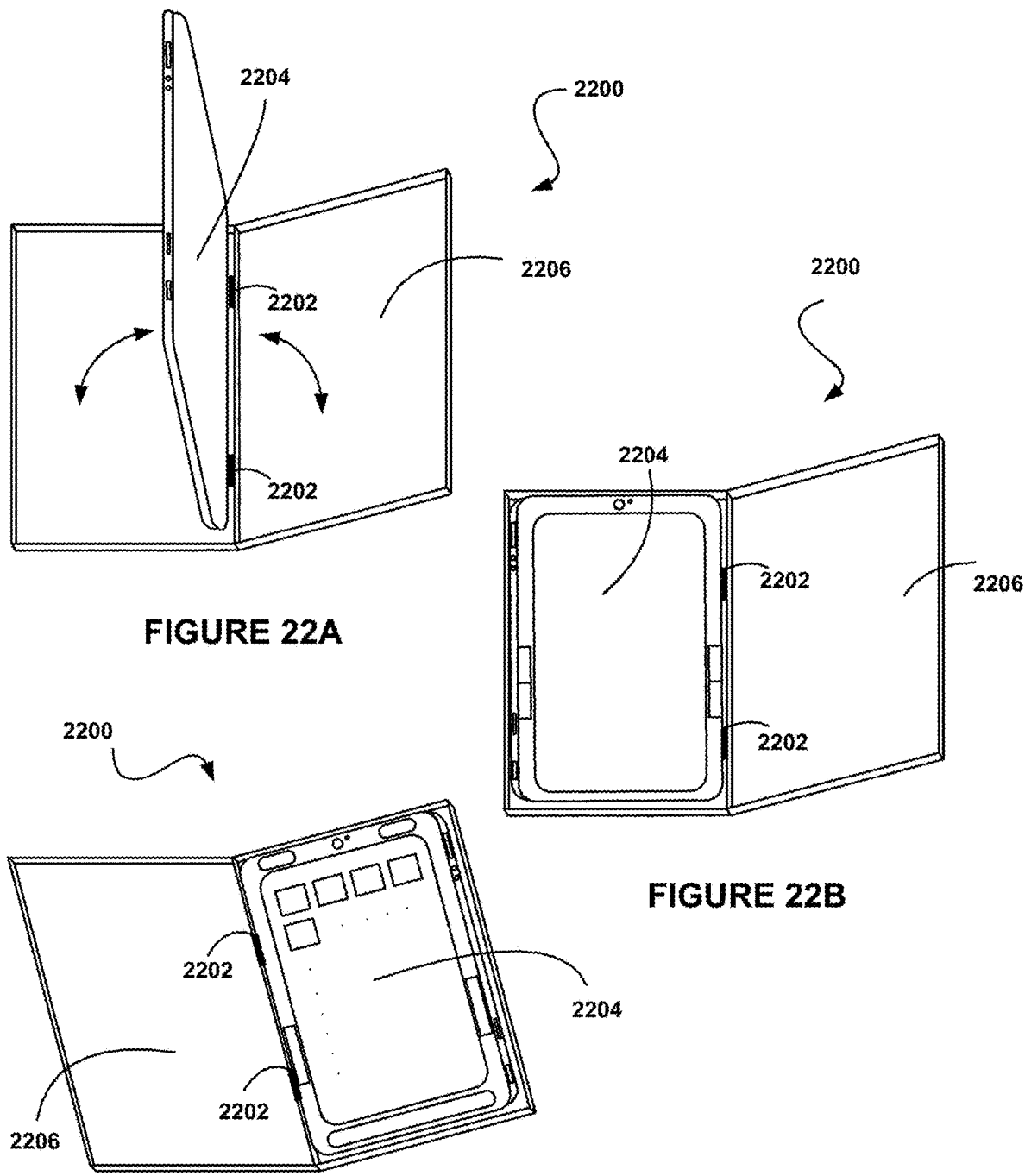
FIGS. 22A-C illustrate a cover having a hinge along a seam to which a tablet apparatus may be coupled, in accordance with one embodiment.

FIGS. 22A-C illustrate a cover 2200 having a first planar portion, a second planar portion, a seam which connects the first and second planar portions, and a hinge along the seam to which a tablet apparatus may be coupled, in accordance with one embodiment. As an option, the cover 2200 may be implemented in the context of the architecture and environment of the previous Figures or any subsequent Figure(s). Of course, however, the cover 2200 may be carried out in any desired environment. It should also be noted that the aforementioned definitions may apply during the present description.

As shown, a first and second planar portion 2206 are identified. A hinge 2202 along the seam of where the first and second planar portions are connected is identified. Additionally, a tablet apparatus 2204 which may be coupled to the hinge is identified.

In one embodiment, a tablet cover that may include a first planar portion and a second planar portion that may have a hinged relationship along a seam therebetween, and a peripheral edge of the tablet housing may be coupleable along the seam. Additionally, the tablet cover may be fabricated in any manner and constructed by any material. In one embodiment, the hinge may be physically connected to the tablet cover and to the apparatus. In another embodiment, the hinge may be a magnet between the tablet cover and the apparatus. Of course, any mechanism may be used to attach or connect the cover to the tablet apparatus.

In a further embodiment, a tablet cover may be comprised of a bumper. In the context of the present description, a bumper refers to a material which covers the outer periphery of a tablet apparatus. For example, the bumper may be constructed of a silicon compound and surround the outer edge of the apparatus (i.e. any edge of the tablet apparatus).

Figure 23A:
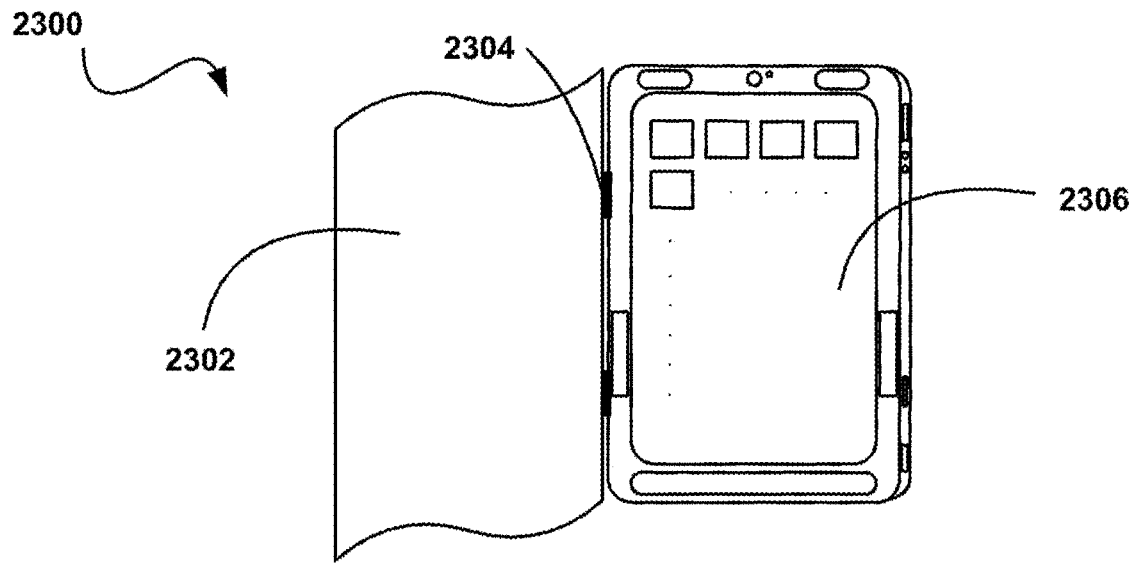
FIGS. 23A-B illustrate a cover having a seam to which a tablet apparatus may be coupled, in accordance with another embodiment.
Figure 23B:
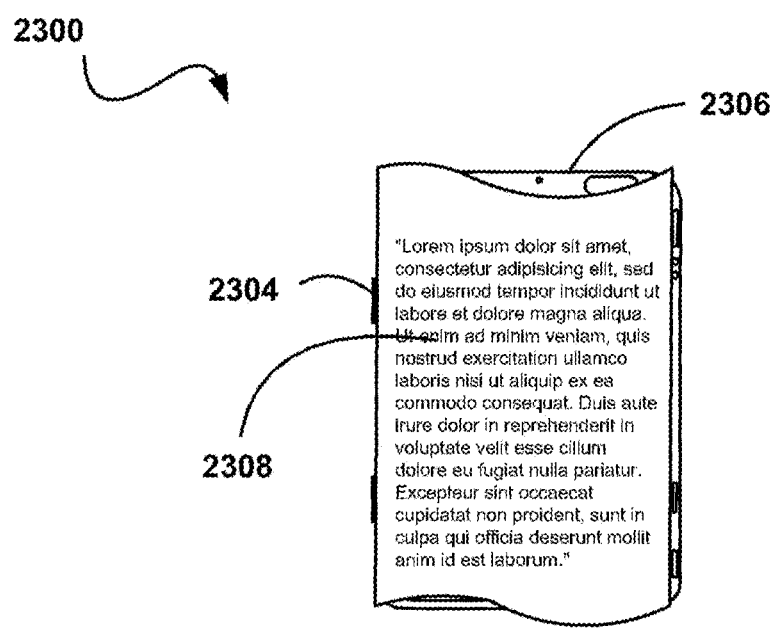

FIGS. 23A-B illustrate a cover 2300 having a first planar portion, and a hinge along the seam to which a tablet apparatus may be coupled, in accordance with one embodiment. As an option, the cover 2300 may be implemented in the context of the architecture and environment of the previous Figures or any subsequent Figure(s). Of course, however, the cover 2300 may be carried out in any desired environment. It should also be noted that the aforementioned definitions may apply during the present description.

As shown, a touchscreen display 2306 is included. A back face 2302 of a cover is included. Additionally, a hinge 2304 connecting the touchscreen display to the cover is illustrated.

In various embodiments, the cover may be composed of any material. For example, the cover may be constructed of leather, silicon, metal compounds, plastic, or any other material which may be suitable to cover the tablet apparatus. In one embodiment, the cover may be one flexible. For example, the cover may be constructed of a material that bends easily without breaking, or the material may be constructed in parts and connected with multiple seams to permit folding of the cover without breaking In another embodiment, the cover may be rigid.

As shown, the front face of the cover 2308 may function as an e-ink display. For example, the material may be composed of flexible plastic sheets which may be used to display e-ink. In another embodiment, the e-ink may be displayed on any flexible substrate which can function both as an e-ink display and as a cover for the touchscreen display. Of course, the cover which may function as an e-ink display may incorporate any of the prior embodiments discussed previously.

In various embodiments, control of the e-ink display cover may occur on the touchscreen display. For example, the touchscreen display may display e-ink controls, content, and/or application(s) on the backlit display. In various embodiments, a social networking prompt may be displayed asking the user what was thought of the book, a rating system may be displayed asking the user to rate the material, a control guide may be displayed prompting the user to select the next chapter or any specific location in the material, a trashcan may be displayed prompting the user to throw away the material, a return rented materials prompt may be displayed prompting the user to return the rented digital materials to the proper location, and/or anything that may be related in some fashion either to the material displayed on the e-ink display, or to the e-ink reader in general. In one embodiment, based on the content of what may be displayed on the e-ink display, advertisements may be tailored and be displayed on the touchscreen. In another embodiment, based on the content of what may be displayed on the touchscreen display, advertisements may be tailed and be displayed on the e-ink display cover.

In another embodiment, the first backlit touchscreen display may be capable of being utilized as a control for the e-ink display cover. For example, an e-ink display application located on the touchscreen display may permit the user to view a thumbnail or even larger of what currently is displayed on the e-ink display, select content to highlight, add comments to the text using a stylus or any input tool (e.g. digital keyboard, microphone, etc.), and/or even control basic functions including go to next chapter, turn the page, go to the title page or appendix, enlarge the text, configure automatic page turns (e.g. after 1 minute, automatically turn the page), enable text-reading software, and/or download digital material. In some embodiments, the touchscreen display may include digital applications which may be used to control the e-ink display. For example, a digital rental application may permit the user to select books to rent for a limited time period, a photography management application may permit the user to select a photo album to be viewed on the e-ink display, and/or any application which may have printed-material related content may be used to control the e-ink display.

In a further embodiment, physical control buttons may be constructed into the cover of the e-ink display. For example, command buttons may be programmed to turn the page of the display, skip to the next chapter, etc. In another embodiment, the command buttons may only function when the e-ink cover display is being actively used. In the context of the present description, being actively used may refer to the e-ink display cover receiving a command (e.g. page turn, etc.) within a set preconfigured time period. Of course, any sensor on the apparatus (e.g. accelerometer, optical sensor, proximity sensor) may be configured to cause the page to turn, or to do any other preconfigured function.

Figure 24A:
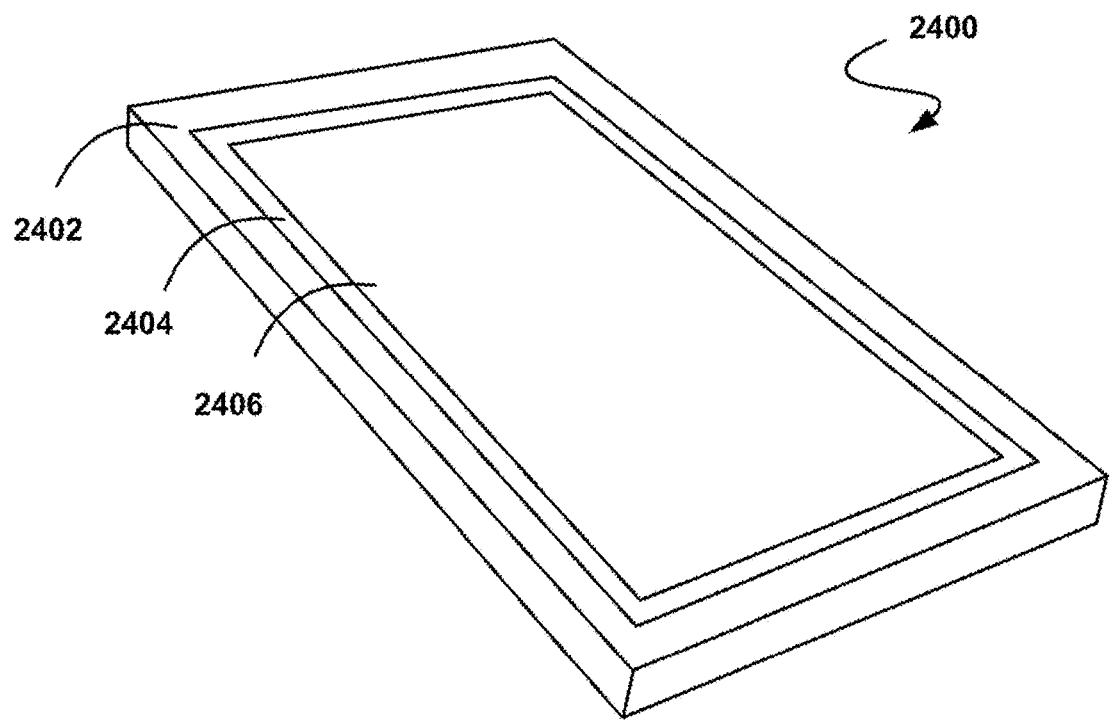
FIG. 24A illustrates a tablet apparatus, in accordance with one embodiment.

FIG. 24A illustrates a tablet apparatus 2400 having a tablet housing, a first backlit touchscreen display positioned on a first face of the tablet housing, and a second e-ink display positioned on the first face of the tablet housing, in accordance with one embodiment. As an option, the apparatus 2400 may be implemented in the context of the architecture and environment of the previous Figures or any subsequent Figure(s). Of course, however, the apparatus 2400 may be carried out in any desired environment. It should also be noted that the aforementioned definitions may apply during the present description.

As shown, a tablet housing 2402 is included. A first backlit touchscreen display 2404 positioned on a first face of the tablet housing is included. Additionally, a second e-ink display 2406 positioned on the first face of the tablet housing is also included.

In one embodiment, the e-ink display may function separate from the touchscreen display. For example, whenever the e-ink display functionality is requested, the touchscreen display may be disabled. In another embodiment, the e-ink display may be activated or deactivated by a mechanical power button.

In another embodiment, the e-ink display may function concurrently with the touchscreen display. For example, if parts of the touchscreen display include text, such text may be displayed using the e-text screen. In another embodiment, any item may be preconfigured to use the e-ink display. As such, battery life may be preserved and eye strain may be reduced.

In various embodiments, the e-ink reader screen and touchscreen display may be divided into sections. For example, while reading a book utilizing the e-ink display, the bottom of the touchscreen display may include images of controls (e.g. page forward, page back, settings, etc.) which can be selected by the user. Additionally, when watching a movie, any part of the e-text display may display appropriate text. Of course, both the e-ink display and the touchscreen display may be integrated (i.e. used) in any other manner together. In a further embodiment, to preserve battery life, the touchscreen display may be disabled and only the e-ink display activated and controlled by manual buttons. Additionally, a majority of the touchscreen display may be disabled while maintaining a touch sensitive panel to add functionality and control to the e-ink display.

In another embodiment, any section the screen that requires a high refresh rate may utilize the touchscreen display. In the context of the present description, a high refresh rate may refer to a refresh that is near continuous. For example, watching a movie may require a near continuous refresh rate and so would benefit from a touchscreen display. In one embodiment, the tablet apparatus may switch between an e-ink display and a touchscreen display based on one or more features of visual content. For example, the apparatus may display visual content with a low rate of change and/or simple color composition on an e-ink display and visual content with a high rate of change or detailed color composition on a video display. In another embodiment, the refresh rate may be set by the user. As such, in various embodiments, the tablet apparatus may determine whether the refresh rate of change is above a first threshold set by the user. For example, the tablet apparatus may compare the rate of change to a threshold to determine if the visual content is relatively static (e.g., below the threshold) or relatively dynamic (e.g., above the threshold).

In one embodiment, the e-ink display may display visual content in black-and-white or grayscale. In other embodiments, the e-ink display may display visual content in color. In one embodiment, the e-ink display may display visual content at any suitable brightness level or resolution. For example, the brightness level or resolution the e-ink display can be adjusted by a user (e.g., through display configuration options). In one embodiment, the tablet apparatus may configure the e-ink display or a portion the e-ink display to be translucent. For example, the tablet apparatus can configure an e-ink display or a portion thereof to transmit at least 50% of the light incident on the display, at least 60% of the light incident on the display, at least 70% of the light incident on the display, at least 80% of the light incident on the display, at least 90% of the light incident on the display, 100% of the light incident on the display, or any other suitable amount of light incident on the display.

In a further embodiment, a tablet apparatus may configure an e-ink display or a portion thereof to be translucent so that a user may see visual content provided by a video display under the e-ink display electronic paper display and under the touchscreen display. In another embodiment, the e-ink display may be located under the video display. Additionally, the tablet apparatus may configure the e-ink display or a portion thereof to be translucent using any suitable technique.

In some embodiments, portions of the e-ink display may be independently enabled. For example, portions of the e-ink display may be activated to provide visual content while other portions of the e-ink display may be configured to be translucent. In some embodiments, the e-ink display may include multiple regions that can be independently enabled. For example, a region the e-ink display may be translucent at a particular location the e-ink display, and that region may provide a segment of visual content corresponding to that location (e.g., lower right-hand corner) but displayed on the touchscreen display.

In some embodiments, the e-ink display may be configured to be translucent by changing the state of material in the display. An electronic paper display may include individually addressable microcapsules, each of which can include particles of different colors, and the particles may have different properties depending on the state of the particles. For example, the particles may appear a particular color in a solid state (e.g., white or black or any other combination color) but appear translucent in a gaseous state. In such embodiments, the electronic paper display or a portion thereof may be configured to be translucent by changing the state of the particles. For example, an electronic paper display can heat particles to convert them from solid to gas and, therefore, configure the electronic paper display to be translucent.

In some embodiments, a user can configure a system to specify if and how the tablet apparatus switches between the e-ink display and the touchscreen display. A user may be able to configure any aspect of determining one or more features of visual content and switching between displays based on the one or more determined features. For example, a user may be able to specify which feature of the visual content may be the basis for switching between displays. In some embodiments, a configuration screen may include an option for specifying if the tablet apparatus can independently switch regions of a composite display between portions of an electronic paper display and corresponding portions of a video display. In various embodiments, a configuration screen may include an option for specifying which features of visual content a tablet apparatus may switch between an e-ink display and a touchscreen display.

In a further embodiment, the e-ink display and touchscreen display may be used in conjunction to create a 3-D effect. For example, text or an image may be displayed on the e-ink display with 3-D shadowing displayed on the video display (e.g. below the e-ink display). As such, a 3-D effect may be produced by having visual content displayed on both the e-ink display and the video display. In another embodiment, the touchscreen display may be used to create a 3-D effect as used in conjunction with either the e-ink display or the video display.

Figure 24B:
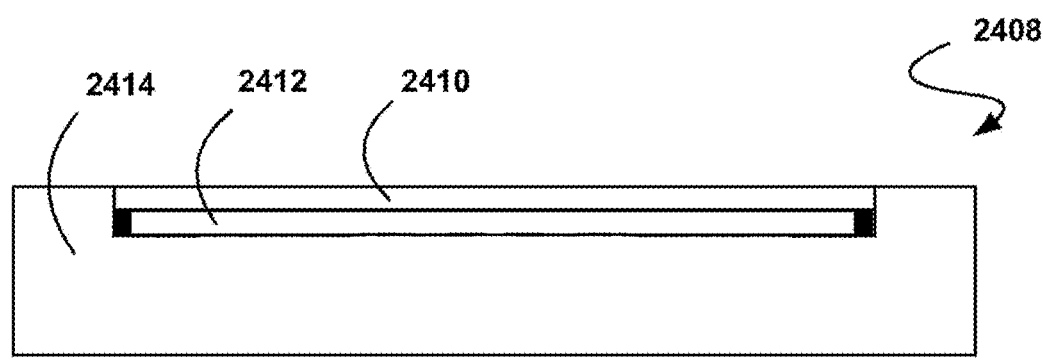
FIG. 24B illustrates a cross section a tablet apparatus, in accordance with one embodiment.

FIG. 24B illustrates a cross section a tablet apparatus 2408 having a tablet housing, a first backlit touchscreen display positioned on a first face of the tablet housing, and a second e-ink display positioned on the first face of the tablet housing, in accordance with one embodiment. As an option, the cross section 2408 may be implemented in the context of the architecture and environment of the previous Figures or any subsequent Figure(s). Of course, however, the cross section 2408 may be carried out in any desired environment. It should also be noted that the aforementioned definitions may apply during the present description.

As shown, a tablet housing 2414 is included. A first backlit touchscreen display 2410 positioned on a first face of the tablet housing is included. Additionally, a second e-ink display 2412 positioned on the first face of the tablet housing is also identified.

In one embodiment, the e-ink display may be positioned under the touchscreen display. For example, such a configuration may permit a user to still give feedback (e.g. select options on the screen) while maintaining the benefit of having the high contrast of an e-ink display. In another embodiment, an additional screen, such as a video screen, may be positioned below the e-ink display to permit continuous viewing of video content. Such a positioning may also be advantageous as the e-ink may also be set as translucent so that the video may be viewed without any obstructions. Of course, the displays on the tablet apparatus may be arranged in any manner and in any order.

Figure 25:
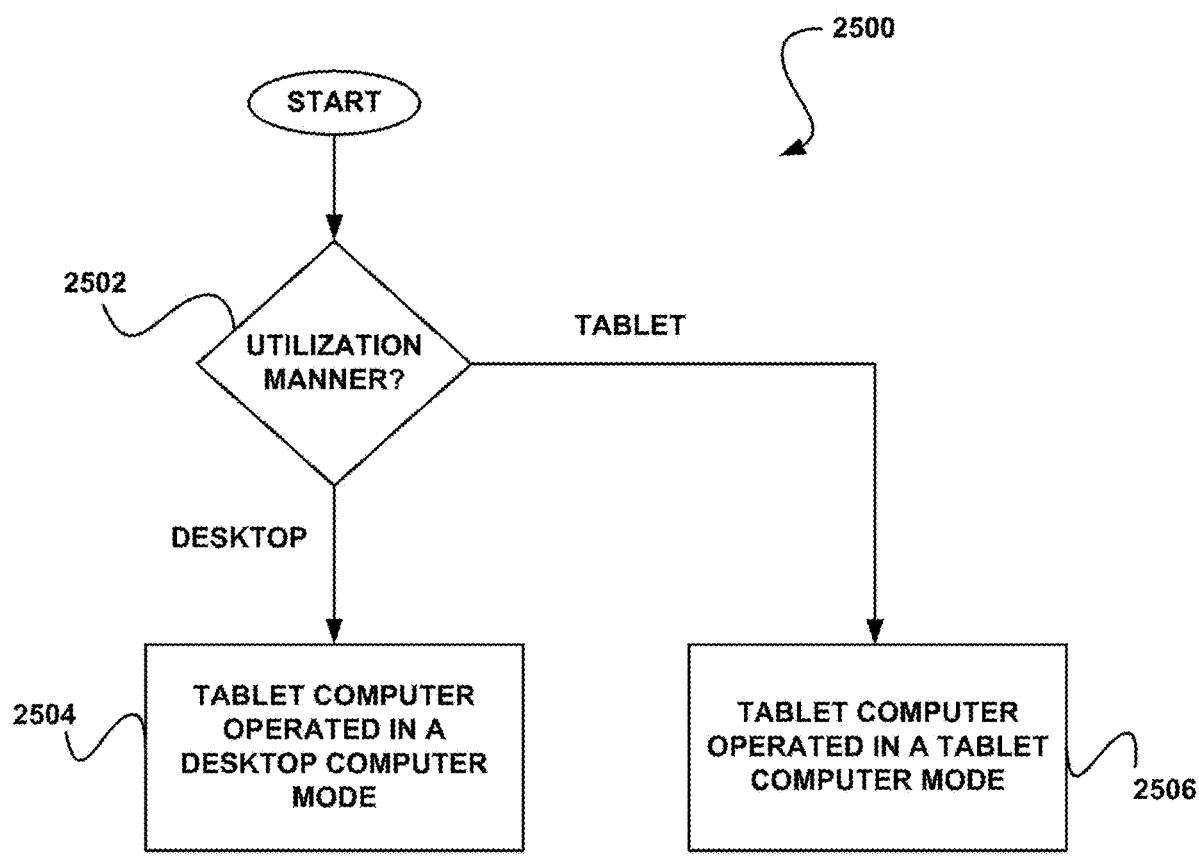
FIG. 25 shows a method for operating a tablet computer in a desktop computer mode, in accordance with one embodiment.

FIG. 25 shows a method 2500 for operating a tablet computer in a desktop computer mode, in accordance with one embodiment. As an option, the method 2500 may be implemented in the context of the architecture and environment of the previous Figures or any subsequent Figure(s). For example, the tablet computer disclosed herein may or may not include an e-ink display and/or any of the features described hereinabove. Of course, however, the method 2500 may be carried out in any desired environment. It should also be noted that the aforementioned definitions may apply during the present description.

As shown, it is determined whether a tablet computer is being utilized in a desktop computer manner or a tablet computer manner. See decision 2502.

In the context of the present description, utilization of a tablet computer in a desktop computer manner refers to any use of the tablet computer which requires the movement of the tablet computer to be confined to the vicinity of a predominantly stationary device, support structure, and/or apparatus. For example, in one embodiment, such utilization may include the use of the tablet computer in conjunction with an external display device (e.g. computer monitor, television, projector, etc.). In another embodiment, such utilization may include the use of the tablet computer in conjunction with an input device (e.g. keyboard, mouse, etc.). In yet another embodiment, such utilization may include the use of the tablet computer in conjunction with a mount, or any other stationary entity. To this end, the use herein of the term "desktop" in the context of desktop computer manner or a similar term should only be limited as defined, and not be construed as being limited to a work environment, thereby clearly encompassing other environments (e.g. social, entertainment, household, etc.).

In the context of the present description, a mount refers to a support structure that holds the tablet in a particular location, in a particular orientation. In various embodiments, the mount may include, but is not limited to, a display mount or an input mount. In the context of the present description, a display mount holds the tablet computer in such a way that it may function as a desktop computer display. Other example embodiments of a mount include, but are not limited to, mounts that can hold a tablet computer in a position typical to that of a television, a picture frame, a recipe book, and/or any device or object which displays visual information.

Additionally, in the context of the present description, an input mount is a mount which holds the tablet computer at an angle and height ideal for use as an input device. For example, in various embodiments, an input mount may include, but is not limited to, a keyboard mount, a trackpad mount, and/or a mount positioned similar to any other type of input device.

Furthermore, in the context of the present description, utilization of a tablet computer in a tablet computer manner refers to using the tablet computer in any manner that is not a desktop computer manner. For example, in one embodiment, the use of the tablet computer while being handheld and not connected to any external display device or input device.

Further, determining whether a tablet computer is being utilized in a desktop computer manner or a tablet computer manner may be based on any number of criteria. For example, in one embodiment, the determination of the manner of use may be based on a detection of a presence of the tablet computer on a display mount (e.g. wall mount, desktop stand, etc.). In another embodiment, the determination of the manner of use may be based on a detection of a presence of the tablet computer with respect to a keyboard mount.

In yet another embodiment, the determination of the manner of use may be based on a detection of a presence of the tablet computer in a proximity of a display (e.g. computer monitor, television, projector, etc.). Additionally, in another embodiment, the determination of the manner of use may be based on a detection of a presence of the tablet computer in a proximity of a keyboard.

In one embodiment, the determination of the manner of use may be based on a detection of a presence of the tablet computer in a proximity of a storage device. For example, the storage device may include an external hard drive, an external SSD, and/or any other device including memory. As an option, a wired connection between the tablet computer and a display, keyboard, storage device, and/or intermediary device/interface may be considered proximate, independent of the spatial relationship between the two devices.

In still another embodiment, the determination of the manner of use may be based on a detection of a presence of a sleeve for receiving the tablet computer, the sleeve including a top surface that simulates a tactile feel of a physical-button equipped keyboard while allowing touchscreen interaction with at least a portion of a backlit touchscreen display of the tablet computer.

The detection of the presence of another device or structure for the purpose of determining the manner of tablet computer use may be accomplished in a number of ways. In one embodiment, the tablet computer may detect the presence of a particular device or mount by receiving a signal (e.g. RFID, NFC, WiFi, ZigBee, Bluetooth, etc.) transmitted by the external device. In another embodiment, the tablet computer may detect the presence of a mount by sensing the magnetic field associated with one or more magnets embedded in the mount.

In another embodiment, determining whether a tablet computer is being utilized in a desktop manner or a tablet computer manner may be based upon user input (e.g. hardware switch, GUI input, etc.). In another embodiment, the determination may be made based upon whether the tablet computer has remained motionless for a predefined period of time. In yet another embodiment, the determination may be made based upon whether the tablet computer has remained in a predefined orientation for a predefined period of time. As an option, the predefined orientation may be associated with the use of a mobile stand (e.g. multipurpose cover, folding travel stand, etc.).

If it is determined that the tablet computer is being utilized in a desktop computer manner, the tablet computer is operated in the desktop computer mode. See operation 2504.

In the context of the present description, a computer mode refers to a collection of tablet computer properties or lack thereof associated with a particular use scenario. For example, in various embodiments, the tablet computer properties may include, but are not limited to, user preferences, input options, output options, power conservation policies, processing capacity, access permissions, and/or any other type of setting that may be attributable to a tablet computer. Switching between modes may be done automatically (e.g. environmental, spatial, temporal, and/or situational triggers, etc.) or manually (e.g. triggered by user input, etc.). In this way, the tablet computer properties can be tailored to specific use environments and situations, maximizing the functionality of the device.

In the context of the present description, a desktop computer mode refers to a collection of tablet computer properties associated with operating the tablet computer in a desktop setting. A desktop computer mode may include using the tablet computer as an input device. For example, in one embodiment, the tablet computer may be utilized as a keyboard in the desktop computer mode for receiving input adapted for being processed by the tablet computer to produce output for display utilizing a display device. In another embodiment, the tablet computer may be utilized as a keyboard in conjunction with a sleeve, the sleeve including a top surface that simulates a tactile feel of a physical-button equipped keyboard while allowing touchscreen interaction with at least a portion of a backlit touchscreen display of the tablet computer.

Further, a desktop computer mode may include operating the tablet computer as a display. For example, in one embodiment, the tablet computer may be utilized as a display in the desktop computer mode for displaying output (e.g. text, graphics, etc.) produced by processing input received utilizing an input device (e.g. keyboard, mouse, etc.) separate from the tablet computer. In another embodiment, the input device may include a smart phone. In one embodiment, the tablet computer may be capable of operating in a landscape mode when positioned on a display mount (e.g. wall mounted tablet holder, desktop tablet holder, desktop mounted tablet holder, etc.) in a horizontal orientation, in the desktop computer mode. In another embodiment, the tablet computer may be capable of operating in a portrait mode when positioned on a display mount in a vertical orientation, in the desktop computer mode. In still another embodiment, the tablet computer may be capable of operating in a dual display mode (e.g. two displays operating as a single display, etc.) when positioned on a display mount next to another tablet computer, in the desktop computer mode.

In still another embodiment, initiation of operation of the tablet computer in desktop computer mode may automatically prompt automatic powering up and/or removal of a standby status of peripherals including, but not limited to a monitor, printer, etc. Conversely, termination of operation of the tablet computer in desktop computer mode may automatically prompt automatic powering down and/or initiation of a standby status of peripherals including, but not limited to a monitor, printer, etc. Still yet, any resources (e.g. on-line application, hard drive, etc.) that requires a log-in may be automatically logged in or out based on the initiation or termination of the operation of the tablet computer in desktop computer mode. This may, in one embodiment, all be accomplished by a control signal being sent from the tablet computer to the corresponding peripheral/resource.

As an option, a desktop computer mode may be altered or chosen based on a tablet computer's ability to differentiate between a plurality of mounts. In one embodiment, at least one aspect of the tablet computer may be altered based upon a determination of which of a plurality of different display mounts the tablet computer is operating with, in the desktop computer mode. The at least one aspect altered may include, but is not limited to, access to at least one resource (e.g. printer, server, display, keyboard, storage, etc.), display brightness, sound volume, input method, etc. In another embodiment, the at least one aspect may include disabling at least one capability of the tablet computer.

Optionally, a desktop computer mode may provide access to resources not available when the tablet computer is operated in a tablet computer mode. In one embodiment, access to different resources of at least one server may be conditionally provided based on the whether the tablet computer is being utilized in the tablet computer manner or the desktop computer manner. For example, streaming movies over a network while utilizing the tablet computer in a tablet computer manner may only provide a stereo audio track, while streaming a movie in a desktop computer manner may provide a surround sound audio track.

As an option, a desktop computer mode may disable aspects of the tablet computer. In one embodiment, a plurality of different capabilities may be conditionally disabled based on the whether the tablet computer is being operated in the desktop computer mode. In another embodiment, the capabilities may involve use of a physical start button. For example, the capabilities may include a required use of a physical start button to prompt the tablet computer from a sleep mode. In this case, the tablet computer may be prompted from a sleep mode by another method (e.g. gesture, sound, wireless signal, etc.).

In another embodiment where the tablet is used in a desktop computer mode in a role other than a keyboard, the disabled capabilities may involve the appearance of a virtual keyboard that is displayed on a touchscreen of the tablet computer for input purposes, when certain input fields, icons, etc. are selected (e.g. by touch gesture or otherwise, etc.). In such desktop computer mode embodiment, such virtual keyboard would not be necessary (and possibly problematically require screen real-estate) in view of the optional use of a keyboard in the desktop computer mode. To this end, such capability may be selectively disabled in the present desktop computer mode embodiment.

A desktop computer mode may allow the tablet computer to receive input through a number of different means. In various embodiments, the tablet computer includes a camera. A desktop computer mode may include utilizing the camera as a control input device. For example, in one embodiment, the camera may be utilized to detect control gestures without a user having to physically touch the tablet computer. In the context of the present description, control gestures refer to hand and/or finger motions using one or both hands, representing control commands to be executed by the tablet computer.

In other embodiments, motions may be detected, utilized, etc. for controlling the tablet computer, mobile device, etc. (or any other device, etc.), utilizing any one or more techniques described in U.S. Provisional Application Ser. No. 61/415,170, filed Nov. 18, 2010, which is incorporated herein by reference in its entirety for all purposes. Of course, any technique, embodiment, feature, etc. disclosed in U.S. Provisional Application Ser. No. 61/415,170, filed Nov. 18, 2010, may be incorporated with any one or more (or none) of the embodiments disclosed herein.

In various embodiments, the tablet computer may be used in conjunction with a smart phone, such that the smart phone operates as an input device. For example, in one embodiment, the smart phone may be utilized to detect control gestures for controlling the tablet computer, in the desktop computer mode. In another embodiment, the control gestures for controlling the tablet computer may be available only when the smart phone is working in connection with the tablet computer in the desktop computer mode. In yet another embodiment, the smart phone may provide a laser projected virtual keyboard. Additionally, in another embodiment, the smart phone may be utilized as a mouse, a trackpad, or any other physical input device.

In still another embodiment, the tablet computer may include a projector (e.g. LCD projector, DLP projector, laser diode projector, etc.), and the projector may be utilized to display a virtual keyboard that is capable of being used to receive input for the tablet computer, while in the desktop computer mode.

If it is determined that the tablet computer is being utilized in the tablet computer manner, the tablet computer is operated in the tablet computer mode. See operation 2506.

In the context of the present invention, a tablet computer mode refers to a collection of tablet computer properties associated with operating the tablet computer separate from a desktop setting. For example, in one embodiment, a tablet computer mode may reduce the processor speed to extend battery life.

More illustrative information will now be set forth regarding various optional architectures and features with which the foregoing techniques discussed in the context of any of the present or previous figure(s) may or may not be implemented, per the desires of the user. For instance, various optional examples and/or options associated with the determination of the manner of utilization in decision 2502, the operation of the tablet computer in a desktop computer mode of operation 2504, the operation of the tablet computer in a tablet computer mode of operation 2506, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 26:
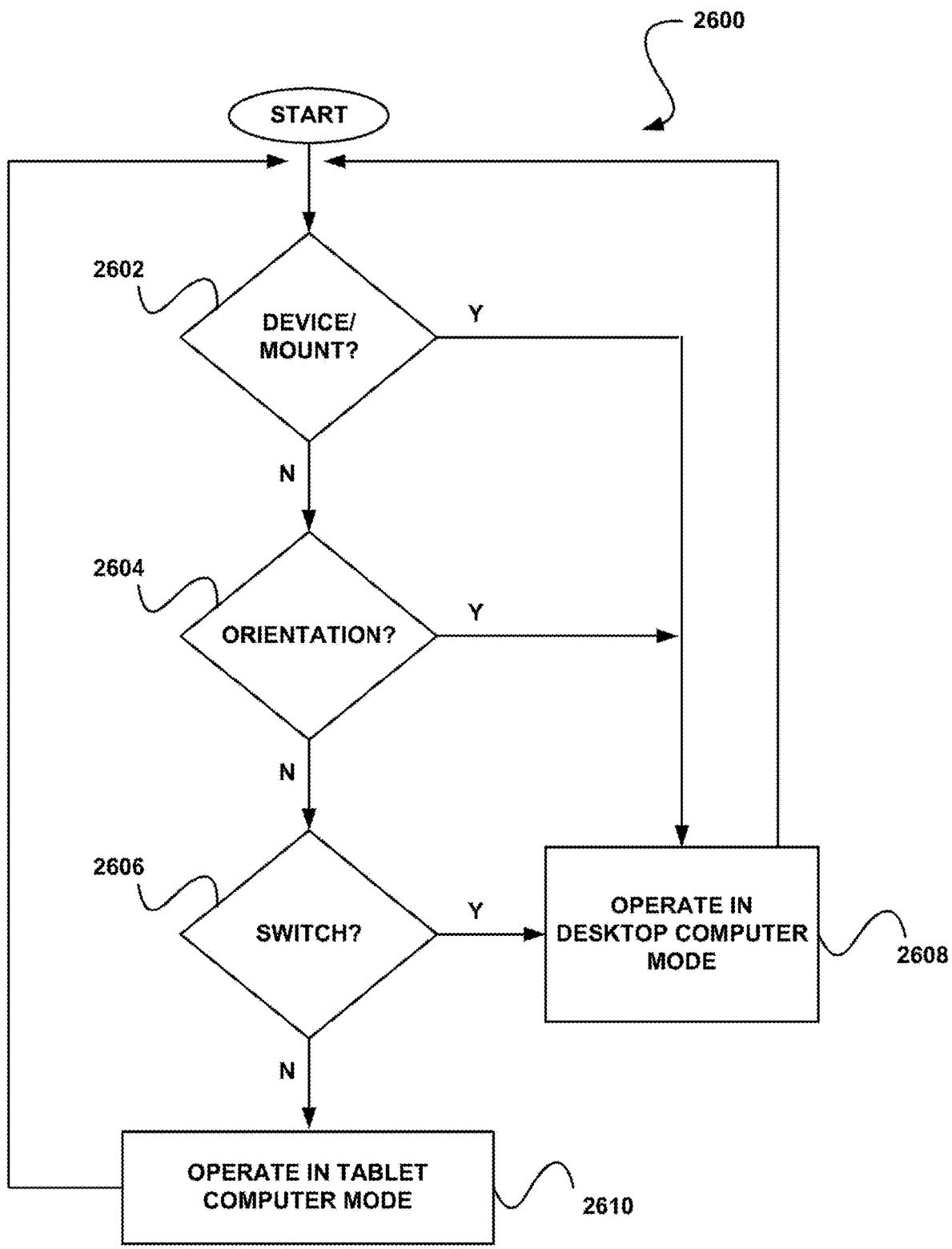
FIG. 26 shows a method for determining whether a tablet computer is being utilized in a desktop computer manner, in accordance with one embodiment.

FIG. 26 shows a method 2600 for determining whether a tablet computer is being utilized in a desktop computer manner. As an option, the method 2600 may be implemented in the context of the architecture and environment of the previous Figures or any subsequent Figure(s). Of course, however, the method 2600 may be carried out in any desired environment. It should also be noted that the aforementioned definitions may apply during the present description.

As shown, it is determined whether a tablet computer is being utilized in a desktop computer manner in connection with a known desktop peripheral device or known mount. See determination 2602.

In the context of the present description, a desktop peripheral device is a device external to the tablet computer that can be associated with desktop computer use. For example, in various embodiments, desktop peripheral devices may include, but are not limited to, display devices, input devices, magnetic storage devices, solid state storage devices, optical storage devices, audio devices, printers, game controllers, and/or any other device capable of interfacing with the tablet computer which a user wishes to associate with a desktop setting.

In various embodiments, a desktop peripheral device may be associated with an identifier, which may be detected by the tablet computer (e.g. wireless signal, passive RFID tag response, audio signal, etc.). In one embodiment, the identifier may explicitly describe the associated desktop peripheral device (e.g. device make and model, etc.). In another embodiment, the identifier may be random, such that it is impossible to determine the device type, make, and/or model of the desktop peripheral device using just the identifier. In yet another embodiment, the identifier may only describe the device type. In still another embodiment, all desktop peripheral devices of the same make and model may share the same identifier. In another embodiment, the identifier may be used to differentiate between two desktop peripheral devices of identical make and model.

In yet another embodiment, the identifier may be broadcast in such a way that it is difficult to detect through interior and/or exterior walls of a property (e.g. home, apartment, office, etc.). This may be accomplished by limiting signal strength, hiding the signal in a large number of false identifiers, using highly directional antennae, and/or any other method of hiding a signal. In this way, it would be difficult to determine what types of devices are located within a property or room.

In various embodiments, the tablet computer may also detect whether the desktop peripheral device is available for use with the tablet. Desktop peripheral devices may be able to transmit their identity and availability, even while in a sleep mode or turned off. As an option, the tablet computer may also be able to control the desktop peripheral device. For example, in one embodiment, a tablet computer, having detected the presence of a desktop peripheral device that is not available for use may instruct the desktop peripheral device to make itself available (e.g. change the video input on a television, change the audio input on a stereo, power up a monitor from sleep mode, turn on a printer, etc.).

In the context of the present description, a known desktop peripheral device is a desktop peripheral device that has previously been paired with the tablet computer. Further, in the context of the present description, pairing a desktop peripheral device with a tablet computer refers to the establishment of trigger parameters for that particular device. For example, in one embodiment, once a user has established trigger parameters for a particular display, that display may be able to cause the tablet computer to operate in a desktop computer mode without further user input. As an option, a user may specify that all peripheral desktop devices of the same type (e.g. all keyboards, all displays, etc.) share the same trigger parameters.

Additionally, in the context of the present description, trigger parameters define the specific conditions in which a particular device or object may cause a tablet computer to operate in a desktop computer mode. In various embodiments, trigger parameters may include, but are not limited to, threshold proximity, device availability, tablet computer power source, and/or a schedule. Additional trigger parameters may include a powering on and/or off of a peripheral such as a monitor, etc. As a further option, user input (e.g. user confirmation, password entry, authentication, etc.) may or may not be required in combination with any one or more of the above, in order to avoid an unwanted mode switch.

In the context of the present description, threshold proximity refers to the distance at which a known desktop peripheral device may trigger a desktop computer mode. The distance between a tablet computer and a desktop peripheral device may be determined in a number of ways, including, but not limited to, measuring the strength of an identifier or other signal associated with the desktop peripheral device, triangulating the relative position of a desktop peripheral device transmitting signals from multiple locations on the device, and/or any other method of measuring the distance between two points in space.

In one embodiment, the threshold proximity may be predefined by the device manufacturer. In another embodiment, the threshold proximity may be established by a user through a tablet computer GUI. As an option, a wired connection between the tablet computer and a desktop peripheral device may be considered within the proximity threshold, independent of the actual spatial relationship between the two devices.

In one embodiment, a user may define a set of trigger parameters for a particular desktop peripheral device to be used when the tablet computer is battery powered, and another set of trigger parameters to be used when the tablet is powered by an external source. For example, in one embodiment, proximity to a display device may trigger a desktop computer mode when the tablet computer is connected to a power source, but not when the tablet computer is operating using battery power.

In one embodiment, a user may define trigger parameters based on a schedule. For example, in one embodiment, a user may specify that a game controller may only trigger a desktop computer mode after a certain time of day, or on the weekend. In another embodiment, a user may specify that a tablet computer may only command a particular desktop peripheral device to make itself available late at night, when such an action is less likely to disrupt someone else's use of the peripheral (e.g. television, stereo, etc.).

Mounts may be classified as one of two types, active or passive. In the context of the present description, an active mount is a powered mount from which proximity to the tablet computer can be determined, similar to one embodiment of the desktop peripheral device. For example, in one embodiment, an active display mount may include a power cord to charge a tablet computer as well as power an optional transmitter that broadcasts an identifier associated with that mount. Active mounts may be treated as desktop peripheral devices. Any previous or subsequent discussion regarding features, functionality, capabilities, etc. of desktop peripheral devices may also apply to active mounts.

Additionally, in the context of the present description, a passive mount is a mount that does not actively transmit an identifier. In one embodiment, a passive mount may incorporate one or more magnets which interact with sensors in a tablet computer. The tablet computer may determine the type of mount it is in contact with by the location of the magnets. For example, in one embodiment, a magnet detected at the corner of the tablet computer may indicate a display mount, while a magnet detected in the middle of one side of the tablet computer may indicate a keyboard mount. In another embodiment, a passive mount may also incorporate a passive RFID tag to provide an identifier when energized by a signal produced by the tablet computer.

In various embodiments, trigger parameters for mounts may be based upon contact between the tablet computer and a mount. For example, in one embodiment, a user may define trigger parameters for a particular display mount such that the tablet computer may begin to operate in a desktop computer mode once contact with that display mount has been detected.

In various embodiments, contact between a tablet computer and a mount may be determined in a number of ways. For example, in one embodiment, contact between the tablet computer and a mount may be determined by the interaction between one or more magnets embedded in the mount and sensors in the tablet computer.

In another embodiment, contact between a tablet computer and an active mount may be defined as the smallest threshold proximity that can be discerned (e.g. maximum signal strength, minimum triangulated distance, etc.).

In yet another embodiment, contact between a mount and a tablet computer may be detected when the tablet begins to charge through an induction pad incorporated into the mount.

In still another embodiment, the determination whether the tablet computer is in contact with a mount may be based upon a device identifier or other signal received over a wired interface. In various embodiments, a mount may incorporate a cable interface which plugs into the tablet computer when it is placed in the mount. This cable interface may provide power to the tablet computer. This cable interface may also provide a wired connection to desktop peripherals with which a wireless connection may be too slow, impractical, or insecure.

If it is determined that a tablet computer is not being utilized in a desktop computer manner due to a known desktop peripheral device or mount, it is then determined whether the tablet computer is in a predetermined orientation associated with utilization in a desktop computer manner. See determination 2604. In various embodiments, the orientation of the tablet computer is determined using one or more internal accelerometers. Additionally, in various embodiments, the predetermined orientation may be the orientation assumed by the tablet computer when it is placed on a tablet stand, on a surface.

In one embodiment, the predetermined orientation may be the orientation associated with the use of a particular tablet stand. In another embodiment, the predetermined orientation may be selected by the user from a plurality of orientations associated with a plurality of known desktop stands. In yet another embodiment, the user may predefine the triggering orientation through a tablet computer GUI. In still another embodiment, a plurality of predetermined orientations may be associated with utilization in a desktop computer manner.

Further, in one embodiment, maintenance of the predetermined orientation may be required for a predetermined amount of time. In this way, accidental mode switches may be prevented. In another embodiment, a user can specify the predetermined amount of time. In still another embodiment, further determinations regarding the manner of utilization of the tablet computer are not delayed while waiting to determine if a predetermined orientation will be held for the predetermined amount of time.

If it is determined that the tablet computer is not in a predetermined orientation associated with utilization in a desktop computer manner, it is then determined whether the user has manually activated a desktop computer mode. See determination 2606. In one embodiment, the user may activate desktop computer mode by toggling a hardware switch. In another embodiment, the user may activate a desktop computer mode using a tablet computer GUI. In this way, the user can operate their tablet computer in desktop computer mode in a situation which might not satisfy the previous determinations, such as on a turbulent plane ride.

If the result of any of the determinations 2602 through 2606 were in the affirmative, the tablet computer is made to operate in a desktop computer mode. In one embodiment, the user may use a tablet computer GUI to specify that one or more of these determinations be skipped/avoided. As a specific example, a user may manually disable efforts to detect proximity to desktop peripheral devices or mounts. This may be done to reduce power consumption, or to avoid interference while on an airplane.

If the result of any of the determinations 2602 through 2606 were in the affirmative, the tablet computer is made to operate in a desktop computer mode. See operation 2608. In one embodiment, there is a single predefined desktop computer mode which may be activated by the affirmative determination. In another embodiment, one of a plurality of predefined desktop computer modes is activated. As an option, a user may define the one or more desktop computer modes (e.g. home, work, etc.).

Once the tablet computer is operating in a desktop computer mode, it is again determined whether the tablet computer is still being utilized in a desktop computer manner, by continuing to make determinations 2602 through 2606 as needed. In one embodiment, it may be determined whether the tablet computer is being used in a desktop computer manner associated with a different desktop computer mode.

If the result of determinations 2602 through 2606 were each negative, then the tablet computer is being utilized in a tablet computer manner, and is made to operate in a tablet computer mode. See operation 2610. Once the tablet computer is operating in a tablet computer mode, it is again determined whether the tablet computer is being utilized in a desktop computer manner, by again making determinations 2602 through 2606 as needed.

It should be noted that, while multiple determinations 2602 through 2606 are disclosed, it is conceived that that only a subset of such determinations (e.g. a single one) or even a different type of determination(s) is utilized for similar purposes. Further, the decision to revert to tablet computer mode may take the form of the reverse of the determinations 2602 through 2606 disclosed above. For example, such reversion may take place after a dismount/disconnection, accelerometer-detected movement of the tablet off a mount or other predetermined position, etc.

In various embodiments, a tablet computer mode may be defined to extend battery life. In one embodiment, a tablet computer mode may increase the amount of time between emitting active RFID signals. In another embodiment, the screen brightness may be reduced. In yet another embodiment, the power devoted to detecting desktop peripheral devices may be reduced.

In one embodiment, a tablet computer mode may vary depending on the location of the tablet computer (e.g. using GPS signals, etc.). For example, a tablet computer may only determine whether desktop peripheral devices or mounts are present when the tablet computer is in one or more predefined locations, such as an office or home. In one embodiment, the tablet computer mode may depend on location and the location may be configurable. For example, in one embodiment, an application associated with the tablet computer may be utilize to select locations (e.g. based on an address, GPS coordinates, etc.) where the tablet computer mode is to be or is not to be activated. In one embodiment, the GUI associated with the application may be utilized to select one or more locations on a map indicating where the tablet computer mode is to be or is not to be activated.

In another embodiment, the tablet computer mode may depend on location and the location may be automatically configurable. For example, in one embodiment, a user may select to be in desktop computer mode or tablet computer mode in a certain area. The computer (or computer code associated therewith) may determine whether the particular mode has been selected on one or more other occasions in the same general area (e.g. based on a log file, etc.). If the particular mode has been selected on one or more other occasions in the same general area, the computer may determine to automatically activate the particular mode (e.g. desktop mode or tablet mode, etc.) in the future, when the computer is in the general location.

The location may be determined in a variety of ways. For example, in one embodiment, the location may be determined utilizing GPS coordinates associated with a current location of the computer. In one embodiment, the location may be determined based on a radius from the determined coordinates. In this way, when the computer is generally in the same location, the mode may be activated.

In another embodiment, the location may be based on an address. For example, if the computer is determined to be located at a particular address (e.g. or within a threshold distance, etc.), the mode may be activated. In another embodiment, signal strength of a known device (e.g. a wireless router, etc.) may be utilized to determine whether the mode should be activated.

For example, in one embodiment, the computer may be configured to detect signal strengths of one or more wireless routers in a particular location. Once the computer has detected the signal strengths, the computer may determine whether a desktop mode or table computer mode is more appropriate. In various embodiments, the determination may be made based on a current mode of the computer and/or based on user input (e.g. in one embodiment, a user may initially be prompted to select an appropriate mode, etc.). In one embodiment, a range of the signal strengths (e.g. a min, max, etc.) may be utilized to determine whether a desktop mode or table computer mode is more appropriate. Based on this determination, the computer may be configured such that the appropriate mode may be automatically selected in the future, when the computer is in the location.

In another embodiment, a tablet computer mode may vary depending on the speed in which the tablet computer is moving. For example, a user may define a tablet computer mode such that the tablet computer does not listen (or reduce a listening cycle) for desktop peripheral devices or mounts when it is determined that the tablet computer is moving faster than a person might move in a desktop setting. As an option, the sensors used to detect desktop peripheral devices and mounts may not be reactivated until the speed of the tablet computer has been below a predefined threshold for a predefined amount of time.

In one embodiment, the tablet computer mode may be activated whenever the computer detects a movement beyond a threshold distance. For example, in one embodiment, the computer may be configured to operate in a tablet computer mode whenever the computer is moving more than a distance that would indicate ordinary desktop movement (e.g. >0.5 cm, 1 cm, etc.).

In another embodiment, a camera associated with the computer may be utilized to determine in which mode the computer should operate. For example, in one embodiment, the camera may be utilized to detect a scene (e.g. a background scene, etc.). Based on the detected scene, the computer may automatically determine a mode in which to operate.

For example, in one embodiment, one or more image processing techniques may be utilized to determine whether a background in one or more captured images is static, thus indicating the computer is stationary. In this case, the determined mode may be the desktop mode. As another example, one or more image processing techniques may be utilized to determine whether a background in one or more captured images is a known background (e.g. of an office, etc.). In this case, the determined mode may be the mode associated with the known background.

As another example, one or more image processing techniques may be utilized to determine whether a background in one or more captured images is non-static. In this case, the determined mode may be a tablet mode. In another embodiment, a microphone associated with the computer may be utilized to determine in which mode the computer should operate.

For example, a microphone associated with the computer may detect ambient noise. Based on the detected ambient noise, the mode may be determined. For example, if the ambient noise is determined by the computer (or computer code associated therewith) to be ambient office noise (e.g. based on a lack of talking, based on printer noise, based on a frequency analysis of the ambient noise, etc.), it may be determined that a desktop mode is appropriate. On the other hand, if the ambient noise is determined by the computer (or computer code associated therewith) to be ambient outdoor noise (e.g. based on talking, based on vehicle traffic, based on a frequency analysis of the ambient noise, etc.), it may be determined that a tablet mode is appropriate. Of course, any number of techniques may be used to determine the appropriate mode for the computer.

Figure 27:
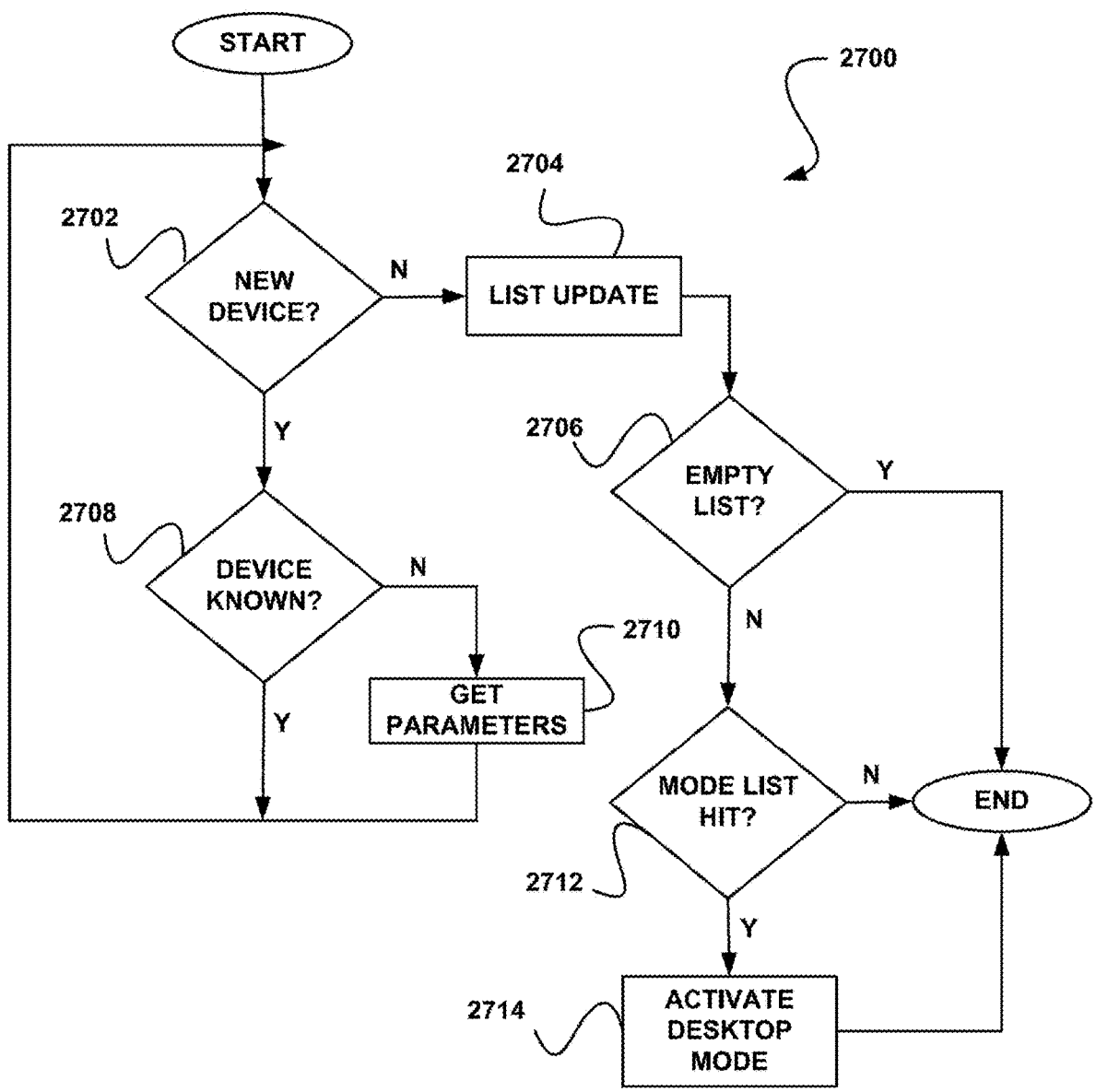
FIG. 27 shows a method for determining whether a tablet computer is being utilized in a desktop computer manner due to a desktop peripheral device or mount, in accordance with one embodiment.

FIG. 27 shows a method 2700 for determining whether a tablet computer is being utilized in a desktop computer manner due to a desktop peripheral device or mount, in accordance with one embodiment. As an option, the method 2700 may be implemented in the context of the architecture and environment of the previous Figures or any subsequent Figure(s). Of course, however, the method 2700 may be implemented in any desired environment. The aforementioned definitions may apply during the present description.

As shown, it is determined whether the tablet computer can sense a desktop peripheral device or mount which is not on the visible device list. See determination 2702. In the context of the present description, a visible device list refers to a list of all desktop peripheral devices and/or mounts which a tablet computer is able to detect at the present time. In one embodiment, the visible device list is maintained in the memory of the tablet computer. In another embodiment, if it is determined that the tablet computer can sense a desktop peripheral device or mount which is not on the visible device list, the device or mount is added to the visible device list.

In one embodiment, the detection of a plurality of desktop peripheral devices and/or mounts not on the visible device list may result in the plurality being added to the visible device list. In subsequent steps of method 2700, the plurality of devices and/or mounts are treated in parallel. In another embodiment, the detection of a plurality of devices and/or mounts is handled in a serial fashion, one desktop peripheral device or mount at a time.

If it is determined that the tablet computer cannot sense a desktop peripheral device or mount which is not on the visible device list, then the visible device list and the trigger device list are both updated. See operation 2704. In the context of the present description, the trigger device list is a subset of the visible device list containing all desktop peripheral devices and mounts whose trigger parameters are presently satisfied. Additionally, in the context of the present description, updating the visible device list refers to removing any desktop peripheral devices or mounts from the list which the tablet computer can no longer detect. Furthermore, in the context of the present description, updating the trigger device list refers to evaluating the trigger parameters for all devices on the visible device list, and amending the trigger device list accordingly.

As shown, it is determined whether the trigger device list is empty. See determination 2706. If the trigger device list is empty, the tablet computer is not configured for being utilized in a desktop computer manner due to a desktop peripheral device or mount. In one embodiment, it may also be determined if the visible device list is empty. If the visible device list is empty, further determinations regarding proximity to or contact with desktop peripheral devices and mounts may be performed less frequently. In this way, battery power may be extended while the tablet computer is being used in a mobile setting, for example, yet still automatically detect and react to the presence of desktop peripheral devices and mounts. Once a single device or mount is detected, the determination may be performed more frequently to provide greater responsiveness, in accordance with one embodiment.

If it is determined in 2702 that the tablet computer can sense a desktop peripheral device or mount which is not on the visible device list, it is then determined if the newly visible device or mount is known. See determination 2708. In various embodiments, the tablet computer maintains a list of all known desktop peripheral devices and known mounts (i.e. devices and mounts for which trigger parameters have been established).

If it is determined that the newly visible desktop peripheral device or mount is not known, the trigger parameters for the unknown device or mount are established. See operation 2710. In one embodiment, the user may be prompted to define the trigger parameters for the newly discovered device or mount. In another embodiment, the user may only be prompted to define the trigger parameters if the tablet computer has been placed in a learning mode. More optional information on such learning mode will be set forth later in the context of different embodiments.

In yet another embodiment, the unknown desktop peripheral device or mount may be given a set of default trigger parameters, without prompting the user. The default trigger parameters may vary depending on the type of device or mount detected. As an option, the user may be able to predefine the default trigger parameters given to new devices and mounts. In another embodiment, the default trigger parameters are predefined.

If it is determined in 2706 that the trigger device list is not empty, it is then determined whether the tablet computer is operating in the most appropriate desktop computer mode. See determination 2712. In various embodiments, the tablet computer may operate in one of a plurality of desktop computer modes. In one embodiment, these modes are indexed in a desktop computer mode list, along with their associated mode conditions.

In the context of the present description, a mode condition is a condition that must be satisfied before the associated computer mode may be activated. Mode conditions may include, but are not limited to, the presence of a particular desktop peripheral device, contact with a certain type of mount, a certain time of day or day of the week, a geographic location, and/or any other environmental, spatial, temporal, or situational detail.

In various embodiments, the activation of a desktop computer mode may be conditional on the satisfaction of the trigger parameters of one or more desktop peripheral devices and/or mounts. For example, in one embodiment, a user may define a desktop computer mode which activates when an available display is within a certain threshold distance of the tablet computer (e.g. a couple feet, physically connected/mounted, etc.).

In various embodiments, the activation of a desktop computer mode may be conditional upon time. For example, in one embodiment, a desktop computer mode may be defined such that it may only be activated on Tuesdays, or between 9 am and 11 am. In another embodiment, a desktop computer mode may be defined which may only remain activated for a set amount of time per day, week, or month. As a specific example, a user may create a desktop computer mode which limits the amount of time the tablet computer may operate as a video game console within a given week. In yet another embodiment, a tablet computer GUI may report the amount of time the tablet computer has spent operating in various computer modes, as well as the time remaining on computer modes with temporal budgets.

In various embodiments, the activation of a desktop computer mode may be conditioned upon the geographic location of the tablet computer. For example, in one embodiment, a user may define a desktop computer mode which relies on the presence of a mouse, and a different desktop computer mode which relies on the same mouse, but at a different location, such as an office (e.g. as determined by a check-in procedure, GPS coordinates, etc.). In this way, desktop computer modes can be defined which depend on the presence and availability of desktop peripheral devices which are easily transported, such as mice, keyboards, and/or any other small desktop peripheral device. As another example, a user may define a desktop computer mode for home use, which commands all displays within range to make themselves available to the tablet computer, and a similar desktop computer mode for use at a relative's home, which prompts the user for confirmation before demanding availability.

In various embodiments, the activation of a desktop computer mode may be conditioned upon other environmental or situational details. For example, in one embodiment, a user may define a desktop computer mode to require access to a Wi-Fi network. In another embodiment, a user may define a desktop computer mode that will not activate if the tablet is only able to attain a cellular data connection. In yet another embodiment, a desktop computer mode may be defined such that it will only be available in low lighting conditions, such as the dim lights of a home theater setting.

In one embodiment, the determination of which desktop computer mode the tablet computer should operate in is performed by evaluating the mode conditions of each desktop computer mode in the desktop computer mode list until a desktop computer mode is found whose mode conditions are satisfied. As an option, the desktop computer mode list may be ordered by priority, such that the evaluation begins with the highest priority desktop computer mode and ends with the lowest priority. In one embodiment, the tablet computer user may specify the priority of the desktop computer modes.

As a specific example, a user might define a desktop computer mode which requires the proximity and availability of a game controller and a display; upon activation of this mode, the tablet computer display is deactivated to conserve VRAM, and a list of game applications is presented. The user might place this desktop computer mode at a higher priority than a mode that requires a display and a mouse, wherein the tablet is used as a keyboard. Such a prioritization would allow the user to initiate a gaming experience simply by activating a game controller (i.e. making it available), even if a keyboard was also present.

If it is determined that the tablet computer is not operating in the most appropriate desktop computer mode, the appropriate desktop computer mode is activated. See operation 2714. In various embodiments, the tablet computer may employ the method shown in FIG. 28

Figure 28:
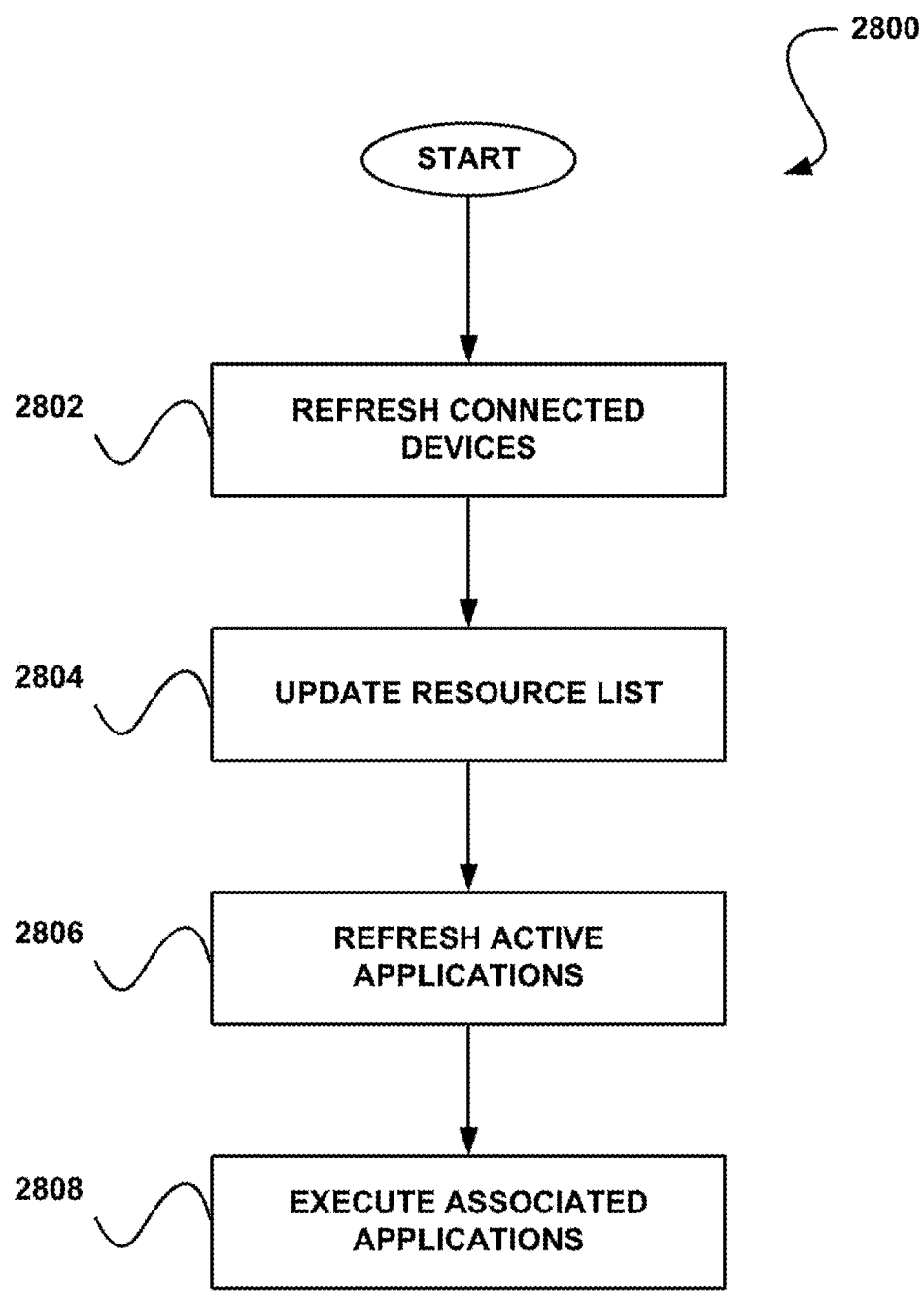
FIG. 28 shows a method for activating a desktop computer mode, in accordance with one embodiment.

FIG. 28 shows a method 2800 for activating a desktop computer mode, in accordance with one embodiment. As an option, the method 2800 may be implemented in the context of the architecture and environment of the previous Figures or any subsequent Figure(s). Of course, however, the method 2800 may be carried out in any desired environment. It should also be noted that the aforementioned definitions may apply during the present description.

As shown, desktop peripheral device connections are refreshed. See operation 2802. A tablet computer may be in a first desktop computer mode when the mode conditions of a second desktop computer mode of a higher priority are satisfied, according to one embodiment. If the tablet computer has a functional line of communication with one or more desktop peripheral devices as a result of operating in the first desktop computer mode, it may be necessary to disconnect one or more of those desktop peripheral devices before the second desktop computer mode may be fully activated. Additionally, the activation may include forming new connections to one or more additional desktop peripheral devices. In this way, possible conflicts caused by multiple devices filling a single role (e.g. keyboards, mice, etc.) may be avoided.

In the context of the present description, disconnecting a desktop peripheral device refers to the termination of functional, non-tangible connections between the desktop peripheral device and the tablet computer. Examples include, but are not limited to, unmounting a hard drive storage device, ending transmission of a video signal to an external display, and/or severing any other form of communication between a tablet computer and a desktop peripheral device.

In one embodiment, some or all desktop peripheral devices are disconnected before activating a different desktop computer mode. In another embodiment, only desktop peripheral devices which are of the same type (e.g. keyboard, mouse, etc.) as the desktop peripheral devices required by the activation are disconnected. In yet another embodiment, only the desktop peripheral devices which cannot be utilized simultaneously with those required by the activation are disconnected. For example, a first mouse may be replaced by a second mouse, but a first hard drive may be used at the same time as a second hard drive.

As shown, a tablet resource list is updated. See operation 2804. In various embodiments, the tablet computer maintains a record of resources available to applications (e.g. processors, graphics processors, memory, storage, displays, etc.). In one embodiment, the tablet computer may run applications which are multimodal. In the context of the present description, a multimodal application refers to an application which is able to take advantage of functionality and resources unique to different computer modes of a tablet computer. For example, a multimodal application executed while the tablet computer is operating in a tablet computer mode may utilize a simplified user interface with few on-screen options.

The same applications, when executed on the tablet computer while it is operating in a desktop computer mode involving an external display of higher resolution might show a user interface with more on-screen options, taking advantage of the increased screen real estate. Other user interface-related parameters that may be utilized (particularly in an embodiment where the tablet computer is not be used as a display in desktop mode) include, but are not limited to font size, icon size (e.g. application icon size, etc), etc. To this end, the user interface may be better suited to accommodate mouse-based selections as opposed to finger gestures. Of course, finger gestures may still be used in addition to mouse-based selections. Still other user interface-related parameters that may be utilized (particularly in an embodiment where the tablet computer is not be used as a display in desktop mode) include, but are not limited to an open application status bar that shows all applications that are open and possibly even different instances therein, etc. so as to allow more convenient switching of focus between multiple applications and/or instances thereof. To this end, a user may experience features that are associated with a desktop environment, in the appropriate mode.

Yet another example of a multimodal application is a voice-command personal assistant application. Such application may serve additional purposes in desktop mode. For example, a number of available commands may be increased when in the desktop mode, where such additional commands may allow voice-command of the various peripherals, applications, resources etc. that are only available via desktop mode. Further, while such additional desktop mode-related voice commands may be received during use of the tablet mode, they may be saved or otherwise queued for execution when the tablet computer enters a desktop mode in which the peripherals, applications, resources etc. are available to accommodate the desktop mode-related voice command(s) received earlier in the tablet mode. Just by way of example, a user may say "archive picture to external hard drive," "print document at work," "display dinner reminder on home display," etc. and such commands may be executed after and upon the tablet computer being triggered into the appropriate (e.g. home, work, etc.) desktop mode.

Other examples of multimodal applications may include, but are not limited to, game applications which adapt to available graphics processing power and memory, and drawing applications which adapt to available input devices.

Furthermore, active applications are refreshed. See operation 2806. Transitioning into a desktop computer mode may provide access to resources which were unavailable when an application was first executed. In the context of the present description, refreshing an active application refers to instructing the active application to reevaluate one or more code segments used to initialize aspects of the application which might be affected by the change in resources.

Refreshing the active applications allows the user to immediately take advantage of new resources associated with the new computer mode, and minimizes the disruption to the user experience when resources are removed. For example, in one embodiment, as part of a transition which results in a tablet computer acting as an application specific input device not present in the previous computer mode, a word processor application may restart its GUI, moving tool bars and statistics reporting from an external display to the tablet display. In another embodiment, a transition triggered by the removal of an external GPU may cause a game to reinitialize the rendering system, allowing the game to continue with lower processing requirements (e.g. reduced resolution, simple models, smaller textures, etc.).

In one embodiment, activating a desktop computer mode may refresh all aspects of active applications which may possibly be affected by a computer mode transition (i.e. user interface, sound, resolution, input options, etc.). In another embodiment, the active application refresh associated with the activation of a desktop computer mode only involves the application code segments that are actually affected. For example, a transition between desktop computer modes which does not change display or input functionality may not cause a reevaluation of active application code segments related to the user interface.

In one embodiment, the tablet user may be prompted by an active application to choose whether to take advantage of one or more resources made available in a new desktop computer mode. In another embodiment, the refresh of active applications is performed without user input. In still another embodiment, a user may define a desktop computer mode such that specific applications will not be refreshed when that desktop mode is activated.

As shown, associated applications are executed. See operation 2808. A user may define a desktop computer mode such that one or more applications are automatically executed when that desktop computer mode is activated. In one embodiment, a user may also define a desktop computer mode such that all active applications are terminated upon mode activation.

A desktop computer mode may be associated with user applications and/or system applications. In the context of the present description, a user application is an application which provides a specific functionality to the user, which they may execute at will. In some embodiments, multiple user applications of the same type may be executed at the same time. Additionally, in the context of the present description, a system application is part of the tablet computer operating system which serves as a foundation for the user's interaction with the tablet computer. For example, in one embodiment, a system application may allow the user to see the user interfaces of two active user applications at the same time, in the same display. In another embodiment, a system application may only allow the user to see the user interface of a single user application at any given time. In some embodiments, multiple system applications of certain types may not be executed at the same time. Examples of system applications include, but are not limited to, window managers, task managers, file system managers, file browsers, application launchers, and/or any other element of the tablet computer operating system which affects the way a user interacts with the tablet computer.

The execution of associated applications upon activation of a desktop computer mode may include the termination and/or execution of one or more system applications. For example, in one embodiment, a transition from a tablet computer mode to a desktop computer mode may require the termination of a first system application which only allows a user to view the interface of a single active user application at one time, and the execution of a second system application which allows the user interfaces of multiple active user applications to be displayed at the same time. In another embodiment, a transition from a first desktop computer mode to a second desktop computer mode may require the termination of a system application which serves as a file system browser, and the execution of a system application which serves as an application launcher. In this way, computer modes may be defined to tailor the user experience to the intended application and available forms of interaction. For example, a streamlined and focused interface for a tablet computer mode, a dynamic multitasking interface for a desktop computer mode associate with productivity, and a simplified application launcher for a desktop computer mode associated with entertainment.

In one embodiment, the user is able to specify which system applications are associated with a desktop computer mode. In another embodiment, associated system applications are determined by whether a computer mode is associated with a tablet manner of utilization or a desktop manner of utilization.

In one embodiment, a particular user application may be prevented from running when the tablet computer is operating in a particular desktop computer mode. In another embodiment, a particular user application may only be executed when the tablet computer is operating in a particular desktop computer mode.

In still another embodiment, a desktop computer mode may be associated with a plurality of user applications, which are presented for the user to choose from once the desktop computer mode is activated. For example, a desktop computer mode which requires the presence of an HDTV and a surround sound system, and is intended for home entertainment use, might present the user with a limited selection of predefined, appropriate applications such as a video rental portal, links to streaming video sites, and/or a home media management application.

Depending on how the desktop computer modes are defined, transitioning a tablet computer from a first computer mode to a second computer mode may be disruptive to the user experience. In various embodiments, a user may define how disruptions caused by computer mode transitions are handled. Examples of possible disruptions include, but are not limited to, terminating applications, changing display devices, accidental computer mode changes, and/or any other event or action which may disrupt the user experience.

If a second computer mode is associated with the execution of a particular application, a transition between a first and the second computer modes may require the termination of active applications to free resources which will be required. In one embodiment, the user may be prompted whether they wish to save their work before their application is terminated. In another embodiment, the associated application is not executed. As an option, the user is informed that the application was not executed due to limited resources.

In another embodiment, the entire contents of the tablet computer RAM memory associated with the application marked for termination may be stored before terminating the application in preparation to transition to a different computer mode. The terminated application, including open documents, may be restored when the tablet computer returns to the first computer mode. As an option, the stored application session may be restored at the request of the user, independent of the computer mode, so long as the necessary resources are available. In another embodiment, the user may be prompted with the option to restore from one or more saved sessions when transitioning into a computer mode where sessions had been saved previously. In still another embodiment, the user may specify preferences regarding how many sessions may be stored, whether they are automatically deleted after remaining dormant for a predetermined period of time, and/or whether they are automatically restored the next time the associated computer mode is activated.

If the second computer mode is associated with a display or plurality of displays of different resolution than the one or more displays associated with the first computer mode, a transition between the first and second computer modes may require a rearrangement of the active elements of the GUI (windows, icons, menus, etc.). In one embodiment, windows may be scaled to the same size, relative to the display device, upon transitioning between desktop computer modes. In another embodiment, windows may retain their original pixel location and size upon transitioning between computer modes. In yet another embodiment, the tablet computer may employ a resolution independent GUI, which scales with display size. In various embodiments, the user may be able to define preferences as to how scaling occurs upon transition between computer modes.

It is possible that the activation of a computer mode may be unwanted. In one embodiment, the user may be able to specify, for a particular computer mode, whether it can be activated automatically or if the user will be prompted for confirmation before activation can take place. In another embodiment, a user may define criteria wherein a mode may activate automatically when the criteria are satisfied, but will otherwise ask for confirmation before activation. The criteria may include, but are not limited to, time of day, day of the week, geographic location, etc.

Figure 29:
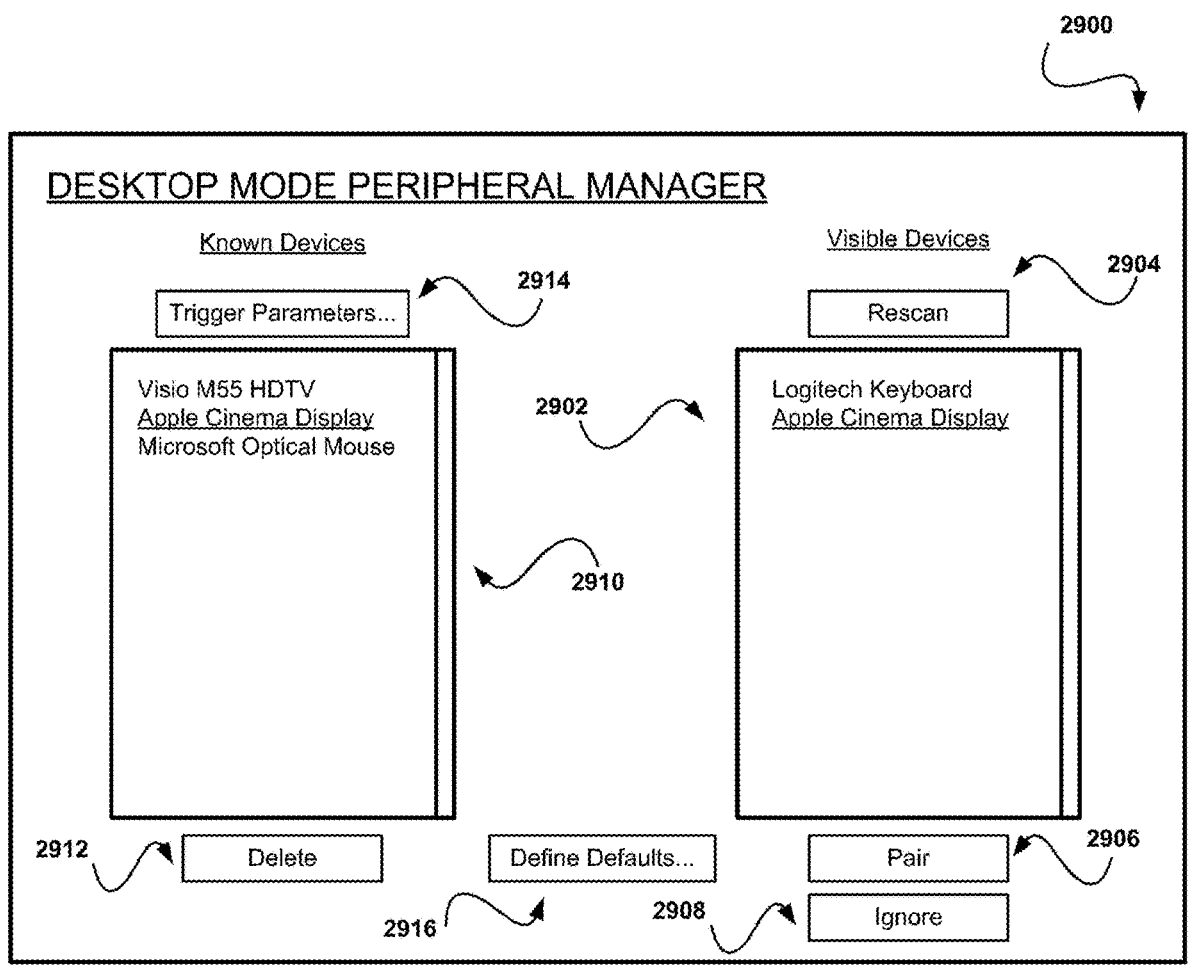
FIG. 29 shows a user interface for managing desktop peripheral devices and mounts, in accordance with one embodiment.

FIG. 29 shows a user interface 2900 for managing desktop peripheral devices and mounts, in accordance with one embodiment. As an option, the user interface 2900 may be implemented in the context of the architecture and environment of the previous Figures or any subsequent Figure(s). Of course, however, the user interface 2900 may be implemented in any desired environment. The aforementioned definitions may apply during the present description.

As shown, the user interface 2900 may be utilized to create, configure, and delete relationships between the tablet computer and desktop peripheral devices and mounts. In one embodiment, the user interface may include a list 2902 which lists all desktop peripheral devices and mounts which are currently visible to the tablet computer. In the context of the present description, being visible to the tablet computer refers to being susceptible to detection by the tablet computer, whether by sensing a wireless signal, detecting a wired connection, sensing a magnetic field, and/or any other method of detecting the presence of a device. In one embodiment, list 2902 is the visible device list previously discussed. As an option, list 2902 may be continuously updated as scans are automatically performed.

In various embodiments, known desktop peripheral devices and known mounts in list 2902 may be highlighted, to indicate that trigger parameters have already been defined for those devices. In one embodiment, list 2902 is sorted by order of device discovery. In another embodiment, list 2902 is divided between known and unknown entities.

As shown, in one embodiment, the user interface 2900 may include a button 2904 to manually initiate a scan for visible devices and mounts. In some embodiments, button 2904 makes use of the method shown in FIG. 27. In one embodiment, button 2904 may initiate a scan, even if continuous scans have been disabled. In another embodiment, a user may interact with button 2904 only when continuous scanning has been disabled.

In some embodiments, it may be possible for a user to instruct a tablet computer to temporarily or permanently ignore a known or unknown device or mount. In one embodiment, an ignored device cannot activate a computer mode, but may still be utilized by the tablet computer in whatever the present computer mode may be. In another embodiment, manually initiating a scan for visible devices may make some or all previously ignored desktop peripheral devices and mounts visible once again. In yet another embodiment, the restoration of visibility to ignored devices and mounts through a manually initiated scan is limited to those which were only being ignored for a specified period of time.

In various embodiments, a scan for desktop peripheral devices may be initiated by a user through interacting with a hardware button and/or a software button in a user interface other than 2900. In one embodiment, the user interface 2900 may be presented to a user in response to the user initiating a scan for unknown desktop peripheral devices, and the scan detecting one or more unknown desktop peripheral devices.

As shown, in one embodiment, the user interface 2900 may include a button 2906 to pair a device or mount selected in list 2902 with the tablet computer. In one embodiment, a user may interact with button 2906 only if the device or mount selected is not a known device or mount. In various embodiments, operating the button 2906 may display the user interface shown in FIG. 30, allowing a user to specify trigger parameters for the selected device or mount.

As shown, in one embodiment, the user interface 2900 may include a button 2908 to ignore a device or mount selected in list 2902. In one embodiment, selecting button 2908 presents the user with a user interface offering the option to ignore the selection for a certain period of time, or permanently. As an option, the user may rename the device (i.e. "neighbor's TV", etc.). In another embodiment, the user may also be presented with a list of devices and mounts currently being ignored, with the option of removing one or more devices and mounts from the list.

In one embodiment, the user interface 2900 may include a list 2910 of all known desktop peripheral devices and mounts. In another embodiment, currently visible, known desktop peripheral devices and mounts in list 2910 may be highlighted.

Further, in one embodiment, the user interface 2900 may include button 2912 to delete the trigger parameters of a known desktop peripheral device or mount selected in list 2910, removing it from the list. Additionally, in one embodiment, the user interface 2900 may include button 2914 to modify the trigger parameters of a known desktop peripheral device or mount selected in list 2910, where operating the button 2914 may display the user interface shown in FIG. 30.

As shown, in one embodiment, the user interface 2900 may include button 2916 to allow the user to define default trigger parameters for one or more types of desktop peripheral devices or mounts. In one embodiment, a user may select a known desktop peripheral device or mount to provide the default trigger parameters for devices or mounts of that type (e.g. displays, keyboards, wall mounts, etc.). In another embodiment, a user may create a default set of trigger parameters for use with a particular type of device or mount which is not tied to the trigger parameters of a known device or mount.

In still another embodiment, a user may be informed whether defaults have been established for subsets of one or more device or mount types. In another embodiment, the user may be given the option of overriding previously established default trigger parameters for device type subsets.

In one embodiment, the user interface 2900 or the like may be presented to a user in response to a tablet computer interacting with a desktop peripheral device for the first time. In another embodiment, the user interface 2900 or the like may be presented to a user in response to a user request.

In one embodiment, once the user initiates a pairing with a selected unknown desktop peripheral device or mount, or initiates the modification of the trigger parameters of a selected known desktop peripheral device or mount, the user may be presented with a plurality of options associated with the trigger parameters of the selected device or mount. In one embodiment, the user may be presented with the options associated with the trigger parameters of the selected desktop peripheral device via a user interface. For example, FIG. 30 shows a user interface that may be utilized to define or modify trigger parameters for a desktop peripheral device.

It should be noted that the term "button" may include/refer any input mechanism (e.g. indicia for selection via a touchscreen, etc.), etc.

Figure 30:
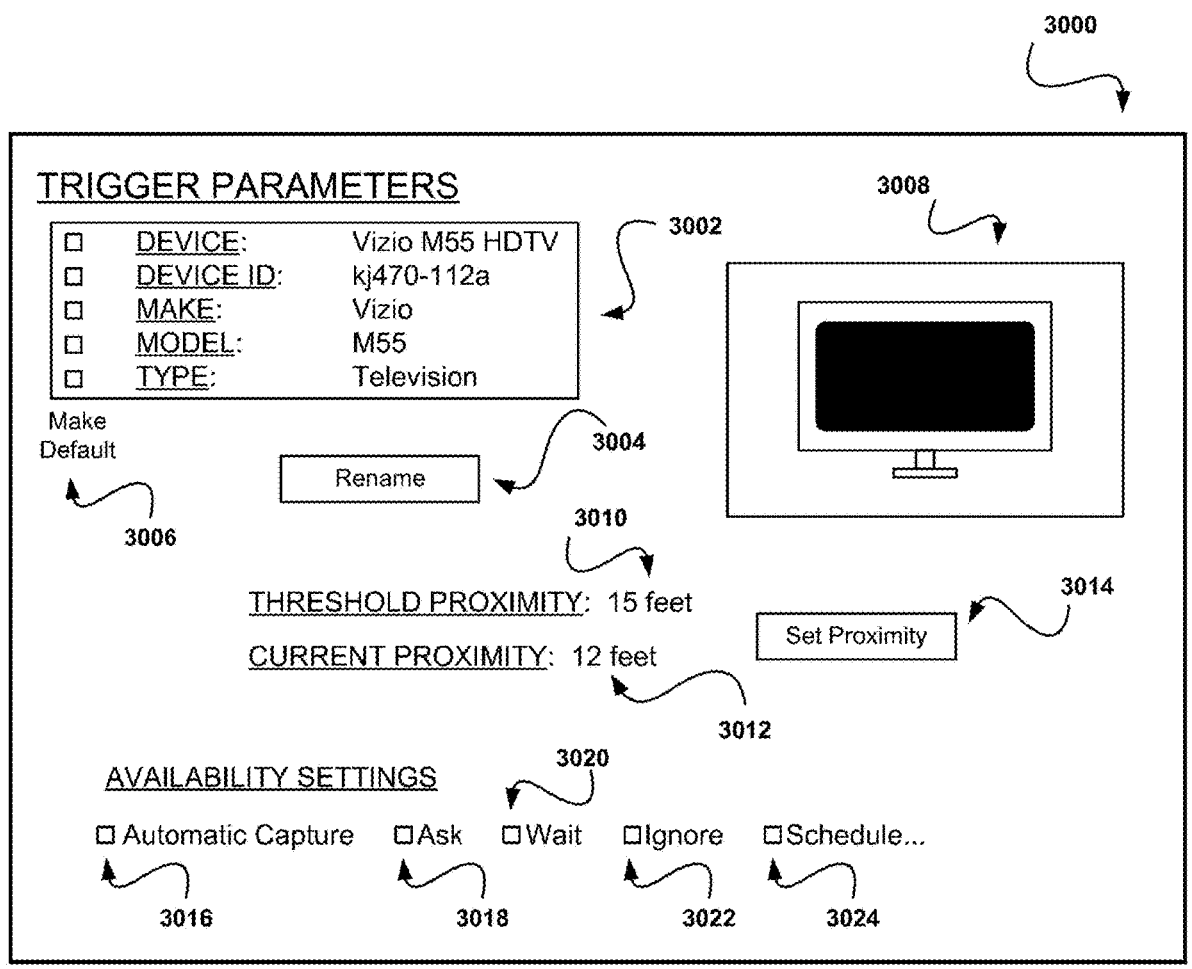
FIG. 30 shows a user interface for defining trigger parameters associated with a desktop peripheral device or mount, in accordance with one embodiment.

FIG. 30 shows a user interface 3000 for defining trigger parameters associated with a desktop peripheral device or mount, in accordance with one embodiment. As an option, the user interface 3000 may be implemented in the context of the architecture and environment of the previous Figures or any subsequent Figure(s). Of course, however, the user interface 3000 may be implemented in any desired environment. The aforementioned definitions may apply during the present description.

As shown, the user interface 3000 may be utilized to define trigger parameters for a desktop peripheral device or mount. In one embodiment, the user interface 3000 may be presented to the user when the tablet computer detects an unknown desktop peripheral device or mount. In another embodiment, the user interface may be presented to the user only in response to a user request.

In various embodiments, the user interface may include one or more text fields 3002 which describe a desktop peripheral device or mount. In one embodiment, the text fields may include, but are not limited to, a device name, a unique device identifier, a device make, a device model, a device type, and/or any other information describing a device.

In various embodiments, the user interface 3000 may include a button 3004 to redefine the device name associated with the trigger parameters. As an option, the default device name may include the make, model, and type of device. In this way, a user may more easily distinguish between multiple devices of the same type by specifying more descriptive names (e.g. "work monitor", "home monitor", etc.).

As shown, the user interface 3000 may include a collection of check boxes 3006, one for each of the descriptive text fields 3002, which allow the user to establish the present set of trigger parameters as defaults for a subset of possible desktop peripheral devices and mounts. For example, selecting the check box next to the device model may establish the present set of trigger parameters as the default for all devices of that model. In one embodiment, a user may, using checkboxes 3006, establish the present set of trigger parameters as the default for all other devices of the same type, make, model, and/or device name. In another embodiment, if the selection of one or more of the check boxes 3006 conflicts with a preexisting default, the user may be presented with a warning indicating the current default, and asking for confirmation before establishing a new default.

The user interface 3000 may include a graphical depiction 3008 of the device or mount associated with the present set of trigger parameters, according to one embodiment. In another embodiment, the graphical depiction may be provided by the user. In yet another embodiment, the graphical depiction may be automatically downloaded from a server. In still another embodiment, the graphical depiction may display an iconic representation of the type of device associated with the present set of trigger parameters.

As shown, the user interface 3000 may include a text field 3010 displaying the threshold proximity established as a trigger parameter for the present device or mount. Additionally, in one embodiment, the user interface may also include a text field 3012 displaying the current distance between the tablet computer and the present device or mount. In one embodiment the proximities may be displayed with units of distance (e.g. feet, meters, etc.). In another embodiment, the proximities may be displayed as signal strengths. In still another embodiment, the current distance displayed in 3012 may be reported as a percentage of the threshold proximity. In yet another embodiment, the proximities may be displayed using a unitless metric.

In various embodiments, the user interface may include a button 3014 to define the threshold proximity. In one embodiment, button 3014 may prompt the user to input a new proximity threshold. In another embodiment, button 3014 may define the current distance 3012 as the new threshold proximity.

Another trigger parameter is the availability of the present device or mount. The user interface may include one or more check boxes to allow the user to define the availability trigger parameter(s) which must be met before the present device may activate a computer mode. In various embodiments, only one button may be selected.

In one embodiment, the user interface 3000 may include a check box 3016 to indicate that availability of the present device is not to be taken into consideration as a trigger parameter, and that if all trigger parameters have been satisfied for the device, the device should be commanded to make itself available, if necessary. In one embodiment, check box 3016 may only be selectable if the present device is capable of reporting its availability to a tablet computer, and is capable of making itself available upon receipt of a command from a tablet computer.

In another embodiment, the user interface 3000 may include a check box 3018 to indicate that availability of the present device is to be treated as a trigger parameter, and that the present device will not be commanded to make itself available without user confirmation. For example, in one embodiment, once all other trigger parameters have been satisfied, and the device is not currently available, the user may be presented with a user interface asking for confirmation before ordering the device to make itself available. As an option, check box 3018 may only be selectable if the present device is capable of reporting its availability to a tablet computer, and is capable of making itself available upon receipt of a command from a tablet computer.

In another embodiment, the user interface 3000 may include a check box 3020 to indicate that availability of the present device is to be treated as a trigger parameter, but the device should not be instructed to make itself available. As an option, check box 3020 may only be selectable if the present device is capable of reporting its availability to a tablet computer.

In still another embodiment, the user interface 3000 may include a check box 3022 to indicate that the availability of the present device is not to be treated as a trigger parameter. In one embodiment, this may be the default availability constraint for all devices and mounts which are not able to report their availability.

In another embodiment, the user interface 3000 may include a check box 3024 to indicate that the role of availability of the present device may change over time. In one embodiment, check box 3024 may cause a user interface to be presented, where a user can specify the times of day and days of the week associated with various availability requirements of the present device. For example, a user may specify that a tablet computer can only command the present device to make itself available on weekends, and must wait for the device to become available on weekdays.

Figure 31:
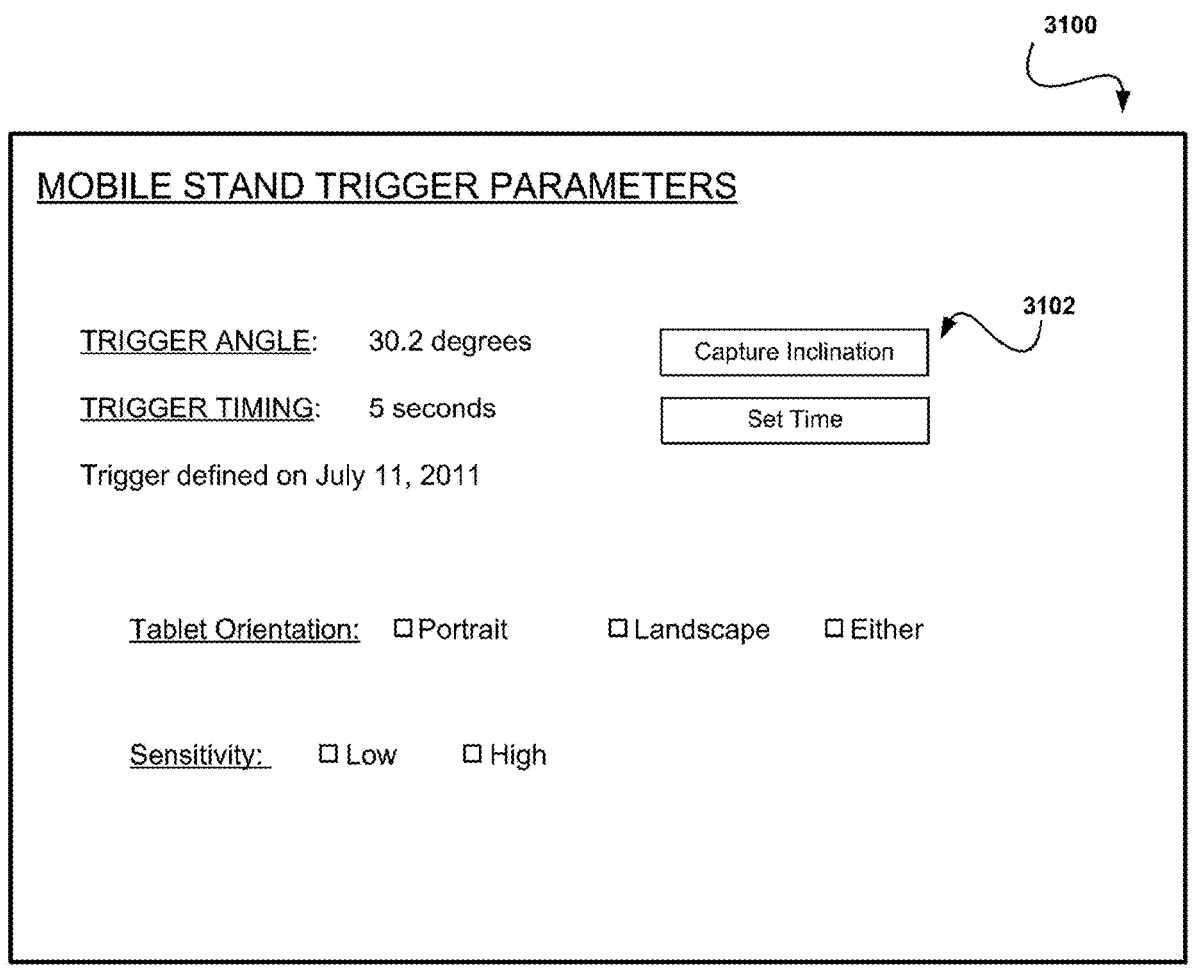
FIG. 31 shows a user interface for defining trigger parameters associated with the use of a mobile stand, in accordance with one embodiment.

FIG. 31 shows a user interface 3100 for defining trigger parameters associated with the use of a mobile stand, in accordance with one embodiment. As an option, the user interface 3100 may be implemented in the context of the architecture and environment of the previous Figures or any subsequent Figure(s). Of course, however, the user interface 3100 may be implemented in any desired environment. The aforementioned definitions may apply during the present description.

As shown, the user interface 3100 may be presented to a user to define trigger parameters associated with the use of a mobile stand. The trigger parameters associated with the use of a mobile stand may include, but are not limited to, a trigger angle, a trigger delay, allowed orientation, sensitivity, and/or any other type of trigger parameter.

In one embodiment, the user interface 3100 may display a trigger angle which may activate a desktop computer mode if the tablet computer is held at that particular angle. In another embodiment, the user interface may also display a trigger delay, which is the amount of time that the tablet computer must remain at the trigger angle before a desktop computer mode may be activated.

As shown, user interface 3100 may be utilized to determine the current inclination of the tablet computer, and define a new trigger angle. For example, in one embodiment, the user interface may include button 3102 to capture the present inclination of the tablet computer. In another embodiment, button 3102 may cause a user interface to be presented to the user, informing them the inclination of the tablet computer was about to be captured. In still another embodiment, the user may be given a countdown before the inclination of the tablet computer is captured. In yet another embodiment, the user interface 3100 may also include functionality that allows a user to define a trigger delay.

The user interface 3100 may include various functionality for the definition of additional trigger parameters associated with the use of a mobile stand. For example, in one embodiment, the user interface may allow a user to specify whether the trigger parameters require the tablet computer to be in a portrait orientation, a landscape orientation, or either. In another embodiment, the user interface may allow a user to specify the tolerance for the trigger angle. This allows the user to balance between sensitivity to unintended movement of the tablet computer and responsiveness when transitioning to another computer mode not based on the inclination of the tablet computer.

In still another embodiment where the tablet computer includes an e-ink display on a back face thereof (see disclosures thereof hereinabove, for example), a trigger for a first desktop mode may be a detection of the e-ink display being positioned in a forward facing orientation. Further, a trigger for a second desktop mode may be a detection of the backlit display being positioned in a forward facing orientation.

Figure 32A:
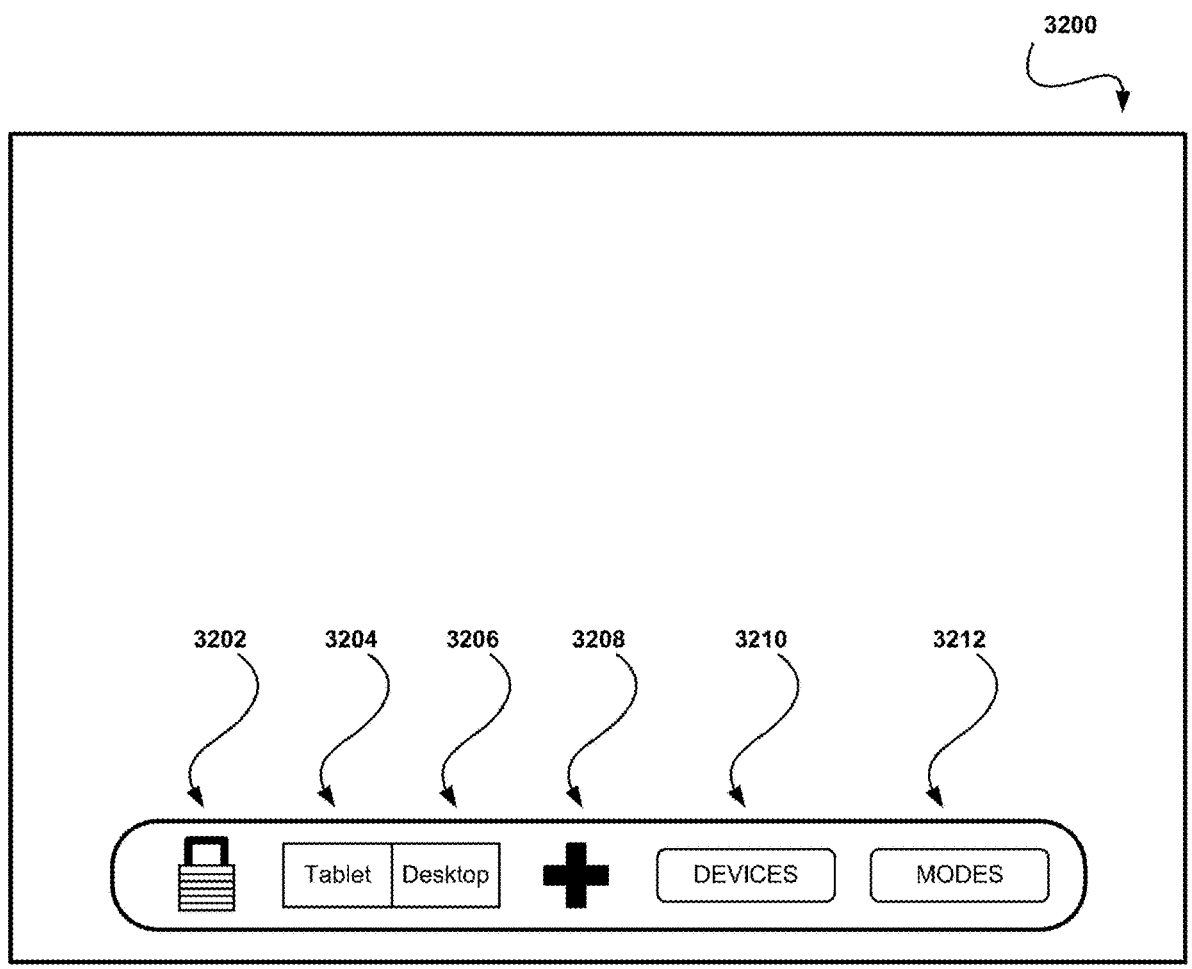
FIG. 32A shows a user interface where a user can manually switch between a desktop computer mode and a tablet computer mode, in accordance with one embodiment.

FIG. 32A shows a user interface 3200 for manually switching between a desktop computer mode and a tablet computer mode, in accordance with one embodiment. As an option, the user interface 3200 may be implemented in the context of the architecture and environment of the previous Figures or any subsequent Figure(s). Of course, however, the user interface 3200 may be implemented in any desired environment. The aforementioned definitions may apply during the present description.

The user interface 3200 may be utilized to present computer mode configuration functionality to the user in a non-obtrusive way. For example, in one embodiment, the user interface may be localized along one edge of a display. In another embodiment, the user interface may be displayed on top of an active application. As an option, the user interface may fade away if no user input is received within a certain period of time. In yet another embodiment, the user may request user interface 3200 by pressing a hardware button one or more times. In still another embodiment, the user interface may be accessed through a general system settings user interface.

As shown, the user interface 3200 may be utilized to manually activate a computer mode. For example, in one embodiment, the user interface may include a button 3202 which can engage or disengage the automatic management of computer modes. When button 3202 is locked, the functionality used to automatically determine the manner in which the tablet computer is being utilized may be disengaged. Accordingly, buttons 3204 and 3206 become available to the user. In another embodiment, the user may be prompted for confirmation before switching computer modes.

In one embodiment, buttons 3204 and 3206 may be used to toggle between a desktop computer mode and a tablet computer mode. In another embodiment, selection of a mode button may display the user interface shown in FIG. 32B, allowing the user to choose from a plurality of modes. In yet another embodiment, the selection of a mode button results in the activation of a predefined computer mode of appropriate type. In still another embodiment, user interface 3200 may display the name and/or type of the current computer mode.

As shown, the user interface 3200 may be utilized to provide the user with easy access to computer mode settings and options. For example, in one embodiment, the user interface may include a button 3208 to place the tablet computer in a learning mode. While in learning mode, the detection of unknown desktop peripheral devices or mounts may result in user interface 2900 of FIG. 29 or user interface 3000 of FIG. 30 being presented to the user, facilitating the definition of trigger parameters.

Additionally, user interface 3200 may be utilized to access a desktop peripheral device and mount manager. For example, in one embodiment, the user interface may include a button 3210 which presents to a user the device and mount manager shown in user interface 2900 of FIG. 29.

Furthermore, user interface 3200 may be utilized to access a computer mode manager. For example, in one embodiment, the user interface may include a button 3212 which presents to a user the desktop computer mode manager shown in user interface 3300 of FIG. 33.

Figure 32B:
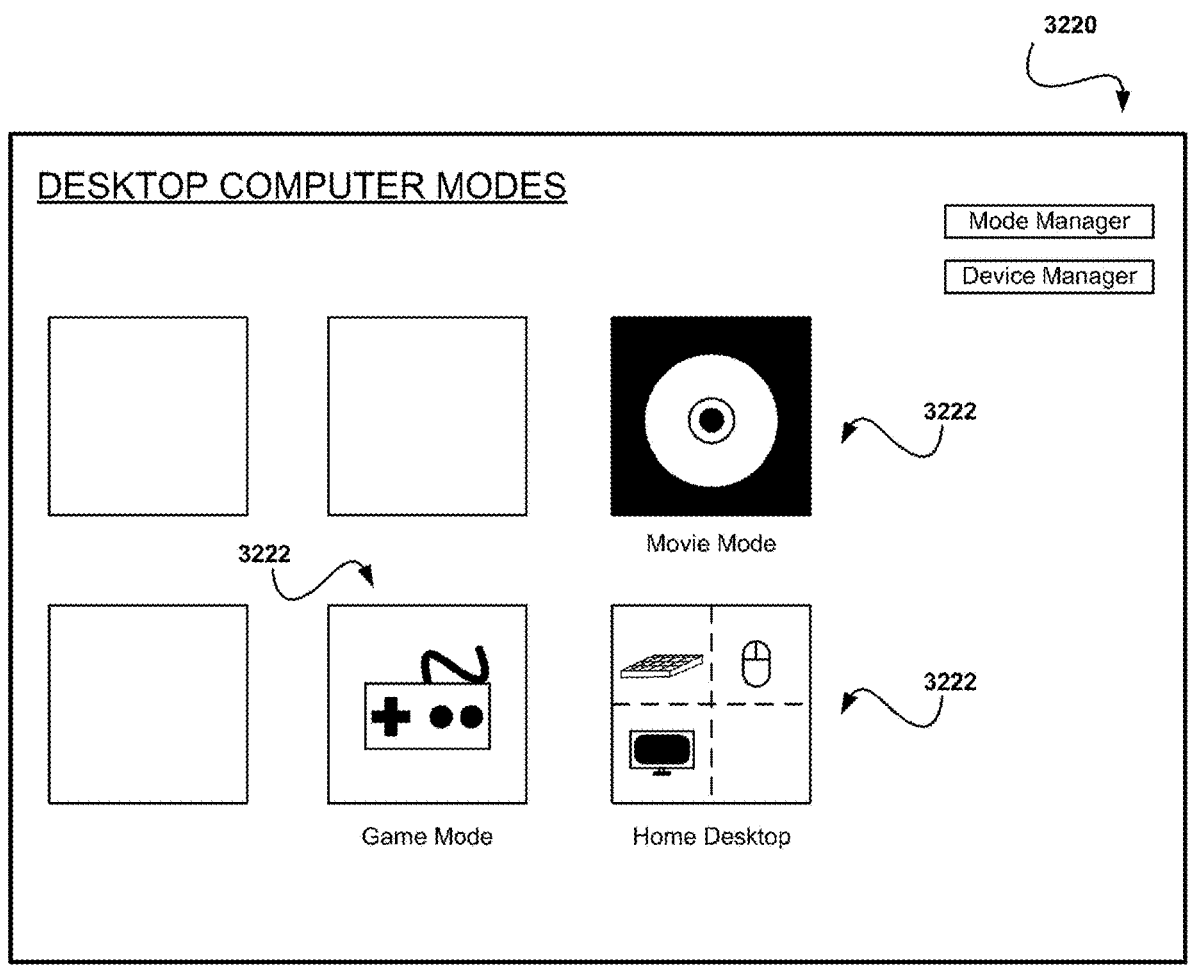
FIG. 32B shows a user interface where a user can select from a plurality of desktop computer modes, in accordance with one embodiment.

FIG. 32B shows a user interface 3220 where a user can select from a plurality of desktop computer modes, in accordance with one embodiment. As an option, the user interface 3220 may be implemented in the context of the architecture and environment of the previous Figures or any subsequent Figure(s). Of course, however, the user interface 3220 may be implemented in any desired environment. The aforementioned definitions may apply during the present description.

In various embodiments, a user may define a plurality of desktop computer modes. As shown, the user interface 3220 may be utilized to manually select a desktop computer mode. In one embodiment, the user interface may include buttons 3222 representing individual desktop computer modes. As an option, these buttons may include a graphic representation of the desktop computer mode (e.g. a representative icon chosen by the user, a miniaturize screenshot of a saved state, a collection of iconic representations of the devices utilized by the mode, a photograph provided by the user, etc.) and/or a mode name. In another embodiment, one of the desktop computer mode buttons may be highlighted, if that particular mode is the currently active computer mode. As an option, the name and/or graphic representation of the currently active computer mode may be indicated elsewhere in the user interface if the associated mode button is not present.

In still another embodiment, a user may only be able to select modes for which all mode conditions have been satisfied. As an option, mode buttons representing computer modes whose mode conditions have not been satisfied may be presented to the user dimmed, crossed out, and/or may be hidden from view. In yet another embodiment, the user may be able to rearrange the order in which the mode buttons are displayed. In another embodiment, the mode buttons may be ordered according to their priority. Furthermore, in one embodiment, the user may be presented with more than one screen of mode buttons.

Figure 33:
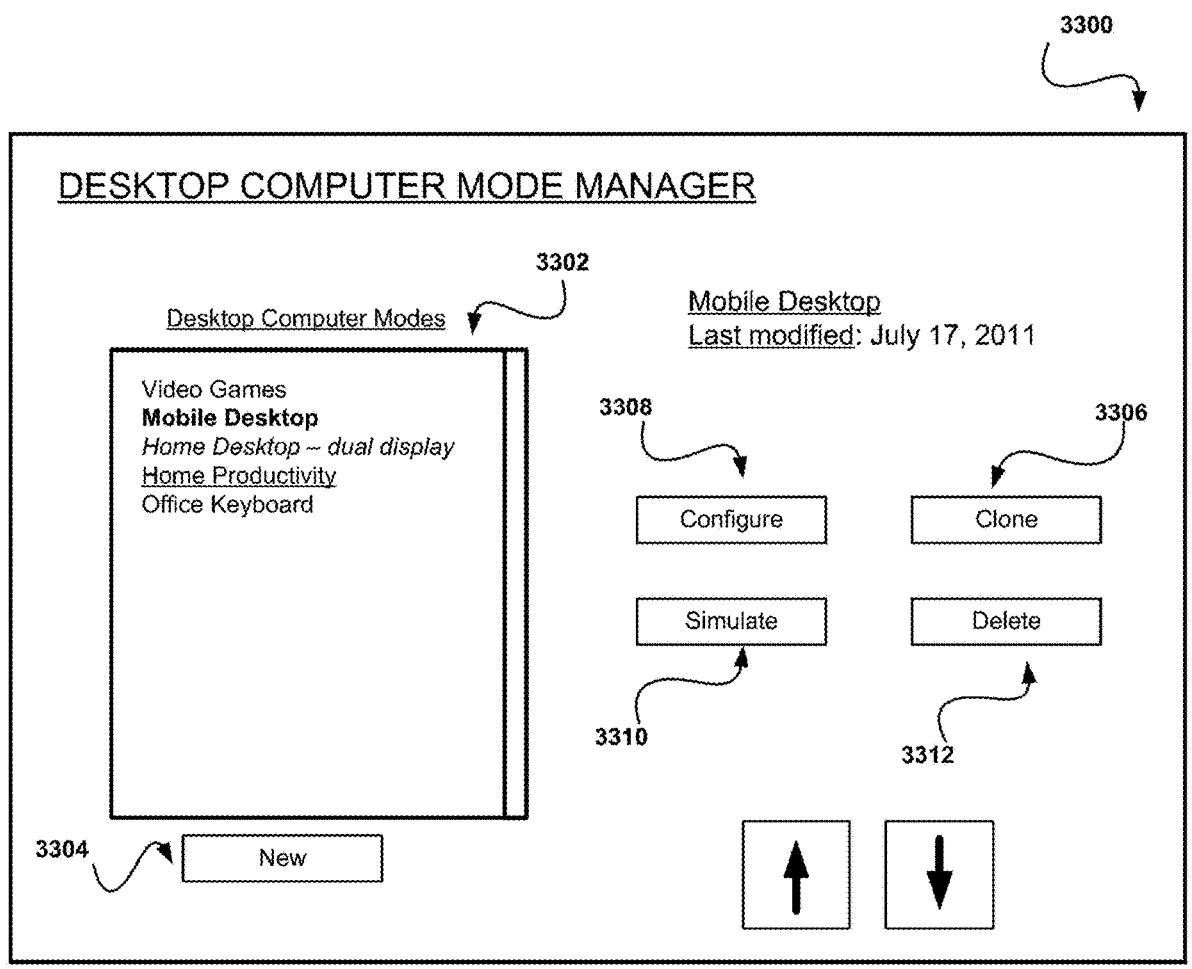
FIG. 33 shows a user interface for managing desktop computer modes, in accordance with one embodiment.

FIG. 33 shows a user interface 3300 for managing desktop computer modes, in accordance with one embodiment. As an option, the user interface 3300 may be implemented in the context of the architecture and environment of the previous Figures or any subsequent Figure(s). Of course, however, the user interface 3300 may be implemented in any desired environment. The aforementioned definitions may apply during the present description.

As shown, the user interface 3300 may be utilized to create, manage, and delete desktop computer modes. For example, in various embodiments, the user interface may include a list 3302 of all defined desktop computer modes. In one embodiment, the list may be ordered by mode priority (i.e. the order in which the mode conditions of each mode are evaluated when determining what mode should be active). In another embodiment, the user may be able to prioritize the computer modes by dragging them to different locations in the list. In still another embodiment, the user interface may include buttons to move a computer mode selected in the list higher and lower.

In one embodiment, the name of the currently active mode may be stylized in list 3302, if present. In another embodiment, the names of blocked computer modes may be highlighted in the list. In the context of the present description, a blocked computer mode refers to a computer mode which will, at least in part, not be able to activate, as a consequence of the defined mode conditions and/or mode priority. For example, if the mode conditions for a computer mode are identical to, or a superset of, the mode conditions defined for another computer mode of higher priority, the lower priority mode will never activate, and is blocked.

As shown, the user interface 3300 may be utilized to create a new desktop computer mode. For example, in one embodiment, the user interface may include a button 3304 to create a new computer mode. As an option, the new computer mode may be predefined using default mode conditions. In another embodiment, selecting button 3304 may result in displaying FIG. 34, where the new computer mode may be configured. In still another embodiment, the user interface may include a button 3306 to create a new computer mode which is a duplicate of the computer mode selected in list 3302.

The user interface 3300 may be utilized to manage desktop computer modes. As shown, in one embodiment, information describing a computer mode selected in list 3302 may be displayed. The information displayed may include, but is not limited to, the mode name, the last modification date, a graphical representation of the selected mode, and/or any other information describing the selected computer mode. In another embodiment, the user interface may include a button 3308 to configure the selected mode. In still another embodiment, selecting button 3308 may result in displaying FIG. 34, where the selected computer mode may be configured.

As shown, the user interface 3300 may be utilized to determine the exact set of conditions which must be satisfied before a selected computer mode would be activated. For example, in one embodiment, the user interface may include a button 3310, which presents to the user a list of all conditions which must be satisfied, and all conditions which must not be satisfied, in order for the selected computer mode to be activated. In this way, the user is able to determine if a particular computer mode will activate as the user intended, without having to physically recreate the triggering scenario.

The user interface 3300 may be utilized to delete a selected desktop computer mode. For example, in one embodiment, the user interface may include a button 3312 to delete the selected computer mode. As an option, the user may be prompted for confirmation before a computer mode is deleted.

Figure 34:
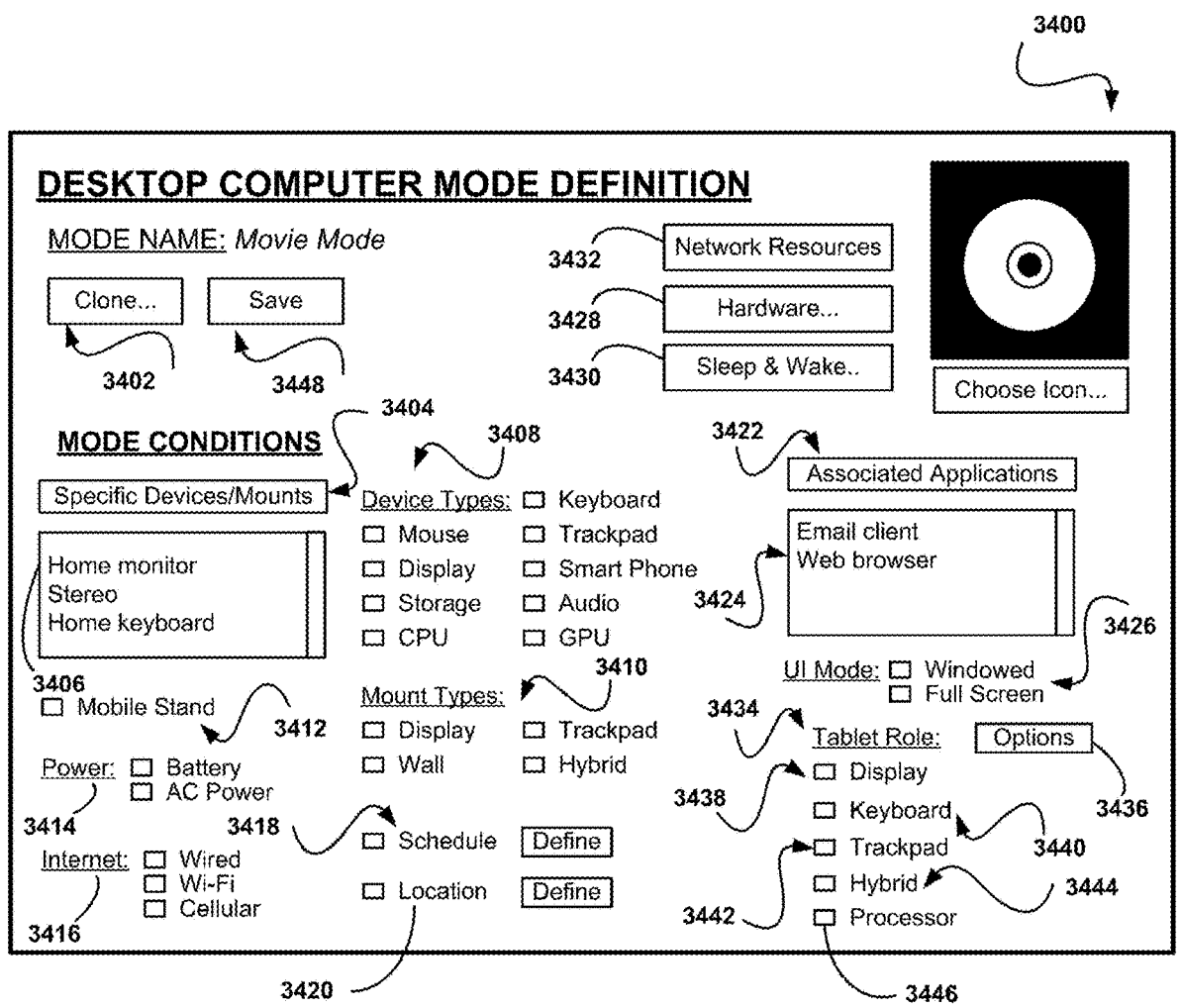
FIG. 34 shows a user interface for defining a desktop computer mode, in accordance with one embodiment.

FIG. 34 shows a user interface 3400 for defining a desktop computer mode, in accordance with one embodiment. As an option, the user interface 3400 may be implemented in the context of the architecture and environment of the previous Figures or any subsequent Figure(s). Of course, however, the user interface 3400 may be implemented in any desired environment. The aforementioned definitions may apply during the present description.

As shown, the user interface 3400 may be utilized to define a desktop computer mode. For example, in one embodiment, the user interface may include a mode name and/or a graphical representation of the desktop computer mode. In another embodiment, the user interface may include a button 3402 to clone the definition of a second desktop computer mode. In this way, a user may easily create a number of similar desktop computer modes without having to repeatedly enter identical parameters.

The user interface 3400 may be utilized to define the mode conditions associated with a desktop computer mode.

In various embodiments, the mode conditions may include, but are not limited to, specific peripherals, generic peripheral types, locations, schedules, network types, and/or power sources.

In one embodiment, the user interface 3400 may include a button 3404 to allow a user to select specific peripherals to act as mode conditions. For example, in one embodiment, selecting button 3404 may present the user with a list of all known peripheral devices and mounts. The user may select one or more peripherals from the list, which will act as mode conditions, in accordance to the established trigger parameters defined for each peripheral. As an option, the user interface 3400 may also include a list 3406 which lists the peripherals acting as mode conditions for the present desktop computer mode.

In one embodiment, the user interface 3400 may include a plurality of check boxes 3408 which represent a plurality of generic peripheral device types. The generic device types may include, but are not limited to, keyboard, mouse, trackpad, smartphone, display, storage, CPU, GPU, audio, and/or any other type of desktop peripheral device. As an option, a user may be presented with user interface 3000 of FIG. 30 or the like in response to selecting a generic device type name next to a check box, allowing the user to modify the default trigger parameters associated with that particular peripheral device type.

In one embodiment, the user interface 3400 may include a plurality of check boxes 3410 which represent a plurality of generic peripheral mount types. The generic mount types may include, but are not limited to, display, keyboard, trackpad, wall, and/or any other type of desktop mount. As an option, a user may be presented with user interface 3000 of FIG. 30 or the like in response to selecting a generic mount type name next to a check box, allowing the user to modify the default trigger parameters associated with that particular mount type.

In one embodiment, the user interface 3400 may include a check box 3412 to establish a predefined "mobile stand" trigger as a mode condition. As an option, a user may be presented with user interface 3100 of FIG. 31 or the like in response to selecting the words "mobile stand" or the like next to check box 3412, allowing the user to modify the trigger parameters associated with using a mobile stand.

In one embodiment, the user interface 3400 may include a collection of check boxes 3414 which allow a user to define one or more types of power source as mode conditions. The types of power sources may include, but are not limited to, battery, AC, and/or any other type of power source.

In one embodiment, the user interface 3400 may include a collection of check boxes 3416 which allow a user to define one or more types of internet connections as mode conditions. The types of internet connections may include, but are not limited to, wired, Wi-Fi, cellular, and/or any other type of internet connection.

In one embodiment, the user interface 3400 may include a check box 3418 which allows the user to define a schedule as a mode condition, such that the mode may only activate according to that schedule. For example, a user may specify that the mode may only activate between 4 pm and 8 pm, or only on weekends. In another embodiment, a user may be able to specify periods of time when the present desktop computer mode cannot activate, effectively acting as negative mode conditions. In yet another embodiment, the user may be able to specify a time limit as a mode condition. In still another embodiment, the user may be presented with a user interface which allows them to define a schedule, in response to selecting the word "schedule" or the like, next to check box 3418.

In one embodiment, the user interface 3400 may include a check box 3420 which allows the user to utilize a geographic location as a mode condition, such that the mode may only activate when the tablet computer is in proximity to that location. For example, a user may specify that the mode may only activate when the tablet computer is located within the user's home. In another embodiment, a user is able to specify one or more geographic locations where the present desktop computer mode may not activate, effectively acting as negative mode conditions. In yet another embodiment, the user may be presented with a user interface which allows them to specify locations, in response to selecting the word "location" or the like, next to check box 3420. In various embodiments, the location may be specified as a street address, a city, a latitude/longitude coordinate pair, and/or any other geographic descriptor.

The user interface 3400 may be utilized to define what happens when the mode conditions of the present desktop computer mode are satisfied. For example, in one embodiment, the user interface may be utilized to associate one or more applications with the present desktop computer mode. In one embodiment, the user interface may include a button 3422 which presents a user interface to the user which allows them to select one or more user application which will be executed when the present desktop computer mode is activated. As an option, the user may specify that all previous active applications be terminated upon activation of the present desktop computer mode. In another embodiment, a user may specify a plurality of applications which will be presented to the user as part of a simplified application launcher interface, when the present computer mode is active. In yet another embodiment, the user interface 3400 may also include a list 3424 which names all applications currently associated with the present desktop computer mode.

The user interface 3400 may also be utilized to define the type of user experience provided by the tablet computer when the present desktop computer mode is activated. For example, in one embodiment, the user interface may include a plurality of radio buttons 3426 which allow the user to define the type of multitasking user experience associated with the desktop computer mode. The types of multitasking user experience include, but are not limited to, windowed (i.e. the user interfaces of multiple applications are visible simultaneously, etc.), full screen (i.e. only the user interface of a single user application may be displayed at any one time), and/or any other type of multitasking user experience.

The user interface 3400 may be utilized to specify the role of hardware controls in the present desktop computer mode. For example, in one embodiment, the user interface may include a button 3428 which presents the user with a user interface that allows them to define the functionality associated with the one or more hardware buttons present on the tablet computer. In one embodiment, the user may be able to disable one or more hardware buttons. As an option, disabling a hardware button may automatically make available an alternative method for accomplishing the task associated with the disabled button. In another embodiment, the user may be able to assign different functionality to one or more hardware buttons. As a specific example, in a desktop computer mode triggered by contact with a display mount which blocks access to the tablet computer power button, the user may desire to reassign the power button to a more accessible volume button. In another example, the user may associate a hardware button with the activation/deactivation of a particular input mode, such as a laser projection keyboard.

The user interface 3400 may be utilized to specify how to handle special user interactions in the present desktop computer mode. For example, it may be specified how a user may wake the tablet computer from a low-power sleep state. In one embodiment, the user interface may contain a button 3430 which presents the user with a user interface that allows them to select one or more ways in which the tablet computer may be woken from a sleep state. The methods may include, but are not limited to, pressing a hardware button, activating a peripheral device, performing a particular control gesture in front of a video camera associated with the tablet computer, a particular voice command, clapping, and/or any other method of interacting with the tablet computer. In one embodiment, the user is also able to select one or more ways to place the tablet computer in a sleep mode.

The user interface 3400 may be utilized to associate the present desktop computer mode with one or more network resources. For example, in one embodiment, the user interface may include a button 3432 which presents the user with a user interface that allows them to specify one or more network resources which are to be made available (e.g. shared drive mounted, cloud storage account logged into, etc.) when the present desktop computer mode is activated. In another embodiment, the user may enter account information (e.g. username, password, etc.) associated with a specified network resource.

When defining a desktop computer mode, the role of the tablet computer may be established. As shown, the user interface 3400 may be utilized to specify and configure a tablet role to be associated with the present desktop computer mode. For example, in one embodiment, the user interface may include a collection of buttons 3434 associated with different tablet roles. In another embodiment, this collection of buttons may also include a button 3436 to configure the selected tablet role.

In one embodiment, the tablet role collection 3434 may include a button 3438 to specify that the tablet computer will operate in the role of a display device in the present desktop computer mode. In one embodiment, while fulfilling a display role, the utilization of the tablet computer may be directed mainly to processing, and displaying the results of the processing. In various embodiments, a display role may minimize the amount of input received through the tablet computer touch screen. In one embodiment, the display role may be configured such that the tablet computer utilizes forms of user interaction that do not require physical contact with the tablet, such as control gestures and/or a laser projected keyboard. In another embodiment, the touch interface of the tablet display may be disabled. As an option, the user may be warned if a desktop computer mode is being configured such that there are no available means of input.

In another embodiment, the tablet role collection 3434 may include a button 3440 to specify that the tablet computer will operate in the role of a keyboard device in the present desktop computer mode. In one embodiment, while fulfilling a keyboard role, the utilization of the tablet computer may be directed mainly to processing, and receiving keyboard input to control the processing. As an option, the user may be warned if a desktop computer mode is being configured such that there are no available means of display. In another embodiment, the keyboard displayed on the tablet computer display may be dynamic, changing in appearance and functionality depending on which active application is being used. For example, in one embodiment, the labeling of the function keys along the top of the keyboard may change depending on which application is being used. In another embodiment, the keys displayed on the keyboard may change depending on which application is active (e.g. a number pad for a spreadsheet application, WASD directional keys for a game, an enlarged and simplified keyset for applications directed towards children, etc.). In still another embodiment, the keyboard role may be configured such that the tablet computer also accepts control gestures through a built-in camera.

In another embodiment, the tablet role collection 3434 may include a button 3442 to specify that the tablet computer will operate in the role of a trackpad device in the present desktop computer mode. In one embodiment, while fulfilling a trackpad role, the utilization of the tablet computer may be directed mainly to processing, and receiving trackpad input to control the processing. In another embodiment, the trackpad displayed on the tablet computer may also receive multitouch gestures. In still another embodiment, the trackpad role may be configured such that the tablet computer also accepts control gestures through a built-in camera.

In one embodiment, the tablet role collection 3434 may include a button 3444 to specify that the tablet computer will operate in the role of a hybrid input device in the present desktop computer mode. In the context of the present description, hybrid input device refers to an application dependent input device which also operates as a display in a limited capacity. For example, in one embodiment, while operating as a hybrid input device, the tablet computer may display the toolbars of the currently active application, providing the user with a simple interface to elements of the application while also freeing up screen real estate. In one embodiment, elements of the hybrid input device role may be configured by the user on a per-application basis. In another embodiment, the hybrid input device role is implemented by each application in a predefined manner.

In one embodiment, while fulfilling a hybrid input device role, the utilization of the tablet computer may be directed mainly to processing, and receiving input to control the processing. As an option, the user may be warned if a desktop computer mode is being configured such that there are no available means of display. In another embodiment, the hybrid input device role may be configured such that the tablet computer also provides other forms of user interaction, such as control gestures and/or a laser projected keyboard.

In one embodiment, the tablet role collection 3434 may include a button 3446 to specify that the tablet computer will operate in the role of a processor device in the present desktop computer mode. In the context of the present description, the processor device role refers to a scenario where the tablet computer is operating with the tablet display disabled. In one embodiment, a first tablet operating in the processor device role may be utilized by a second tablet computer to perform distributed, parallel calculations. As an option, the user may be warned if a desktop computer mode is being configured such that there are no available means of display. In another embodiment, the processor device role may be configured such that the tablet computer also provides forms of user interaction which do not require the use of the tablet display, such as control gestures and/or a laser projected keyboard.

As shown, the user interface 3400 may be utilized to save a desktop computer mode. For example, in one embodiment, the user interface may include a button 3448 to initiate the process of saving the present desktop computer mode. In one embodiment, the desktop computer mode may be evaluated for conflicts before being saved. Possible conflicts may include, but are not limited to, configurations missing a means for text input, configurations missing a means for indication (i.e. missing a mouse, trackpad, and touchscreen), configurations missing a means to display processing results, and/or any other type of conflict which may prevent the desktop computer mode from providing functionality to the user. In another embodiment, the user may be prompted if a conflict is found, informing them of the nature of the conflict.

In various embodiments, the interfaces of FIGS. 29 through 34 (or any of the interfaces for that matter) may be displayed utilizing the tablet computer mode and/or desktop computer mode. In still other embodiments, the interfaces of FIGS. 29 through 34 (or any of the interfaces for that matter) may take the form of webpages displayed utilizing a web browser on any desired computer, handheld device, etc. In such case, any of the parameters or other input disclosed herein may be entered without use of the tablet computer, whereby such parameters or other input (or derivatives thereof) may be pushed to the tablet computer for configuration/updated purposes.

In one embodiment, when the tablet computer is being operated in the desktop computer mode and is not serving as a keyboard or primary display as disclosed herein, the touchscreen of the tablet computer may serve as a secondary display. In one embodiment, the tablet computer may serve as such secondary display in a position between a conventional keyboard and a conventional primary display, facing a user, angled between 25-65 degrees so as to allow viewing by the user while the user is manipulating the keyboard and viewing the conventional primary display during desktop use, and within reaching distance of such user manipulating the keyboard and viewing the conventional primary display (for providing finger gestures via the tablet computer touchscreen).

To accomplish this, the tablet computer may be positioned on an independent, separate mount (e.g. stand, resting platform, etc.) situated between the keyboard and primary display, in accordance with one possible embodiment. In another possible embodiment, the tablet computer may be positioned in the manner set forth above, on a mount coupled (e.g. integrally or otherwise) to the keyboard. To this end, the tablet computer would extend upwardly and in a rearward direction from an upper edge of the keyboard (possibly in a substantially same plane as an operating surface of the keyboard). In yet another embodiment, the tablet computer may be positioned in the manner set forth above, on a mount coupled (e.g. integrally or otherwise) to the primary display. To this end, the tablet computer would extend downwardly and in a forward direction from a bottom edge of the primary display that is vertically oriented.

In another embodiment, when the tablet computer is being operated in the desktop computer mode and is serving as a keyboard as disclosed herein, the aforementioned interfaces of FIGS. 29 through 34 (or any of the interfaces disclosed herein, for that matter) may be displayed in a section of the tablet computer that is not displaying the keyboard. For example, a user may have an ability to configure the keyboard displayed on the tablet computer to either consume the entire touchscreen of the tablet screen or only a portion thereof (e.g. bottom portion, in landscape position, etc.) such that any of the aforementioned interfaces (or any others disclosed herein) may be positioned thereabove for viewing and/or manipulation by a user typing using the keyboard.

In any such embodiments, the tablet computer display (or portion thereof) may be used to display information, application interfaces, etc. secondarily with respect to the primary display. For example, in such secondary role, the tablet computer display may depict the interfaces of FIGS. 29 through 34 (or any of the interfaces disclosed herein, for that matter), and/or others, as well.

For example, in such secondary display role during desktop mode, the tablet computer display may be used to display: 1) an e-mail interface that displays a plurality of e-mails as they are received during desktop use and allow a reply to/forwarding of such received emails, 2) a task manager for setting, defining, and a plurality of tasks to be completed and an ability to set and display reminders for the same during desktop use, 3) a calendar for setting, defining, and displaying a plurality of scheduled events (e.g. meetings, etc.) in a day, week, month, etc. format, 4) social networking interface for displaying real-time pushed/pulled social network updates (e.g. news, feeds, etc.) as they are received along with an ability to respond, post user status updates, etc. during desktop use, 5) a web browser for searching for and browsing information on a network such as the Internet, 6) a music interface for searching, playing, pausing and otherwise controlling music playback during use of the tablet computer in the desktop mode, 7) an application/file explorer (e.g. manager, etc.) interface for displaying a plurality of application and/or files (which may each possibly indicate associated applications in connection with an associated icon) for browsing file folders of such files and further selecting the same for launching the same for display on the primary display and/or the tablet computer display, 8) a control panel which allows users to view and manipulate basic system settings and controls, such as adding hardware, adding and removing software, controlling user accounts, and changing accessibility options associated with the desktop mode use (and possibly even tablet mode use), and/or 9) a video conference control interface for initiating, managing, controlling, etc. a video conference while, a) displaying a video feed from a local camera of a user of the desktop thus freeing the primary display to be used solely (or at least substantially) for display of an incoming video feed from a third party, and/or b) displaying the video feed from the local camera of the user of the desktop and the incoming video feed from the third party, thereby freeing the primary display to be used solely (or at least substantially) for display of work product that is the subject of the user's primary attention and/or being shared with the third party.

By this design, in one possible embodiment, the tablet computer display be used as a secondary interface to display any one or more of the above without necessarily disrupting (at least in part) the use of the primary display for other primary matters (e.g. word processing, graphic design, and/or other work/entertainment-related tasks, etc.). For example, the tablet computer display may be secondarily used as an interface to display any one or more of the above without necessarily requiring application context switching among the different windows/interfaces displayed on the primary display, as well as allow finger gesture manipulation in connection with what is displayed on the primary display.

In still another embodiment, the tablet computer display may be used as a secondary interface to manipulate anything displayed on the primary display. Such manipulation may include the use of the touchscreen of the tablet computer in a manner that allows touch gestures to zoom in, zoom out, rotate, crop, swipe, flip, drag, etc. in connection with any content (e.g. document, picture, etc.) that is displayed using the primary display. Any such manipulation may, in one embodiment, only be displayed on the tablet computer display. Of course, however, such manipulation may, in another embodiment, be displayed on both the tablet computer display and the primary display (such that the content and the manipulation of the content on the tablet computer display are simultaneously displayed on the primary display).

To initiate the foregoing technique, in accordance with one embodiment; an application interface, content within an application instance (e.g. document, file etc.), and/or a portion thereof may be selected using an icon, menu option, etc. for being displayed on the tablet computer display, for the purpose of finger gesture manipulation, etc. Further, in other embodiments where a primary display includes a touchscreen, such selection may be accomplished by swiping items down from the primary screen down to the secondary screen of the tablet computer. Of course, other embodiments are contemplated where the tablet computer touchscreen is used for any gesture manipulation purpose disclosed herein, but the backlight of the tablet computer is not activated (for power savings, etc.).

In other embodiment where the tablet computer display mimics the primary display, the user may choose to simply use his/her fingers to manipulate the content shown on the primary display, by touching (e.g. manipulating, and/or applying gestures to content, etc.) the touchscreen of the tablet computer.

In another optional embodiment, a power-save mode that results in deactivation (i.e. power down) of the tablet computer display backlight (or entry into a screensaver mode), may be disabled during desktop mode so that the secondary interface features disclosed herein may be displayed continuously while the tablet computer display is being used in the desktop mode. In another embodiment, the foregoing feature may be only conditionally enabled, based on whether the primary display is activated/being used. In other words, the tablet computer display may enter a screensaver mode or the backlight may be powered down coincidently (or at least as a function of) the screensaver or power down of the primary display.

Of course, the foregoing interfaces, features, etc. may be provided in any role/mode (other than the secondary mode) disclosed herein (or even not disclosed). Further, a user may be able to configure the tablet computer (using the various configuration interfaces disclosed herein, for example, etc.) to include any one or more of the foregoing features/interfaces (or any other disclosed herein), including what interfaces (or portion thereof) are displayed, how they are displayed (e.g. format, arrangement, etc.), when they are display (time of day), and in which tablet mode they are displayed (e.g. tablet mode, desktop_1 mode, desktop_2 mode, etc.).

In other embodiments, any of the applications disclosed herein may take the form of one or more online application (and/or related features, techniques, etc.) described in U.S. application Ser. No. 12/340,533, filed Dec. 19, 2008, which is incorporated herein by reference in its entirety for all purposes. Of course, any technique, embodiment, feature, etc. disclosed in U.S. application Ser. No. 12/340,533, filed Dec. 19, 2008, may be incorporated with any one or more (or none) of the embodiments disclosed herein.

Figure 35:
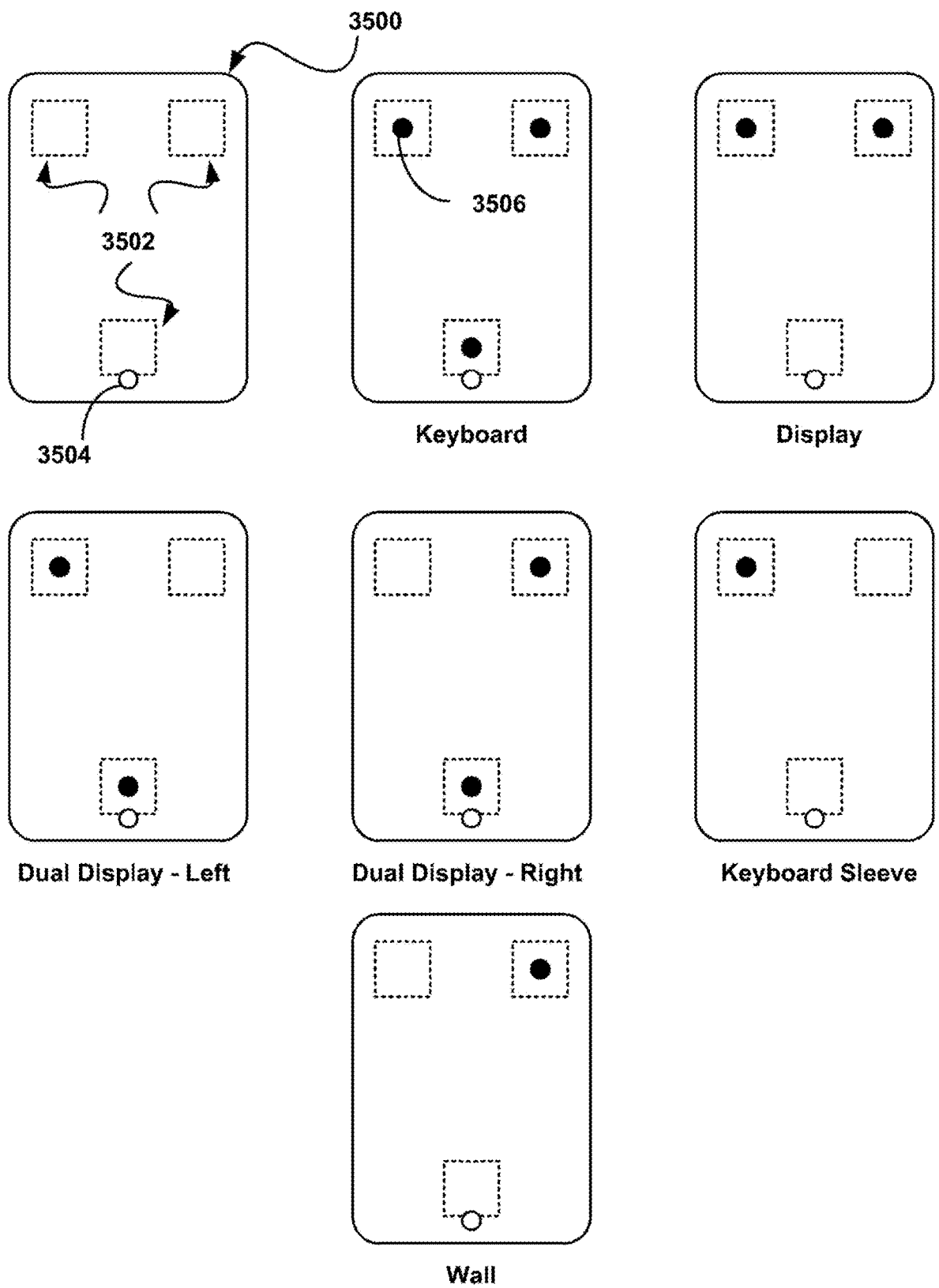
FIG. 35 shows an exemplary implementation of a method to identify a mount using magnets, in accordance with one embodiment.

FIG. 35 shows a plurality of exemplary implementations of a method to identify a mount using magnets, in accordance with one embodiment. As an option, this method may be implemented in the context of the architecture and environment of the previous Figures or any subsequent Figure(s). Of course, however, this method may be implemented in any desired environment. The aforementioned definitions may apply during the present description.

In one embodiment, a tablet computer in contact with a mount may determine the type of mount by sensing the interaction between magnets embedded in the mount and sensors within the tablet computer responsive to a magnetic field. As shown in FIG. 35, a tablet computer may include one or more sensors 3502 which are responsive to magnetic fields [or any other communication (transmitter/sensor) mechanism, for that matter]. For example, in one embodiment, a tablet computer includes three magnetic sensors 3502 situated on the back face of the tablet computer, one located behind a home button 3504 and two located in the far corners, as shown. In another embodiment, one or more magnets may be embedded within a tablet computer mount. A variety of mount types may be identified by sensing the presence of a magnet near on or more of the sensors 3502. The mount types which may be detected include, but are not limited to, keyboard mounts, display mounts, dual tablet mounts, keyboard sleeve mounts, and/or wall mounts. In yet another embodiment, a tablet computer may distinguish between the left side and right side of a dual tablet mount based on magnet placement. In various embodiments, the magnets may be chosen such that their strength is great enough to be detected, yet weak enough to not interfere with the operation of the tablet computer.

Figure 36A:
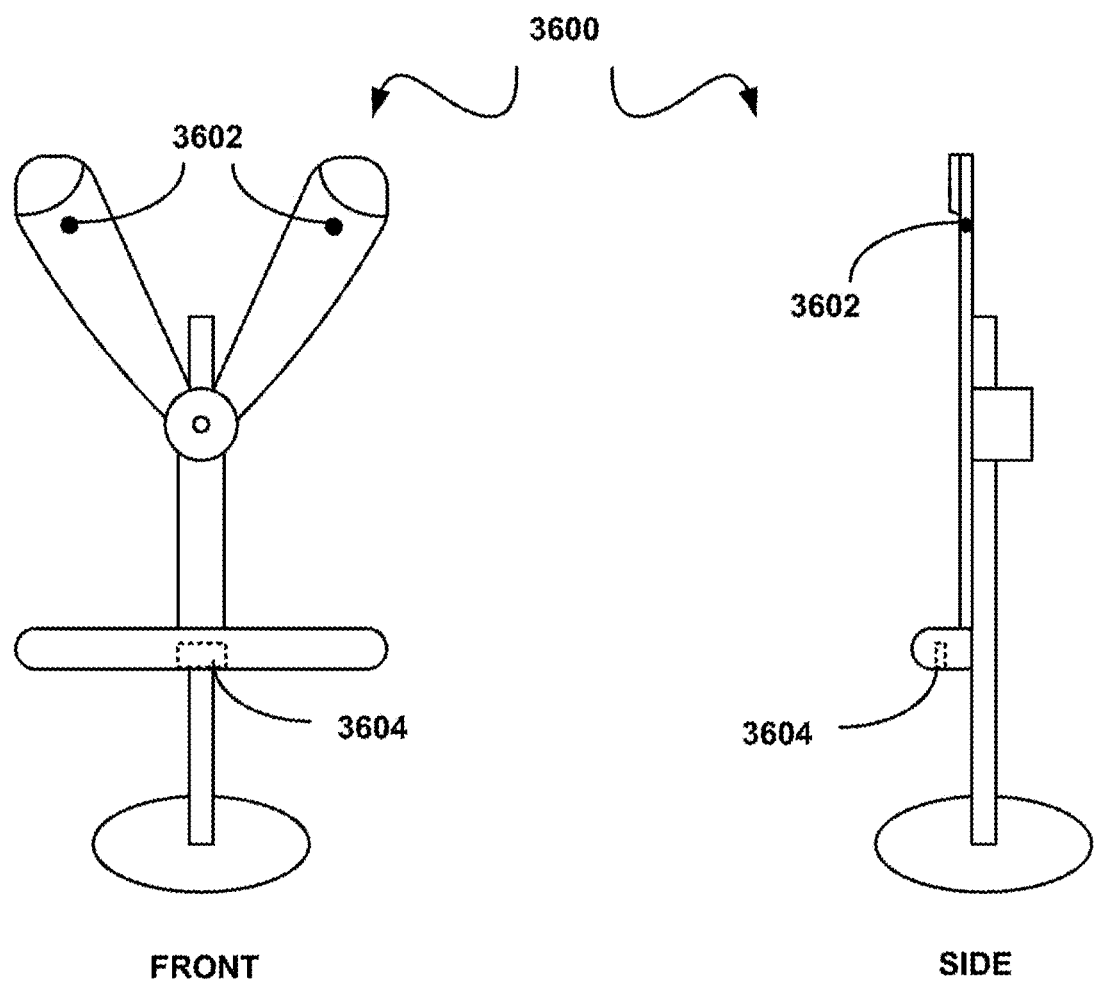
FIG. 36A shows a display mount apparatus in a portrait orientation, in accordance with one embodiment.

FIG. 36A shows a display mount apparatus 3600 in a portrait orientation, in accordance with one embodiment. As an option, apparatus 3600 may be implemented in the context of the architecture and environment of the previous Figures or any subsequent Figure(s). Of course, however, the apparatus 3600 may be implemented in any desired environment. The aforementioned definitions may apply during the present description.

As shown, the display mount 3600 may be identifiable to a tablet computer. For example, in one embodiment, the display mount 3600 may include one or more magnets 3602 embedded within the body of the mount. The placement of the magnets may indicate to the tablet computer that it is in contact with a display mount. In another embodiment, the display mount 3600 may include an RFID tag encoded with at least a unique identifier and a mount type.

As shown, the display mount 3600 may be utilized to provide a mounted tablet computer with wired connection to power and/or data sources. For example, in one embodiment, the display mount 3600 may include a tablet computer docking connector 3604 to provide power to a mounted tablet computer. In another embodiment, the display mount 3600 may provide power and a wired data connection to other resources and devices. In still another embodiment, the display mount 3600 may include an inductive charging plate for charging a tablet computer.

Figure 36B:
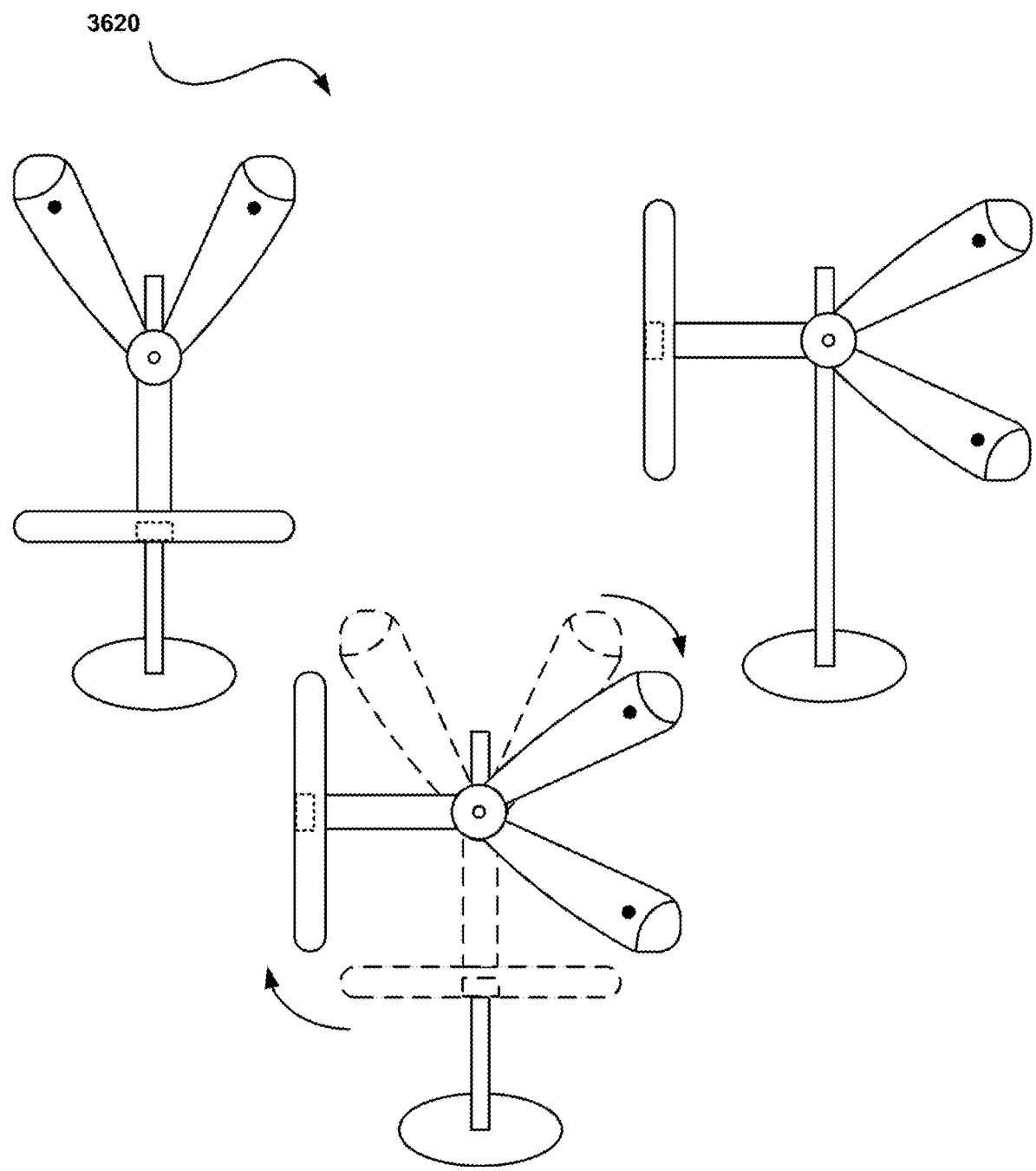
FIG. 36B shows a display mount apparatus in a landscape orientation, in accordance with one embodiment.

FIG. 36B shows a display mount apparatus 3620 in a landscape orientation, in accordance with one embodiment. As an option, apparatus 3620 may be implemented in the context of the architecture and environment of the previous Figures or any subsequent Figure(s). Of course, however, the apparatus 3620 may be implemented in any desired environment. The aforementioned definitions may apply during the present description.

As shown, the display mount 3620 may be utilized in more than one orientation. For example, in one embodiment, display mount 3620 may be placed in either a portrait orientation or a landscape orientation. In another embodiment, a mounted tablet may be rotated from one orientation to another without being removed from the display mount 3620. In still another embodiment, the display mount 3620 may be placed on an articulated arm to allow a user to further adjust the position of the mounted tablet computer.

Figure 36C:
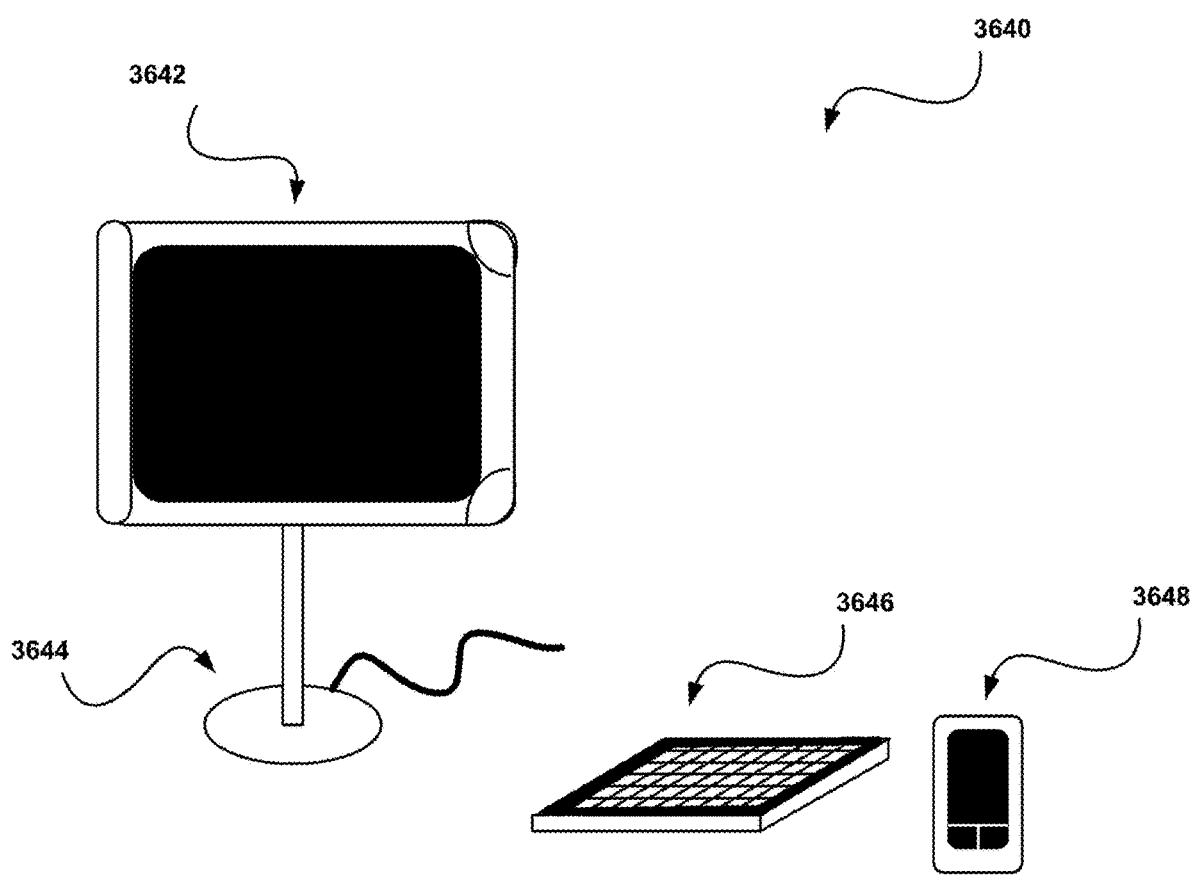
FIG. 36C shows a system for utilizing a tablet computer as a display, in accordance with one embodiment.

FIG. 36C shows a system 3640 for utilizing a tablet computer as a display, in accordance with one embodiment. As an option, system 3640 may be implemented in the context of the architecture and environment of the previous Figures or any subsequent Figure(s). Of course, however, the system 3640 may be implemented in any desired environment. The aforementioned definitions may apply during the present description.

In various embodiments, a tablet computer 3642 attached to a display mount 3644 may receive input from one or more other devices. For example, in one embodiment, the tablet computer 3642 may receive input through a wireless connection to a keyboard 3646.

In another embodiment, the tablet computer may receive input through a wireless connection to a smart phone 3648. A smart phone may be utilized as an input device by a tablet computer in multiple ways. For example, in one embodiment, the smart phone may be utilized as a trackpad device for moving a cursor displayed on the tablet computer. In another embodiment, the smart phone may be utilized as a remote camera to detect and report the use of control gestures. In still another embodiment, the smart phone may be used as a hybrid input device. In yet another embodiment, a smart phone may be used as a remote microphone which conveys voice commands to the tablet computer. In another embodiment, a smart phone may project a virtual keyboard to be used in conjunction with the tablet computer.

Figure 37A:
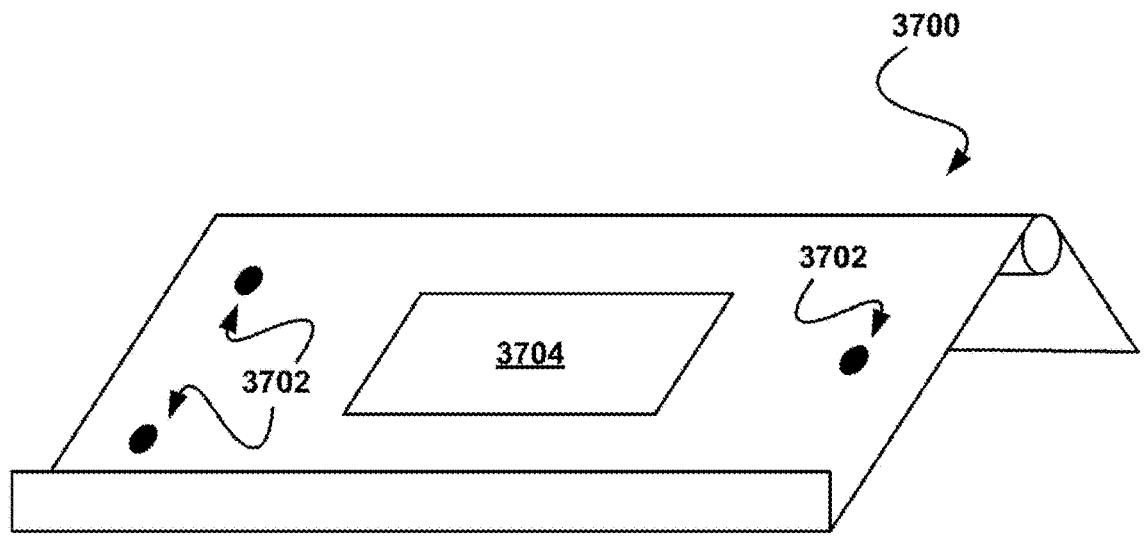
FIG. 37A shows a keyboard mount apparatus, in accordance with one embodiment.

FIG. 37A shows a keyboard mount apparatus 3700 for utilizing a tablet computer as a keyboard, in accordance with one embodiment. As an option, apparatus 3700 may be implemented in the context of the architecture and environment of the previous Figures or any subsequent Figure(s). Of course, however, the apparatus 3700 may be implemented in any desired environment. The aforementioned definitions may apply during the present description.

As shown, the keyboard mount 3700 may be identifiable to a tablet computer. For example, in one embodiment, the keyboard mount 3700 may include one or more magnets 3702 embedded within the body of the mount. The placement of the magnets may indicate to the tablet computer that it is in contact with a keyboard mount. In another embodiment, the keyboard mount 3700 may include an RFID tag encoded with at least a unique identifier and a mount type.

As shown, the keyboard mount 3700 may be utilized to provide power to a tablet computer. For example, in one embodiment, the keyboard mount includes an inductive charging plate 3704 to provide power to a tablet computer. In another embodiment, the keyboard mount may also incorporate a tablet computer dock connector to provide power and/or wired communication with resource and devices.

Figure 37B:
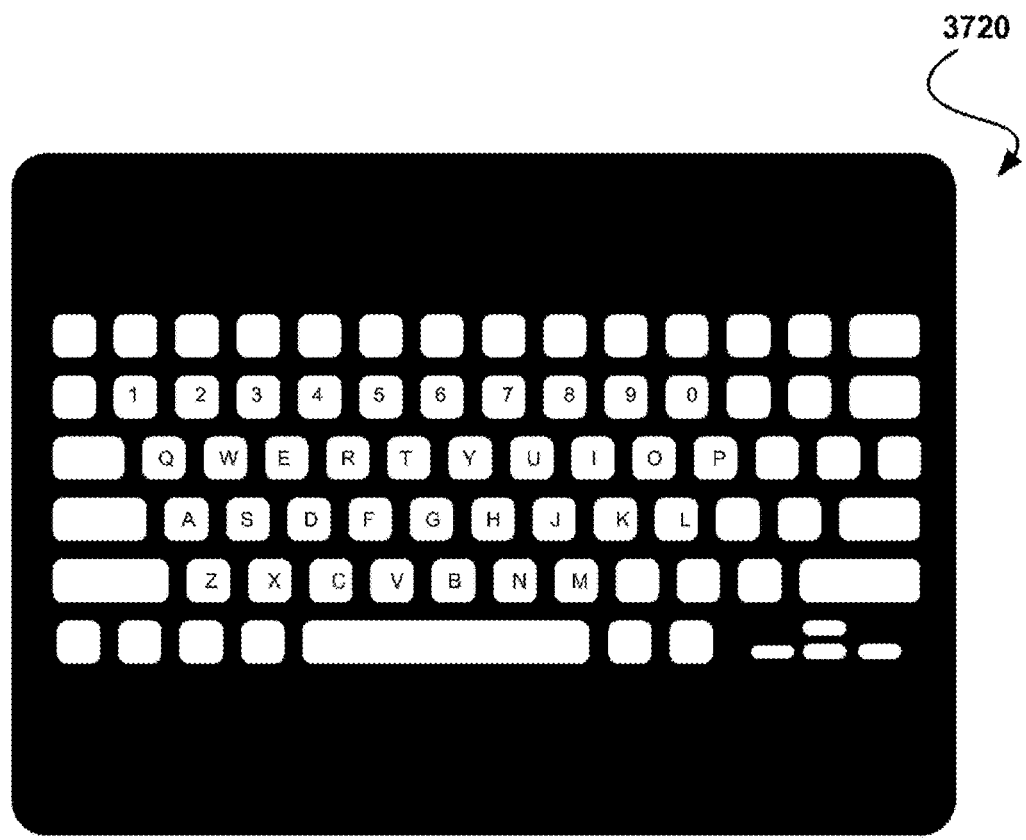
FIG. 37B shows a user interface for utilizing a tablet computer as a keyboard input device, in accordance with one embodiment.

FIG. 37B shows a user interface 3720 for utilizing a tablet computer as a keyboard, in accordance with one embodiment. As an option, user interface 3720 may be implemented in the context of the architecture and environment of the previous Figures or any subsequent Figure(s). Of course, however, the user interface 3720 may be implemented in any desired environment. The aforementioned definitions may apply during the present description.

As shown, the user interface 3720 may allow the tablet computer to be utilized as a keyboard input device. For example, in one embodiment, the user interface may include a graphical representation of a QWERTY keyboard. In another embodiment, the user interface may include dynamic elements in addition to a standard set of keyboard keys. The dynamic elements may include, but are not limited to, application launchers, clocks, buttons specific to the presently active application, and/or any other element which may depend on one or more factors. In still another embodiment, the user interface may be adapted to the alphabet of one of a plurality of languages. In yet another embodiment, the user interface may be implemented such that the tablet computer provides a very short vibration in response to the pressing of an on-screen key, providing tactile feedback to the user.

Figure 37C:
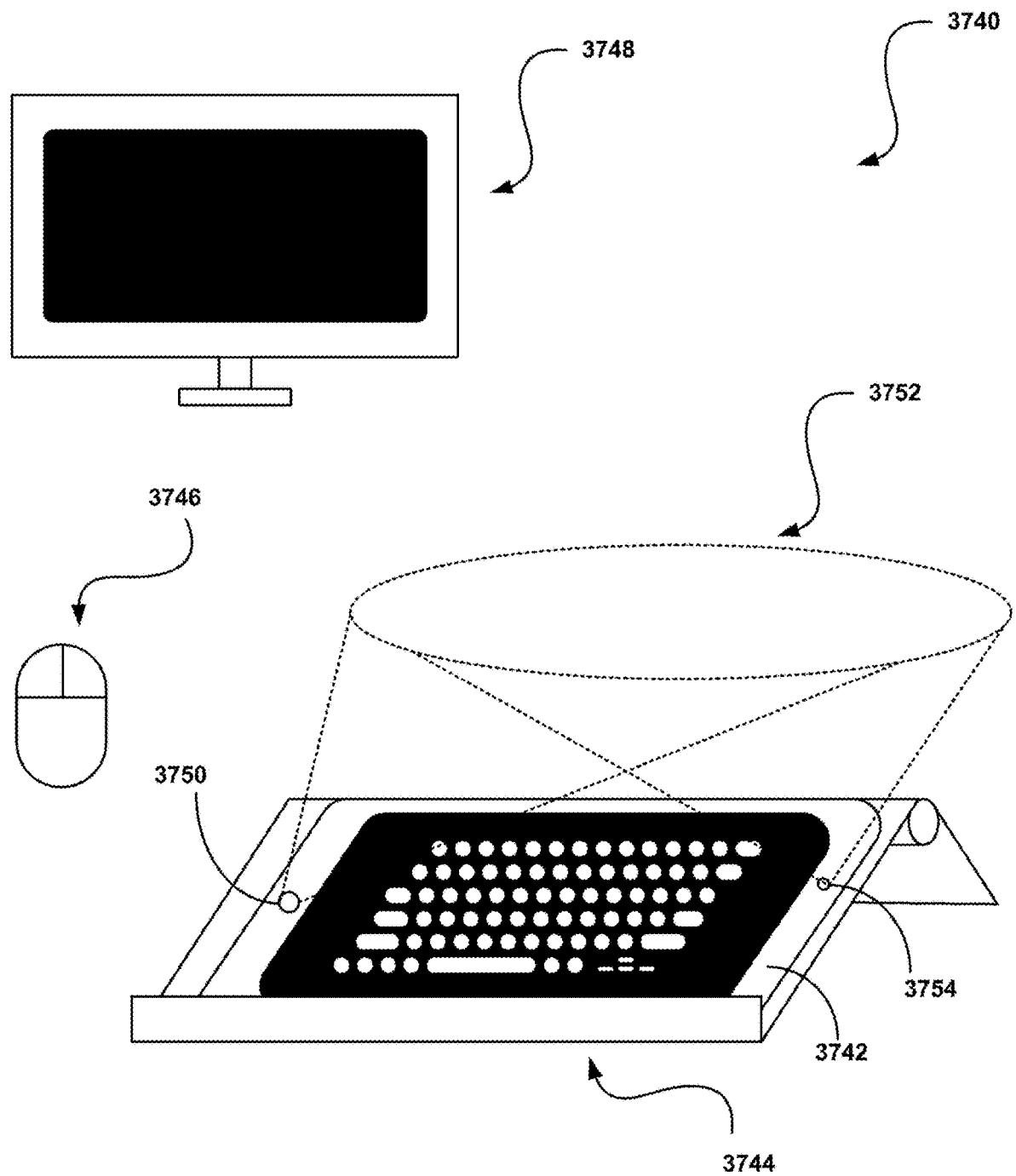
FIG. 37C shows a system for utilizing a tablet computer as a keyboard in conjunction with a keyboard mount, in accordance with one embodiment.

FIG. 37C shows a system 3740 for utilizing a tablet computer as a keyboard in conjunction with a keyboard mount, in accordance with one embodiment. As an option, system 3740 may be implemented in the context of the architecture and environment of the previous Figures or any subsequent Figure(s). Of course, however, the system 3740 may be implemented in any desired environment. The aforementioned definitions may apply during the present description.

In various embodiments, a tablet computer 3742 attached to a keyboard mount 3744 may receive input from, and provide output to, one or more other devices. For example, in one embodiment, the tablet computer 3742 may receive input from a mouse 3746 through a wireless connection. In another embodiment, the tablet computer may provide graphical output to an external display 3748 through a wireless connection.

While functioning as a keyboard device, a tablet computer 3742 may also receive input from the user which does not require physical contact. For example, in one embodiment, the tablet computer may be receptive to control gestures detected by a first built-in camera 3750 when the gestures are executed within the volume of space 3752. As an option, a second built-in camera 3742 may be utilized to allow the tablet computer to perform stereoscopic gesture recognition (e.g. able to determine the distance above the tablet computer at which a control gesture is being performed, etc.). In this way, the set of distinct control gestures may be augmented with additional intuitive control gestures. As a specific example, a user may change the system volume level by raising and lowering their hand over the tablet computer.

Figure 38A:
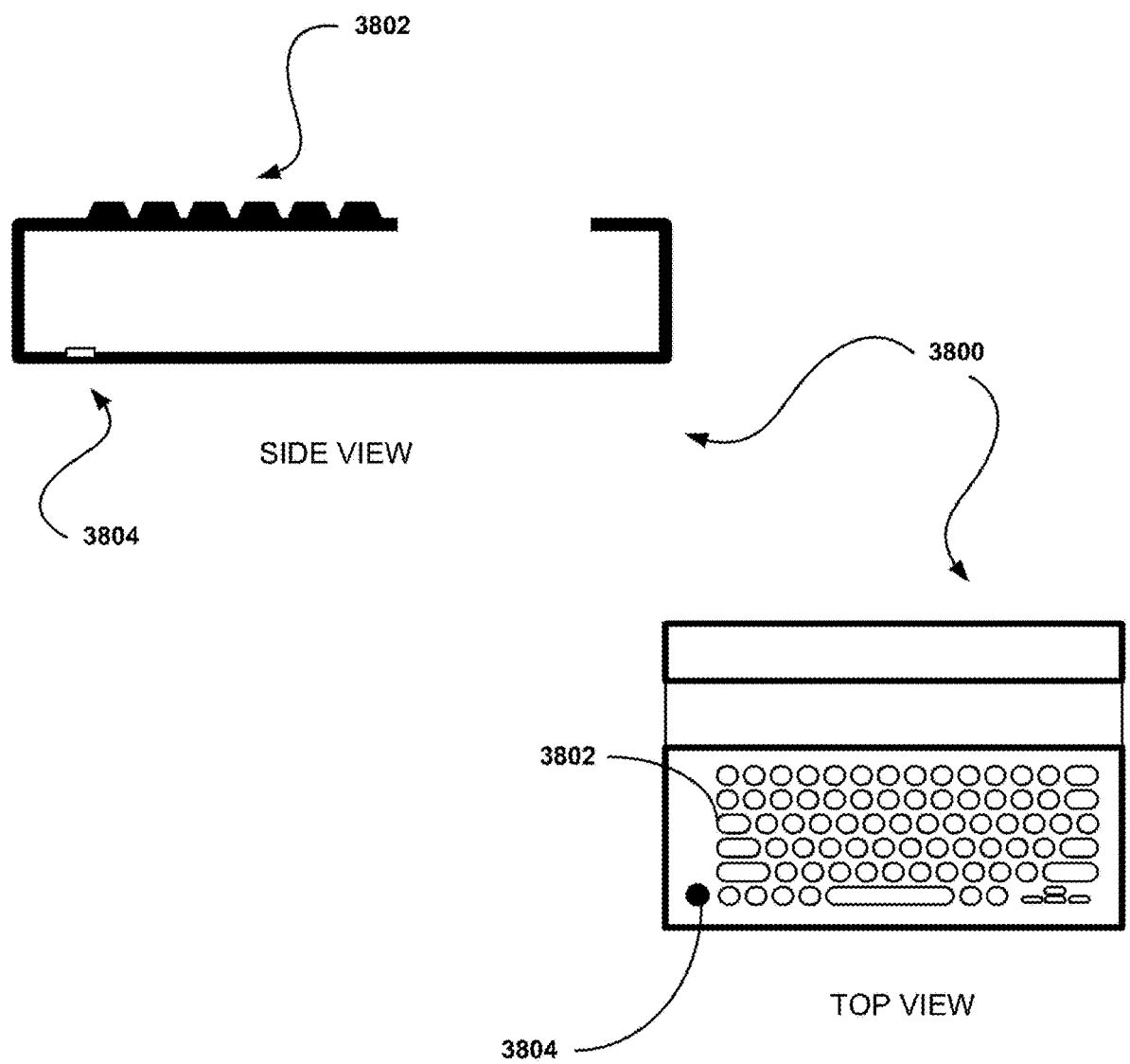
FIG. 38A shows a keyboard sleeve mount apparatus, in accordance with one embodiment.

FIG. 38A shows a keyboard sleeve mount apparatus 3800 for utilizing a tablet computer as a keyboard, in accordance with one embodiment. As an option, apparatus 3800 may be implemented in the context of the architecture and environment of the previous Figures or any subsequent Figure(s). Of course, however, the apparatus 3800 may be implemented in any desired environment. The aforementioned definitions may apply during the present description.

As shown, the keyboard sleeve mount 3800 may be utilized to enhance the user experience when using the tablet computer as a keyboard device. For example, in one embodiment, the keyboard sleeve mount may envelop some or all of a tablet computer, providing a top surface 3802 which simulates the tactile feel of a physical-button equipped keyboard. In some embodiments, the keyboard sleeve mount also allows for touchscreen interaction with at least a portion of the touchscreen display of the tablet computer. In one embodiment, the keyboard sleeve mount may be constructed out of a flexible material (e.g. silicone, rubber, etc.). In another embodiment, the keyboard sleeve mount may be constructed out of a transparent or translucent material, allowing a portion of the light from the tablet display to pass through the top surface of the sleeve.

As shown, the keyboard sleeve mount 3800 may be identifiable to a tablet computer. For example, in one embodiment, the keyboard sleeve mount 3800 may include one or more magnets 3804 embedded within the body of the sleeve. The placement of the magnets may indicate to the tablet computer that it is in contact with a keyboard sleeve mount. In another embodiment, the keyboard sleeve mount 3800 may include an RFID tag encoded with at least a unique identifier and a mount type.

Figure 38B:
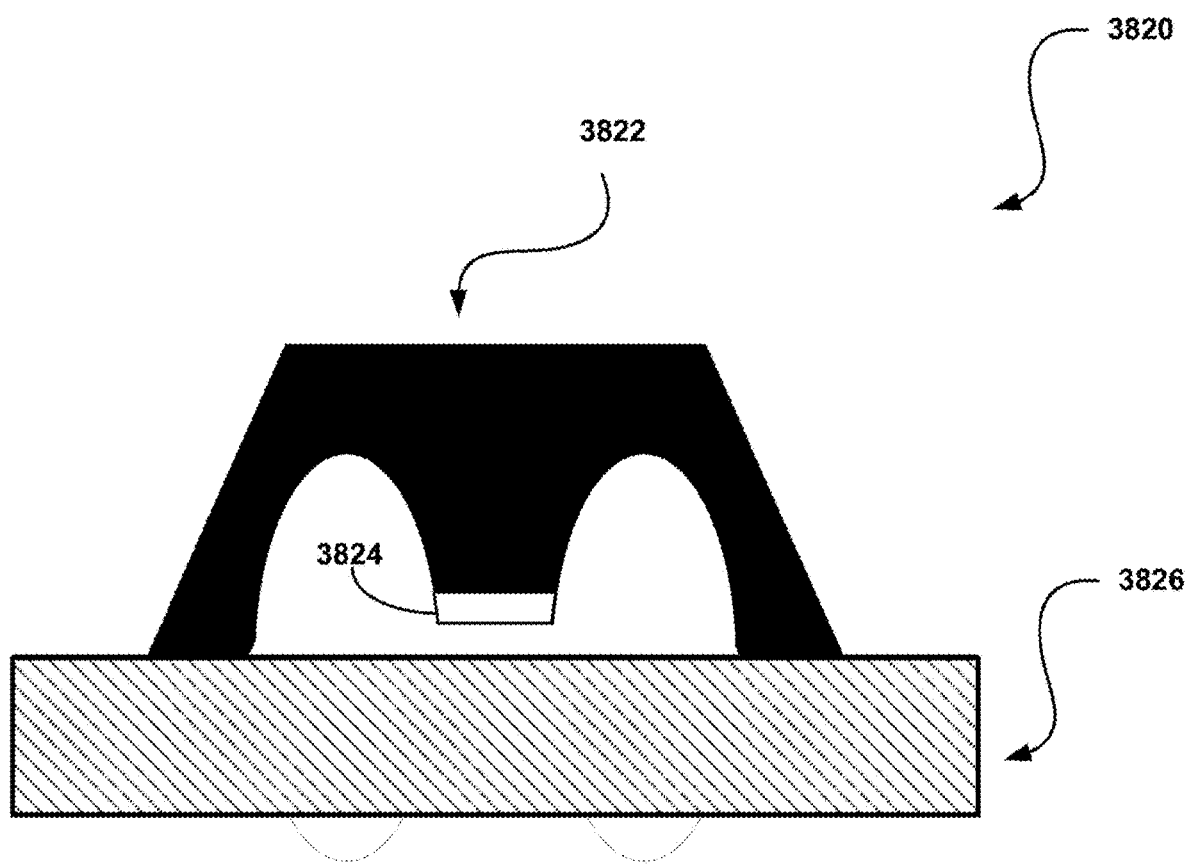
FIG. 38B shows a cross section of a key situated on the top surface of a keyboard sleeve mount apparatus, in accordance with one embodiment.

FIG. 38B shows a cross section of a key 3820 situated on the top surface of a keyboard sleeve mount apparatus, in accordance with one embodiment. As an option, apparatus 3820 may be implemented in the context of the architecture and environment of the previous Figures or any subsequent Figure(s). Of course, however, the apparatus 3820 may be implemented in any desired environment. The aforementioned definitions may apply during the present description.

As shown, the key 3820 situated on the top surface of a keyboard sleeve mount may be utilized to translate physical pressure into effective interaction with the touchscreen display of a tablet computer. For example, in one embodiment, the key may be constructed out of a flexible material 3822, with an internal nub whose cap 3824 is situated a short distance away from the tablet computer touchscreen display 3826. The cap 3824 may be composed of material whose contact may be discernable by the touchscreen display. Pressing the key results in the cap making contact with an area of the touchscreen display. In one embodiment, the thickness of the walls of the key is thick enough to provide resistance to finger pressure, while thin enough to provide a smooth motion.

Figure 38C:
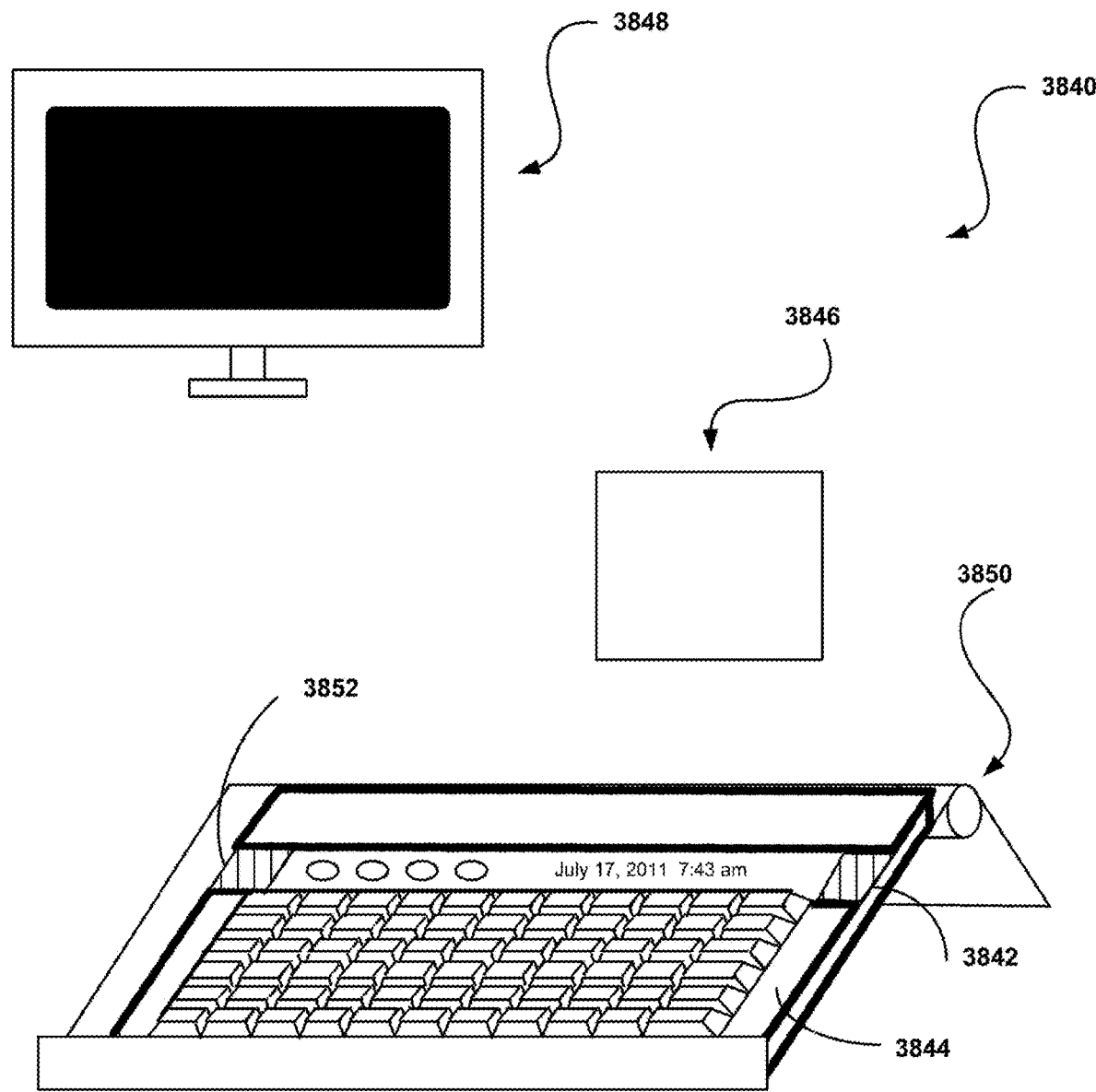
FIG. 38C shows a system for utilizing a tablet computer as a keyboard in conjunction with a keyboard sleeve mount, in accordance with one embodiment.

FIG. 38C shows a system 3840 for utilizing a tablet computer as a keyboard in conjunction with a keyboard sleeve mount, in accordance with one embodiment. As an option, system 3840 may be implemented in the context of the architecture and environment of the previous Figures or any subsequent Figure(s). Of course, however, the system 3840 may be implemented in any desired environment. The aforementioned definitions may apply during the present description.

In various embodiments, a tablet computer 3842 attached to a keyboard sleeve mount 3844 may receive input from, and provide output to, one or more other devices. For example, in one embodiment, the tablet computer 3842 may receive input from a trackpad 3846 through a wireless connection. In another embodiment, the tablet computer may provide graphical output to a second tablet computer in a display mount 3848, through a wireless connection. The second tablet computer is in a display mount, and is operating as a display device.

As shown, a tablet computer being utilized as a keyboard device in conjunction with a keyboard sleeve mount may additionally be used with a keyboard mount 3850. In one embodiment, the tablet computer may be able to detect the presence of the keyboard mount in addition to the keyboard sleeve mount, allowing the user to define desktop computer modes for that specific situation. In another embodiment, the sleeve may be too thick for the tablet to detect the presence of the keyboard mount 3850. In still another embodiment, the sleeve material may be thin enough that the tablet computer may receive power from the inductive charging plate incorporated into the keyboard mount.

Figure 39A:
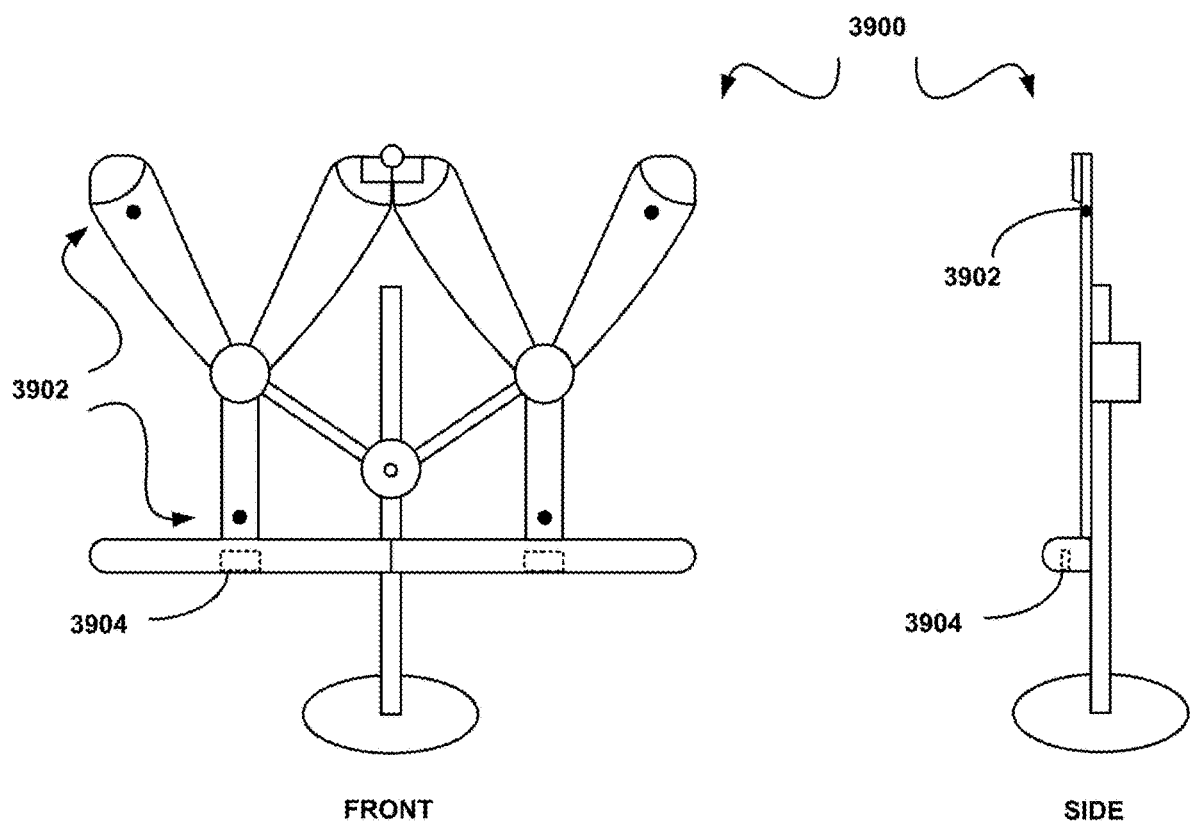
FIG. 39A shows a dual display mount apparatus in a portrait orientation, in accordance with one embodiment.

FIG. 39A shows a dual display mount apparatus 3900 for utilizing two tablet computers as a display device in a portrait orientation, in accordance with one embodiment. As an option, apparatus 3900 may be implemented in the context of the architecture and environment of the previous Figures or any subsequent Figure(s). Of course, however, the apparatus 3900 may be implemented in any desired environment. The aforementioned definitions may apply during the present description.

As shown, the dual display mount 3900 may be identifiable to a tablet computer. For example, in one embodiment, the dual display mount 3900 may include one or more magnets 3902 embedded within the body of the mount. The placement of the magnets may indicate to the tablet computer that it is in contact with a dual display mount. As an option, the placement of the magnets may allow the tablet computers to determine which side of the dual display mount they are in contact with. In another embodiment, the dual display mount 3900 may include an RFID tag encoded with at least a unique identifier and a mount type.

As shown, the dual display mount 3900 may be utilized to provide power to the two tablet computers. For example, in one embodiment, the dual display mount may incorporate tablet computer dock connectors 3904 to provide power and/or wired communication between the two tablet computers, as well as with other resources and devices. In another embodiment, the dual display mount may include inductive charging plates to provide power to the tablet computers.

FIG. 39B shows a dual display mount apparatus 3920 in a landscape orientation, in accordance with one embodiment. As an option, apparatus 3920 may be implemented in the context of the architecture and environment of the previous Figures or any subsequent Figure(s). Of course, however, the apparatus 3920 may be implemented in any desired environment. The aforementioned definitions may apply during the present description.

As shown, the dual display mount 3920 may allow the tablet computers to be utilized in more than one orientation. For example, in one embodiment, dual display mount 3920 may be placed in either a portrait orientation or a landscape orientation. In another embodiment, the mounted tablets may be rotated from one orientation to another without being removed from the dual display mount 3920. In still another embodiment, the dual display mount 3920 may be placed on an articulated arm to allow a user to further adjust the position of the mounted tablet computers.

Figure 39C:
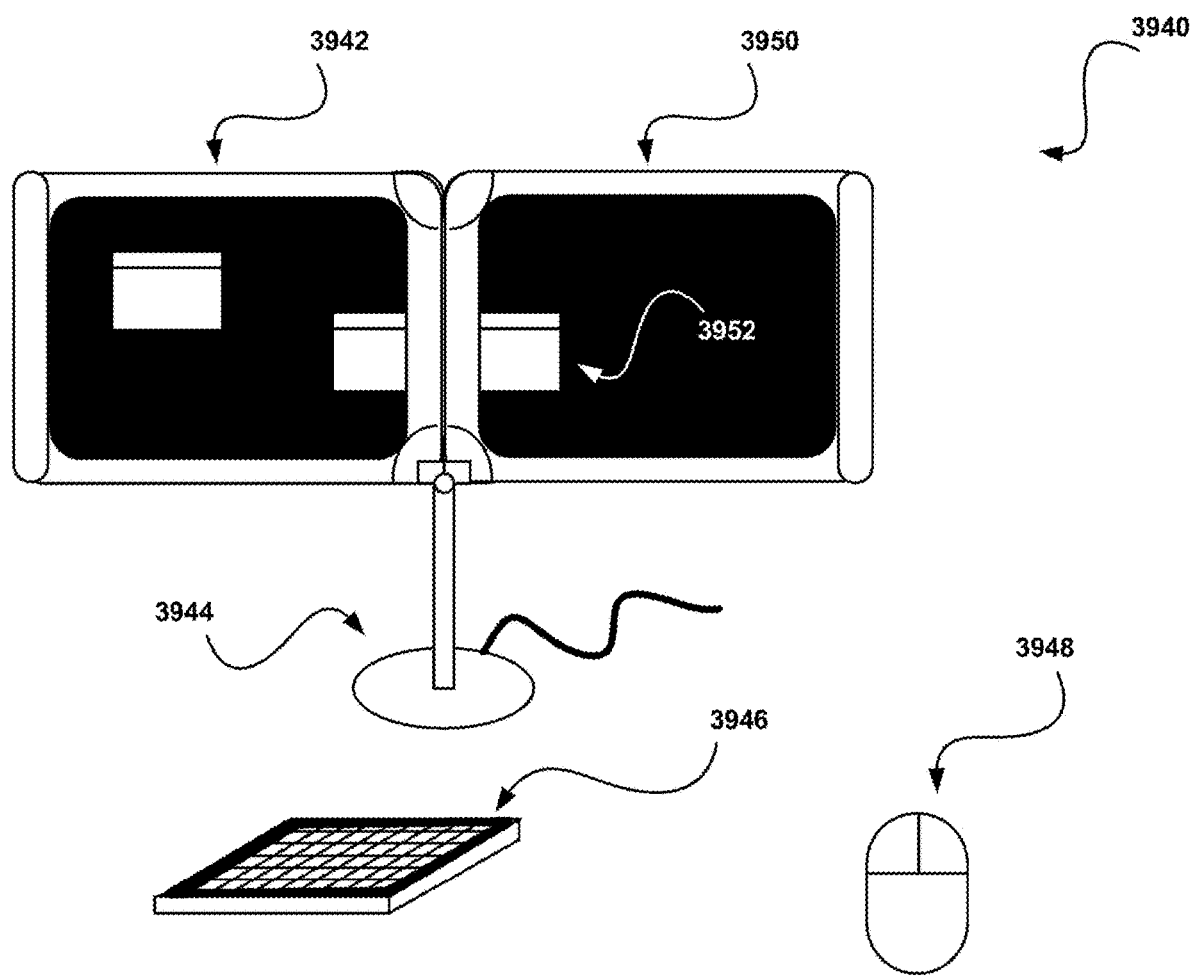
FIG. 39C shows a system for utilizing two tablet computers as a single display, in accordance with one embodiment.

FIG. 39C shows a system 3940 for utilizing two tablet computers as a single display, in accordance with one embodiment. As an option, system 3940 may be implemented in the context of the architecture and environment of the previous Figures or any subsequent Figure(s). Of course, however, the system 3940 may be implemented in any desired environment. The aforementioned definitions may apply during the present description.

In various embodiments, a tablet computer 3942 attached to a dual display mount 3944 may receive input from one or more other devices. For example, in one embodiment, the tablet computer 3942 may receive input through a wireless connection to a keyboard 3946. In another embodiment, the tablet computer 3942 may receive input through a wireless connection with a mouse 3948.

As shown, tablet computers 3942 and 3950 may be utilized together while mounted in dual display mount 3944. For example, in one embodiment, the touchscreen displays of both tablet computer may function as a single display, such that user interface window 3952 may span both displays.

While operating together as a single display, the two tablet computers may also share processing duties. In one embodiment, the processors of both tablet computers may operate together in a parallel fashion. In another embodiment, the tablets may have a master/slave relationship, with the master tablet computer performing all processing, and the slave tablet computer simply responsible to display the content it receives from the master tablet computer. In still another embodiment, the two tablet computers operate as separate computers which share a single set of input devices, such that when the cursor reaches the edge of one tablet display, it appears at the edge of the other tablet display, while still keeping active applications separated. As an option, passing input control from a first tablet computer to a second tablet computer also copies the contents of the clipboard. In this way, a user may copy or cut content from an application running in one tablet computer and pasting it into an application running on the second tablet computer.

In another embodiment, the previously mentioned dual display functionality may be available without use of a dual display mount. In still another embodiment, the previously mentioned shared processing functionality may be available when one or more tablet computer are used in a processor role.

Figure 40:
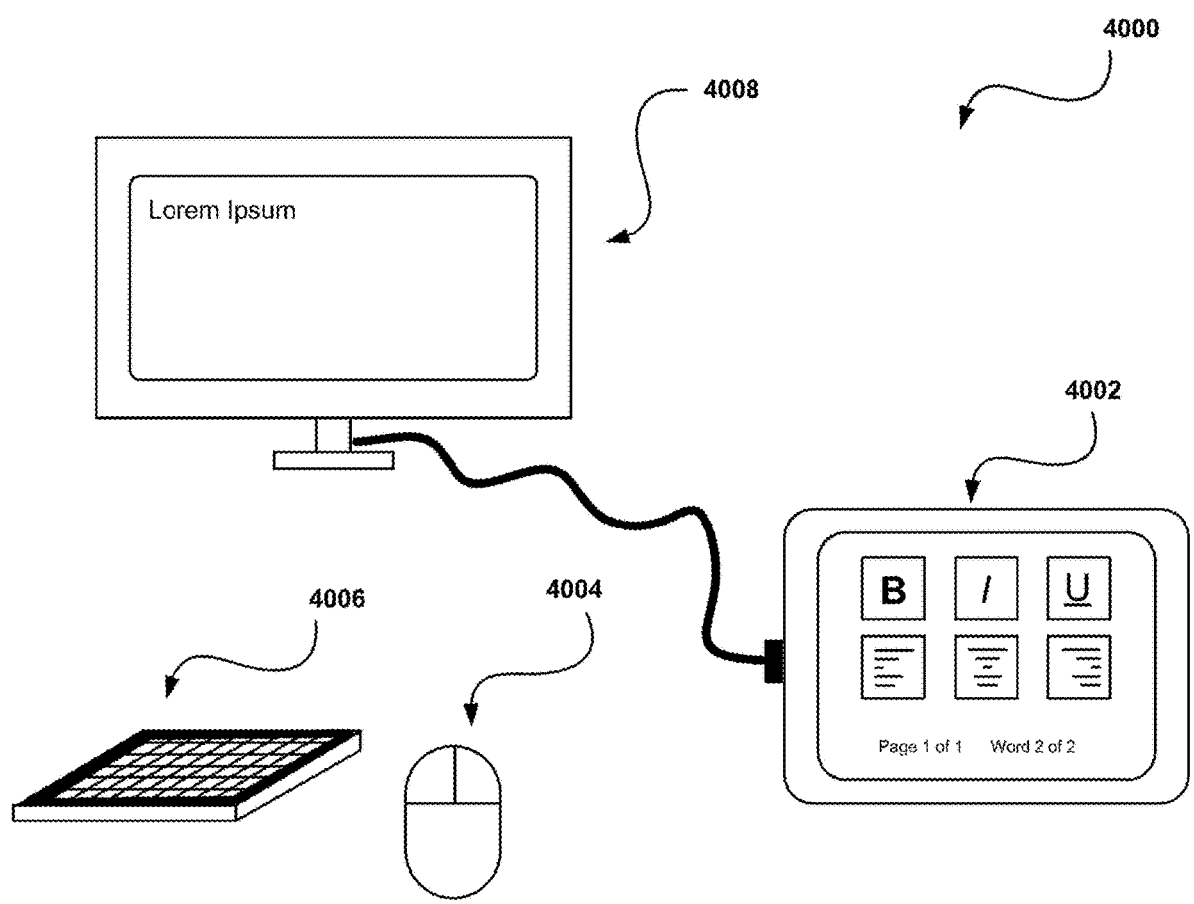
FIG. 40 shows a system for utilizing a tablet computer as a hybrid input device, in accordance with one embodiment.

FIG. 40 shows a system 4000 for utilizing a tablet computer as a hybrid input device, in accordance with one embodiment. As an option, system 4000 may be implemented in the context of the architecture and environment of the previous Figures or any subsequent Figure(s). Of course, however, the system 4000 may be implemented in any desired environment. The aforementioned definitions may apply during the present description.

In various embodiments, a tablet computer 4002 being utilized as a hybrid input device may receive input from, and provide output to, one or more other devices. For example, in one embodiment, the tablet computer 4002 may receive input from a mouse 4004 and a keyboard 4006 using wireless connections. In another embodiment, the tablet computer may provide graphical output to a computer display 4008, through a wired connection.

In various embodiments, a hybrid input device may serve as a dynamic source of input, being configured for specific applications. As a specific example, FIG. 40 illustrates a tablet computer running a word processing application while operating in a desktop computer mode. The tablet computer is being utilized as a hybrid input device. The availability of a hybrid input device has allowed the application to simplify the main user interface displayed on computer display 4008, allowing the user to focus on writing. The toolbars associated with the word processing application, as well as information such as word count and page number, are presented to the user through the tablet computer display.

A hybrid input device may be reconfigured by an active application, according to its needs, and according to one embodiment. For example, a graphics application may use the tablet computer to display tool bars, a color picker, and a means to navigate around an image. In another specific example, a game application may use the tablet computer to display special commands, a map, game statistics, and/or a user manual.

In one embodiment, applications must be preconfigured to take advantage of a hybrid input device. In another embodiment, the hybrid input device may display a generic interface when the active application was not configured to make use of a hybrid input device. In various embodiments, the generic interface may include, but is not limited to, an application launcher, a clock, a calendar, a social network update field, and/or system statistics. The system statistics may include, but are not limited to, operating temperature, available storage capacity, battery status, and/or any other metric associated with the operation of the tablet computer.

Figure 41A:
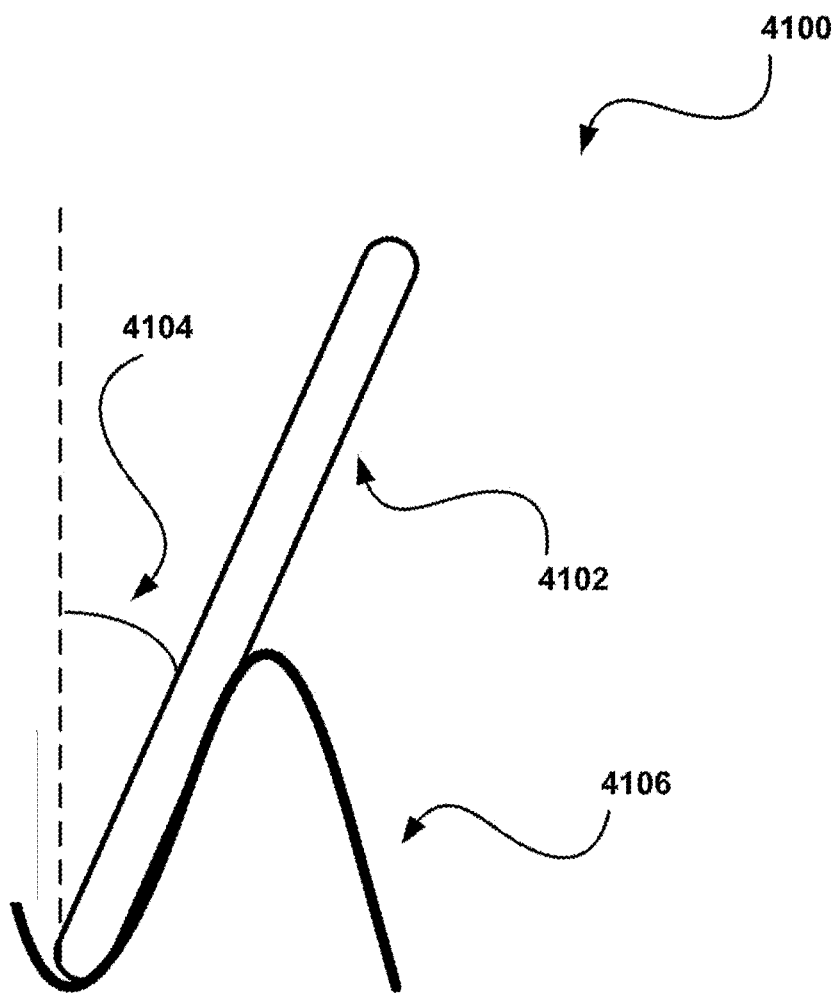
FIG. 41A shows a system for utilizing a tablet computer at a predetermined orientation and in a desktop computer manner, in accordance with one embodiment.

FIG. 41A shows a system 4100 for utilizing a tablet computer at a predetermined orientation, in accordance with one embodiment. As an option, system 4100 may be implemented in the context of the architecture and environment of the previous Figures or any subsequent Figure(s). Of course, however, the system 4100 may be implemented in any desired environment. The aforementioned definitions may apply during the present description.

One of the multiple ways in which a tablet computer may be utilized in a desktop computer manner is to maintain a predetermined orientation for a predetermined amount of time, in accordance with one embodiment. As shown, a tablet computer 4102 may be maintained in a predetermined orientation 4104 when used in conjunction with a mobile tablet stand 4106. In this way, a user may utilize a tablet computer in a desktop computer manner simply by placing it in a tablet stand which is easily portable.

Figure 41B:
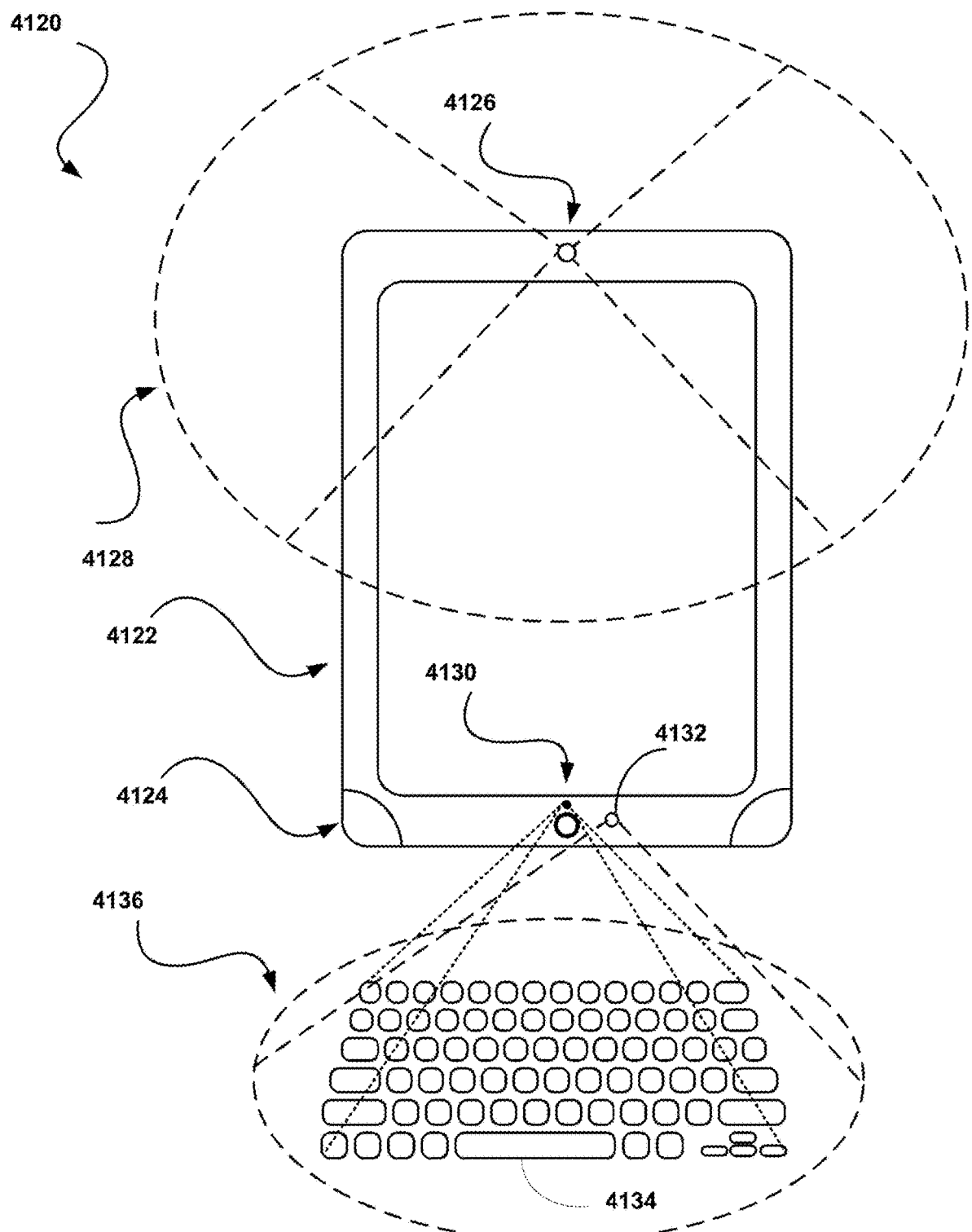
FIG. 41B shows a system for utilizing a tablet computer as a mobile desktop computer, in accordance with one embodiment.

FIG. 41B shows a system 4120 for utilizing a tablet computer as a mobile desktop computer, in accordance with one embodiment. As an option, system 4120 may be implemented in the context of the architecture and environment of the previous Figures or any subsequent Figure(s). Of course, however, the system 4120 may be implemented in any desired environment. The aforementioned definitions may apply during the present description.

As shown, a tablet computer 4122 held at a predetermined orientation by a tablet stand 4124 may receive input from the user which does not require physical contact. For example, in one embodiment, the tablet computer may be receptive to control gestures detected by a first built-in camera 4126 when executed within the volume of space 4128. As an option, a second built-in camera 4132 may be utilized to allow the tablet computer to perform stereoscopic gesture recognition (e.g. able to determine the distance from the tablet computer at which a control gesture is being performed, etc.). In this way, the set of distinct control gestures may be augmented with additional intuitive control gestures. As a specific example, a user may interact with a three dimensional object on the tablet computer display by moving their hands within the volume of space 4128.

In another embodiment, the tablet computer 4122 may be receptive to input from a projected laser keyboard 4134. In one embodiment, the laser projector 4130 may project a virtual keyboard 4134 onto a flat surface in front of the tablet computer. A user may type on the virtual keys as though they were physical buttons. The built-in camera 4132, which may be configured to monitor the volume 4136, may be used to determine the position of the user's hands with respect to the virtual keyboard, and translate the finger positions into keystrokes. In another embodiment, the tablet computer may also be equipped with a laser projector and camera on the long side, to provide the same functionality when the tablet computer is used in a landscape orientation.

Figure 42A:
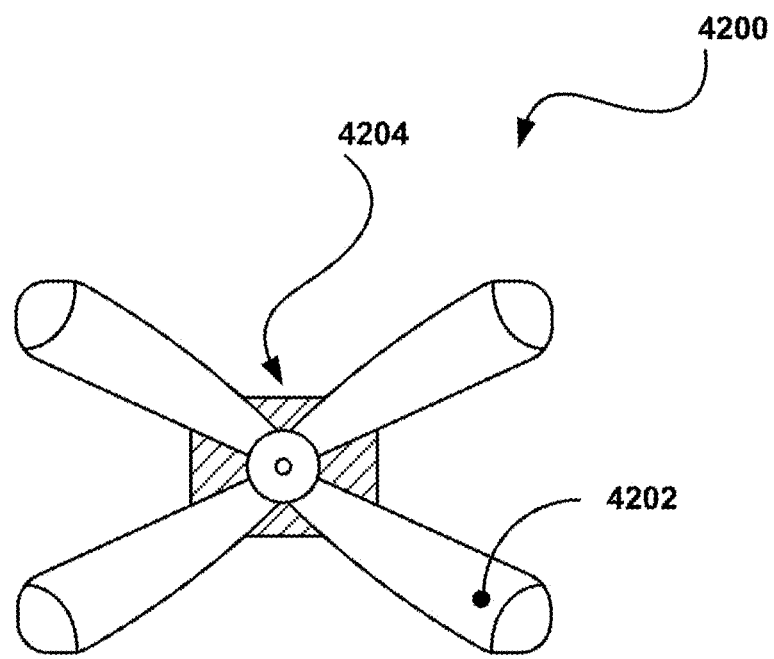
FIG. 42A shows a wall mount apparatus in a landscape orientation, in accordance with one embodiment.

FIG. 42A shows a wall mount apparatus 4200 in a landscape orientation, in accordance with one embodiment. As an option, apparatus 4200 may be implemented in the context of the architecture and environment of the previous Figures or any subsequent Figure(s). Of course, however, the apparatus 4200 may be implemented in any desired environment. The aforementioned definitions may apply during the present description.

As shown, the wall mount 4200 may be identifiable to a tablet computer. For example, in one embodiment, the wall mount 4200 may include one or more magnets 4202 embedded within the body of the mount. The placement of the magnets may indicate to the tablet computer that it is in contact with a wall mount. In another embodiment, the wall mount 4200 may include an RFID tag encoded with at least a unique identifier and a mount type.

As shown, the wall mount 4200 may be utilized to provide a mounted tablet computer with a connection to power and/or data sources. For example, in one embodiment, the wall mount 4200 may include an inductive charging plate 4204 for charging a tablet computer. In another embodiment, the wall mount 4200 may include a tablet computer docking connector to provide power and/or data to a mounted tablet computer.

Figure 42B:
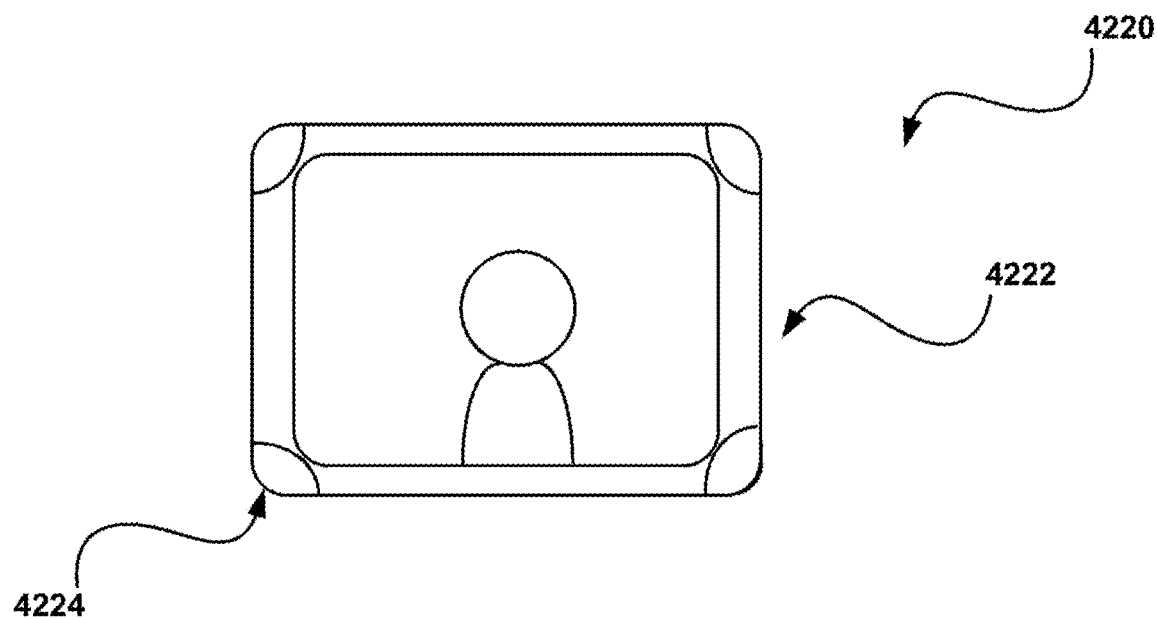
FIG. 42B shows a system for utilizing a tablet computer as a picture frame, in accordance with one embodiment.

FIG. 42B shows a system 4220 for utilizing a tablet computer as a picture frame, in accordance with one embodiment. As an option, system 4220 may be implemented in the context of the architecture and environment of the previous Figures or any subsequent Figure(s). Of course, however, the system 4220 may be implemented in any desired environment. The aforementioned definitions may apply during the present description.

A powered wall mount may provide a useful storage location for a tablet computer when not in use. As shown, a tablet computer 4222 may be mounted in a wall mount 4224. In one embodiment, the tablet computer may be utilized as a digital picture frame while mounted in the wall mount. In another embodiment, the tablet computer may be configured such that, upon placement in a wall mount, a slideshow begins automatically. In yet another embodiment, the user may configure what information is displayed once a tablet computer has been mounted in a wall mount. As an option, the tablet computer may be configured to retrieve photographs from a remote server or cloud storage service or device.

While functioning as a picture frame, a tablet computer 4222 may also be utilized as a server, providing access to files and resources localized on the tablet computer. In one embodiment, the tablet may be able to receive input from the user which does not require physical contact. For example, in one embodiment, the tablet computer may be receptive to control gestures and/or voice commands.

Figure 43:
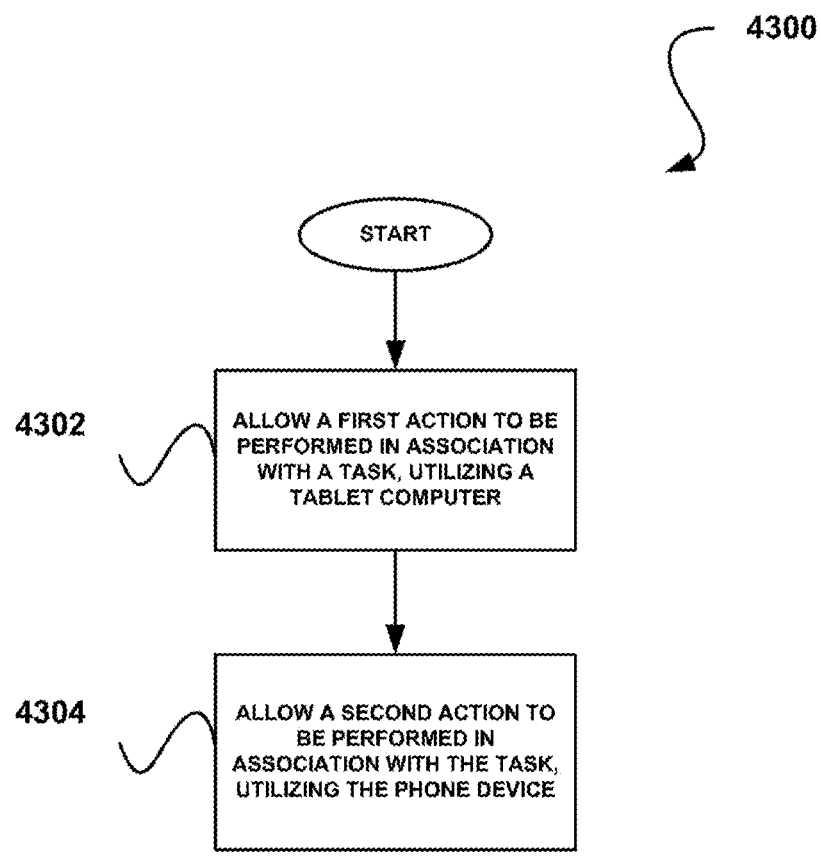
FIG. 43 shows a method for integrating a tablet computer and a phone device, in accordance with one possible embodiment.

FIG. 43 shows a method 4300 for integrating a tablet computer and a phone device, in accordance with one possible embodiment. As an option, the method 4300 may be implemented in the context of the architecture and environment of any subsequent Figure(s). Of course, however, the method 4300 may be carried out in any desired environment.

As shown, a first action to be performed in association with a task utilizing a tablet computer is allowed. See operation 4302. In the context of the present description, an action refers to any step or procedure that is performed. For example, in various embodiments, actions may include, but are not limited to, activating a camera, taking a picture, opening a document, controlling a peripheral device, writing comments, or any other action which is performed and/or is invoked by the user or a device. In some embodiments, these actions may be manually invoked by a user. In other embodiments, these actions may be invoked automatically by a device.

In the context of the present description, a task may refer to one or more functions. For example, a task may include executing a program, making a call, creating a document, using an application, taking a picture, or any other function or group of functions. Additionally, in the context of the present description, a tablet computer refers to any portable computer shaped and/or sized like a tablet. For example, in one embodiment, the tablet computer may include a personal digital assistant (PDA), a laptop personal computer with a rotatable touchscreen, a tablet (e.g. Apple i-pad, Microsoft Slate, etc.), and/or any other portable computer shaped and/or sized like a tablet. In another embodiment, the tablet computer may include a cellular phone, or any other mobile device. In one embodiment, the tablet computer may include a touch screen.

As shown, a second action to be performed in association with the task utilizing a phone device is allowed. See operation 4304. In the context of the present description, a phone device refers to any apparatus that is portable and provides telephonic functions. For example, in various embodiments, a phone device may include a cellular phone, smart phones, an IPHONE, a BLACKBERRY, a PDA, a hand held computer, a tablet computer, or any apparatus that is portable and may provide telephonic functions. In addition, in some embodiments, a phone device may include any device capable of receiving broadband access through a UTMS, CDMA, GSM EDGE, WIMAX, LIE, or LTE Advanced system, or any other mobile telecommunication broadband system.

In one embodiment, the phone device may include a device with cellular phone capabilities. In another embodiment, the phone device may include a short-range wireless communication protocol headset. In the context of the present description, short-range wireless communication protocol headset may refer to any wireless protocol that functions at a short-range. For example, in one embodiment, the short-range wireless communication protocol may include Wireless USB, Bluetooth, Wi-Fi, or any other wireless protocol which may function at a short-range.

In one embodiment, the short-range wireless communication protocol headset may be capable of being used to receive voice commands in association with the tablet computer. In another embodiment, the short-range wireless communication protocol headset may be capable of being used to receive voice dictation in association with the tablet computer. In a further embodiment, the task may include data communication over a network, and the first action and the second action may involve a collaboration of network or processing resources of the phone device and the tablet computer.

In one embodiment, it may be determined whether the task is being resumed utilizing the phone device, such that the second action is allowed to be performed in association with the task, if it is determined that the task is being resumed utilizing the phone device. For example, in one embodiment, a document may be created on a tablet device, and when subsequently opened on the phone device, a prompt may be given to the user asking if the document was to be resumed. Of course, any program or function may be started on a tablet device and subsequently resumed on a phone device. Additionally, any function may be used to determine if a task if being resumed utilizing the phone device. For example, a prompt requesting user feedback may be given, a device id may be verified, a screen resolution may be used to determine the type of device being used, or any other software or hardware mechanisms may be used to determine if the task is being resumed utilizing the phone device.

In another embodiment, the task may include presenting a presentation utilizing the phone device that includes a projector, and the first action includes receiving a projector control command and the second action includes displaying output utilizing the projector based on the projector control command. In the context of the present description, a projector control command may refer to any directive that controls a projector. For example, in various embodiments, a projector control command may include activating, shutting down, sleeping, focusing, zooming, and/or any other directive that controls a projector.

In one embodiment, the task may include collaboratively utilizing the tablet computer and the phone device as a desktop computer, and the first action may include receiving a gesture command utilizing the phone device and the second action may include displaying an output utilizing the tablet computer based on the gesture command. In the context of the present description, a gesture command may refer to any command associated with a gesture. For example, in one embodiment, a user may draw a circle or an arrow on a screen which may allow for functions such as zooming, bringing up a preset location or application. Of course, any gesture may be used to invoke any function. In one embodiment, a gesture command may be preconfigured to invoke a function. In another embodiment, a gesture command may be configured at run-time. For example, after completing a gesture, a list of possible commands may be displayed to the user which may be selected.

In another embodiment, the task may include receiving input utilizing the phone device, processing the input utilizing the tablet computer, and displaying output based on the processing utilizing the tablet computer, and the first action may include receiving a gesture command utilizing the phone device and the second action may include displaying output utilizing the tablet computer based on the gesture command.

In some embodiments, the task may include utilizing an application accessible utilizing the tablet computer and the phone device, and the first action includes initiating the task with the application utilizing the tablet computer and the second action includes continuing with the already-initiated task with the application utilizing the phone device. In the context of the present description, an already-initiated task refers to a task which had been previously begun. In one embodiment, the already-initiated task may be accessed by executing the application utilizing the phone device and subsequently selecting the task with the executed application.

In another embodiment, upon selection of the task, a state of the application in connection with the tablet computer, may be utilized to continue with the already-initiated task with the application utilizing the phone device. In the context of the present description, a state of the application refers to data relating to an application which is retrieved.

In some embodiments, the task may include a video conference, and the first action may include initiating the task with the phone device and the second action may include providing video communication in association with the video conference utilizing a camera and a display of the tablet computer. For example, in one embodiment, the phone device may be capable of being used to generate a secondary video feed in association with the video conference. In another embodiment, the phone device may be capable of being used to generate a still picture that is capable of being shared in association with the video conference. In still another embodiment, the phone device may be capable of being used to generate an audio feed in association with the video conference.

Of course, the various embodiments set forth herein may be implemented utilizing hardware, software, or any desired combination thereof. For that matter, any type of logic may be utilized which is capable of implementing the various functionality set forth herein.

More illustrative information will now be set forth regarding various optional architectures and features with which the foregoing techniques discussed in the context of any of the present or previous figure(s) may or may not be implemented, per the desires of the user. For instance, various optional examples and/or options associated with allowing a first action to be performed in association with a task utilizing a tablet computer 4302, allowing a second action to be performed in association with the task, utilizing a phone device 4304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

As an option, the aforementioned mobile device may be capable of operating in a location-specific mode. Specifically, in one embodiment, a location associated with the mobile device may be determined. Further determined may be a presence of at least one other person at the location. Still yet, a graphical user interface may be automatically displayed. Such graphical user interface may be specifically associated with the determined location and the determined presence of the at least one other person. In another embodiment, the system, method, or computer program product may be capable of determining a location associated with the mobile device and automatically determining that the location is proximate to a previously identified item of interest. To this end, a graphical user interface associated with the determined location and the previously identified item of interest may be displayed. More information regarding such location-specific features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

Figure 44:
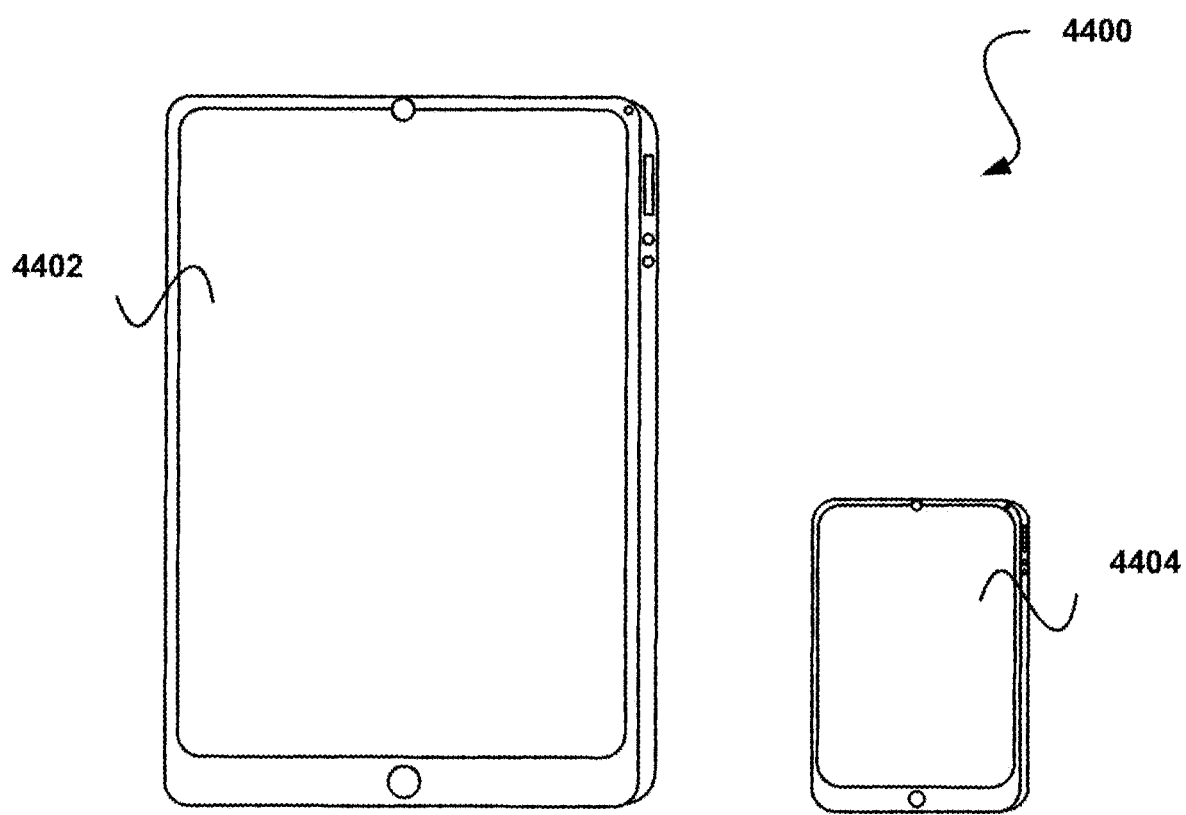
FIG. 44 shows a system for integrating a tablet computer and a phone device, in accordance with one possible embodiment.

FIG. 44 illustrates a system 4400 for integrating a tablet computer and a phone device, in accordance with one possible embodiment. As an option, the system 4400 may be implemented in the context of the architecture and environment of the previous Figures or any subsequent Figure(s). Of course, however, the system 4400 may be carried out in any desired environment. It should also be noted that the aforementioned definitions may apply during the present description.

As shown, a tablet computer 4402 may be included. Additionally, a phone device 4404 may be included.

In one embodiment, the tablet computer and the phone device may communicate by various techniques. For example, in one embodiment, the tablet computer and the phone device may communicate wirelessly, using such protocols as, for example, Wireless USB, Bluetooth, Wi-Fi, near-field, or any other wireless protocol. Additionally, in one embodiment, the tablet computer and the phone device may communicate by an external connector. For example, the tablet computer and the phone device may communicate by a serial, parallel, USB, or any other port which may be used to transfer data and/or used for communication between two devices. Additionally, in a further embodiment, any type of interface card may be used for communication between the tablet computer and the phone device.

In another embodiment, the tablet computer and the phone device may communicate automatically or manually. For example, in one embodiment, a device may include a communication switch or physical button by which communication is established with another device. Additionally, an application may be used to establish communication between the two devices. Of course, any manual technique may be used to establish communication between the two devices.

In another embodiment, a tablet computer may establish communication with a phone device automatically. For example, after the two devices are connected, communication may automatically be exchanged. In one embodiment, such exchange may be based on preconfigured settings.

In one embodiment, the tablet computer and the phone device may establish connection wirelessly. For example, the tablet computer and the phone device may connect by a listen process. In one embodiment, after a device is connected to a wireless communication system, the device may enter a listen state wherein the device listens in the common frequency sequence, which periodically changes frequency. When in listen state, if a request to send a signal is received from another device, the device may enter a receive state. Included in receive state may be a state for sending a clear to send signal. After the clear to send signal is sent, the device may default to a state for receiving data in the designated channel. If no data is received, the device may revert to the listen state. If data is received, then the device may enter a state for sending an acknowledgement ACK. The device may then default back to the listen state.

While in the transmit state, the device may enter a carrier sense state. In the context of the present description, a carrier sense state may refer to sensing whether the carrier (i.e. the current frequency in the common frequency sequence) is busy or free. If the carrier is busy, the device may enter a back off state. In the context of the present description, a back off state may refer to a temporary state based off of a timer. In one embodiment, a device may revert to the listen state until the back off timer expires or a request to send (RTS) event occurs. If, instead, the carrier is free, the device may enter a send state for sending a RTS signal to another peer device. The device may listen for a clear to sent signal. If a clear to sent signal is received, then the device may enter another send state for sending data. After data is sent, the device may listen for an acknowledgement (ACK) that the data was received. If no clear to sent signal is received, the device may enter the back off state, may set the back off timer, and may revert to the listen state. After data is sent, if an ACK signal is received, the device may erase the transmission buffer, and may default back to the listen state. If no ACK signal is received, the transmission buffer may not be cleared, and the device may revert to the listen state and may increment a retry limiter counter associated with that transmit buffer. If the limited retries are exceeded, the buffer may be cleared and an internal error may be noted. Of course, any method may be employed by which the computer tablet and the phone device may communication.

In another embodiment, the tablet computer and the phone device may establish a wired connection. For example, the tablet computer and the phone device may be connected by an Ethernet cord, a port connecting the two devices, an USB cable, or any other physical technique which may be used to connect the tablet computer and the phone device.

In another embodiment, the tablet computer and the phone device communicate via a peer-to-peer protocol. In the context of the present description, a peer-to-peer protocol may refer to a distributed application architecture that partitions tasks or workloads between peers. For example, wireless devices within range of each other may discover and may communicate directly without involving central access points. In another embodiment, a bridge may function as a connection point for a peer-to-peer protocol. Of course, any other technique may also be used to discover and foster communication between two devices.

In one embodiment the peer-to-peer protocol system may be configured to provide visibility to only users on one or more identified networks thereby precluding access to users residing outside the identified LANs. Additionally, such access restrictions may be enforced by firewalls or via the private network configuration, for example. Additionally, any other security mechanism may be used to protect and secure the network by which the tablet computer and the phone device communicate.

In a further embodiment, a relative position may be determined of the tablet computer and the phone device, and at least one of the tablet computer and the phone device may be operated in a predetermined mode based on the determined relative position. Additionally, computer code may be included for determining a relative position of the tablet computer and the phone device, and operating at least one of the tablet computer and the phone device in a predetermined mode based on the determined relative position. For example, in one embodiment, when a phone device is brought within a set distance of a tablet computer, the phone device may automatically operate as a projector. In another embodiment, when a phone device is brought within a set distance of a tablet computer, the phone device may automatically operate as a keyboard to the tablet computer. Of course, in one embodiment, the tablet computer and the phone device may each be preconfigured to operate in any mode based on the relative position.

Figure 45:
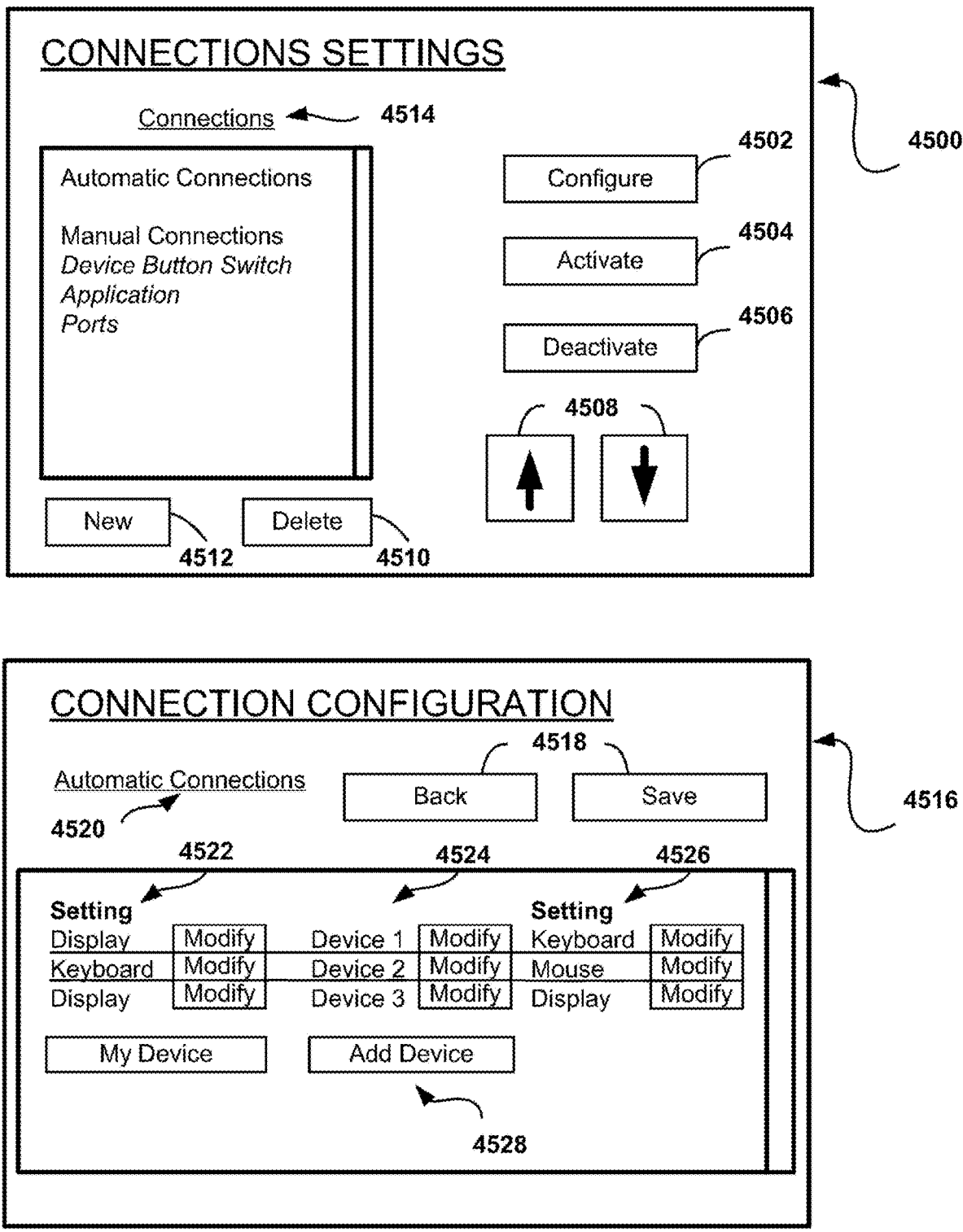
FIG. 45 shows a user interface for configuring connection settings, in accordance with one possible embodiment.

FIG. 45 shows a user interface for configuring connection settings, in accordance with one possible embodiment. As an option, the user interface 4500 may be implemented in the context of the architecture and environment of the previous Figures or any subsequent Figure(s). Of course, however, the user interface 4500 may be carried out in any desired environment. It should also be noted that the aforementioned definitions may apply during the present description.

As shown, a first user interface 4500 may be used to select a connection type 4514, to configure the selection 4502, to activate the selection 4504, to deactivate the selection 4506, to delete a selection 4510, and/or to create a connection 4512.

In one embodiment, the connection interface may automatically list all available connections (e.g. network based, application based, ports, cables, etc.). Further, applications on the device may be used to scour networks, listen for devices, and collect and list any potential connections. In another embodiment, the list of connections may be manually populated by adding each new connection (e.g. setup for every connection type, etc.).

As shown, selection arrows 4508 may be used to select the appropriate connection. Of course, any method may be used to select the connection. In one embodiment, the user may select the connection by touch (e.g. touch the connection text to select, etc.). In another embodiment, the user may use a stylus, pen, or a potentially conductive material to select the connection.

In one embodiment, the user may activate and/or deactivate a connection automatically. For example, in one embodiment, when a second device is brought within a preconfigured geographic proximity of a first device, the first device may automatically establish a connection with the second device (or the second device may automatically establish a connection with the first device). Additionally, if a first device is attached to a second device (e.g. by a hinge, slot, or some other attachment, etc.), communication may automatically be established between the two devices. In another embodiment, any attachment connected between two devices (e.g. cord, etc.) may automatically trigger a connection between the devices. Further, in some embodiments, a connection may be automatically disconnected by removing a cord, moving a second device away to a pre-configured geographic proximity of a first device, removing a second device from an attachment on a first device, and/or any other method may be used to automatically disconnect a connection between two devices. In other embodiments, an activation (e.g. execution, power-up, etc.) of the second device may prompt the aforementioned connectivity with the first device. In still additional embodiments, detection of an event via the second device may prompt the aforementioned connectivity.

In other embodiments, the user may activate and deactivate a connection manually. For example, in one embodiment, a user may first connect a cord between two devices, and thereafter establish a connection. In some embodiments, the connection may be activated through an application (e.g. an application to share information, a collaboration application, etc.). In other embodiments, the connection may be activated through a connection settings interface (e.g. select an available connection and activate, etc.). Of course, any method may be used to manually establish a connection between two devices. Additionally, although the above examples have illustrated activating and/or deactivating a connection between a first device and a second device (automatic and manual), any number of devices and connections may, in like manner, be activated and/or deactivated.

Further, in one embodiment, the user may wish to activate and deactivate a connection manually to preserve privacy and security. For example, in some embodiments, a phone device may be used in a financial institution where a manual connection between a phone device, operated by the user, and a tablet computer, operated by the financial institution, may be used to transfer, deposit, or otherwise manipulate a user's funds. Additionally, such a connection may provide greater interaction between the financial institution and a user (e.g. send live quotes, project financial analysis, etc.). In another embodiment, a parent may wish to activate and deactivate a connection manually to limit a child's access to the Internet. For example, in some embodiments, a phone device, operated by a child, may be used to access the Internet by manually connecting to a tablet computer, operated by a parent. Such a connection may permit a parent to monitor, actively control, and potentially even limit, a child's access to the Internet. Of course, a connection between a tablet computer and a phone device may be used in any manner and with respect to any application.

As shown, after selecting to configure a connection, a user interface 4516 may be used to modify connection settings. While user interface 4516 is shown in a single interface, in other embodiments, each of such connection settings may be separately established, maintained, managed, etc. by separate applications that require or benefit from such device connections.

In one embodiment, the user interface may be used to configure connection settings for automatic connections (e.g. 4520, etc.). In other embodiments, the user interface may be used to configure connection settings for manual connections, application connections, and/or any other type of connection.

As shown, settings associated with a user's device 4522, settings associated with another device 4526, and a list of other devices with which a connection has been or may be established 4528, may be included on the user interface.

In one embodiment, the connection configuration list connection settings row by row. For example, on one row, the user's device setting may be displayed and modified, the associated device may be displayed and modified, and the associated device's setting may be displayed and modified. The next row may include settings relative to the user's device and another device. In various embodiments, the user's device and another device may be set to act as a display, a keyboard, a mouse, a video conference interface, a calculator, a scanner, a painting device, a speaker system, and/or any other type of function that may be preconfigured on either device. As such, in some embodiments, connections between devices may be modified, configured, and saved.

As shown, "add device" 4528 may be included on the user interface. In one embodiment, upon selection of "add device," the device may initiate a setup wizard to locate or specify a device location (e.g. utilizing an IP address, Bluetooth connection, etc.) as well as corresponding settings for both the user device and the added device. Of course, an advanced setup interface (e.g. input directly by the user, etc.) may also be used to add additional devices, or any other method may be employed to input new devices and associated settings.

As shown, the user interface may include navigation buttons 4518. In one embodiment, the navigation buttons may include "back" for going to the prior page (e.g. connection settings page, etc.) and/or "save" to implement any changes that may have occurred on the connection configuration user interface page. Of course, any type of button may be included to facilitate navigation of the user interface and may be preconfigured for a specific function. In another embodiment, the user interface may automatically save any changes and/or modifications set by the user, as well as may rely on hardware designs (e.g. a set "back" button, etc.) to facilitate navigation.

In various embodiments, the settings entered utilizing the user interface of FIG. 45 may be automatically synchronized with other devices that are pre-configured to collaborate with the user device. For example, if a newly added first row of settings involves the user device and a first other device that is pre-configured to operate with the user device, such newly added first row of settings would be synchronized with the first other device, such that a similar interface associated with the first other device would show such configuration, etc. Similarly, if a newly added second row of settings involves the user device and a second other device that is pre-configured to operate with the user device, such newly added second row of settings would be synchronized with the second other device, such that a similar interface associated with the second other device would show such configuration, etc. Conversely, if a newly added row of settings using a similar interface on a third device (and such settings involve the user device, and the third other device is pre-configured to operate with the user device), such newly added row of settings would be synchronized with the user device, such that the corresponding interface associated with the user device would show such configuration, etc. To this end, a user of multiple devices may configure each of them using any one or more of such devices and such settings propagate accordingly.

Further, in various embodiments, the user may create multiple modes/roles for each of a plurality of devices (each represented by one of the aforementioned row of settings). To this end, a user's phone or tablet device may serve as a gesture mouse or keyboard in connection with a work computer/tablet in a first mode/role; may serve as a projector in connection with and under the control of a different tablet in a second mode/role; may serve as a remote control for a user's television in a third mode/role; may serve as a control interface for a user's vehicle in a fourth mode/role; may serve as a control interface for an array of home appliances in a fifth mode/role; etc.

Figure 46:
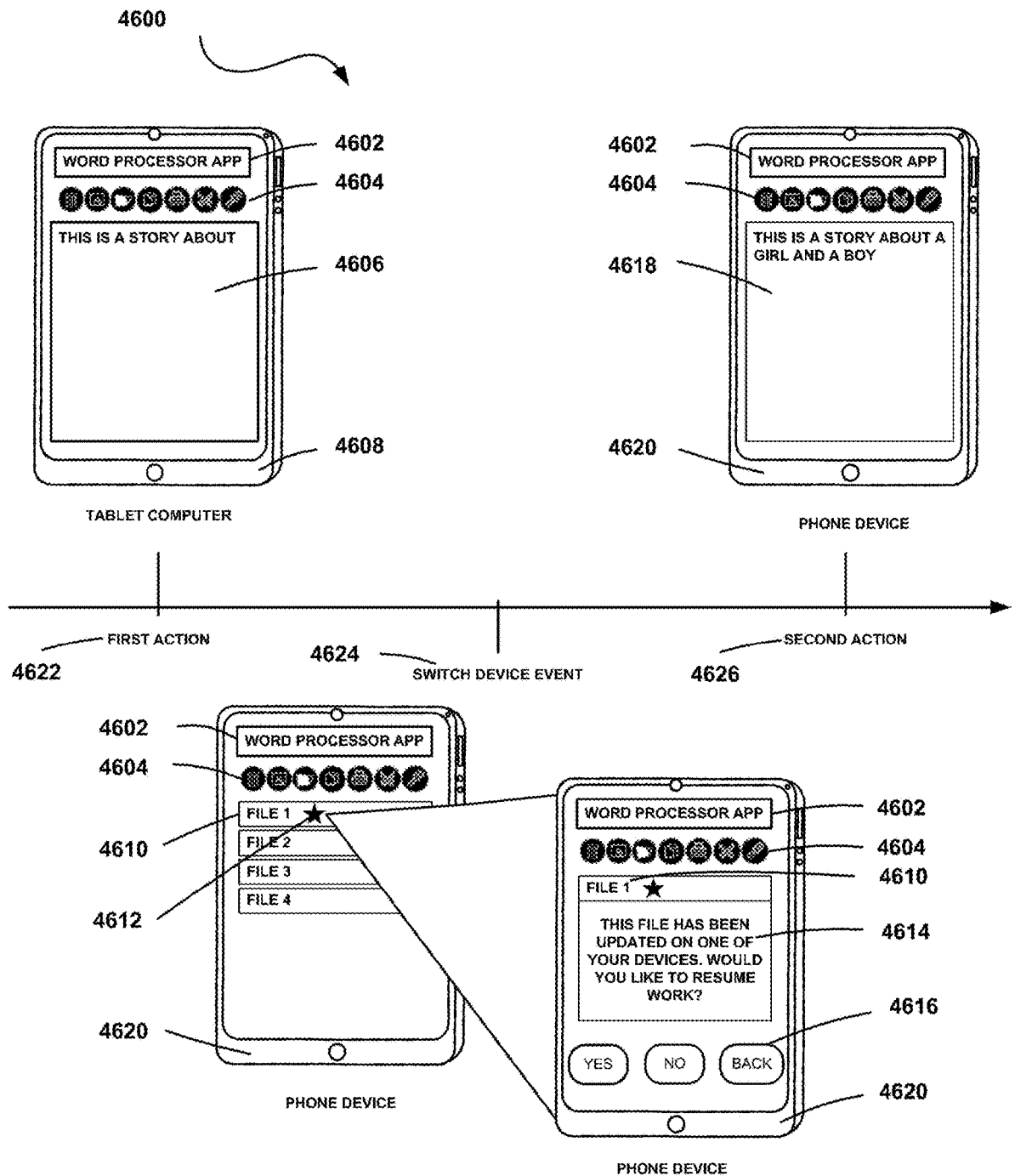
FIG. 46 shows a timeline for integrating a tablet computer and a phone device, in accordance with one possible embodiment.

FIG. 46 shows a timeline 4600 for integrating a tablet computer and a phone device, in accordance with one possible embodiment. As an option, the timeline 4600 may be implemented in the context of the architecture and environment of the previous Figures or any subsequent Figure(s). Of course, however, the timeline 4600 may be carried out in any desired environment. It should also be noted that the aforementioned definitions may apply during the present description.

As shown, a tablet computer 4608 may be included. Additionally, a phone device 4620 may be included.

As shown, an application 4602 may be included. In one embodiment, the application may include a word processing application, a camera, a sharing platform, a game, and/or any application which may include saving data. In another embodiment, the application may allow for joint collaboration between more than one user and more than one device. For example, multiple users may work together on a single document, with the collaborative document shown on each of the user's devices. In the present exemplary embodiment, the application 4602 is shown to include the word processing application.

As shown, a control panel 4604 may be included. In one embodiment, the panel may include a button for discarding, saving, opening, copying, printing, cutting, settings, and/or any other button which may be used to control some function of the application. Of course, any button may be configured to any function. In another embodiment, the control panel may include functions for controlling some aspect of another device. For example, the panel may include a button for zooming the camera lens, taking a photo, displaying an image, rearranging the display on another device, disabling the device, and/or any other function which may be used to control some aspect of another device.

As shown, an original document 4606 contains inputted text. In one embodiment, the text may be inputted by a variety of sources. For example, in one embodiment, a phone device or another tablet may function as a keyboard for inputting the text. In another embodiment, a physical, digital, or projected keyboard may function for inputting the text. In a further embodiment, a microphone (i.e. speech-to-text) may be used to input text. Of course, any other device and/or technique may be used to input text.

As shown, a first action 4622 may be allowed. In various embodiments, a first action may include activating a camera, taking a picture, editing a document, controlling a peripheral device, writing comments, or any other procedure which is performed having been invoked by the user. In some embodiments, these actions may be manually invoked by a user. In other embodiments, these actions may be invoked automatically by a device. In another embodiment, the first action may include saving data. For example, after saving the data, the application may be later reopened on another device and resumed from the saved state.

As shown a switch device event 4624 may be detected. In the context of the present description, a switch device event may include any event where a saved state may be resumed on another device. For example, in one embodiment, a document may have been created, edited, and saved. Such a document may then be subsequently opened on another device and resumed from the point at which the document had been closed on the first device. In another embodiment, the saving of the state of the application may be automatic or manual. Of course, any state may be saved and resumed on another device.

As shown, a phone device 4620 may be included. Of course, any apparatus that is portable and provides telephonic functions may be used as a phone device. For example, in various embodiments, a phone device may include a cellular phone, smart phones, an IPHONE, a BLACKBERRY, a PDA, a hand held computer, a tablet computer, or any apparatus that is portable and may provide telephonic functions.

As shown, a collection of saved files 4610 may be displayed to a user utilizing the phone device 4620. In one embodiment, the saved files on the application may be displayed in a list. Of course, the view may be modified and preconfigured in any manner. In another embodiment, the view of the saved files may be displayed based on the device that accesses the files. For example, in one embodiment, a device with a smaller screen may display only the first few words of text of the file, whereas with a device with a larger screen, the entire name of the file may be displayed. Additionally, in another embodiment, the saved files may be arranged to facilitate easy selection. For example, a file name may be displayed as a link, or the file name may be enclosed within any type of surrounding to facilitate selection.

As shown, a marking 4612 may be displayed as well. In one embodiment, the marking may be used to designate if a file has been updated since the last time the application was opened. Of course, the marking may include a star, a tab, or any other marking. In another embodiment, no marking may be used. Instead, in one embodiment, the text may be bolded to show that a file has been updated. In another embodiment, a photo file may be displayed in a yellow frame to show that it has been updated. Of course, any manner may be used to signify that a file or application data has been updated (and potentially by which of a plurality of devices).

As shown, a prompt 4614 may be included. In one embodiment, after selecting a "file 1," a prompt may state, "This file has been updated on one of your devices. Would you like to resume work?" Of course, any prompt may be given to a user requesting if it is desired to resume work on saved data. For instance, the last one or more devices that were used to update the corresponding file or application data may be identified. In another embodiment, a prompt may not be given. For example, a user may preconfigure settings so that work may be resumed without being prompted.

As shown, an application may receive user feedback 4616. For example, a user may indicate whether it is desired to resume work by selecting an appropriate button in the form of "yes," "no," or "cancel." Of course, the application may be programmed to receive the feedback in any manner. For example, a sensor may be used to scan a user's fingerprint and implement preconfigured settings, including automatically selecting a pre-selected button. In another embodiment, the application may further request a form of security clearance before resuming work. For example, a user may need to enter a password, scan a finger, take a photo image, and/or use any other technique to verify a user's identity.

As shown, a second action 4626 may be allowed. In various embodiments, a second action may include further using a camera, altering a picture, editing a document, further controlling a peripheral device, writing additional comments, or any other procedure which is performed using any type of saved data and/or application state. Of course, any additional second action may be performed.

As shown, resumed work 4618 may be included. For example, a document may receive further text input in addition to that which was saved prior to the switch device event. In one embodiment, any alteration may be made to the saved data. For example, a photo may be cropped and adjusted (i.e. contrast, brightness, etc.), a game may be further played, a to-do list may be updated, and/or any file and/or application may be accessed, adjusted, and/or updated.

Figure 47:
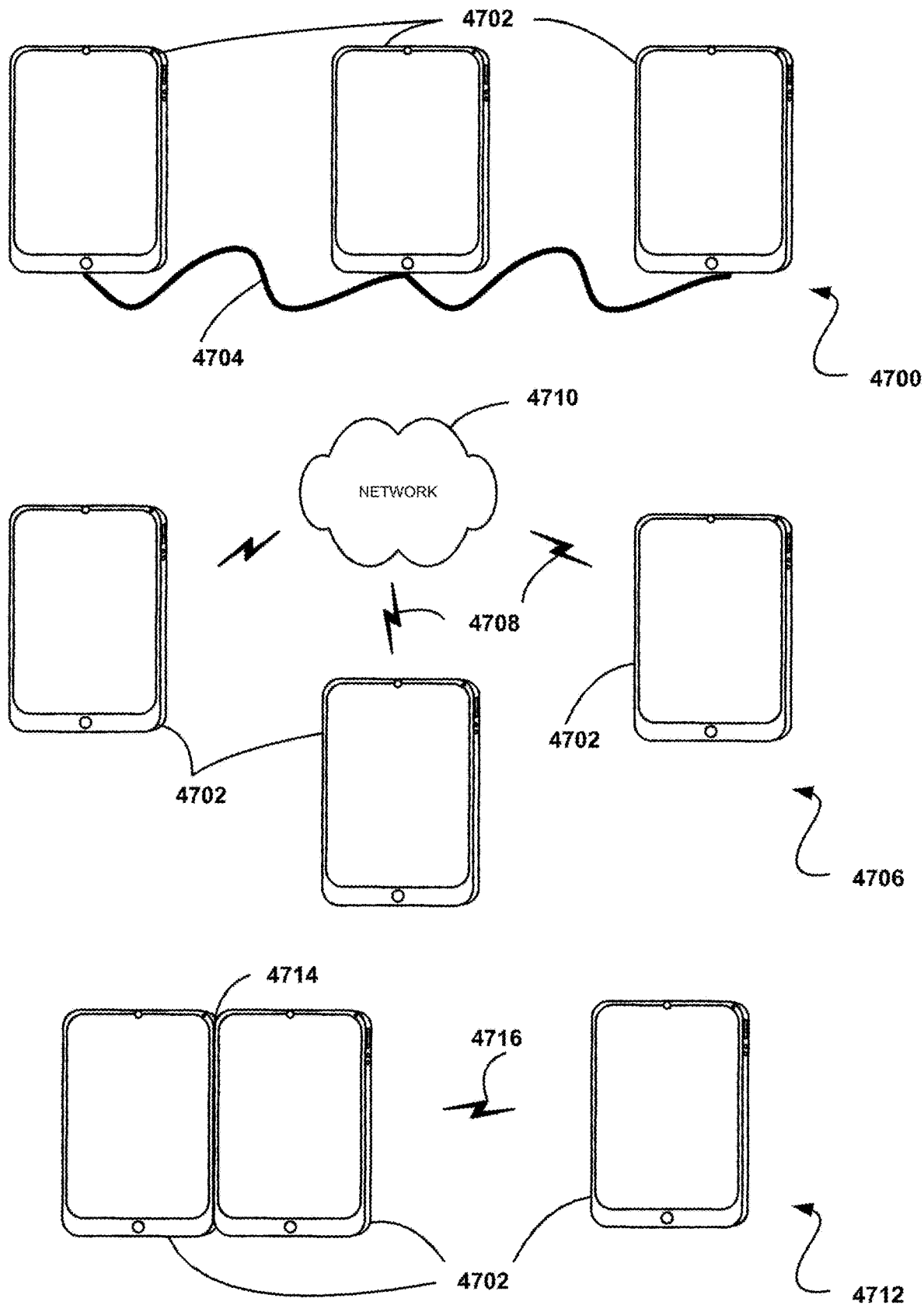
FIG. 47 shows systems used for connecting a tablet computer and a phone device, in accordance with one possible embodiment.

FIG. 47 shows systems 4700, 4706, and 4712 for connecting a tablet computer and a phone device, in accordance with one possible embodiment. As an option, the systems 4700, 4706, and 4712 may be implemented in the context of the architecture and environment of the previous Figures or any subsequent Figure(s). Of course, however, the systems 4700, 4706, and 4712 may be implemented in any desired environment. It should also be noted that the aforementioned definitions may apply during the present description.

As shown, two or more devices 4702 may be included. In one embodiment, the first device may be a tablet computer and the second device may be a phone device. Additionally, any additional device connected to the tablet computer or the phone device may be a tablet computer, a phone device, any device (e.g. peripheral, etc.) which is portable and has a touchscreen, or any other device.

As shown, a cord 4704 may be used to connect the two or more devices. In one embodiment, the cord (e.g. USB, firewire, etc.) may be used to connect the devices. Of course, any type of physical connector may be used to connect the two or more devices.

As shown, a wireless connection 4708 may be used to connect the two or more devices. In one embodiment, the two or more devices may use a wireless connection to connect to a network (e.g. 4710, internal network system, internet, etc.) by which the devices may then communicate and connect.

In one embodiment, the network may include a local wireless communications network (e.g. WiFi, wireless LAN, etc.). In some embodiments, the device may first need to login to a central station (e.g. router, hub, etc.) and thereby gain access to the network. Gaining access to the network may permit the device to then establish communication with another device logged into the network. Additionally, the connection via the network may have a relatively large bandwidth, such that a relative large amount of data can be exchanged in a short time. Further, any number of devices may connect to the network and thereby establish a connection to other devices.

As shown, a wireless connection 4716 may also be used to connect the two or more devices. In one embodiment, the devices may rely on a short-range communication (e.g. Bluetooth, Near Field Communication, ZigBee, etc.) to establish communication between two or more devices. In various embodiments, any number of devices may use short-range communication to establish communication (e.g. with the first and/or second device, and/or between all devices within short-range) between devices.

Figure 48:
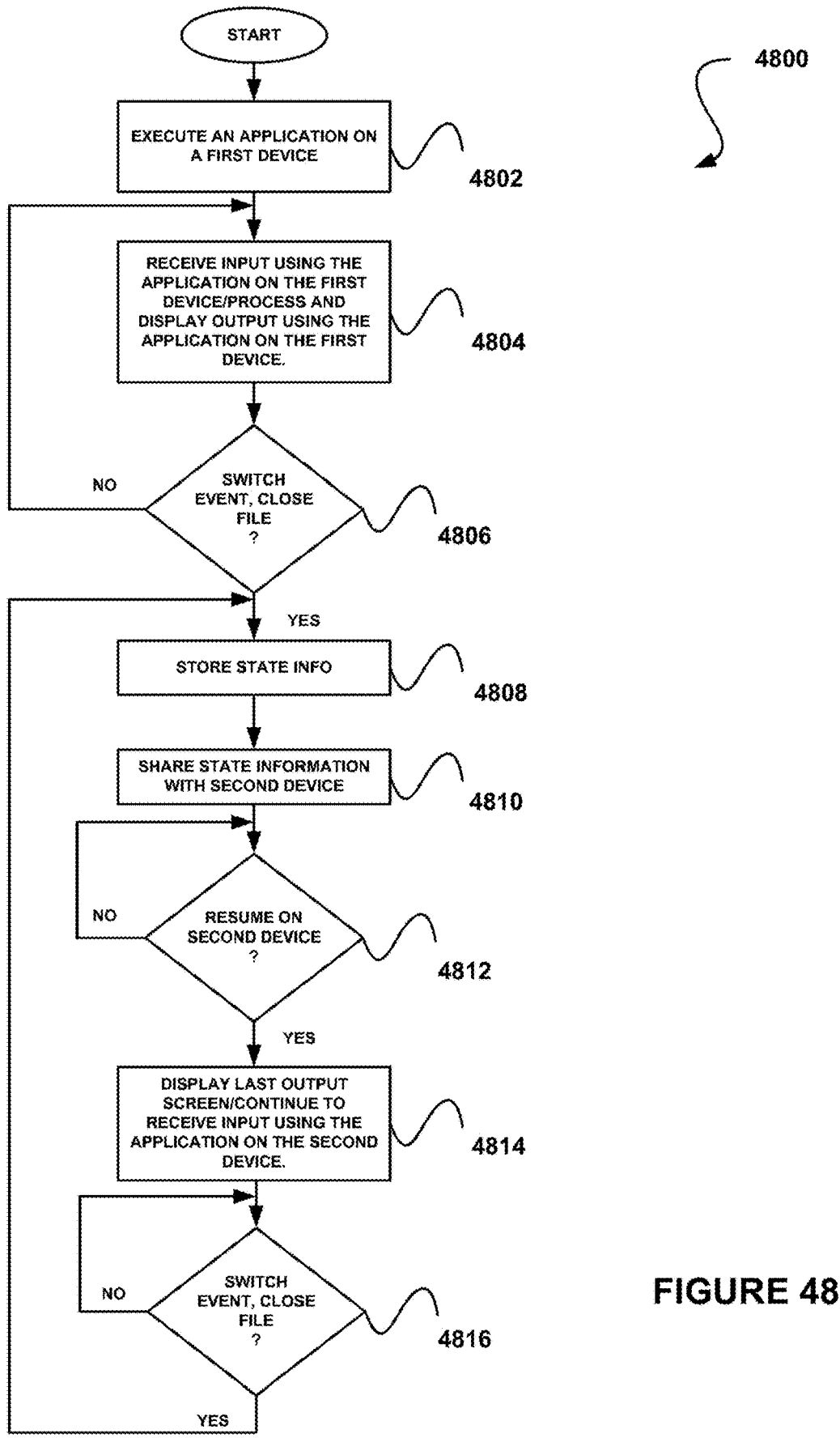
FIG. 48 shows a method for integrating a tablet computer and a phone device, based on a switch event, in accordance with one possible embodiment.

FIG. 48 shows a method 4800 for integrating a tablet computer and a phone device, based on a switch event, in accordance with one possible embodiment. As an option, the method 4800 may be implemented in the context of the architecture and environment of the previous Figures or any subsequent Figure(s). Of course, however, the method 4800 may be carried out in any desired environment. It should also be noted that the aforementioned definitions may apply during the present description.

As shown, an application on a first device may be executed. See operation 4802. In one embodiment, such an application may be capable of being used to initiate, contribute to, and/or complete a task. For example, the application or task may include starting a program, making a call, creating a document, taking a picture, or executing any other single block of functions. In another embodiment, the application may include initializing a social networking application, a joint collaboration platform, a cloud based application, and/or any other type of application.

As shown, input using the application on the first device may be received and output using the application on the first device may be processed and displayed. See operation 4804. For example, in one embodiment, a word processing application may receive a text input and display the text output on the device display. In another embodiment, a photo may be opened and receive inputs in the form of crop and alteration (e.g. brightness, contrast, etc.) commands and display the output on the device display. Of course, any input may be received on any application.

As shown, it is determined if a switch event has occurred or a file has been closed. See decision 4806. In one embodiment, a switch event may include any event where a saved state may be resumed on another device. For example, in one embodiment, a document may have been created, edited, and saved. Such a document may then be subsequently opened on another device and resumed. In another embodiment, the file may be closed and later resumed from the point at which the document had been closed on the first device. Of course, the closing of an application or program would also inherently close the file and store the state as well.

Additionally, in a further embodiment, the saved state may occur periodically and automatically. For example, in one embodiment, the user may preconfigure settings of an application automatically save a state every hour. Of course, any time period may be preconfigured by the user.

In another embodiment, the first device may continue to have an application and file open, and subsequently open the application and file on a second device. In such a situation, the saved state may be opened on the second device, and the application and file may be automatically closed on the first device. In a further embodiment, when a first device and a second device are within a specified distance of each other, the first device may automatically revert to a specified function (e.g. digital keyboard, display, etc.) and the second device may automatically open the saved state of the file. In another embodiment, the first device may have a file open, and a second device may open the same file which may automatically close the file on the first device.

For example, an embodiment is contemplated where a first device is a desktop/laptop device or a tablet that serves as a computing device (possibly higher capacity), and a second device includes a phone or mobile tablet device (possibly lower capacity). In such embodiment, the first device may be utilized to perform first actions in association with a task (e.g. create and edit a document, etc.) after which the switch event may be associated with/prompted by a close file event, device/application shut-down, device standby, device mode change (see any of the mode/role changes disclosed herein), device undocking, etc. of the first device (or even second device). In such case, the second device may be used to seamlessly resume with the task by being prompted to do so, etc. (e.g. possibly after opening the same application on the second device, in connection with a task list posted on the second device, etc.).

In one embodiment, the first device may have a file open, and a second device may open the same file without closing the file on the first device. For example, both devices may access the same file and make changes to the document that may be displayed on both the first and second devices. In one embodiment, each device may store a local copy of the file and send updated state changes to the other device. In another embodiment, the devices may communicate with real time updates and may display any changes made immediately. In a further embodiment, the devices may be connected to the cloud (e.g. internet, etc.) and each device accesses a common cloud platform which saves the changes to the file from all devices.

If it is determined that a switch event has occurred or a file has been closed, the state information may be stored, as shown. See operation 4808. In one embodiment, the state information may include saved data relating to an application. For example, the state information may include file metadata, data files (e.g. text files or binary files), or any other data relating to the application and/or file. In one embodiment, the state information may also include a user id, a timestamp, and/or any other information that may relevant later when the file is reopened.

As shown, state information is shared with the second device. See operation 4810. In one embodiment, the sharing may be performed immediately or as needed. For example, once the first and second devices establish communication with each other, state information may be exchanged. As discussed above, communication may be established wirelessly or by a wired connection and may be automatic or manual.

In one embodiment, once an application is opened on a second device, the application may request updates from any other device. In another embodiment, the first device may automatically send state information updates to other devices at set intervals. For example, the updates may be set immediately upon saving a state or closing a file, or may be sent at a sent at a set later time period.

In another embodiment, the communication may be established by a peer-to-peer protocol. For example, wireless devices within range of each other may discover and may communicate directly without involving central access points. In another embodiment, a bridge may function as a connection point for a peer-to-peer protocol. Of course, any other technique may also be used to discover and foster communication between two devices. As an option, the peer-to-peer protocol (or any other similar direct communication protocol) may be conditionally used (in lieu of or in addition to) any server interaction, if such server interaction is not available, to thereby ensure connectivity, synchronization, etc.

In one embodiment the peer-to-peer protocol system may be configured to provide visibility to only users on one or more identified networks thereby precluding access to users residing outside the identified LANs. Additionally, such access restrictions may be enforced by firewalls or via the private network configuration, for example. Additionally, any other security mechanism may be used to protect and secure the network by which the tablet computer and the phone device communicate.

In a further embodiment, the devices may communicate through a server. For example, a local server may allow the devices to locally communicate. In another embodiment, the devices may communicate through an online (i.e. cloud-based) server. Of course, the devices may communicate through any type of server, regardless of whether the server is local or remote based.

As shown, it is determined whether to resume the state information on a second device. See decision 4812. In various embodiments, state information may be resumed based on user input or device settings. For example, in one embodiment, an application or a file may be selected by the user and opened. After the user selects such an application or a file, a prompt may be given to the user requesting if it is desired to resume the saved state. In another embodiment, no prompt may be given and the file or application may simply be opened without any user feedback. As another example, in one embodiment, state information may be resumed based on settings the user has preconfigured on the device. For example, the user may configure the device to automatically open any state information upon selecting a file and/or an application.

If it is determined to resume the state information on a second device, a last output screen may be displayed and input may continue to be received using the application on the second device, as shown. See operation 4814. For example, in one embodiment, the word processing application may be retrieved and initially display the last output screen as seen on the first device. Additional text may then be inputted and displayed into the application through the second device. In another embodiment, a game application may be retrieved and display the last output screen as seen on the first device. Playing the game may then be continued on the second device. Of course, any application may be resumed on a second device, and display the last output screen from the first device and receive input using the application on the second device.

As shown, it is determined if a switch event has occurred or a file has been closed. See decision 4816. In one embodiment, a switch event may include any event where a saved state may be resumed on another device. For example, in one embodiment, a document may have been created, edited, and saved. Such a document may then be subsequently opened on another device and resumed. In another embodiment, the file may be closed and later resumed from the point at which the document had been closed on the first device. Of course, the closing of an application or program would also inherently close the file and store the state as well.

Additionally, in a further embodiment, the saved state may occur periodically and automatically. For example, in one embodiment, the user may preconfigure settings of an application automatically save a state every hour. Of course, any time period may be preconfigured by the user.

In another embodiment, the first device may continue to have an application and file open, and subsequently open the application and file on a second device. In such a situation, the saved state may be opened on the second device, and the application and file may be closed on the first device. In a further embodiment, when a first device and a second device are within a specified distance of each other, the first device may automatically revert to a specified function (e.g. digital keyboard, display, etc.) and the second device may automatically open the saved state of the file. In another embodiment, the first device may have a file open, and a second device may open the same file which may automatically close the file on the first device.

In one embodiment, the first device may have a file open, and a second device may open the same file without closing the file on the first device. For example, both devices may access the same file and make changes to the document that may be displayed on both the first and second devices. In one embodiment, each device may store a local copy of the file and send updated state changes to the other device. In various embodiments, the updated state changes may occur periodically (e.g. once every X minutes or seconds, etc.) and/or as a result of an action (e.g. a save command initiated by the user, etc.).

In another embodiment, the devices may communicate with real time updates and may display any changes made immediately. In a further embodiment, the devices may be connected to the cloud (e.g. internet, etc.) and each device accesses a common cloud platform which saves the changes to the file from all devices.

If it is determined that a switch event has occurred or a file has been closed, the state information may be stored, as shown. See operation 4808. At this point, in one embodiment, the state information may be resumed on a third, fourth, or any number of additional devices. As such, tablet computers and phone devices may be constantly integrated so that switching from one device to another is a seamless and fluid experience for the user. For example, a user may start a word document on a tablet computer. While traveling, the user may continue the word document on a phone device. And later, the user may further continue the word document on another tablet computer. Transitioning from one device to the next may thus be completely more seamlessly. In the context of the present description, seamless refers to a consistent look and uninterrupted transition of work on a file regardless of the device used to access the file. For example, transitioning from one device to another may permit resuming work on a file. In one embodiment, the user may be permitted to resume work on a file immediately. In such a configuration, the user's devices may be connected on a peer-to-peer network or to a broadband internet connection.

Figure 49:
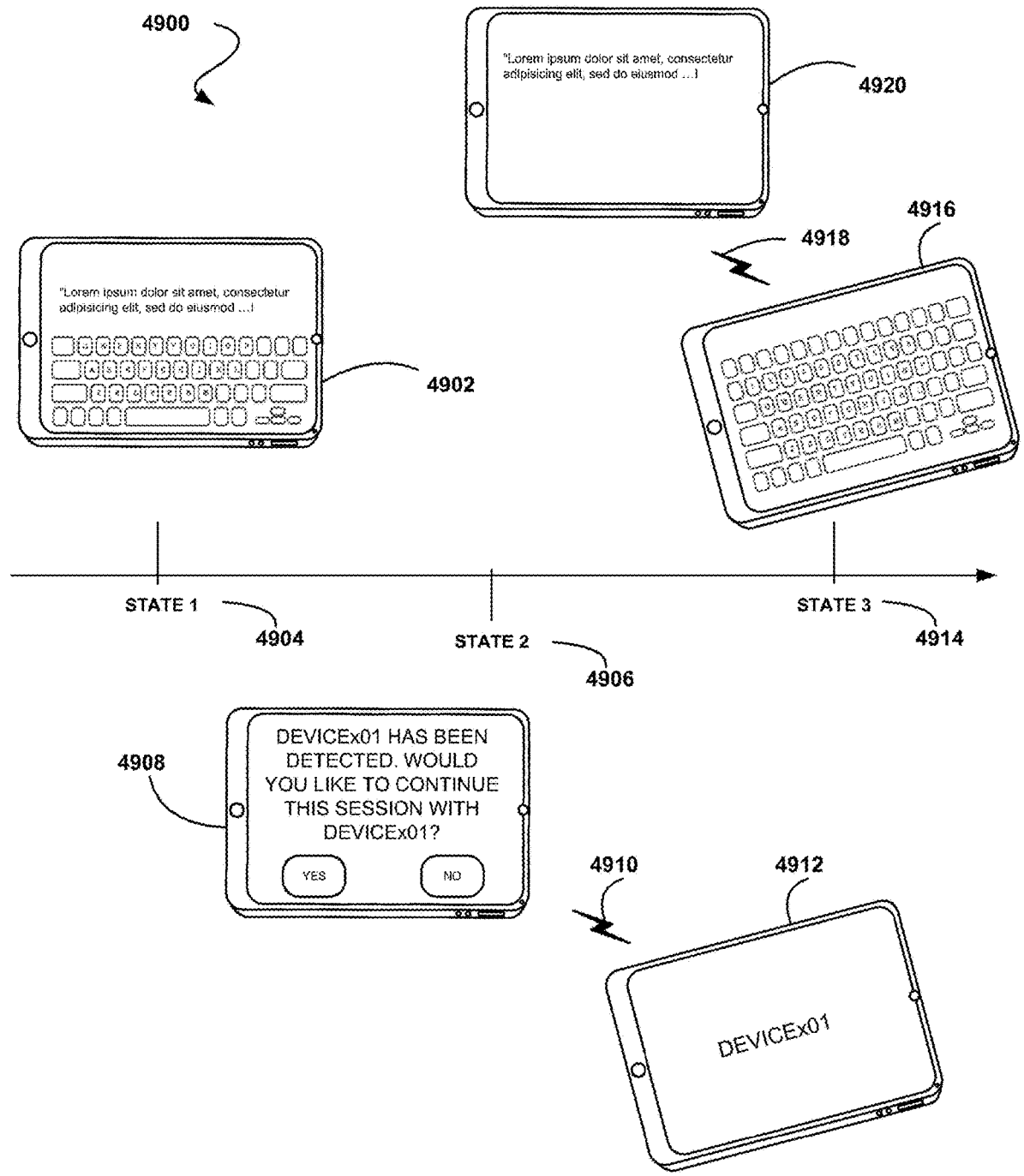
FIG. 49 shows a timeline for connecting a tablet computer and a phone device, in accordance with one possible embodiment.

FIG. 49 shows a timeline 4900 for connecting a tablet computer and a phone device, in accordance with one possible embodiment. As an option, the timeline 4900 may be implemented in the context of the architecture and environment of the previous Figures or any subsequent Figure(s). Of course, however, the timeline 4900 may be carried out in any desired environment. It should also be noted that the aforementioned definitions may apply during the present description.

As shown, state 1 4904 may be included on the timeline. In one embodiment, a first state may involve a device (e.g. 4902, tablet computer, phone device, etc.) which receives an input from a user and displays the output. In one embodiment, the display may be both an input device and an output device simultaneously. Additionally, in other embodiments, in addition to being an output device, the display may be a cursor controlling device, where a finger, stylus, or other apparatus interacting with the display results in cursor events. Of course, the display may function in any manner by which an input is received and an output is displayed.

In some embodiments, the device may include a word processing application where text is inputted by an on-screen keyboard and displayed (i.e. outputted, etc.) on the device display. In another embodiment, the device may include a photo editing application where displayed input keys have preconfigured functions (e.g. curve, layers, b&w, etc.) which may be used to edit a photo. Such input keys may be arranged on a digital image editing keyboard.

In another embodiment, the device may include an industrial process design application. For example, a collaborative design module within the application may permit a reviewer to capture and annotate screens using an input (e.g. electronic pen, finger, stylus, etc.) and screen capture capability of the device. The annotated captured screens may thereafter be placed within a data storage on the network or emailed to a developer of the industrial process control system using the wireless network connectivity feature of the device. As such, during a design and development phase of a project, developers may use the device to annotate changes, develop graphics, and track changes to process control designs.

Additionally, the device may be used to for production management usage. For example, the device may be utilized during production meetings, shift reviews and production management applications. Additionally, the device may support integrating data from applications (e.g., database programs) which may enable the user to bring plant data (e.g., real time, historical, etc.) which may be transported to a variety of locations including a plant floor and a conference room. Of course, any application may be used to receive user input and display the output.

As shown, state 2 4906 may be included on the timeline. In one embodiment, the state 2 may involve a first device (e.g. 4908, same device as in state 1, etc.) and a second device (e.g. 4912, etc.). Additionally, a wireless connection 4910 may be included. In one embodiment, the wireless connection may be used to connect the first device to the second device, or to any additional device which seeks to connect with either the first or second device.

In one embodiment, the first device may prompt the user with "DEVICEx01 HAS BEEN DETECTED. WOULD YOU LIKE TO CONTINUE THE SESSION WITH DEVICEx01?" In one embodiment, this prompt may be displayed as soon as a connection (e.g. automatic, manual, etc.) is activated between the two devices. In other embodiments, the prompt may be delivered in association a close file event, device/application shut-down, device standby, device mode change (see any of the mode/role changes disclosed herein), and/or device undocking, etc. of the first device (or even second device).

Additionally, a user may be presented with buttons "yes" and "no" by which user may input feedback. In one embodiment, if the user selects "no," the first device display reverts back to what was displayed in state 1 (e.g. 4904, etc.). If the user selects "yes," the first device advances to state 3 (e.g. 4914, etc.).

As shown, state 3 4914 may be included on the timeline. In one embodiment, the state 3 may involve a first device (e.g. 4920, same device as in state 1, etc.) and a second device (e.g. 4916, etc.). Additionally, a wireless connection 4918 may be included and may be used to connect device 4920 to device 4916. In various embodiments, any number of devices may be used and connected wirelessly.

In one embodiment, after a user selects "yes" in response to continuing an application session on the first device, the two devices automatically activate preconfigured settings and resume the application being used in state 1. For example, the first device (e.g. 4920, etc.) may automatically function as a display (e.g. display inputted text, etc.). Additionally, the second device (e.g. 4916) may automatically function as an on-screen keyboard. Of course, the first device, the second device, and/or any other device which may be connected, may automatically function in any preconfigured setting. Additionally, although the above example automatically activates preconfigured settings, the devices may also activate settings manually. Further, the settings may be configured at the time of connection (e.g. dropdown menu may appear on each screen requesting the setting to be activated, etc.), which especially may occur if a device had not previously been recorded and configured.

Figure 50:
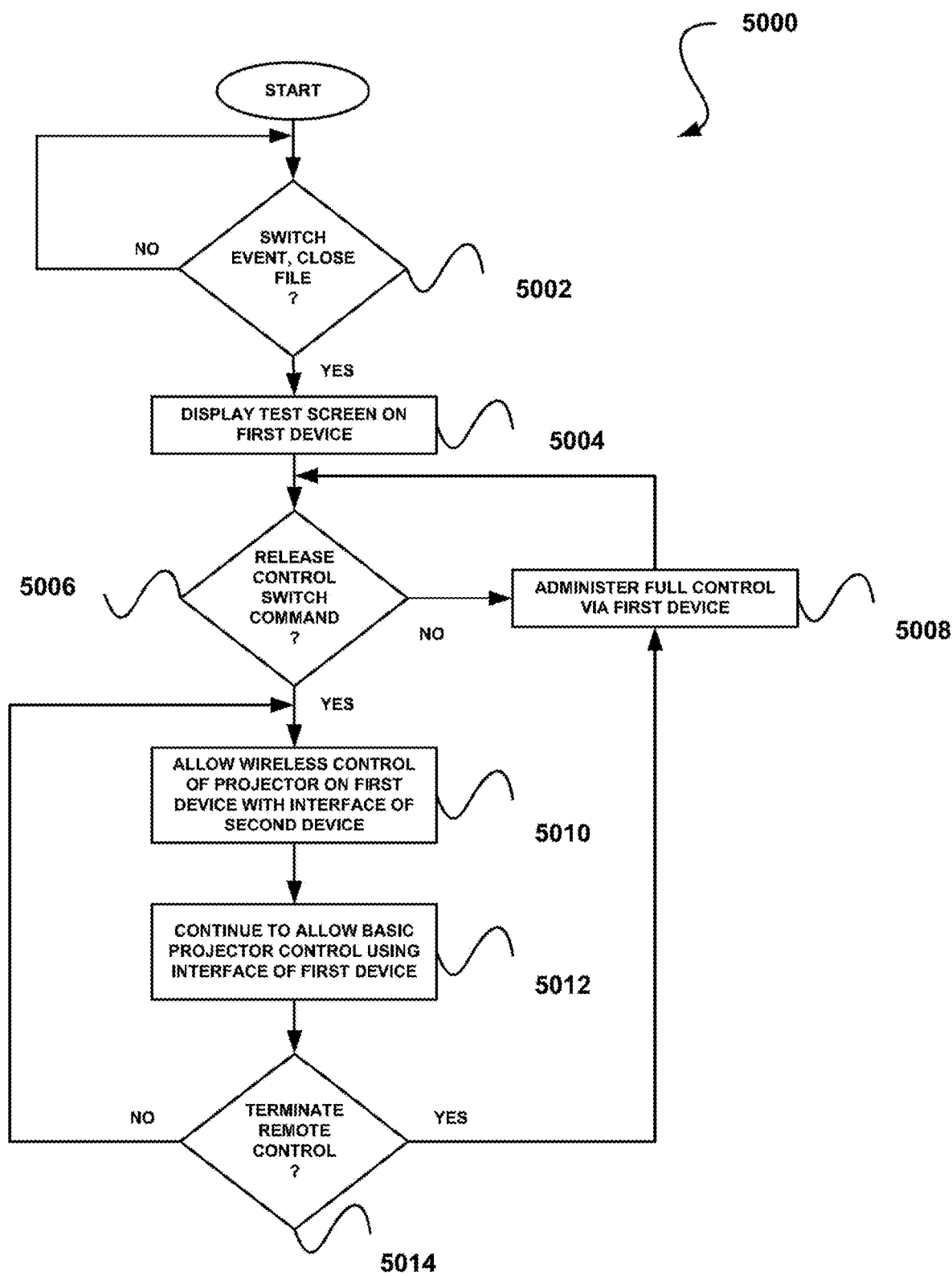
FIG. 50 shows a method for controlling a projector, in accordance with one possible embodiment.

FIG. 50 shows a method 5000 for controlling a projector, in accordance with one possible embodiment. As an option, the method 5000 may be implemented in the context of the architecture and environment of the previous Figures or any subsequent Figure(s). Of course, however, the method 5000 may be carried out in any desired environment. It should also be noted that the aforementioned definitions may apply during the present description.

As shown, it is determined if a switch event has occurred or a file has been closed. See decision 5002. In one embodiment, a switch event may include any event where a saved state may be resumed on another device. For example, in one embodiment, a document may have been created, edited, and saved. Such a document may then be subsequently opened on another device and resumed. In another embodiment, the file may be closed and later resumed from the point at which the document had been closed on the first device. Of course, the closing of an application or program would also inherently close the file and store the state as well.

In another embodiment, the first device may continue to have an application and file open, and subsequently open the application and file on a second device. In such a situation, the saved state may be opened on the second device, and the application and file may be closed on the first device. In a further embodiment, when a first device and a second device are within a specified distance of each other, the first device may automatically revert to a specified function (e.g. digital keyboard, display, etc.) and the second device may automatically open the saved state of the file. In another embodiment, the first device may have a file open, and a second device may open the same file which may automatically close the file on the first device.

In one embodiment, the first device may have a file open, and a second device may open the same file without closing the file on the first device. For example, both devices may access the same file and make changes to the document that may be displayed on both the first and second devices. In one embodiment, each device may store a local copy of the file and send updated state changes to the other device. In another embodiment, the devices may communicate with real time updates and may display any changes made immediately. In a further embodiment, the devices may be connected to the cloud (e.g. internet, etc.) and each device accesses a common cloud platform which saves the changes to the file from all devices.

If it is determined that a switch event has occurred or a file has been closed, a test screen may be displayed on the first device, as shown. See operation 5004. It should be strongly noted that, in the context of the present embodiment, decision 5002 is clearly optional and other embodiments are contemplated where such decision 5002 is omitted.

In one embodiment, a test card, or test pattern may be displayed. Additionally, the screen may cycle through different display resolutions until a set resolution is selected by a user. Of course, any image may be displayed as a test screen, and any technique may be used to display the test screen on the first device.

In another embodiment, the test screen being displayed may be a screen offering additional control and functionality of the device. For example, in one embodiment, the test screen displayed may include control buttons such as "release control to device," "allow device to remotely login," "alter test screen," or any other button that may relate to control and/or functionality of the device. Of course, the test screen may additionally include an "exit" or "resume" option.

As shown, it is determined whether to release a control switch command. See decision 5006. In various embodiments, a release control switch command may occur automatically or manually. For example, after a test screen is displayed on the first device, the first device may be used as a projector to display a device's display. In such a scenario, control of the first device may be released. The first device may then be controlled by a second device and/or another device. In one embodiment, releasing control of the first device may be partial or complete. For example, after releasing control switch command, a first device may be completely controlled by another device. In another embodiment, functions of the first device may be controlled by another device while maintaining some control functionality on the touchscreen display. In another embodiment, after releasing control switch command, more than one additional device may partially or completely control the first device. For example, more than one tablet computer may alter some aspect of control of the first device (e.g. zoom, brightness, sharpness, etc.) and even content.

If it is not determined to release control switch command, full control is administered via the first device. See operation 5008. For example, in one embodiment, the first device may function as a projector. This may be accomplished with the first device being a dedicated projector, the first device being a phone or tablet device with an integrated projector, the first device being a phone or tablet device with a retrofitted projector, etc.

In any case, under one potential embodiment, full control of the projector may be at least initially accomplished through exclusive use of the first device. For example, in one embodiment, the first device may include on a screen (e.g. touchscreen, etc.) a picture of content that is to be displayed, along with command functions, including, but not limited to, "settings," "zoom," "keystone," "brightness," and/or any other control function.

In another embodiment, the spatial arrangement on the first device for the control switch command and for the picture of what is being projected, may be enlarged or rearranged. For example, the command buttons may be grouped together in a rectangle format (two columns of buttons), or stretched along the bottom of the display on one row. In another embodiment, the picture of what is being projected may be enlarged or minimized Alterations to the size may be accomplished by dragging the border of the frame to the desired height and width.

In a further embodiment, if the picture that is being projected is enlarged, the command buttons may be automatically resized and reduced in size. For example, as the picture of what is being projected is enlarged, the grouping of the command buttons may switch to another part of the screen where there is room to accommodate the grouping of the command buttons, or the command buttons may be reduced in number so that only a few buttons are displayed to accommodate the larger display of what is being projected.

If it is determined to release control switch command, wireless control of projector on first device with an interface of the second device is allowed. See operation 5010. For example, control of the projector may be done through use of an interface on the second device. In one embodiment, the interface on the second device may display the controls shown on the first device (as well as content to be/that is being displayed, optionally). In another embodiment, the second device may display separate controls than that shown on the first device. For example, if the first device is a phone device (with an integrated or retrofitted projector) and the second device is a tablet computer, the interface on the tablet computer may be more full and complete than that which may be displayed on the phone device's smaller screen and resolution.

As shown, basic projector control using interface of first device may continue to be allowed. See operation 5012. In one embodiment, the projector on the first device may be controlled in part by the interface of the second device while still maintaining input control functionality. For example, the interface on the first device may still display command buttons such as "minimize," "zoom," "brightness," and/or any other buttons that may control the projector. Of course, any button may be assigned to be displayed on the interface of the first device. To this end, at least rudimentary control of projector settings may be accomplished utilizing the first device, while control is administered via the interface of the second device. Of course, in various embodiments, the control administered via the interface of the second device may involve just the same rudimentary control (similar to the first device), full control of both content to be/that is being displayed and projector settings, just control of content to be/that is being displayed, etc.

In another embodiment, the interface of the first device may disable the background lighting of its screen to conserve battery, while still maintaining touch sensitive functionality. In a further embodiment, the interface of the first device may automatically display a different interface based on the type of second device. For example, if the second device is a phone device which controls in part the projector on the first device, the first device interface may display the same interface as the second device. In another scenario, if the second device is a tablet computer with a larger screen to display controls, the interface on the first display may display only the view of the projector, but with a tap of the screen may bring up control buttons displayed on top of the display of the projector.

As shown, it is determined to terminate the remote control. See decision 5014. In various embodiments, many techniques may be used to terminate the remote control of the projector. For example, in one embodiment, one of the control buttons may be labeled "terminate remote control," or upon touching the screen of the second device, the user may be prompted with a choice to terminate the remote control. In another embodiment, if the projector is turned off, the remote control may be automatically terminated. Of course, the projector may be turned off by the first device and/or by the second device.

In another embodiment, the remote control may be terminated based off of a threshold of inactivity. For example, the user may specify in the settings to terminate the remote control if no input is received within a set time period (e.g. fifteen minutes, etc.). In another embodiment, the remote control may be terminated based of the distance between the first device and the second device. For example, the user may specify in the settings that if the second device is a certain distance from the first device (e.g. more than 50 feet), that the remote control may be automatically terminated. Additionally, if the distance between the first device and the second device causes communication between the two devices to fail, the remote control may also be terminated. Of course, any other mechanism may be used to terminate the remote control.

It should be noted that, while a single second device is disclosed hereinabove for controlling the projector associated with the first device, a plurality of additional devices may be used for such control, particularly in a collaborative environment. In such embodiment, a single one (or more) of such additional device may be equipped with a higher level of control (e.g. full control of both content to be/that is being displayed and projector settings, etc.), while the remaining additional device may be allowed just control of content to be/that is being displayed, etc.

In some embodiments, the aforementioned collaboration may include any of the features disclosure hereinafter with respect to the video conferencing/collaboration embodiments. To this end, any one or more such video conferencing/collaboration features may be included in combination with at least one device (but also multiple) being used to control a projector such that at least one projector-equipped site may allow multiple users to view via a projector what would otherwise be viewed just by a screen of a device in a manner disclosed herein.

In various embodiments, any of the capabilities disclosed herein in connection with viewer recognition may be applied utilizing other technologies other than facial recognition and/or the other techniques disclosed herein. Just by way of example, viewer and/or user identification may also be accomplished by identifying the presence, activity, processing, input/output, etc. of a device (e.g. tablet, phone, remote control, watch, etc.) associated with a particular viewer and/or user, and thereby accomplish the same or similar capabilities, applications, etc.

In various other optional embodiments, the features, capabilities, and/or technology, etc. of the television, mobile devices, and/or mobile device applications, etc. disclosed in the following patents/applications may or may not be incorporated into any of the embodiments disclosed herein: U.S. Pat. Nos. 8,078,397, 7,669,123, 7,725,492, 7,788,260, 7,797,256, 7,809,805, 7,827,208, 7,827,265, 7,890,501, 7,933,810, 7,945,653, 7,970,657, 8,010,458, 8,027,943, 8,037,093, 8,081,817, 8,099,433, US20080033739A1, US20080046976A1, US20090144392A1, US20090198487A1, US20100049852A1, US20100132049A1, US20100164957A1, US20100169327A1, US20100198581A1, US20100229223A1, US20100257023A1, and/or US20110044354A1. Each of the foregoing patents/applications are hereby incorporated by reference in their entirety for all purposes.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

In one embodiment, each method described above and combinations thereof may be embodied in computer executable code that, when executing on one or more computing devices, performs the acts and/or provides the capabilities thereof. In another embodiment, the methods may be embodied in systems that perform the acts and/or provides the capabilities thereof, and may be distributed across devices in a number of ways, or all of the functionality may be integrated into a dedicated, standalone device or other hardware. In another embodiment, means for performing the steps associated with the processes described above may include any of the hardware and/or software described above. All such permutations and combinations are intended to fall within the scope of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a first device including a first Bluetooth interface, a first Wi-Fi interface, a first input device, a first display, at least one first processor, and a first memory storing first instructions and an application, the first device including a desktop computer or a lap-top computer;
   a second device that is physically separated from the first device, the second device including a second Bluetooth interface, a second Wi-Fi interface, a touchscreen including a second input device and a second display, at least one second processor, and a second memory storing second instructions, the second device including a tablet;
   said at least one first processor of the first device configured to execute the first instructions stored in the first memory for causing the first device to:
      display content via the first display of the first device utilizing the application, and
      display an option via the first display of the first device for, in response to a detection of a selection thereof via the first input device of the first device, conditionally causing display of the content on the touchscreen of the tablet in addition to the content being displayed via the first display of the first device, in a mode of operation during which the touchscreen of the tablet operates as a secondary display for the first device, where a state is capable of being communicated between the first device and the tablet via a wireless connection;
   said at least one second processor of the tablet configured to execute the second instructions stored in the second memory for, in response to the detection of the selection of the option via the first input device of the first device, causing the tablet to:
      display, via the touchscreen of the tablet, an interface including:
         based on the state received from the first device, the content for, in response to a detection of a finger gesture thereon via the touchscreen of the tablet, causing display of a manipulation of at least a portion of the content via the first display of the first device,
         a first indicia for, in response to a detection of a selection thereof via the touchscreen of the tablet, changing at least one aspect of the mode of operation during which the touchscreen of the tablet operates as the secondary display for the first device, and
         a second indicia for, in response to a detection of a selection thereof via the touchscreen of the tablet, conditionally displaying a virtual keyboard for providing keyboard input in connection with the content.

2. The system of claim 1, wherein the at least one second processor of the tablet is configured to execute the second instructions for causing the tablet to display the first indicia and the second indicia in a bar displayed along an edge of the touchscreen.

3. The system of claim 2, wherein the at least one second processor of the tablet is configured to execute the second instructions for causing the tablet to operate such that the display of the bar is conditionally terminated and re-displayed based on user input.

4. The system of claim 2, wherein the at least one second processor of the tablet is configured to execute the second instructions for causing the tablet to operate such that a location of the bar is based on user input received via a settings menu.

5. The system of claim 1, wherein the at least one second processor of the tablet is configured to execute the second instructions for displaying an application explorer interface for displaying third indicia for, in response to a detection of a selection thereof via the touchscreen of the tablet, displaying the interface including the content, the first indicia, and the second indicia.

6. The system of claim 1, wherein the at least one second processor of the tablet is configured to execute the second instructions for causing the tablet to display a first application launcher interface that includes at least some of a plurality of applications displayed via a second launcher interface on the first device.

7. The system of claim 1, wherein the at least one first processor of the first device is configured to execute the first instructions for causing the first device to display the option on a top of the application via the first device for, in response to the detection of the selection thereof via the first input device of the first device, causing the display of the content on the touchscreen of the tablet in the mode of operation.

97

8. The system of claim 1, wherein the system is configured such that, in response to the detection of the selection of the option via the first input device of the first device, the interface including the content, the first indicia, and the second indicia is conditionally displayed based on whether a user password has been entered via the tablet.

9. The system of claim 1, wherein the system is configured such that, in response to the detection of the selection of the option via the first input device of the first device, the interface including the content, the first indicia, and the second indicia is conditionally displayed based on whether a user password has been entered via the first device and the tablet.

10. The system of claim 1, wherein the system is configured such that, in response to the detection of the selection of the option via the first input device of the first device, the interface including the content, the first indicia, and the second indicia is conditionally displayed based on whether a user password has been entered in connection with a network service employed by both the first device and the tablet.

11. The system of claim 1, wherein the at least one second processor of the tablet is configured to execute the second instructions for, in response to the detection of the selection of the option via the first input device of the first device, causing the tablet to execute the application.

12. The system of claim 1, wherein the at least one second processor of the tablet is configured to execute the second instructions for causing the tablet to operate such that the at least one aspect of the mode of operation is changed by the mode of operation being terminated.

13. The system of claim 1, wherein the state is communicated with the tablet via the wireless connection.

14. The system of claim 1, wherein the system is configured such that:
in a first operation, the content is simultaneously displayed on both the first and second devices; and
in a second operation, the content is only displayed on the second device.

15. The system of claim 1, wherein at least one of:
the first input device and the first display are components of a first touchscreen;
the first input device includes at least one of a track pad, or a keyboard;
the indicia includes a marking;
the first and second instructions are components of different instances of the same operating system installed on both the first device and the second device;
the first and second instructions are components of an operating system installed on both the first device and the second device;
the manipulating includes at least one of moving or changing an appearance;
the first indicia includes at least one of an option, a control, a setting, or an icon;
the second indicia includes at least one of an option, a control, a setting, or an icon;
the mode of operation includes a desktop mode of operation;
the content is based on the state received from the first device, by the content being included in the interface based on the state received from the first device identifying the content;
the first device includes the desktop computer;
the first device includes the lap-top computer;
the state includes an indication of the content;
the state relates to the mode of operation;

98 the state includes an indication of the mode of operation;
the state includes or relates to a setting;
the state includes or relates to a command associated with the option;
the state includes a state of the first device;
the state includes a state of the application;
the state includes a state of the contents;
the state is communicated with the tablet via the wireless connection;
the state is communicated with the tablet via the wireless connection once;
the state is communicated with the tablet via the wireless connection periodically;
the finger gesture includes a single finger gesture;
the finger gesture includes a multiple finger gesture;
the first memory includes a single memory;
the first memory includes one or more memories;
the second memory includes a single memory;
the second memory includes one or more memories;
the content includes an entirety of a web page;
the content includes only a portion of a web page;
the content includes an entirety of interface contents;
the content includes only a portion of interface contents;
the content includes a single image;
the tablet operates as the secondary display for the first device, by including at least one of: an e-mail interface, a task manager, a calendar, social networking interface, a web browser, a music interface, an application or file explorer, a control panel, or a video conference control interface;
the tablet operates as the secondary display for the first device, by not disrupting the first device;
the tablet operates as the secondary display for the first device, by displaying the content displayed by the first device;
the tablet operates as the secondary display for the first device, by secondarily displaying the content displayed by the first device;
the content on the touchscreen of the tablet is caused to be displayed in addition to the content being displayed via the first display of the first device, by the content on the touchscreen of the tablet being caused to be displayed simultaneously with the content being displayed via the first display of the first device;
the content on the touchscreen of the tablet is caused to be displayed in addition to the content being displayed via the first display of the first device, by the content on the touchscreen of the tablet being caused to not be displayed simultaneously with the content being displayed via the first display of the first device;
the content on the touchscreen of the tablet is caused to be displayed in addition to the content being displayed via the first display of the first device, by the content on the touchscreen of the tablet being caused to be displayed partially simultaneously with the content being displayed via the first display of the first device;
the content on the touchscreen of the tablet is caused to be displayed in addition to the content being displayed via the first display of the first device, by the content on the touchscreen of the tablet being caused to be displayed initially simultaneously with the content being displayed via the first display of the first device;
the content on the touchscreen of the tablet is caused to be displayed in addition to the content being displayed via the first display of the first device, by the content on the touchscreen of the tablet being caused to be displayed identically with respect to the content being displayed via the first display of the first device;

the content on the touchscreen of the tablet is caused to be displayed in addition to the content being displayed via the first display of the first device, by the content on the touchscreen of the tablet being caused to be displayed differently with respect to the content being displayed via the first display of the first device;

the content on the touchscreen of the tablet is caused to be displayed in addition to the content being displayed via the first display of the first device, such that the content on the touchscreen of the tablet is a subset of the content being displayed via the first display of the first device;

the display of the content is conditionally caused on the touchscreen of the tablet, by not being displayed until the detection of the selection of the option via the first input device of the first device;

the display of the content is conditionally caused on the touchscreen of the tablet, by not being displayed without the detection of the selection of the option via the first input device of the first device;

the display of the content is conditionally caused on the touchscreen of the tablet, by not being displayed only after the detection of the selection of the option via the first input device of the first device;

the content is conditionally displayed in response to the detection of the selection of the option via the first input device of the first device, by being displayed immediately, without any intermediate operation, in response to the detection of the selection of the option via the first input device of the first device;

the content is conditionally displayed in response to the detection of the selection of the option via the first input device of the first device, by being displayed after at least one intermediate operation that is conditionally caused in response to the detection of the selection of the option via the first input device of the first device;

the content is conditionally displayed in response to the detection of the selection of the option via the first input device of the first device, by being displayed after at least one intermediate operation that is conditionally caused in response to the detection of the selection of the option via the first input device of the first device;

the second input device includes at least one of: capacitive, resistive, infrared, surface acoustic wave, or proximity sensor array technologies;

where the state is capable of being communicated between the first device and the tablet via the wireless connection during a first use case scenario, and the state is capable of being communicated between the first device and the tablet via a wired connection during a second use case scenario;

where the state is capable of being communicated between the first device and the tablet via the wireless connection in addition to or instead of being communicated between the first device and the tablet via a wired connection;

the second device is physically separated from the first device, while still being able to be connected via a connecting wire;

the second device is physically separated from the first device, while being connected via a connecting wire in a first use case scenario, and while not being connected via the connecting wire in a second use case scenario;

the second device is physically separated from the first device, by having separate housings;

the second device is physically separated from the first device, by having separate housings with space therebetween;

the interface includes a software interface;

the interface includes a graphical user interface;

the interface includes the content based on the state received from the first device, by the content being identified by the state;

the interface includes the content based on the state received from the first device, by the state indicating that the content is to be displayed;

the interface includes the content based on the state received from the first device, by the state resulting in the content being displayed;

where the state is capable of being communicated between the first device and the tablet via the wireless connection, by being exclusively communicated between the first device and the tablet via the wireless connection;

where the state is capable of being communicated between the first device and the tablet via the wireless connection, by being non-exclusively communicated between the first device and the tablet via the wireless connection;

where the state is capable of being communicated between the first device and the tablet via the wireless connection, by being directly communicated between the first device and the tablet via the wireless connection;

where the state is capable of being communicated between the first device and the tablet via the wireless connection, by being indirectly communicated between the first device and the tablet via the wireless connection;

where the state is capable of being communicated between the first device and the tablet via the wireless connection, by being communicated to a router, that is separate from the first device, via the wireless connection, and then being communicated over a wired connection between the router and the first device;

the at least portion of the content includes only a subset of the content;

the at least portion of the content includes an entirety of the content;

the wireless connection utilizes at least one of: the first Bluetooth interface, or the first Wi-Fi interface of the first device; and wherein the first device is configured for determining a location associated with the first device; determining a presence of at least one other person at the location; and automatically displaying a graphical user interface associated with the determined location and the determined presence of the at least one other person, wherein the first device is further configured for determining that the location is proximate to a previously identified item of interest; and displaying another graphical user interface associated with the determined location and the previously identified item of interest.

16. The system of claim 1, wherein the at least one second processor of the tablet is configured to execute the second instructions for causing the tablet to:

display a plurality of files of the content for browsing the files and for, in response to a detection of a selection of at least one of the plurality of files via the touchscreen of the tablet, displaying the at least one file via the touchscreen of the tablet;

display the first indicia and the second indicia in a bar displayed along an edge of the touchscreen;
operate such that the display of the bar is conditionally terminated and re-displayed based on user input;
a location of the bar is based on additional user input received via a settings menu;
display a plurality of
display a first application explorer interface including:
  third indicia for, in response to a detection of a selection thereof via the touchscreen of the tablet, displaying the interface including the content, the first indicia, and the second indicia, and
  at least some of a plurality of applications displayed via a second launcher interface on the first device;
operate such that the at least one aspect of the mode of operation is changed by the mode of operation being at least partially terminated; and
in response to the detection of the selection of the option via the first input device of the first device, conditionally display the interface including the content, the first indicia, and the second indicia based on whether a user password has been entered via the first device and the tablet.

17. The system of claim 16, wherein the at least one first processor of the first device is configured to execute the first instructions for causing the first device to:
display, simultaneously with the display of the content via the first device, the option on a top of the application via the first device for, in response to the detection of the selection thereof via the first input device of the first device, causing the display of the content on the touchscreen of the tablet in the mode of operation.

18. The system of claim 17, wherein:
in a first operation, the content is simultaneously displayed on both the first and second devices; and
in a second operation, the content is only displayed on the second device.

19. A non-transitory computer readable storage medium storing one or more programs, the one or more programs comprising instructions a first portion of which, when executed by a first device including a desktop computer or a lap-top computer, and a second portion of which, when executed by a second device including a tablet including a touchscreen that is physically separated from the first device, cause:
the first device to:
  display content utilizing an application, and
  display an option for, in response to a detection of a selection thereof, conditionally causing display of the content on the touchscreen of the tablet in addition to the content being displayed via the first device, in a mode of operation during which the touchscreen of the tablet operates as a secondary display for the first device, where a state is capable of being communicated between the first device and the tablet via a wireless connection;
the second device to, in response to the detection of the selection of the option via the first device, cause the tablet to:
  display, via the touchscreen of the tablet, an interface including:
    the content for, in response to a detection of a finger gesture thereon via the touchscreen of the tablet, causing display of a manipulation of at least a portion of the content via the first device,
    a first indicia for, in response to a detection of a selection thereof via the touchscreen of the tablet, changing at least one aspect of the mode of operation during which the touchscreen of the tablet operates as the secondary display for the first device, and
    a second indicia for, in response to a detection of a selection thereof via the touchscreen of the tablet, conditionally displaying a virtual keyboard for providing keyboard input in connection with the content.

20. The non-transitory computer readable storage medium of claim 19, wherein the option is displayed on a top of the application via the first device for, in response to the detection of the selection thereof, causing the display of the content on the touchscreen of the tablet in the mode of operation.

21. The non-transitory computer readable storage medium of claim 20, wherein:
in a first operation, the content is simultaneously displayed on both the first and second devices; and
in a second operation, the content is only displayed on the second device.

22. The non-transitory computer readable storage medium of claim 21, wherein the second portion of the instructions, when executed by the second device including the tablet including the touchscreen, causes the tablet to:
display the first indicia and the second indicia in a bar displayed along an edge of the touchscreen;
operate such that the display of the bar is conditionally terminated and re-displayed based on user input;
determine a location of the bar is based on additional user input received via a settings menu;
display a first application launcher interface that includes:
  third indicia for, in response to a detection of a selection thereof via the touchscreen of the tablet, displaying the interface including the content, the first indicia, and the second indicia, and
  at least some of a plurality of applications displayed via a second launcher interface on the first device;
in response to the detection of the selection of the option, cause the tablet to execute the application;
operate such that the at least one aspect of the mode of operation is changed by the mode of operation being terminated; and
in response to the detection of the selection of the option, conditionally display the interface including the content, the first indicia, and the second indicia based on whether a user password has been entered via the first device and the tablet.

23. The non-transitory computer readable storage medium of claim 22, wherein the second portion of the instructions, when executed by the second device including the tablet including the touchscreen, causes the tablet to: display a plurality of images of the content for browsing the images and for, in response to a detection of a selection of at least one of the plurality of images via the touchscreen of the tablet, displaying the at least one image via the touchscreen of the tablet.

24. The non-transitory computer readable storage medium of claim 19, wherein the second portion of the instructions, when executed by the second device including the tablet including the touchscreen, causes the tablet to: display, via the interface that is displayed in response to the detection of the selection of the option via the first device, a plurality of images of the content for browsing the images and for, in response to a detection of a selection of at least one of the plurality of images via the touchscreen of the tablet, displaying the at least one image via the touchscreen of the tablet.

25. A method, comprising:
   at a first device including a desktop computer or a lap-top computer that is physically separated from a tablet:
   displaying content utilizing an application, and
   displaying an option for, in response to a detection of a selection thereof, conditionally causing display of the content on a touchscreen of the tablet in addition to the content being displayed via the first device, in a mode of operation during which the touchscreen of the tablet operates as a secondary display for the first device, where a state is capable of being communicated between the first device and the tablet via a wireless connection;
   at the tablet:
   in response to the detection of the selection of the option via the first device, displaying, via the touchscreen of the tablet, an interface including:
      the content for, in response to a detection of a finger gesture thereon via the touchscreen of the tablet, causing display of a manipulation of at least a portion of the content via the first device,
      a first indicia for, in response to a detection of a selection thereof via the touchscreen of the tablet, changing at least one aspect of the mode of operation during which the touchscreen of the tablet operates as the secondary display for the first device, and
      a second indicia for, in response to a detection of a selection thereof via the touchscreen of the tablet, conditionally displaying a virtual keyboard for providing keyboard input in connection with the content.

26. The method of claim 25, and further comprising:
   at the tablet:
   displaying, simultaneously with the display of the content via the tablet, the first indicia and the second indicia in a bar displayed along an edge of the touchscreen;
   operating such that the display of the bar is conditionally terminated and re-displayed based on user input;
   determining a location of the bar is based on additional user input received via a settings menu;
   displaying a first application launcher interface that includes:
      third indicia for, in response to a detection of a selection thereof via the touchscreen of the tablet, displaying the interface including the content, the first indicia, and the second indicia, and
      at least some of a plurality of applications displayed via a second launcher interface on the first device;
   operating such that the at least one aspect of the mode of operation is changed by the mode of operation being terminated; and
   in response to the detection of the selection of the option, conditionally displaying the interface including the content, the first indicia, and the second indicia based on whether a user password has been entered via the first device and the tablet.

27. The method of claim 26, and further comprising:
   at the first device including the desktop computer or the lap-top computer:
   displaying the option on a top of the application via the first device for, in response to the detection of the selection thereof, causing the display of the content on the touchscreen of the tablet in the mode of operation.

28. The method of claim 27, wherein:
   in a first operation, the content is simultaneously displayed on both the first and second devices; and
   in a second operation, the content is only displayed on the second device.

29. The method of claim 25, and further comprising:
   at the tablet:
   displaying a plurality of images of the content for browsing the images and for, in response to a detection of a selection of at least one of the plurality of images via the touchscreen of the tablet, displaying the at least one image via the touchscreen of the tablet.

30. A system, comprising:
   first device means for:
   displaying content utilizing an application, and
   displaying an option for, in response to a detection of a selection thereof, conditionally causing display of the content elsewhere in addition to the content being displayed via the first device, in a mode of operation during which a touchscreen operates as a secondary display, where a state is capable of being communicated from the first device means and via a wireless connection;
   tablet means that is physically separated from the first device means, the tablet means for:
   in response to the detection of the selection of the option, displaying an interface including:
      based on the state received, the content for, in response to a detection of a finger gesture thereon, causing display of a manipulation of at least a portion of the content via the first device means,
      a first indicia for, in response to a detection of a selection thereof, changing at least one aspect of the mode of operation during which the tablet means operates as the secondary display, and
      a second indicia for, in response to a detection of a selection thereof, conditionally displaying a virtual keyboard for providing keyboard input in connection with the content.

* * * * *